United States Patent
Park et al.

(10) Patent No.: US 10,171,641 B2
(45) Date of Patent: Jan. 1, 2019

(54) DISPLAY APPARATUS

(71) Applicant: LG ELECTRONICS INC., Seoul (KR)

(72) Inventors: Mihyun Park, Seoul (KR); Hongjo Shim, Seoul (KR); Youngho Sohn, Seoul (KR); Youngsok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/669,142

(22) Filed: Aug. 4, 2017

(65) Prior Publication Data

US 2018/0041624 A1 Feb. 8, 2018

(30) Foreign Application Priority Data

Aug. 4, 2016 (KR) .......................... 10-2016-0099536

(51) Int. Cl.
*H04M 1/725* (2006.01)
*G02F 1/133* (2006.01)
(Continued)

(52) U.S. Cl.
CPC ...... *H04M 1/72522* (2013.01); *G02B 27/017* (2013.01); *G02F 1/13318* (2013.01); *G02F 1/13338* (2013.01); *G06F 1/1622* (2013.01); *G06F 1/1624* (2013.01); *G06F 1/1626* (2013.01); *G06F 1/1643* (2013.01); *G06F 3/0481* (2013.01); *G06F 3/0485* (2013.01); *G06F 3/04883* (2013.01); *G06T 15/20* (2013.01); *H04M 1/0208* (2013.01); *H04N 5/23238* (2013.01); *G02B 2027/014* (2013.01); *G02B 2027/0138* (2013.01);
(Continued)

(58) Field of Classification Search
None
See application file for complete search history.

(56) References Cited

U.S. PATENT DOCUMENTS 9,787,895 B2 10/2017 Rekimoto et al.
2012/0162357 A1 6/2012 Okegawa et al.
(Continued)

FOREIGN PATENT DOCUMENTS

WO WO 2015/122108 A1 8/2015

*Primary Examiner* — Mohammed Rachedine
(74) *Attorney, Agent, or Firm* — Birch, Stewart, Kolasch & Birch, LLP

(57) ABSTRACT

A display apparatus is disclosed. The display apparatus includes: a display unit configured to display an image; an input unit configured to receive an input from a user; and a controller configured to display a first image included in a first region of an entire region of an omnidirectionally captured image, and display a second image included in a second region of the entire region of the omnidirectionally captured image if a first input for changing a region displayed on the display unit in the entire region of the omnidirectionally captured image is received, wherein the second region is a region that is symmetrical to the first region with respect to an uppermost portion of the omnidirectionally captured image, and the first input is an input for changing the displayed region from the first region to the second region by passing through the uppermost portion of the omnidirectionally captured region.

20 Claims, 151 Drawing Sheets

(51) Int. Cl.
| | |
|---|---|
| *G02F 1/1333* | (2006.01) |
| *G06F 1/16* | (2006.01) |
| *G06F 3/0481* | (2013.01) |
| *H04M 1/02* | (2006.01) |
| *H04N 5/232* | (2006.01) |
| *G02B 27/01* | (2006.01) |
| *G06T 15/20* | (2011.01) |
| *G06F 3/0485* | (2013.01) |
| *G06F 3/0488* | (2013.01) |

(52) U.S. Cl.
CPC ........ *G02B 2027/0187* (2013.01); *G06F 2203/04804* (2013.01); *G06T 2215/16* (2013.01)

(56) References Cited

U.S. PATENT DOCUMENTS

| | | | |
|---|---|---|---|
| 2012/0262462 A1* | 10/2012 | Montan | G06T 13/80 345/473 |
| 2014/0063181 A1 | 3/2014 | Lee et al. | |
| 2016/0284048 A1 | 9/2016 | Rekimoto et al. | |
| 2016/0301865 A1 | 10/2016 | Rekimoto et al. | |
| 2018/0095650 A1* | 4/2018 | Park | G06F 3/0412 |

\* cited by examiner

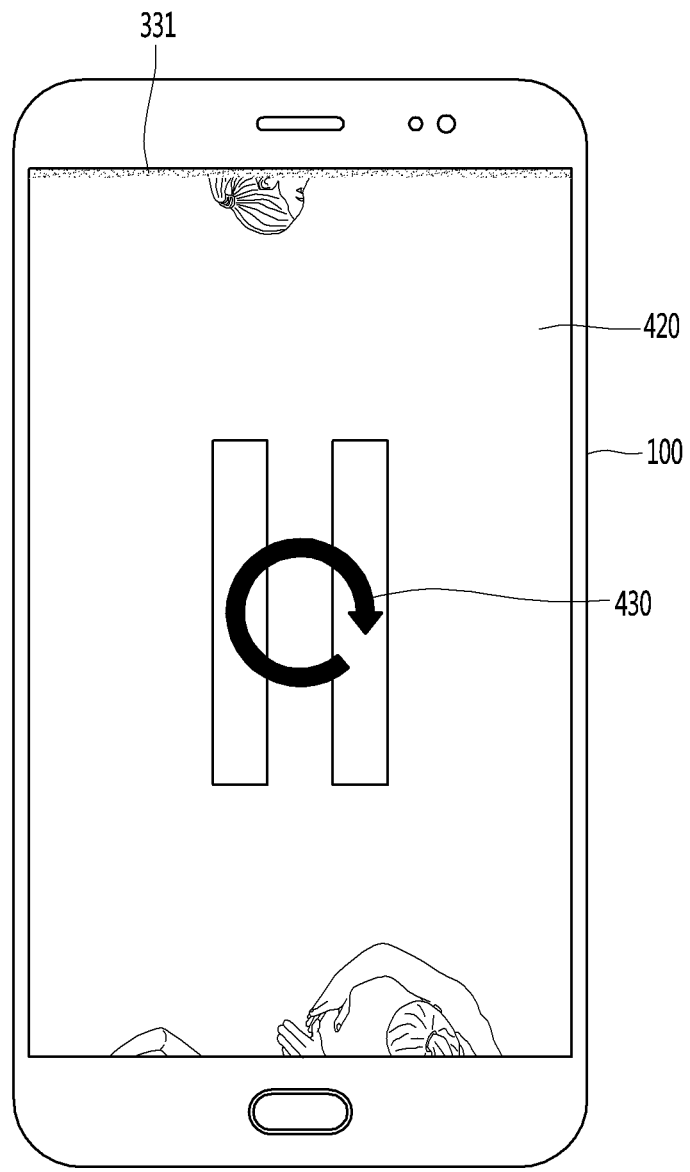

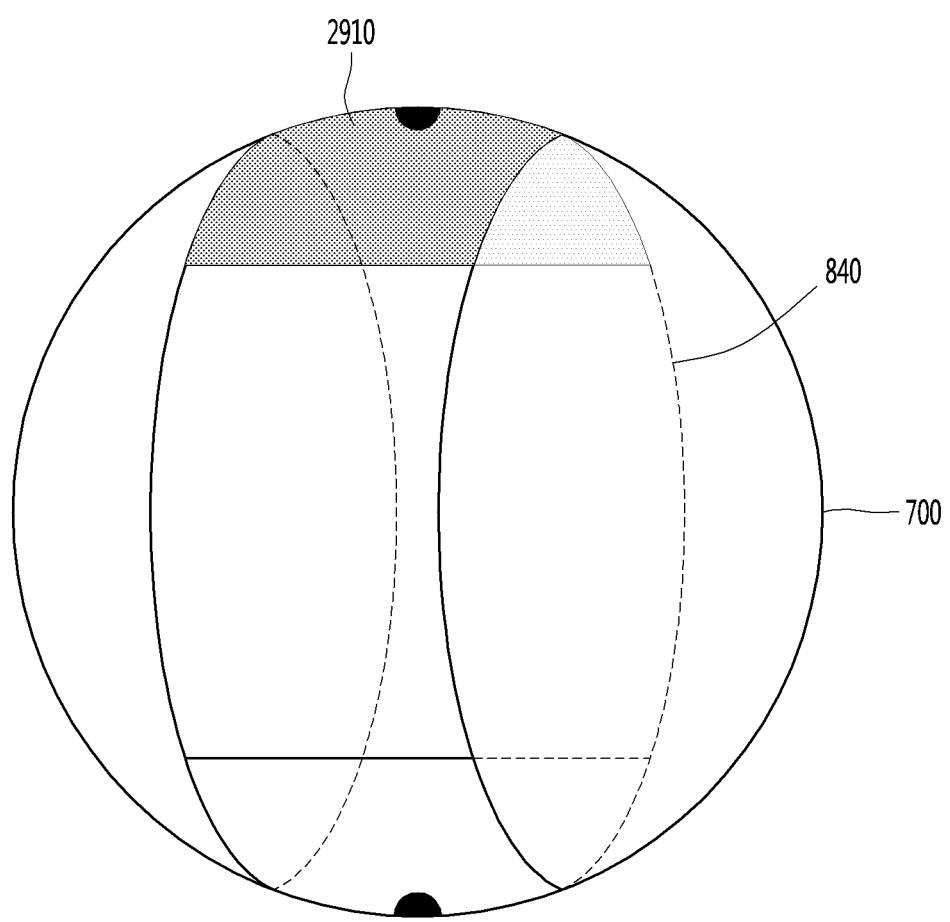

DISPLAY APPARATUS

CROSS-REFERENCE TO RELATED APPLICATIONS

This application claims priority to Korean Patent Application No. 10-2016-0099536 filed on Aug. 4, 2016 in Korea, the entire contents of which is hereby incorporated by reference in its entirety.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

On the other hand, technologies capable of omnidirectionally capturing an image by using an omnidirectional camera and providing the omnidirectionally captured image to a user have been recently introduced. A representative example is a capturing device called a 360-degree camera, a mobile terminal that displays an image captured by the 360-degree camera, or the like.

On the other hand, an omnidirectionally captured image is obtained by capturing an entire spherical region around a camera. Thus, when the entire region of the omnidirectionally captured image is displayed on one screen, severe distortion occurs in the displayed image.

Therefore, an image of a partial region of an omnidirectionally captured image is displayed, and then, an image of the other region is displayed according to a user manipulation.

When a manipulation of changing a displayed region is performed to pass through an uppermost portion or a lowermost portion of an omnidirectionally captured image, a reverse image (upside down in terms of a user) is displayed. In order to solve such problems, the related art prevents the displayed region from being changed by passing through the uppermost portion or the lowermost portion of the omnidirectionally captured image.

However, a user viewing an image may want to view a reverse image so as to have an experience similar to reality. For example, when the user wants to have a feeling as if the user views an image in a reverse direction while tilting his or her head back, it is necessary to display a reverse image of an opposite region by passing through the uppermost portion of the omnidirectionally captured image from the currently displayed region. When the user wants to have a feeling as if the user views an image in a reverse direction while standing on his or her hands, it is necessary to display a reverse image of an opposite region by passing through the lowermost portion of the omnidirectionally captured image from the currently displayed region.

However, in the related art, it is impossible to satisfy such needs of the user.

Also, the user may want to view a region, which is opposite to a region that the user currently views, as a normal image (an image that is not upside down in terms of the user) through a simple manipulation.

However, when the displayed region is not changed by passing through the uppermost portion or the lowermost portion, the user has to perform a manipulation several times so as to find an opposite region and the accuracy thereof is reduced.

SUMMARY

The present disclosure is directed to provide a display apparatus capable of changing a displayed region of an omnidirectionally captured image to an opposite region by passing through the displayed region of the omnidirectionally captured image through an uppermost portion or a lowermost portion of the omnidirectionally captured image.

In one embodiment, a display apparatus includes: a display unit configured to display an image; an input unit configured to receive an input from a user; and a controller configured to display a first image included in a first region of an entire region of an omnidirectionally captured image, and display a second image included in a second region of the entire region of the omnidirectionally captured image if a first input for changing a region displayed on the display unit in the entire region of the omnidirectionally captured image is received, wherein the second region is a region that is symmetrical to the first region with respect to an uppermost portion of the omnidirectionally captured image, and the first input is an input for changing the displayed region from the first region to the second region by passing through the uppermost portion of the omnidirectionally captured region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
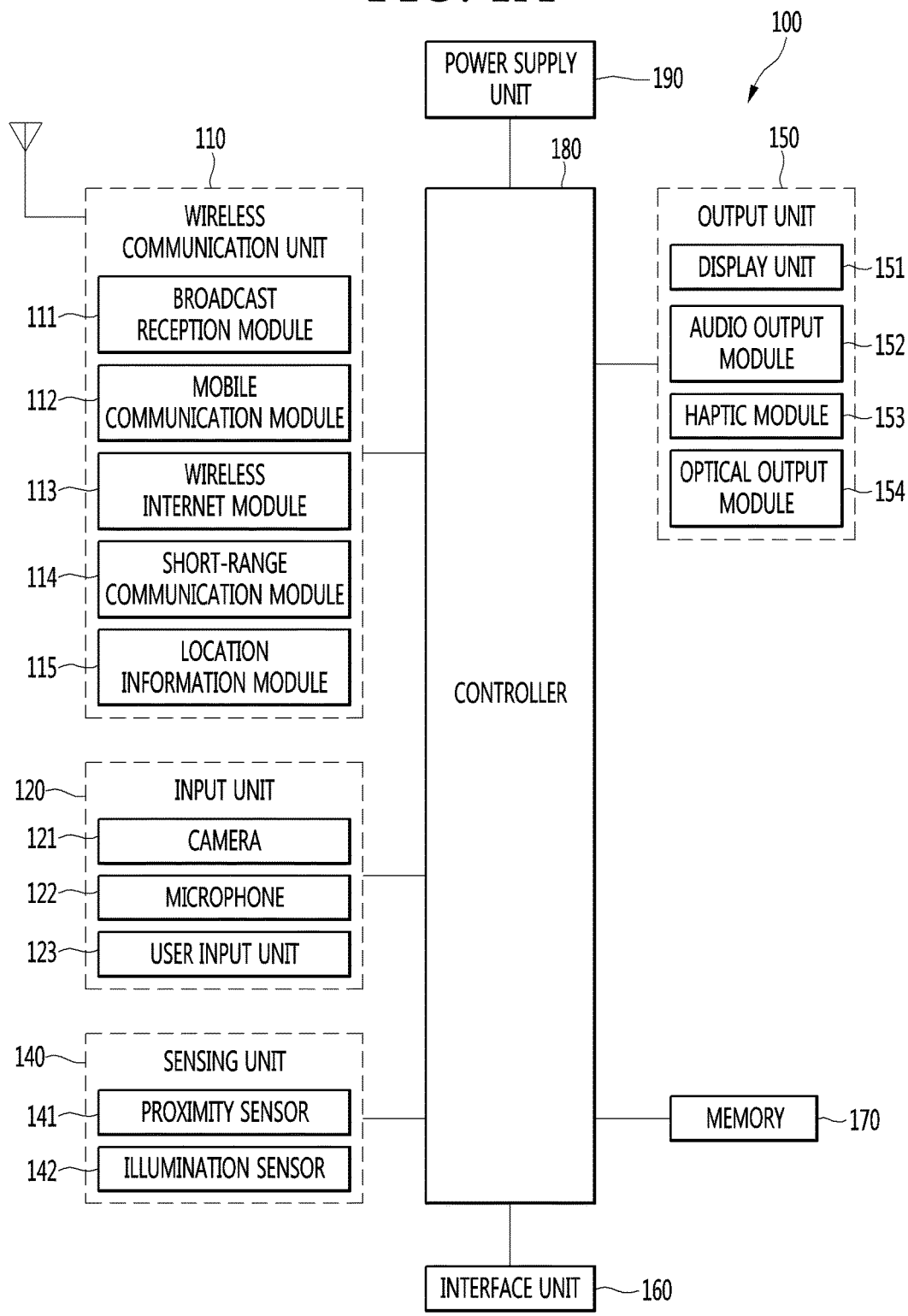
FIG. 1A is a block diagram of a mobile terminal in accordance with the present disclosure.
Figure 1B:
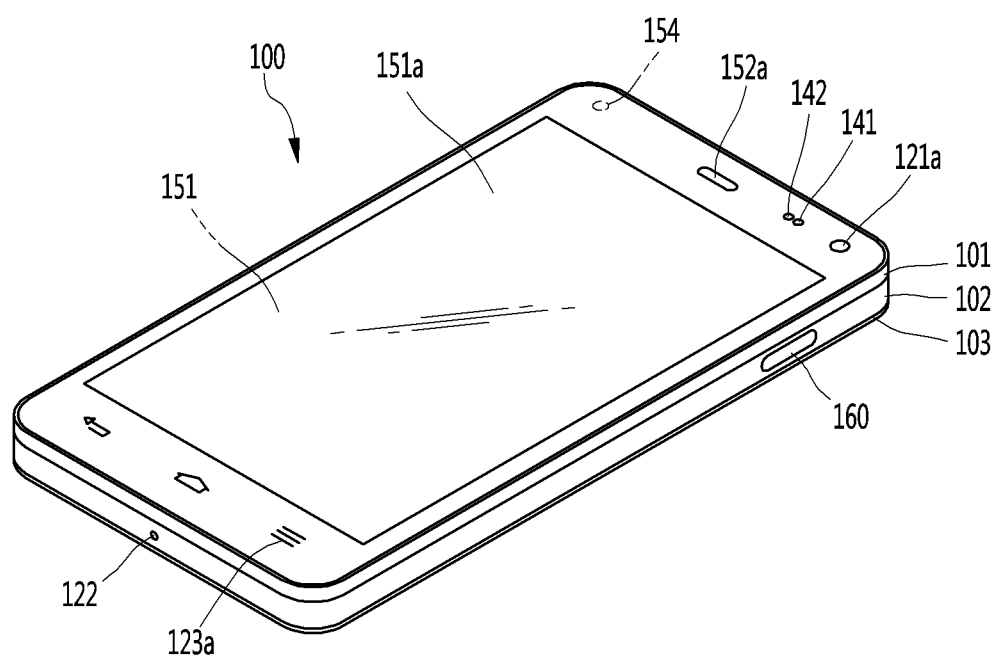
FIGS. 1B and 1C are conceptual views of one example of the mobile terminal, viewed from different directions.
Figure 1C:
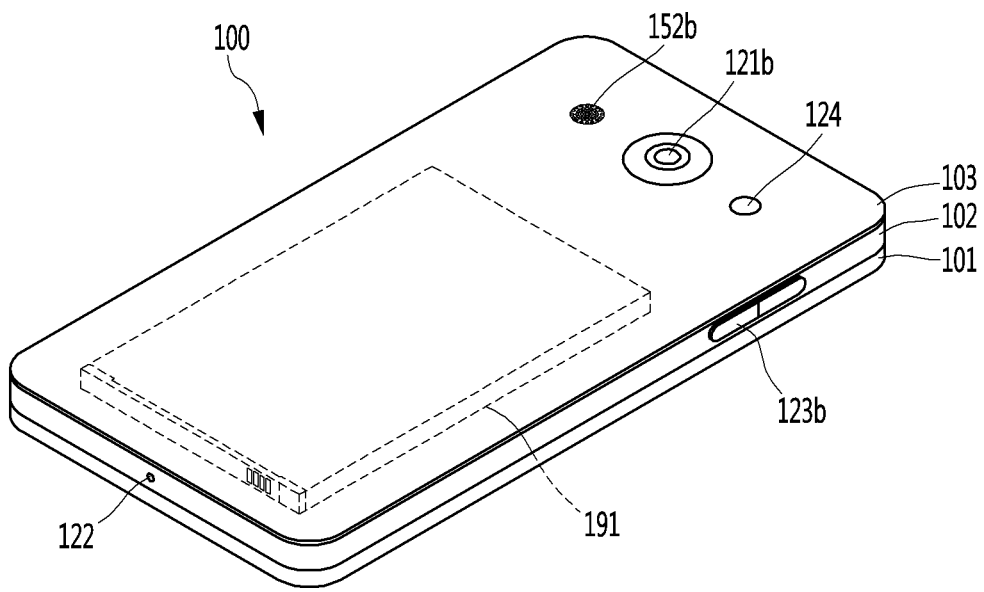

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference therebetween by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the present disclosure, the term "memory 170" may also be referred as the "storage unit 170".

The input unit 120 of the mobile terminal 100 may include the sensing unit 140 and perform all functions performed by the sensing unit 140. For example, the input unit 120 may sense a user touch input.

The present disclosure is described as being implemented in the mobile terminal 100, but the present disclosure is not limited. The present disclosure may be implemented in any display apparatuses. Also, the display apparatus may include all or part of the components of the mobile terminal described above with reference to FIGS. 1A to 1C.

Figure 2:
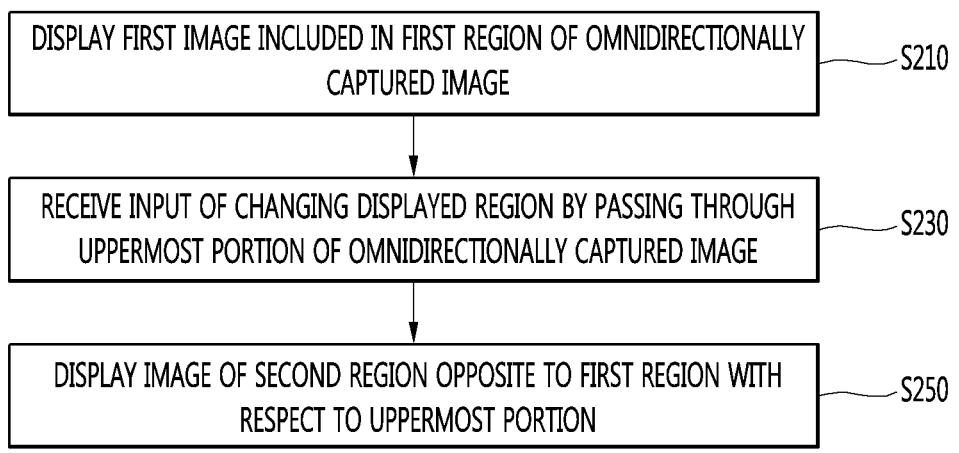
FIG. 2 is a flowchart of a displaying method of a display apparatus, in accordance with an embodiment of the present disclosure.

FIG. 2 is a flowchart of a displaying method of a display apparatus, in accordance with an embodiment of the present disclosure.

The displaying method of the display apparatus in accordance with the embodiment of the present invention may include: displaying a first image included in a first region of an entire region of an omnidirectionally captured image (S210); receiving a first input for changing a displayed region from a first region to a second region by passing through an uppermost portion of the omnidirectionally captured image (S230); and displaying a second image included in the second region opposite to the first region, based on the uppermost portion of the omnidirectionally captured image, in the entire region of the omnidirectionally captured image (S250).

FIGS. 3A to 6B are views for describing a conventional method of changing a displayed region of an omnidirectionally captured image reversely, based on an uppermost portion.

Figure 3A:
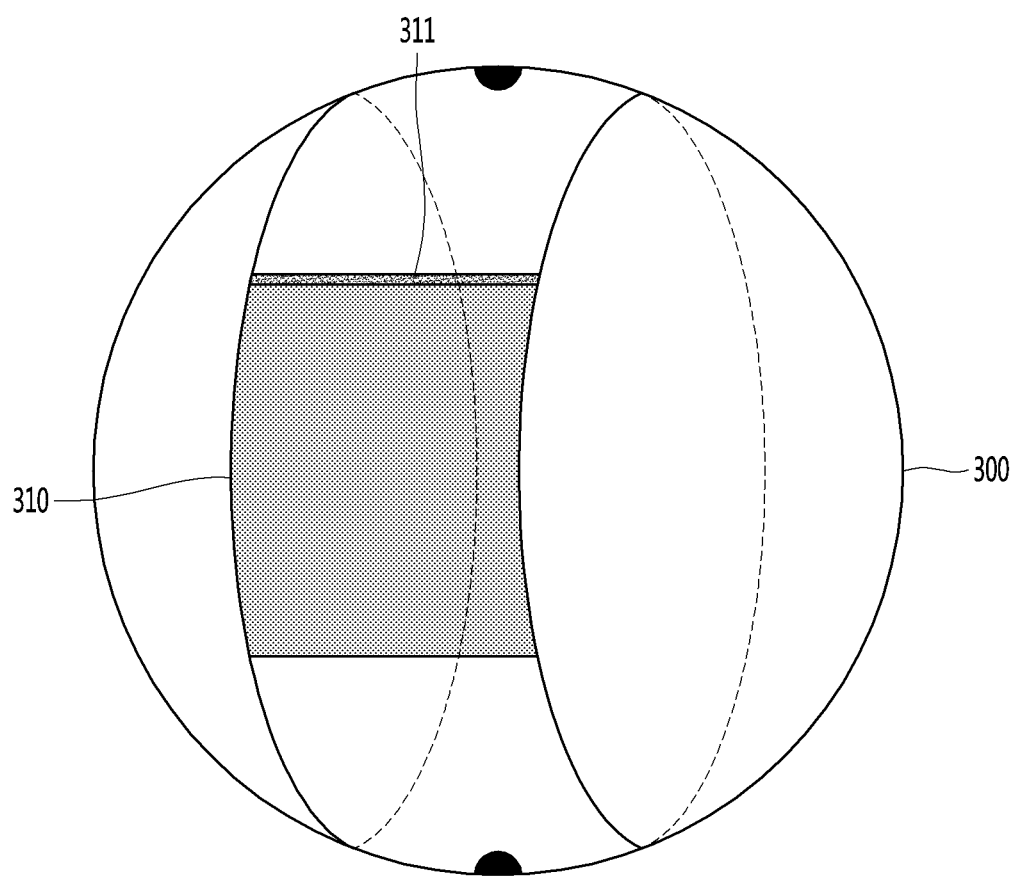
FIGS. 3A to 6B are views for describing a conventional method of changing a displayed region of an omnidirectionally captured image reversely, based on an uppermost portion.
Figure 3B:
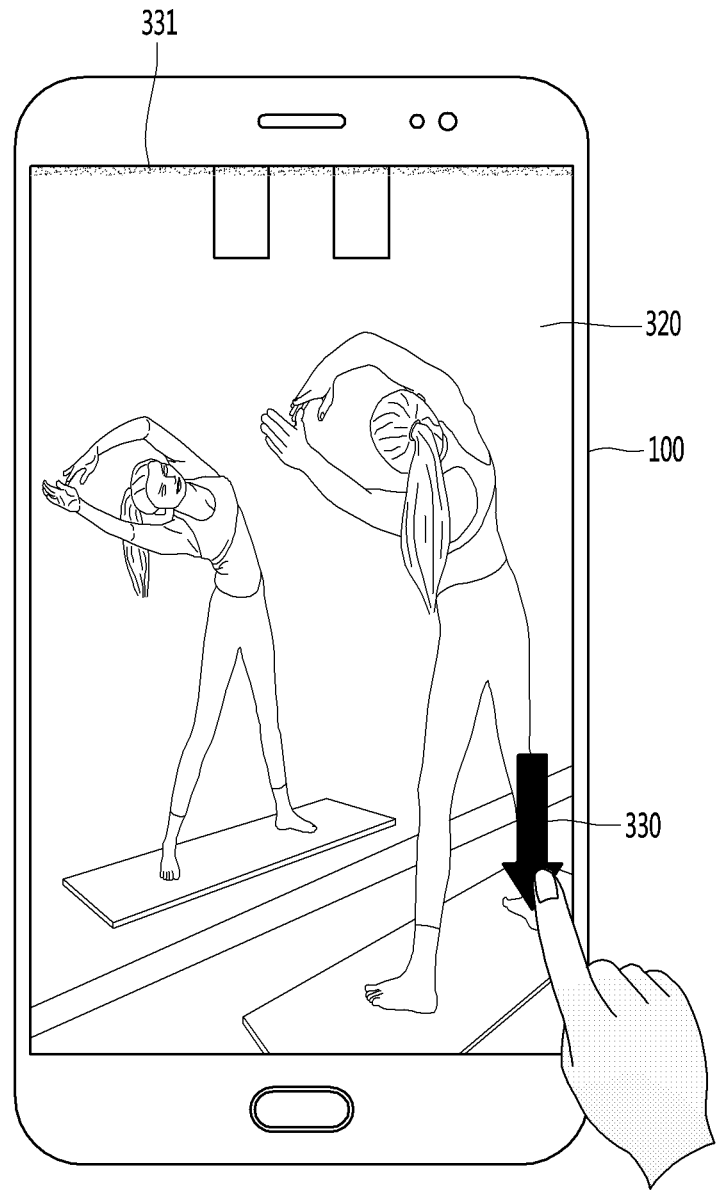

FIGS. 3A and 3B are views showing that an image corresponding to a "a" region in the entire region of the omnidirectionally captured image is displayed.

Referring to FIGS. 3A and 3B, the image 320 corresponding to the "a" region 310 in the entire region 300 of the omnidirectionally captured image is currently displayed on the mobile terminal 100, and an input 330 for changing the displayed region to a "c" region 610 is received.

Figure 4A:
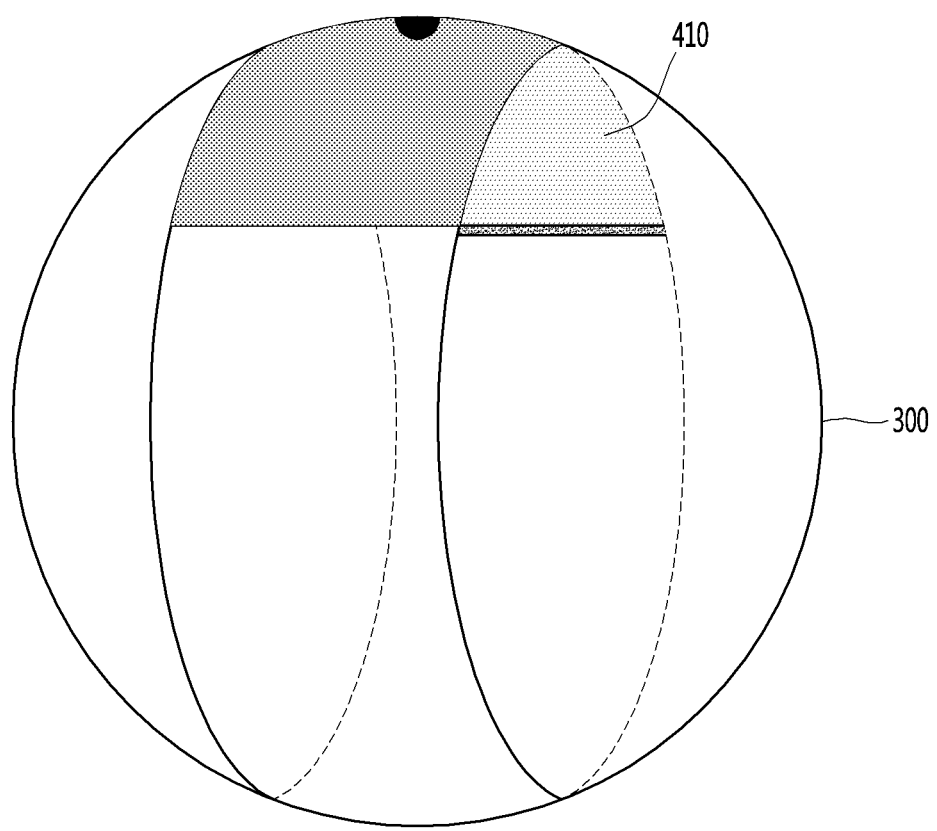

FIGS. 4A and 4B are views showing that an image corresponding to a "b" region in the entire region of the omnidirectionally captured image is displayed.

Since the input 330 for changing the displayed region is directed upward, the displayed region passes through the uppermost portion of the omnidirectionally captured image.

In this case, a user's intention is that the displayed region is changed from the "a" region 310 to the "c" region 610 by passing through the "b" region 410, but the display region cannot pass through the uppermost portion of the omnidirectionally captured image. Thus, an image 420 corresponding to the "b" region 410 is displayed instead of an image corresponding to the "c" region 610.

In this case, the user may rotate the image so as to display the image corresponding to the "c" region 610. That is, the mobile terminal 100 may receive an input 430 of rotating the image 420 corresponding to the "b" region 410.

Figure 5A:
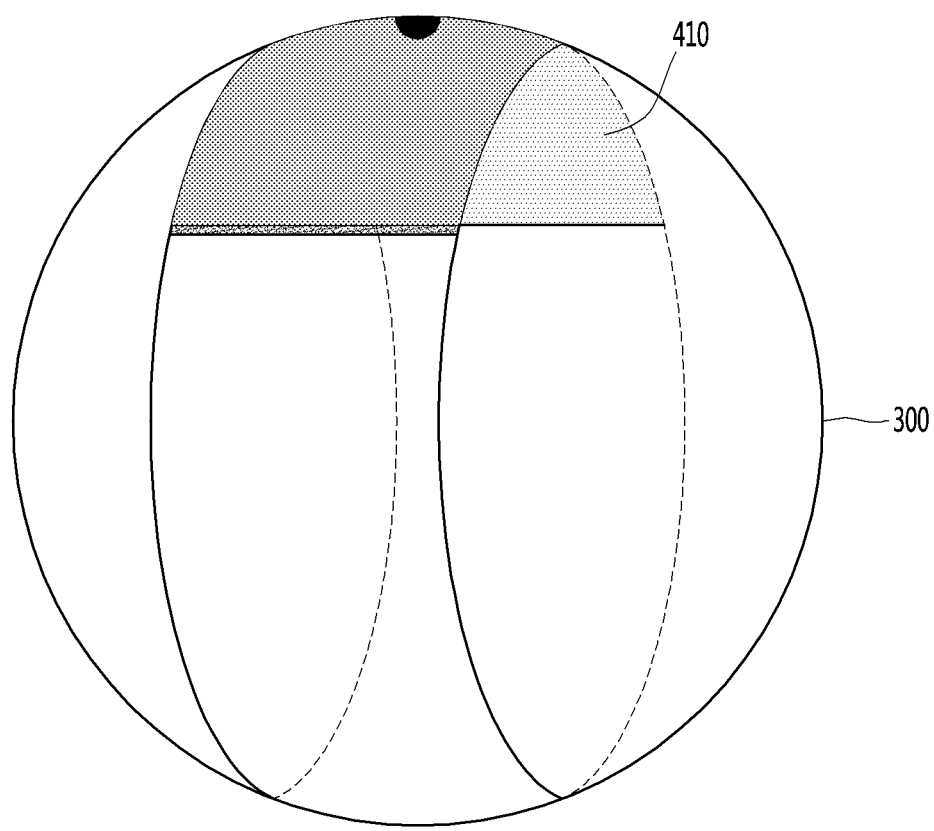
Figure 5B:
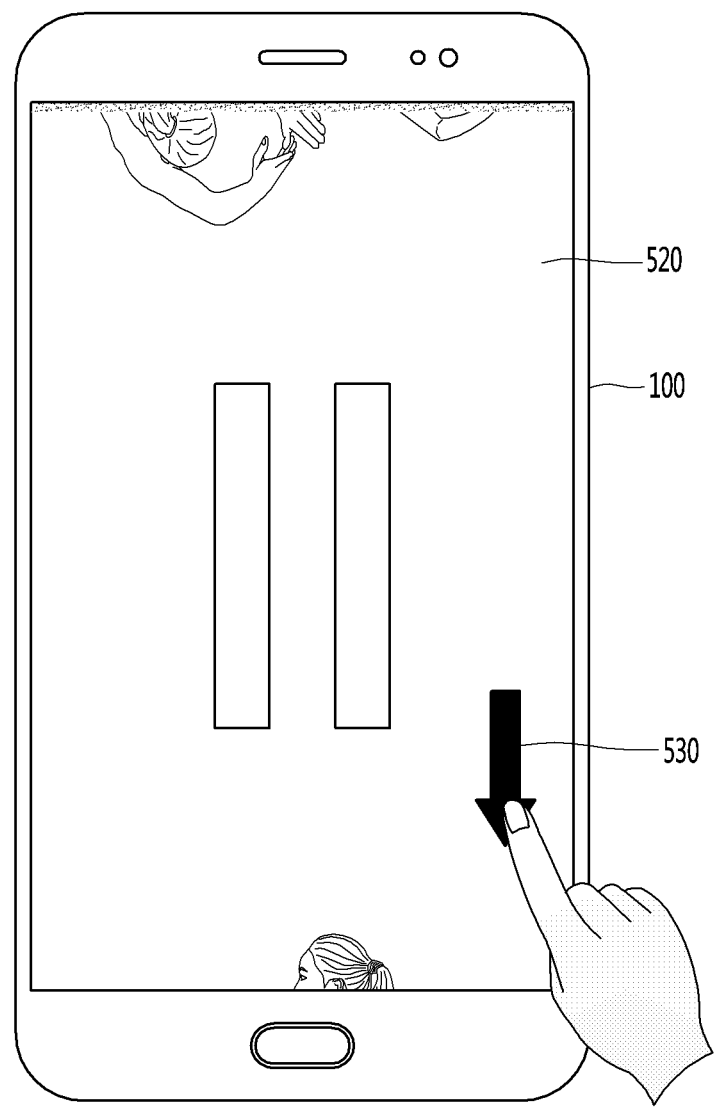

FIGS. 5A and 5B are views showing that the image corresponding to the "b" region in the entire region of the omnidirectionally captured image is rotated.

if the input 430 of rotating the image 420 is received, the displayed region is the "b" region 410 which is the same as the displayed region in FIG. 4A. However, an image 520 rotated from the displayed image 420 in FIG. 4B may be displayed.

On the other hand, the image may be moved downward so as to display the image corresponding to the "c" region 610. That is, the mobile terminal 100 may receive an input 530 of moving the displayed region downward.

Figure 6A:
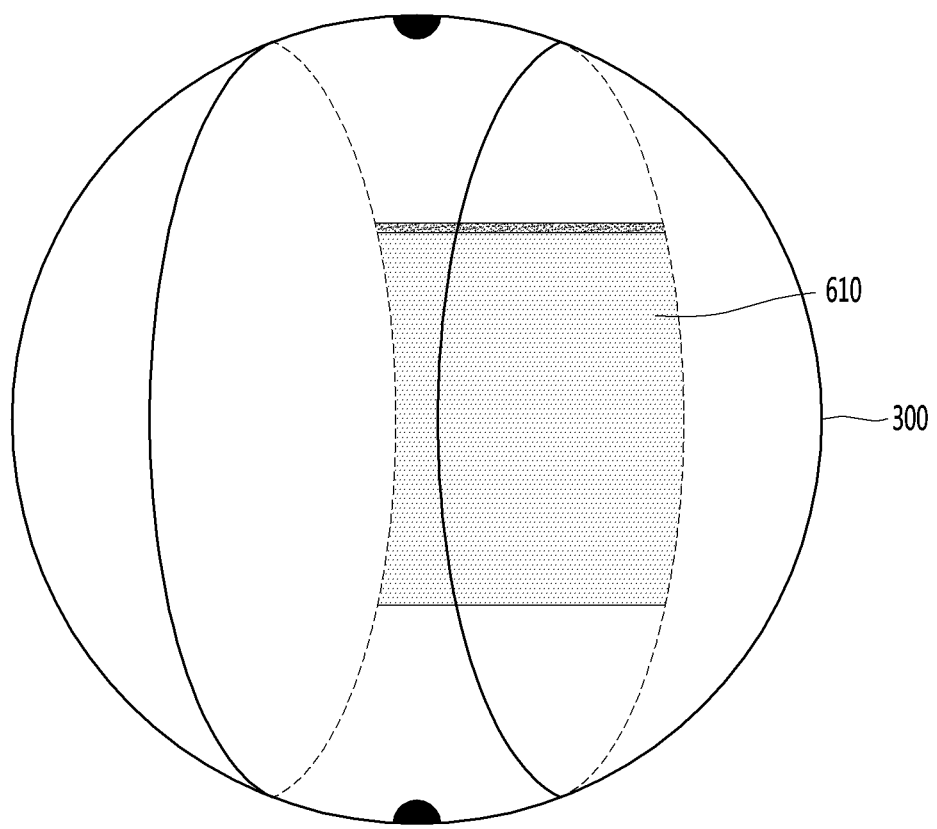
Figure 6B:
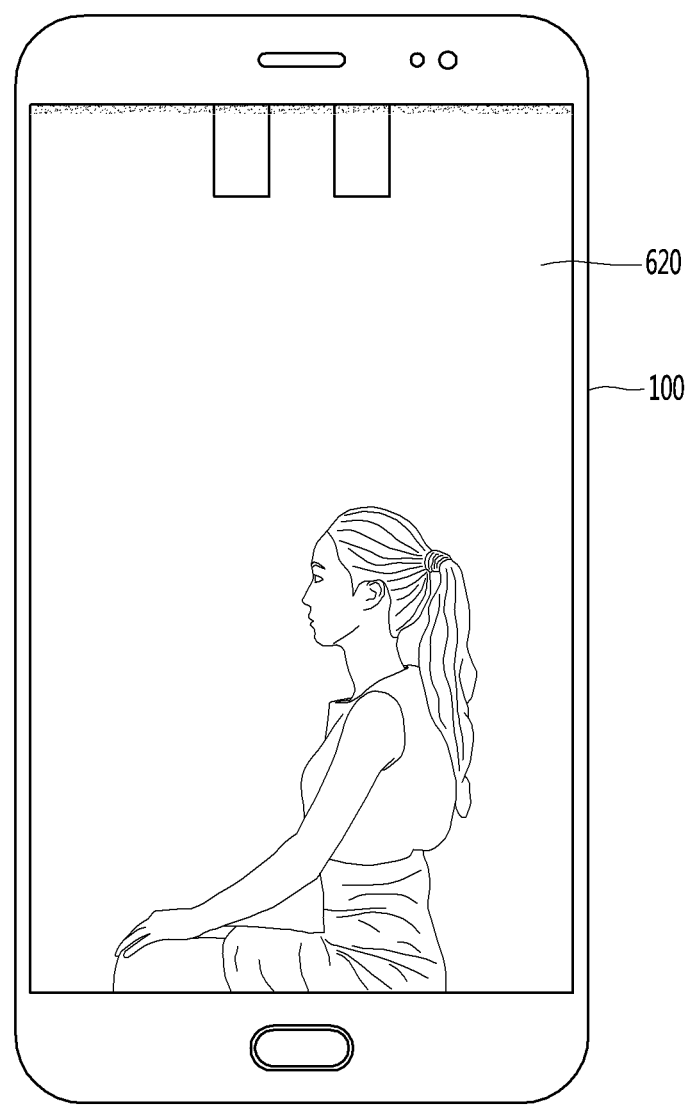

FIGS. 6A and 6B are views showing that the image corresponding to the "c" region in the entire region of the omnidirectionally captured image is displayed.

When an input 530 of moving the displayed region downward is received, the mobile terminal 100 may display the image 620 corresponding to the "c" region 610.

In the related art, in the displaying of the omnidirectionally captured image, there has been a problem that manipulations as shown in FIGS. 3A to 6B have to be performed several times because the displayed region cannot be changed by passing through the uppermost portion or the lowermost portion of the omnidirectionally captured image.

Also, since the user roughly rotates the image by 180 degrees in a state in which the image 420 corresponding to the "b" region 410 is displayed, the accuracy may be reduced. Thus, a region unintended by the user is displayed and the user has to continuously search for a region that the user wants to display.

Also, in the related art, in the displaying of the omnidirectionally captured image, there has been a problem that cannot provide a reverse image, which allows the user to have an experience similar to reality, because the displayed region cannot be changed by passing through the uppermost portion or the lowermost portion of the omnidirectionally captured image.

FIGS. 7A to 8C are views for describing an entire region of the omnidirectionally captured image, an uppermost portion of the omnidirectionally captured image, a lowermost portion of the omnidirectionally captured image, a first region, and a second region, in accordance with an embodiment of the present invention.

First, the omnidirectionally captured image will be described.

The omnidirectionally captured image may be an image omnidirectionally captured with respect to a specific point.

For example, when a virtual sphere is present and a specific point is the center of the virtual sphere, omnidirection may be all directions directed from the center of the virtual sphere toward the surface of the virtual sphere.

That is, when an image is captured using an omnidirectional camera such as a 360-degree camera, the omnidirectionally captured image may be an image captured in all directions with respect to the camera. For example, the omnidirectionally captured image may be an image captured using a camera in which two fisheye lenses having an angle of view of 180 degrees are arranged in opposite directions.

In regard to the omnidirectionally captured image, the virtual sphere has been described above, but the present disclosure is not limited thereto.

Specifically, when an image within a specific angle of view is captured by using the omnidirectional camera, the omnidirectionally captured image may mean an image captured in all directions within the specific angle of view.

For example, when the capturing is performed by setting the angle of view of 180 degrees to the omnidirectional camera, the omnidirectionally captured image may be an image captured in all directions directed from the center of the virtual sphere toward the surface of the virtual sphere.

Also, the omnidirectionally captured image may be an image captured at a specific angle of view or more. For example, the omnidirectionally captured image may be an image captured at an angle of view of 90 degrees or more.

Also, the case where the image is captured using the omnidirectional camera has been described above, but the present disclosure is not limited thereto. For example, the present disclosure is also applied to a case where a plurality of images are captured using a general camera, instead of the omnidirectional camera, and the plurality of captured images are combined to generate an omnidirectionally captured image.

Figure 7A:
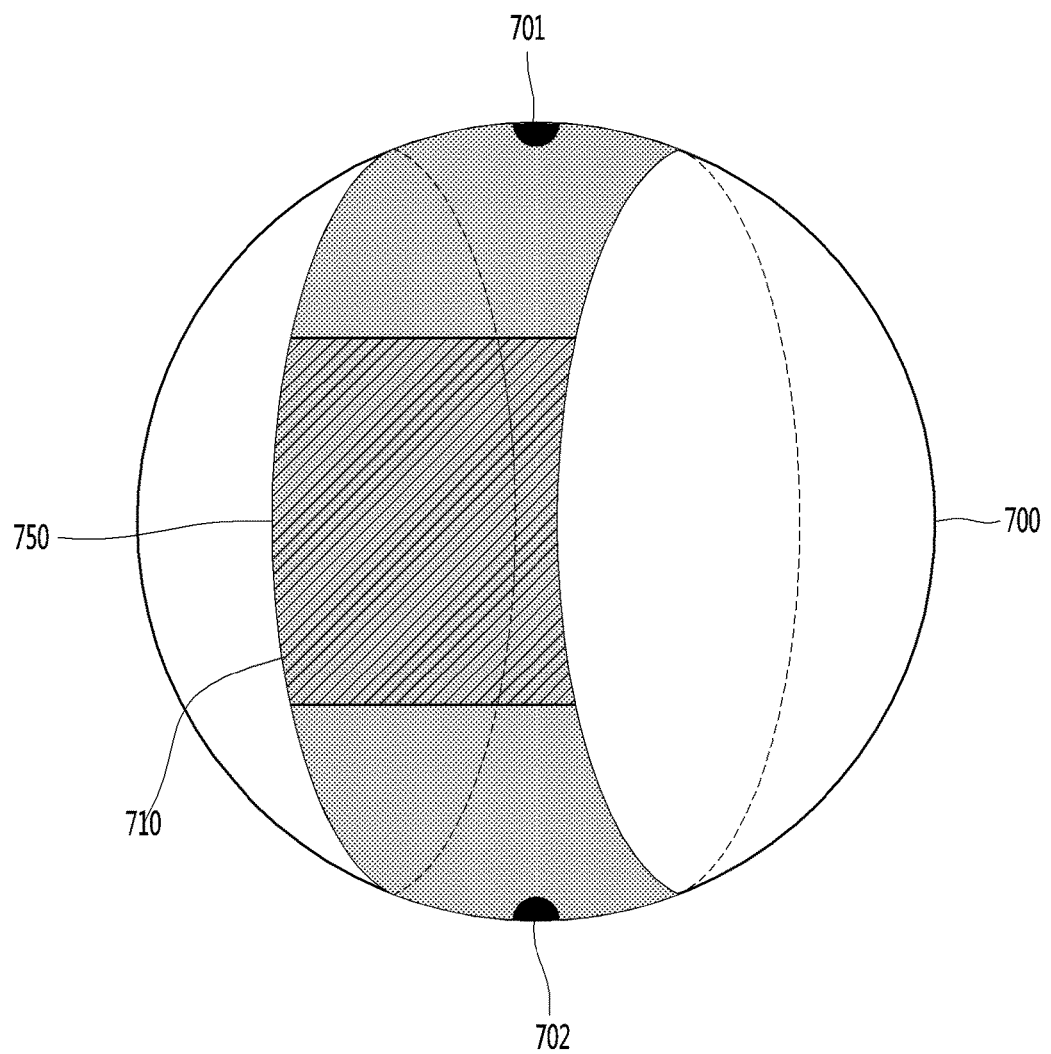
FIGS. 7A to 8C are views for describing an entire region of the omnidirectionally captured image, an uppermost portion of the omnidirectionally captured image, a lowermost portion of the omnidirectionally captured image, a first region, and a second region, in accordance with an embodiment of the present invention.

An entire region 320 of the omnidirectionally captured image is shown in FIG. 7A. The entire region of the omnidirectionally captured image may be a sphere as shown in FIG. 7A. The center of the sphere may correspond to the omnidirectional camera, and the inner surface of the sphere may correspond to an image of a direction before capturing by the omnidirectional camera.

On the other hand, an uppermost portion 701 of the omnidirectionally captured image may mean an apex of the omnidirectionally captured image.

For example, when an image is omnidirectionally captured by the camera, a point corresponding to an apex of the camera may be the uppermost portion 701 of the omnidirectionally captured image.

Also, a specific point may be the uppermost portion 701 of the omnidirectionally captured image, without regard to a direction of the omnidirectionally captured image. For example, a point corresponding to a direction of the sky in the omnidirectionally captured image may be the uppermost portion 701 of the omnidirectionally captured image.

Based on the center of the entire region 700 of the omnidirectionally captured image (that is, the center of the sphere), a vertical angle of the uppermost portion 701 may be 0 degrees.

On the other hand, a lowermost portion 702 of the omnidirectionally captured image may mean a bottom point of the omnidirectionally captured image.

For example, when an image is omnidirectionally captured by the camera, a point corresponding to a bottom point of the camera may be the lowermost portion 702 of the omnidirectionally captured image.

Also, a specific point may be the lowermost portion 702 of the omnidirectionally captured image, without regard to a direction of the omnidirectionally captured image. For example, a point corresponding to a direction of the ground in the omnidirectionally captured image may be the lowermost portion 702 of the omnidirectionally captured image.

Based on the center of the entire region 700 of the omnidirectionally captured image (that is, the center of the sphere), a vertical angle of the lowermost portion 702 may be 180 degrees.

On the other hand, the uppermost portion 701 and the lowermost portion 702 of the omnidirectionally captured image may be variously designated according to a user's setting.

The controller 180 may display an image corresponding to a specific region 750 of the entire region 700 of the omnidirectionally captured image. The specific region 750 may mean a region of an image displayed on the mobile terminal 100 in the entire region of the omnidirectionally captured image.

For example, when an image that is within −25 degrees to 25 degrees horizontally (left and right) and 55 degrees to 125 degrees vertically (up and down) with respect to the center of the entire region 700 of the omnidirectionally captured image is displayed, the specific region 750 may be a region that is within −25 degrees to 25 degrees and 55 degrees to 125 degrees vertically with respect to the center of the entire region 700 of the omnidirectionally captured image.

Also, the image corresponding to the specific region 750 of the omnidirectionally captured image may be an image that is within the specific region of the omnidirectionally captured image.

The specific region 750 displayed on the mobile terminal 100 in the entire region of the omnidirectionally captured image may be changed based on a user manipulation.

On the other hand, as shown in FIG. 7A, the entire region 700 of the omnidirectionally captured image may include the "a" region 710.

The "a" region 710 may be a region including the specific region 750 while having the same horizontal (left/right) angle as that of the specific region 750 corresponding to the displayed region and having a vertical (up/down) angle from the uppermost portion 701 to the lowermost portion 702 of the omnidirectionally captured image.

For example, when it is assumed that the specific region 750 is an image that is within −25 degrees to 25 degrees horizontally and 55 degrees to 125 degrees vertically with respect to the center of the entire region 700 of the omnidirectionally captured image, the "a" region 710 may be a region that is within −25 degrees to 25 degrees and 0 degrees to 180 degrees vertically with respect to the center of the entire region 700 of the omnidirectionally captured image.

Figure 7B:
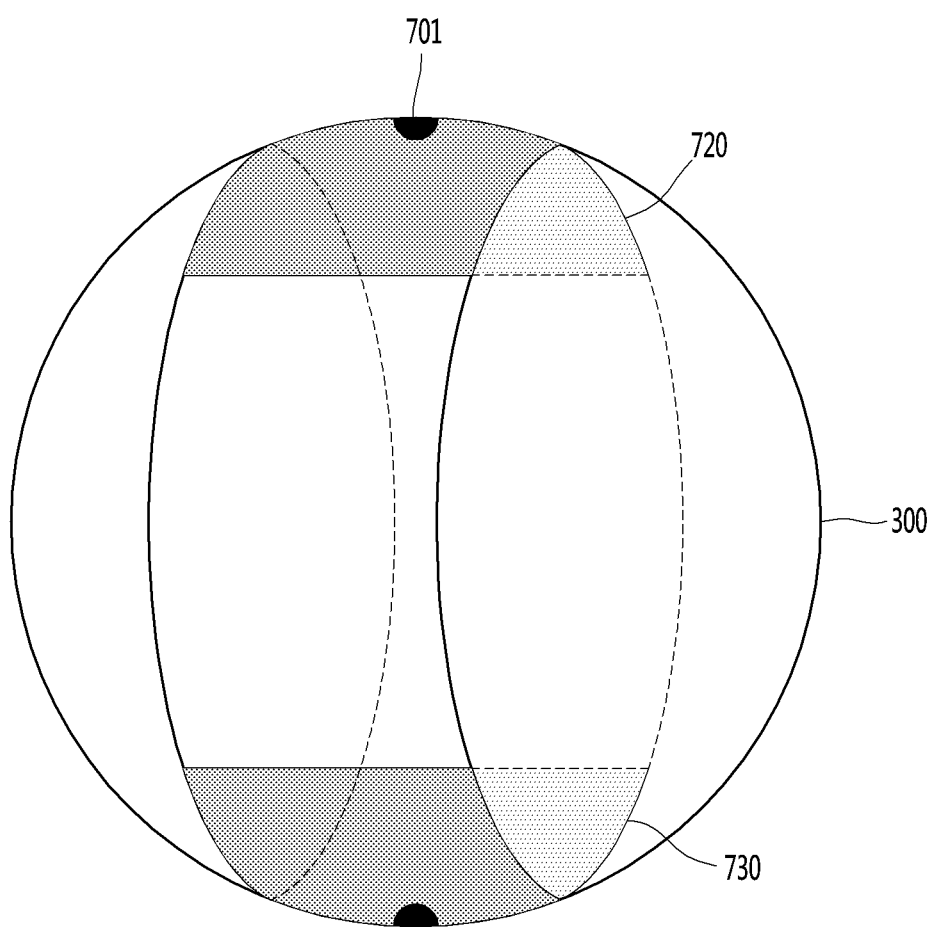

On the other hand, as shown in FIG. 7B, the entire region 700 of the omnidirectionally captured image may include a ceiling region 720. The ceiling region may be a region that includes the uppermost portion 701 in the center, has the same horizontal angle as that of the specific region 750, and has the same vertical angle as that of the specific region 750.

For example, when it is assumed that the specific region 750 is an image that is within −25 degrees to 25 degrees horizontally and 55 degrees to 125 degrees vertically with respect to the center of the entire region 700 of the omnidirectionally captured image, the ceiling region may be a region that is within −25 degrees to 25 degrees and −35 degrees to 35 degrees vertically with respect to the center of the entire region 700 of the omnidirectionally captured image.

However, the present disclosure is not limited thereto, and the ceiling region may be a region whose center is located within a preset range from the uppermost portion 701. In other words, passing through the uppermost portion 701 of the omnidirectionally captured image may mean that the uppermost portion 701 of the omnidirectionally captured image can be located within a preset range from the center of the image capable of being displayed on the screen according to a change of the region displayed on the screen.

Also, the ceiling region may mean a region whose center is located at the uppermost portion 701 of the omnidirectionally captured image.

On the other hand, the entire region 700 of the omnidirectionally captured image may include a bottom region 730. The bottom region 730 may be a region that includes the lowermost portion 702 in the center, has the same horizontal angle as that of the specific region 750, and has the same vertical angle as that of the specific region 750.

For example, when it is assumed that the specific region 750, which is a region displayed on the mobile terminal 100, is an image that is within −25 degrees to 25 degrees horizontally and 55 degrees to 125 degrees vertically with respect to the center of the entire region 700 of the omnidirectionally captured image, the bottom region may be a region that is within −25 degrees to 25 degrees and 145 degrees to 215 degrees vertically with respect to the center of the entire region 700 of the omnidirectionally captured image.

However, the present disclosure is not limited thereto, and the bottom region may be a region whose center is located within a preset range from the lowermost portion 702. In other words, passing through the lowermost portion 702 of the omnidirectionally captured image may mean that the lowermost portion 702 of the omnidirectionally captured image can be located within a preset range from the center of the image capable of being displayed on the screen according to a change of the region displayed on the screen.

Figure 7C:
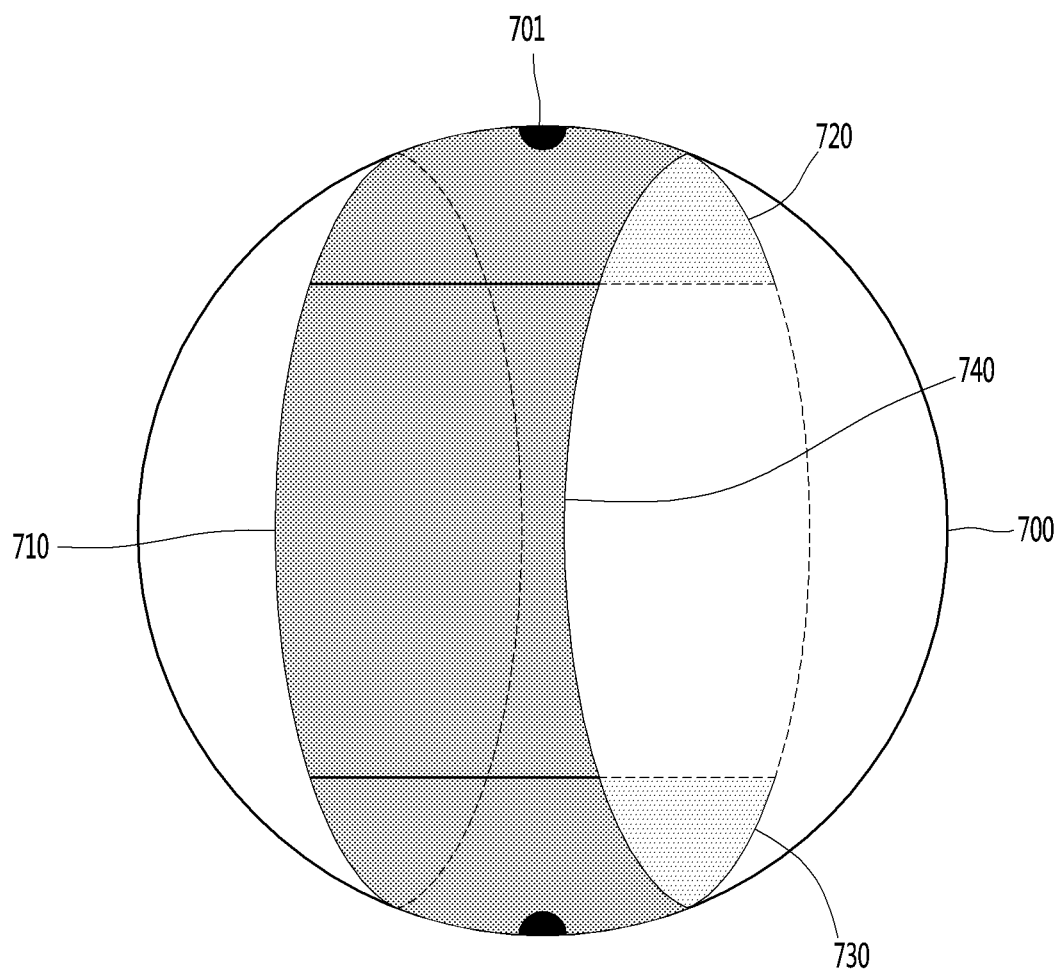

On the other hand, as shown in FIG. 7C, a first region 740 may include the "a" region 710, the ceiling region 720, and the bottom region 730.

For example, when it is assumed that the specific region 750, which is a region displayed on the mobile terminal 100, is an image that is within −25 degrees to 25 degrees horizontally and 55 degrees to 125 degrees vertically with respect to the center of the entire region 700 of the omnidirectionally captured image, the first region 740 may be a region that is within −25 degrees to 25 degrees and −35 degrees to 215 degrees vertically with respect to the center of the entire region 700 of the omnidirectionally captured image.

In other words, the specific region corresponding to the displayed region may be vertically movable and the center of the specific region also may be vertically movable. The center of the specific region may be movable within the "a" region 710. In this case, all regions through which the specific region can pass may be defined as the first region 740.

Figure 8A:
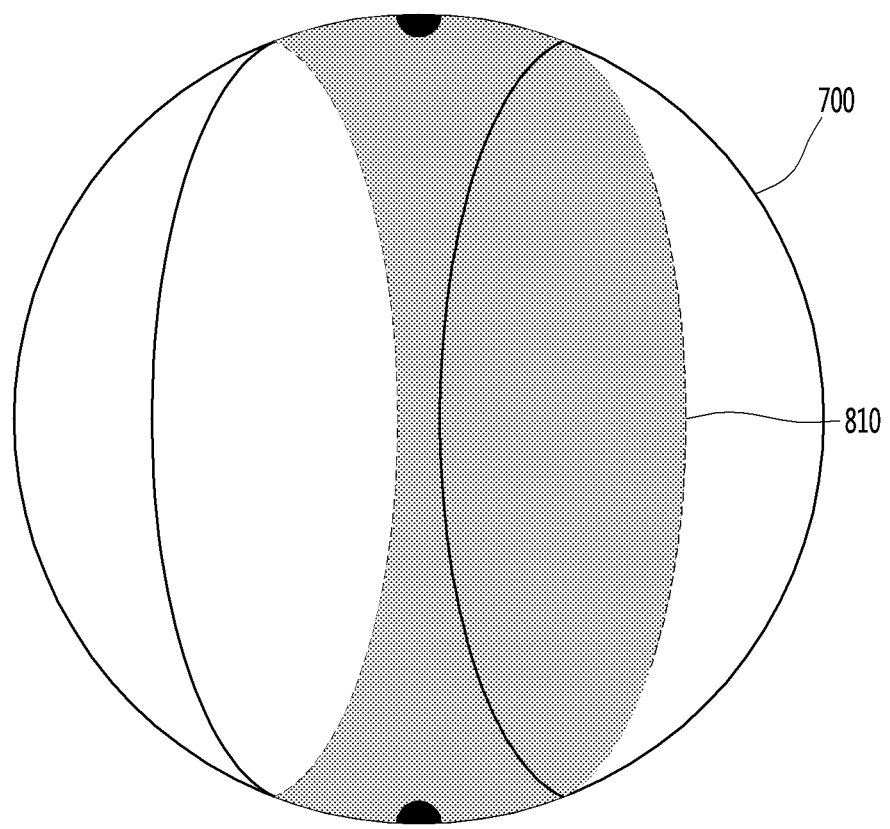

On the other hand, as shown in FIG. 8A, the entire region 700 of the omnidirectionally captured image may include a "b" region 810.

The "b" region 810 may be a region that does not include the specific region 750 while having the same horizontal angle as that of the specific region 750 and having a vertical angle from the lowermost portion 702 to the uppermost portion 701 of the omnidirectionally captured image.

For example, when it is assumed that the specific region 750, which is a region displayed on the mobile terminal 100, is an image that is within −25 degrees to 25 degrees horizontally and 55 degrees to 125 degrees vertically with respect to the center of the entire region 700 of the omnidirectionally captured image, the "b" region 810 may be a region that is within −25 degrees to 25 degrees and 180 degrees to 360 degrees vertically with respect to the center of the entire region 700 of the omnidirectionally captured image.

Also, the "b" region 810 may be a region that is symmetrical or opposite to the "a" region 710 with respect to at least one of the uppermost portion 701 and the lowermost portion 702 of the omnidirectionally captured image.

Figure 8B:
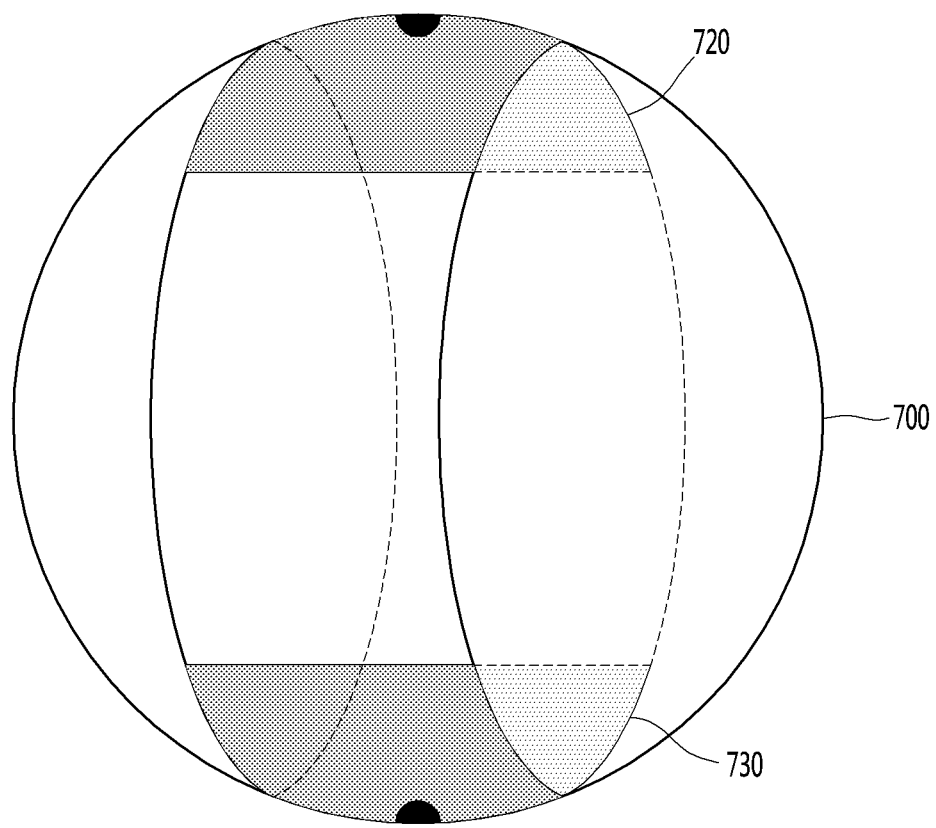

On the other hand, as shown in FIG. 8B, the entire region 700 of the omnidirectionally captured image may include the ceiling region 720 and the bottom region 730.

Figure 8C:
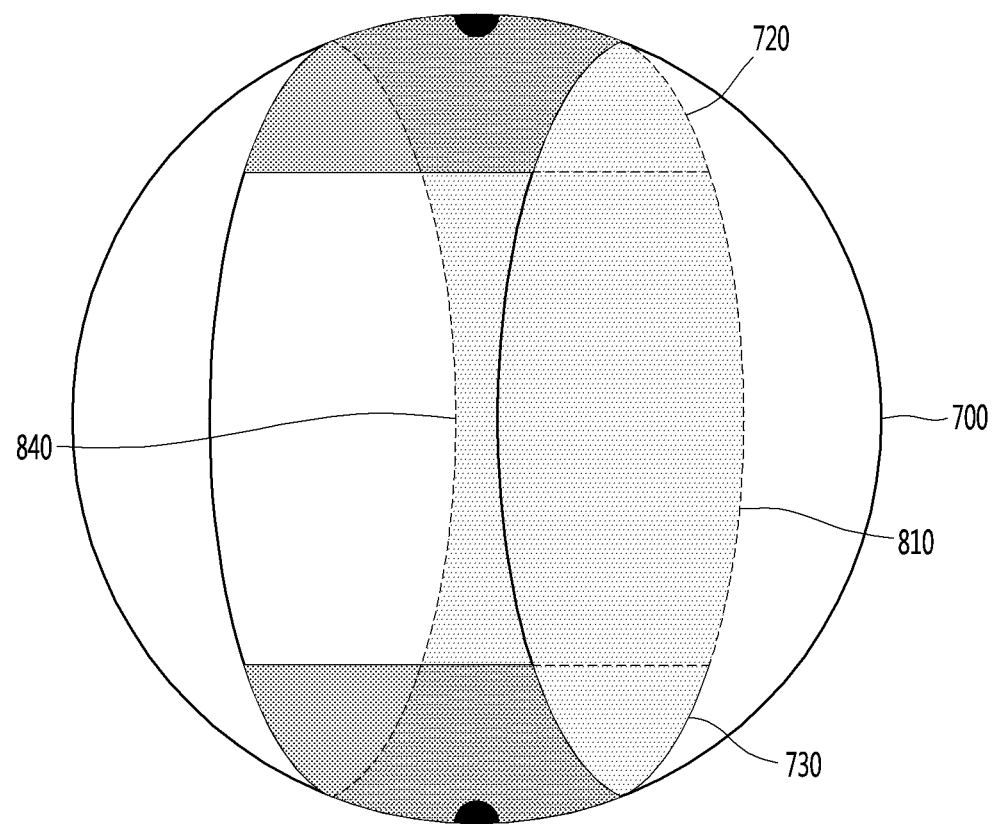

On the other hand, as shown in FIG. 8C, the second region 840 may include the "b" region 810, the ceiling region 720, and the bottom region 730.

For example, when it is assumed that the specific region 750, which is a region displayed on the mobile terminal 100, is an image that is within −25 degrees to 25 degrees horizontally and 55 degrees to 125 degrees vertically with respect to the center of the entire region 700 of the omnidirectionally captured image, the second region 840 may be a region that is within −25 degrees to 25 degrees and 145 degrees to 35 degrees vertically with respect to the center of the entire region 700 of the omnidirectionally captured image.

In other words, the specific region corresponding to the displayed region may be vertically movable and the center of the specific region also may be vertically movable. The center of the specific region may be movable within the "b" region 810. In this case, all regions through which the specific region can pass may be defined as the second region 840.

On the other hand, the first region 740 and the second region 840 may be regions that are symmetrical to each other with respect to at least one of the uppermost portion 701 and the lowermost portion 702 of the omnidirectionally captured image.

In other words, the second region 840 may be a region that is symmetrical to the first region 740 with respect to at least one of the uppermost portion 701 and the lowermost portion 702 of the omnidirectionally captured image.

For example, when the first region 740 is an image that is within −25 degrees to 25 degrees horizontally and −35 degrees to 215 degrees vertically with respect to the center of the entire region 700 of the omnidirectionally captured image, the second region 840 may be a region that is symmetrical with the first region 740 with respect to the uppermost portion 701 of the omnidirectionally captured image, that is, a region that is within −25 degrees to 25 degrees horizontally and 145 degrees to 35 degrees vertically with respect to the center of the entire region 700 of the omnidirectionally captured image.

In other words, the second region 840 may be a region that is opposite to the first region 740 with respect to at least one of the uppermost portion 701 and the lowermost portion 702 of the omnidirectionally captured image.

FIGS. 9A to 11B are views for describing an example in which an image displayed on a mobile terminal is changed from a first region to a second region, in accordance with an embodiment of the present invention.

In FIGS. 9A to 11B, the image is described as being reversed, but the present disclosure is not limited thereto. The upper and lower sides of the image may be maintained. This will be described below in detail.

Figure 9A:
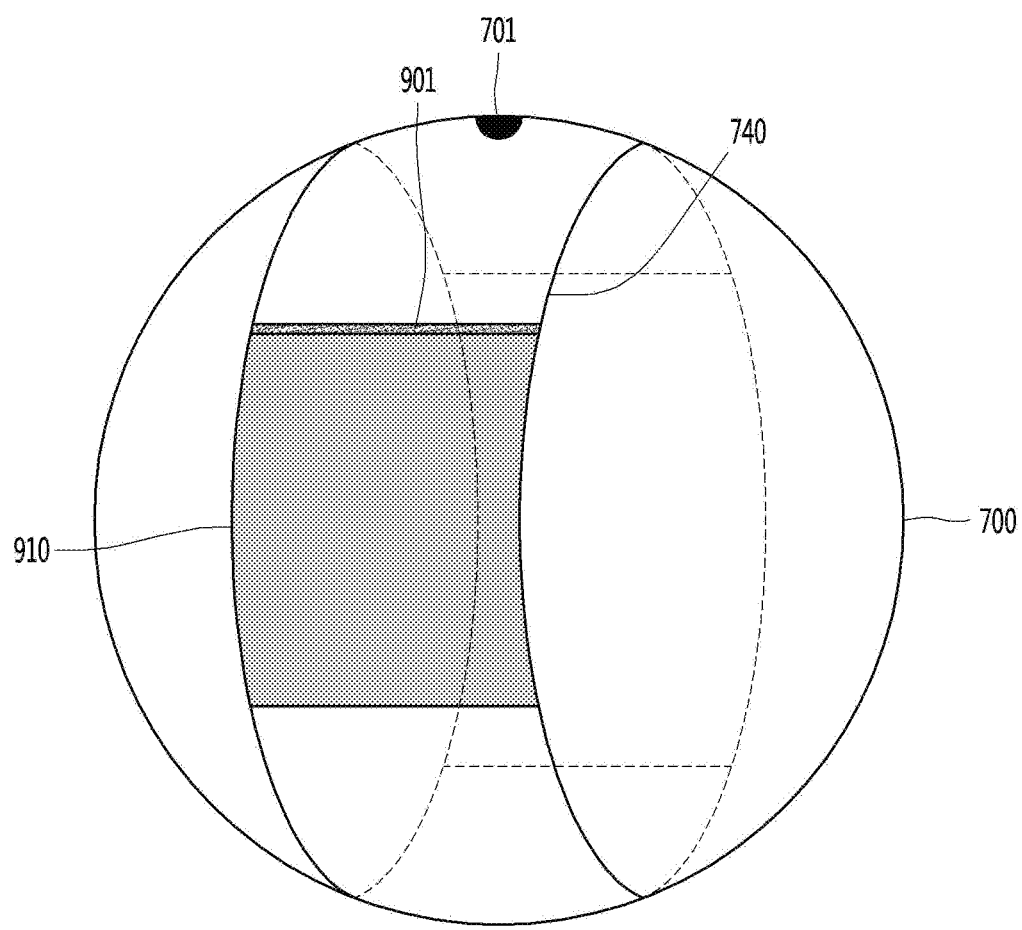
FIGS. 9A to 11B are views for describing an example in which an image displayed on a mobile terminal is changed from a first region to a second region, in accordance with an embodiment of the present invention.
Figure 9B:
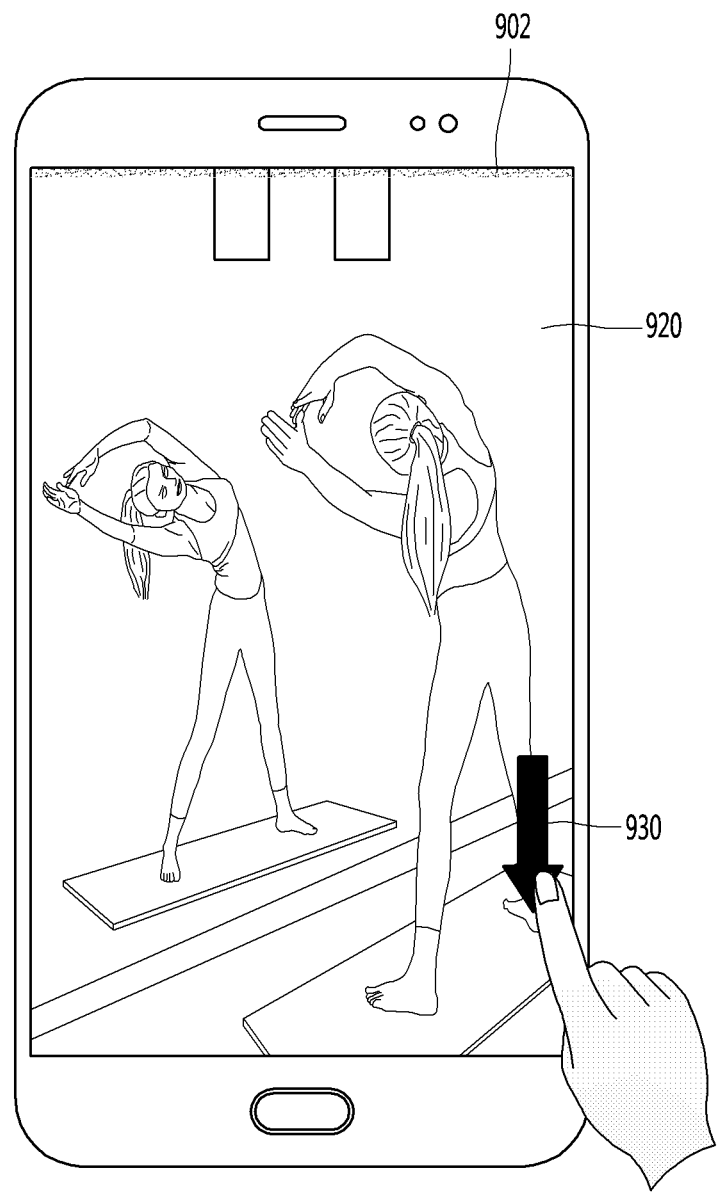

Referring to FIGS. 9A and 9B, the controller 180 may display a first image 920 included in the first region 740 in the entire region 700 of the omnidirectionally captured image.

The region corresponding to the first image 920 in the entire region 700 of the omnidirectionally captured image, that is, the specific region 910 displayed on the display unit 151 in the entire region 700 of the omnidirectionally captured image, is shown in FIG. 9A.

A bar 901 shown in FIG. 9A is shown so as to indicate a direction in which the image of the specific region is displayed on the screen. Specifically, the first image 920 corresponding to the specific region 910 is displayed so that the direction of the bar 901 is directed toward the upper portion 902 of the screen.

On the other hand, the controller 180 may receive a first input of changing the region 910 displayed on the display unit 151 in the entire region 700 of the omnidirectionally captured image. The first input may be an input for changing the region displayed on the display unit 151 from the first region 740 to the second region 840 by passing through the uppermost portion 701 of the omnidirectionally captured image. More specifically, the first input may be an input for changing the region displayed on the display unit 151 from a partial region 910 included in the first region 740 to a partial region 1110 included in the second region 840 by passing through the uppermost portion 701 of the omnidirectionally captured image.

For example, as shown in FIG. 9B, when an input 930 of dragging downward is received, the region displayed on the display unit 151 in the entire region 700 of the omnidirectionally captured image is moved upward.

Figure 10A:
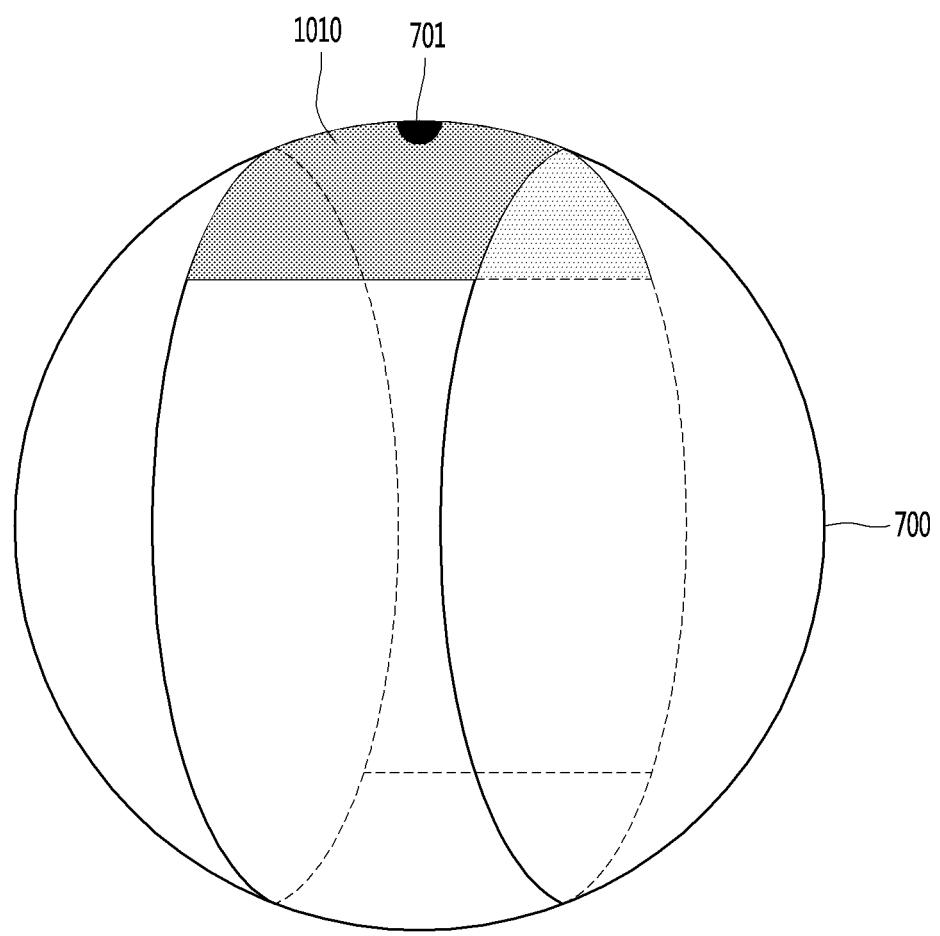
Figure 11A:
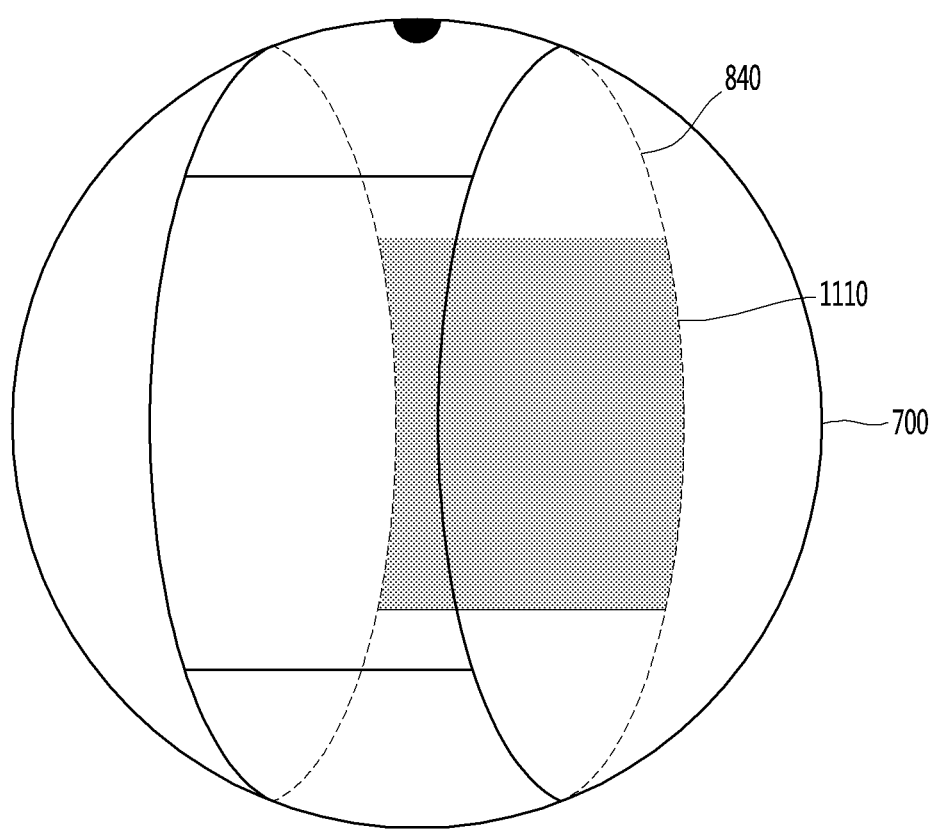

In this case, the region displayed on the screen may pass through the uppermost portion 701 of the omnidirectionally captured image as shown in FIG. 10A and may be changed to the second region 840 as shown in FIG. 11A.

Therefore, the input 930 of dragging downward as shown in FIG. 9B may be an input for changing the region displayed on the screen from the first region 740 to the second region 840 by passing through the uppermost portion 701 of the omnidirectionally captured image.

On the other hand, passing through the uppermost portion 701 of the omnidirectionally captured image may mean that, when the region displayed on the screen is changed, the region passing during the change includes the uppermost portion 701 of the omnidirectionally captured image.

For example, when the input 930 of dragging downward in a state in which the specific region 910 is displayed, as shown in FIG. 9A, the displayed region is changed. Also, as shown in FIG. 10A, a region 1010 through which the displayed region passes during the change may include the uppermost portion 701 of the omnidirectionally captured image.

Also, passing through the uppermost portion 701 of the omnidirectionally captured image may mean that the region capable of being displayed on the screen according to the change of the region displayed on the screen can include the uppermost portion 701 of the omnidirectionally captured image.

Figure 10B:
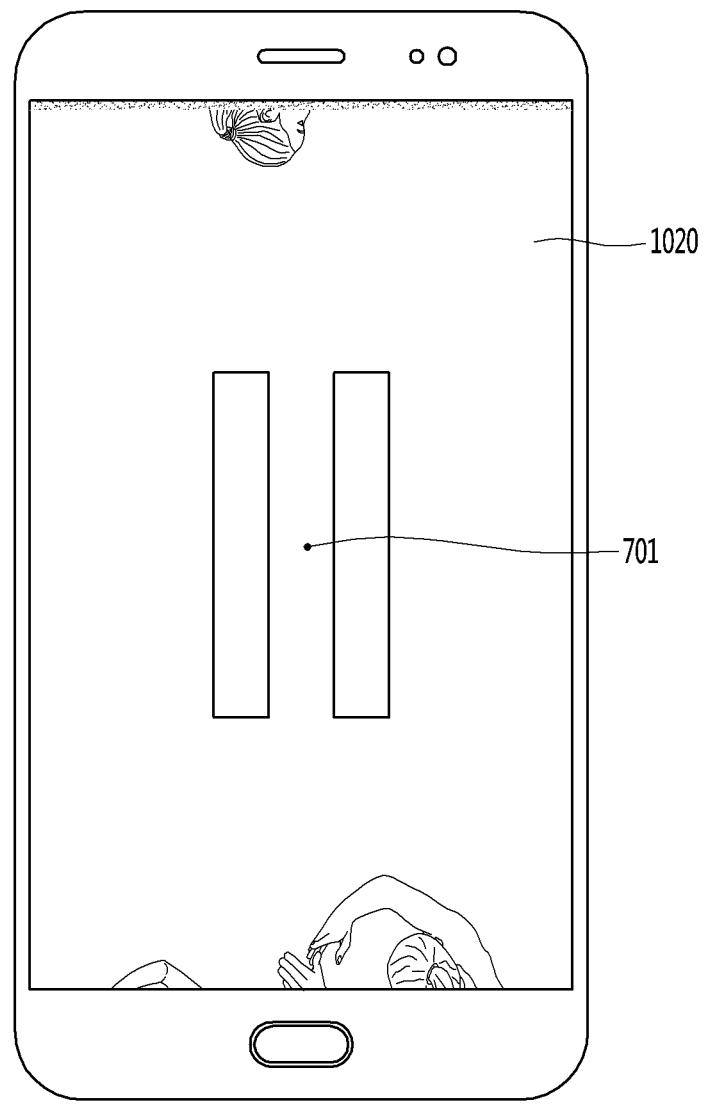

For example, when the input 930 of dragging downward is received in a state in which an image including two women is displayed as shown in FIG. 9B, the display region may be changed upward and an image 1020 including a ceiling may be displayed as shown in FIG. 10B. In this case, the image 1020 including the ceiling may include the uppermost portion 701 of the omnidirectionally captured image.

Also, that the displayed region passes through the uppermost portion 701 of the omnidirectionally captured image may mean that, when the region displayed on the screen is changed, the center of the displayed region passes through the uppermost portion 701 of the image. In other words, passing through the uppermost portion 701 of the omnidirectionally captured image may mean that the uppermost portion 701 of the image can be located at the center of the image capable of being displayed on the screen according to the change of the region displayed on the screen.

Also, that the displayed region passes through the uppermost portion 701 of the omnidirectionally captured image may mean that the center of the region passing during the change can be located within a preset range from the uppermost portion 701 of the image. In other words, passing through the uppermost portion 701 of the omnidirectionally captured image may mean that the uppermost portion 701 of the omnidirectionally captured image can be located within a preset range from the center of the image capable of being displayed on the screen according to a change of the region displayed on the screen.

Figure 11B:
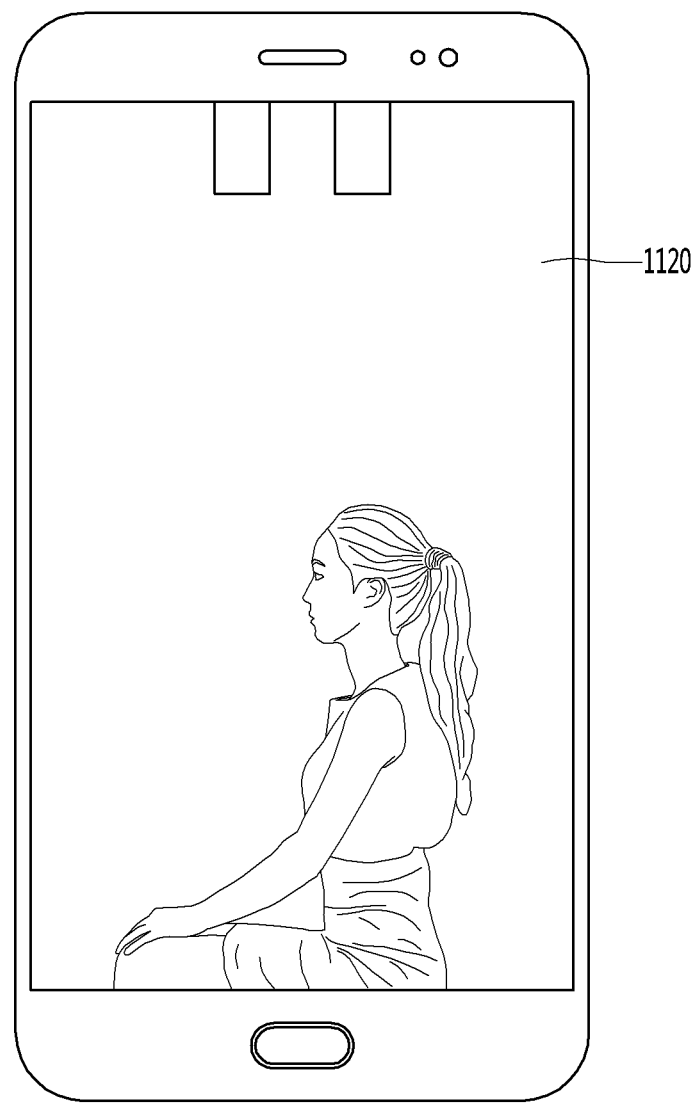

As shown in FIG. 11B, when the first input is received, the controller 180 may display a second image 1120 included in a second region 840 in the entire region 700 of the omnidirectionally captured image. A region 1110 corresponding to the second image 1120 is shown in FIG. 11A.

Figure 12A:
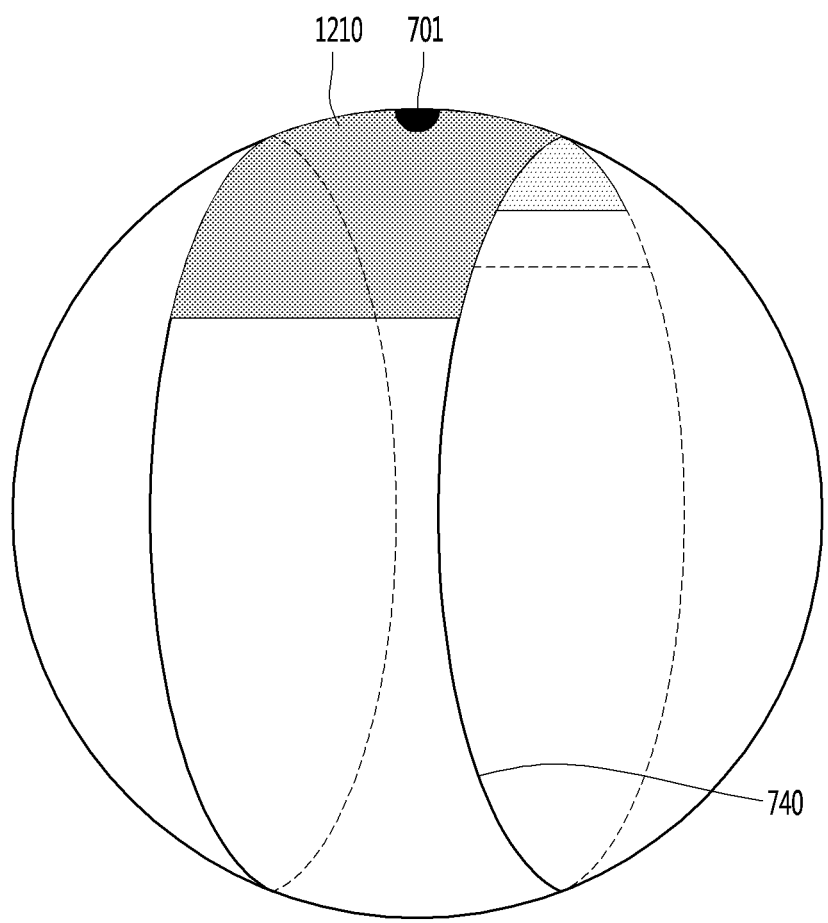
FIGS. 12A to 12C are views for describing an example in which an image displayed on a mobile terminal is changed from a first region to a second region, in accordance with another embodiment of the present invention.
Figure 12B:
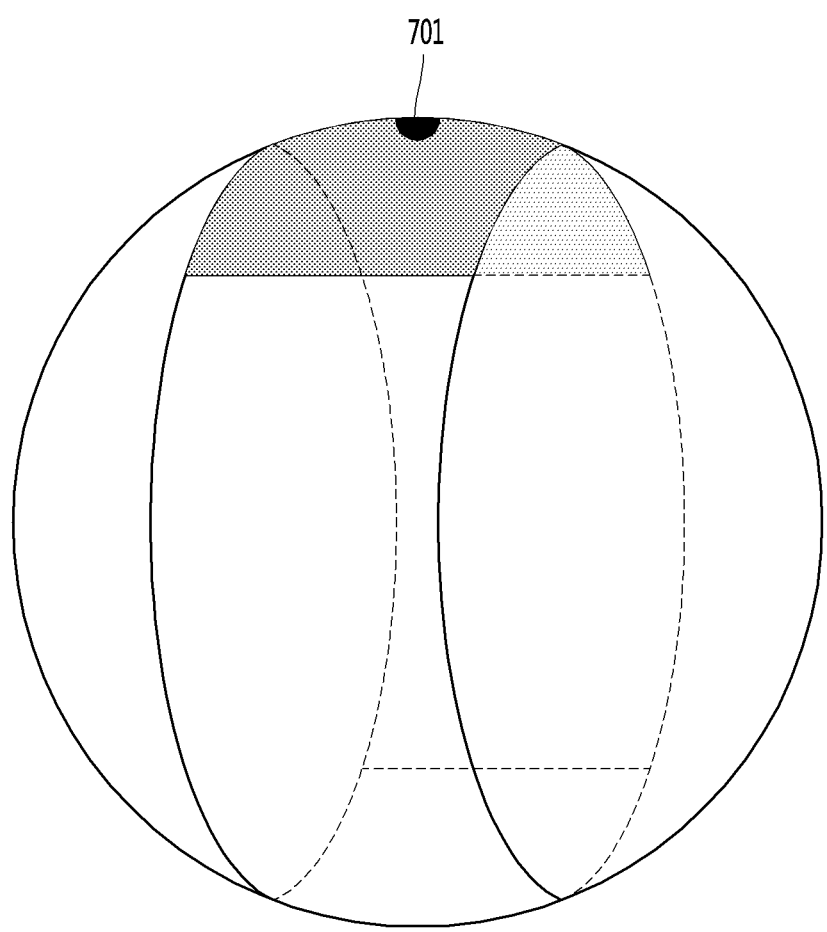
Figure 12C:
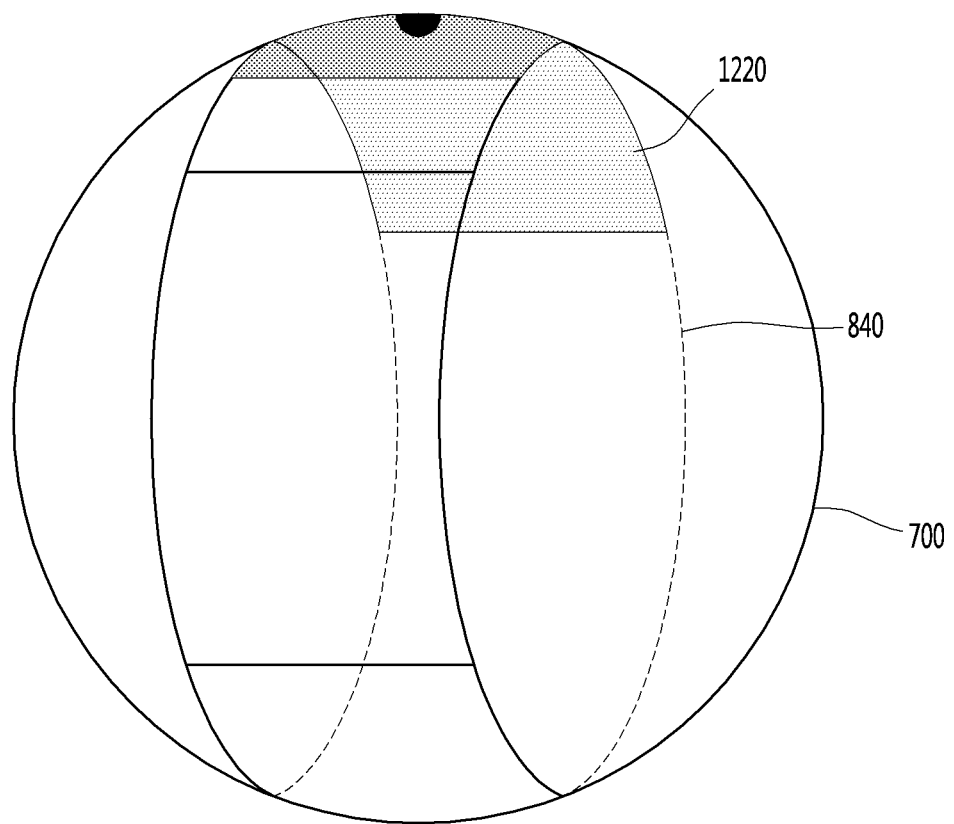

FIGS. 12A to 12C are views for describing an example in which an image displayed on a mobile terminal is changed from a first region to a second region, in accordance with another embodiment of the present invention.

The controller 180 may display the first image included in the first region 740 in the entire region 700 of the omnidirectionally captured image. A region 1210 corresponding to the first image is shown in FIG. 12A.

On the other hand, the controller 180 may receive a first input of changing the region displayed on the display unit 151 in the entire region 700 of the omnidirectionally captured image.

As shown in FIGS. 12B and 12C, the first input may be an input for changing the region displayed on the display unit 151 from the first region 740 to the second region 840 by passing through the uppermost portion 701 of the omnidirectionally captured image.

On the other hand, when the first input is received, the controller 180 may display the second image included in the second region 840 in the entire region 700 of the omnidirectionally captured image. A region 1220 corresponding to the second image is shown in FIG. 12C.

As such, in accordance with the present disclosure, since the displayed region can be changed by passing through the uppermost portion or the lowermost portion of the omnidirectionally captured image, it is possible to reduce the number of times of manipulations necessary for displaying the region opposite to the currently displayed region and improve the accuracy thereof.

FIGS. 13A to 15B are views for describing a method of displaying a second image reversely.

The second image may be an image whose upper and lower sides are maintained from the first image. Specifically, the second image may be an image whose upper and lower sides are not reversed from the first image.

In terms of the user, when the first image is normal (an image whose upper and lower sides are not reversed in terms of the user), a reverse image of the second image may be displayed when the displayed region is changed from the first region to the second region by passing through the uppermost portion or the lowermost portion of the omnidirectionally captured image. That is, when the first image is normal, the second image may be an image that is displayed reversely (an image whose upper and lower sides are reversed in terms of the user). On the contrary, when the first image is a reverse image, the second image may be an image that is displayed normally.

This will be described in detail with reference to FIGS. 13A to 15B.

FIGS. 13A to 15B are views for describing a method of displaying a second image whose upper and lower sides are maintained from the first image.

Figure 13A:
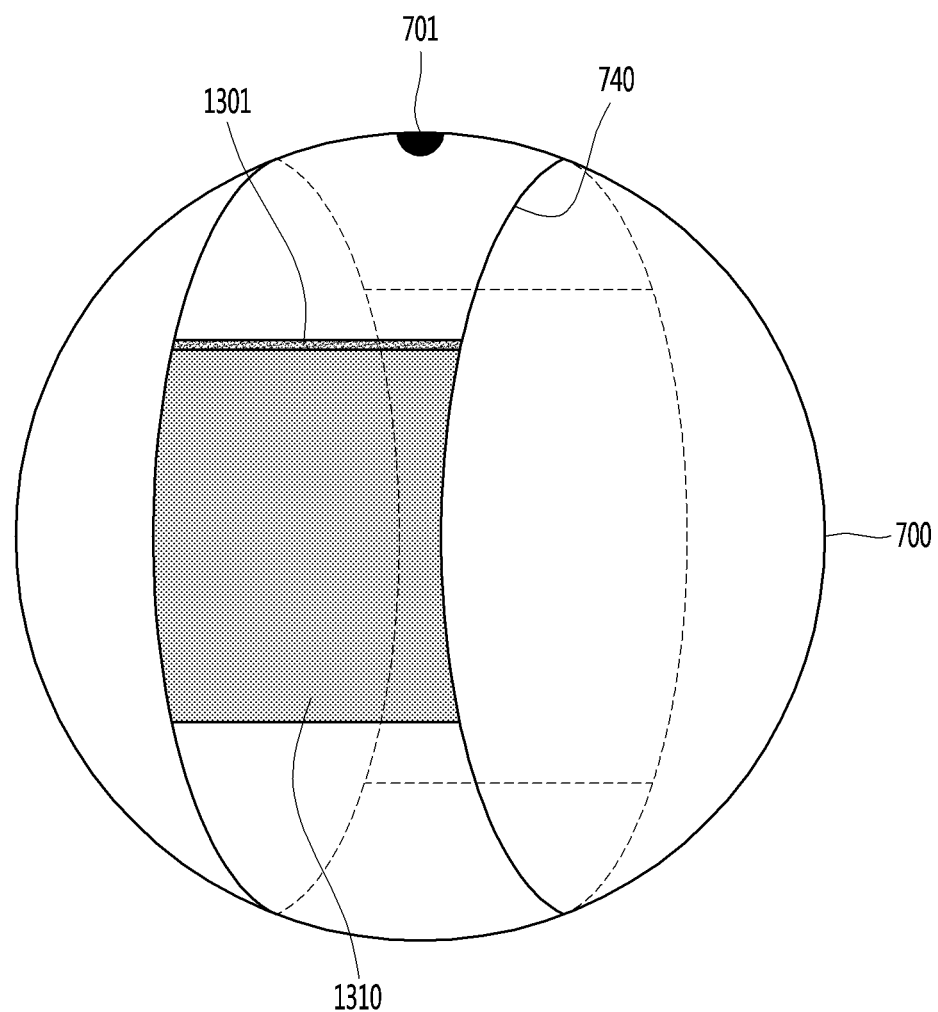
FIGS. 13A to 15B are views for describing a method of displaying a second image reversely.
Figure 13B:
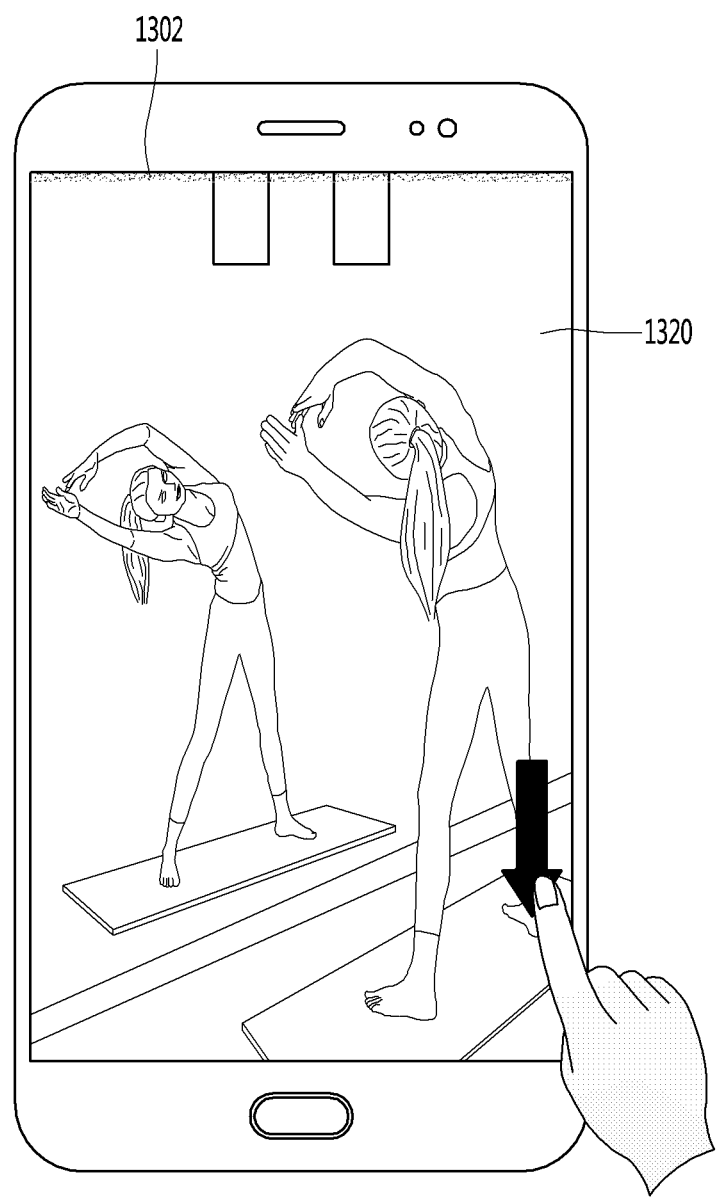

As shown in FIGS. 13A and 13B, the controller 180 may display a first image 1320 included in the first region 740. A region 1310 corresponding to the first image 1320 in an entire region 700 of an omnidirectionally captured image is shown in FIG. 13A.

The first image 1320 is displayed so that a direction of a bar 1301 is directed toward an upper portion 1302 of a screen. The first image 1320 may be displayed as a normal image, that is, an image whose upper and lower sides are not reversed in terms of the user.

Figure 14A:
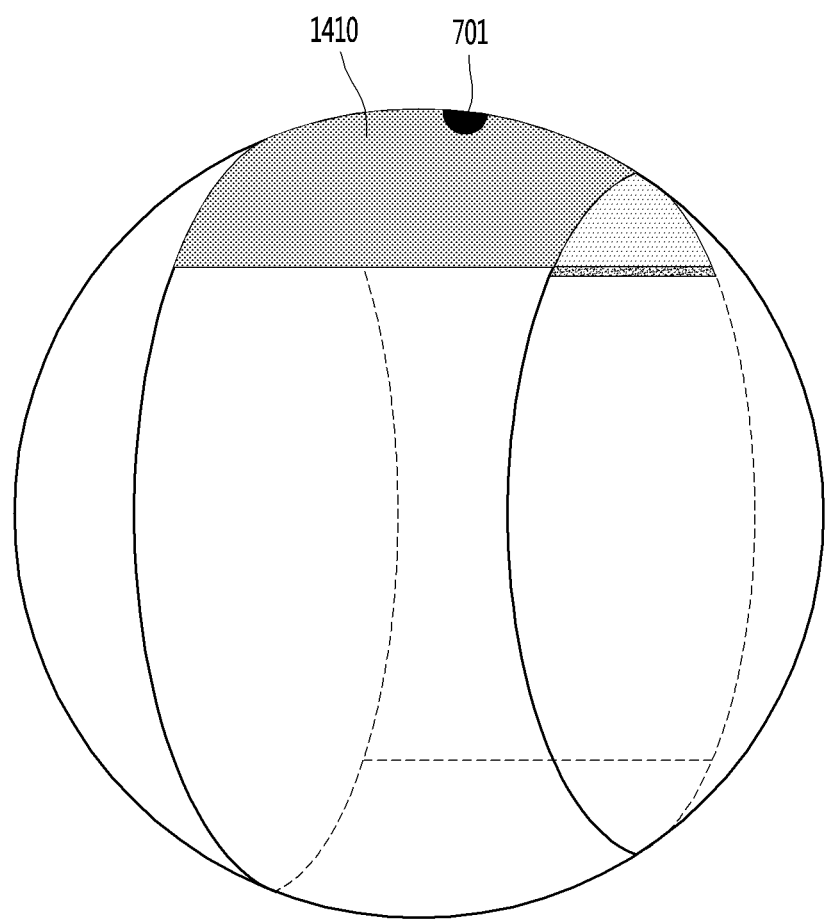
Figure 14B:
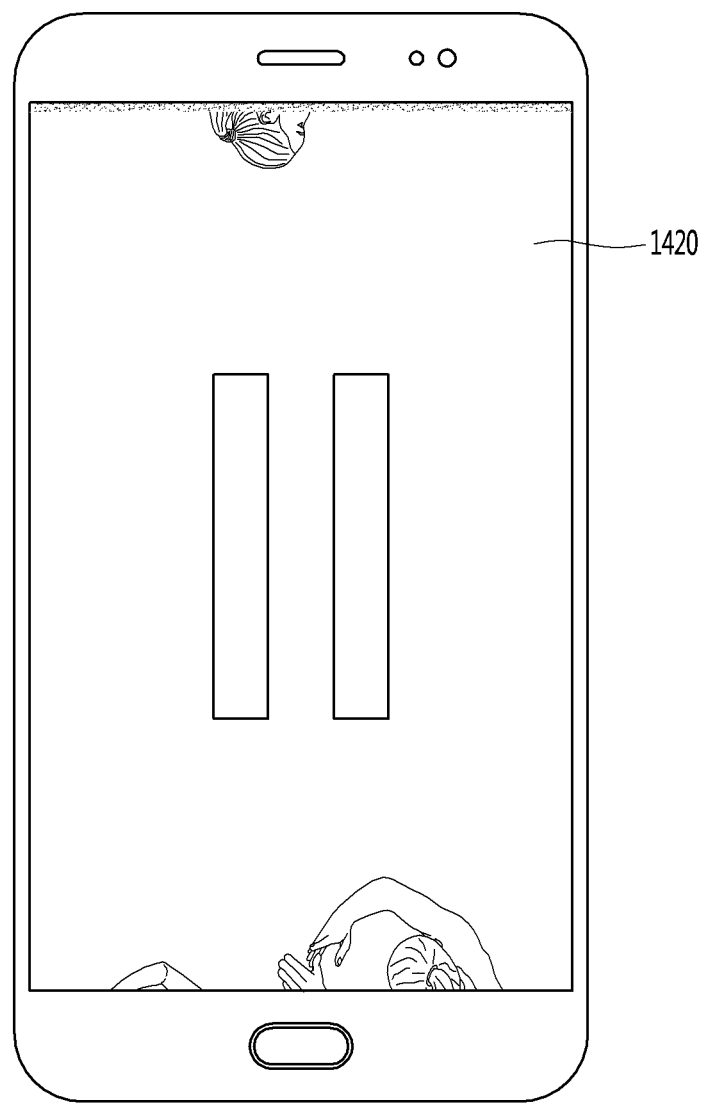

On the other hand, the controller 180 may receive a first input. Also, when the first input is received, a region 1410 displayed on the screen may pass through the uppermost portion 701 of the omnidirectionally captured image as shown in FIGS. 14A and 14B. In this case, the image 1420 displayed on the screen may include the uppermost portion 701 of the omnidirectionally captured image.

Figure 15A:
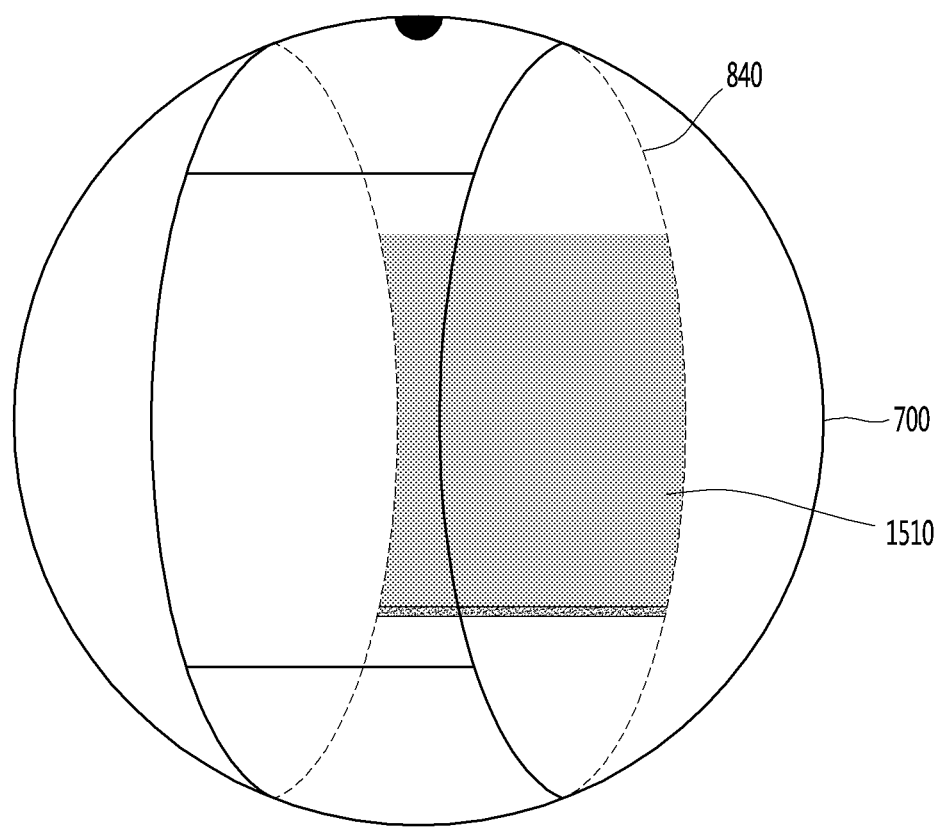
Figure 15B:
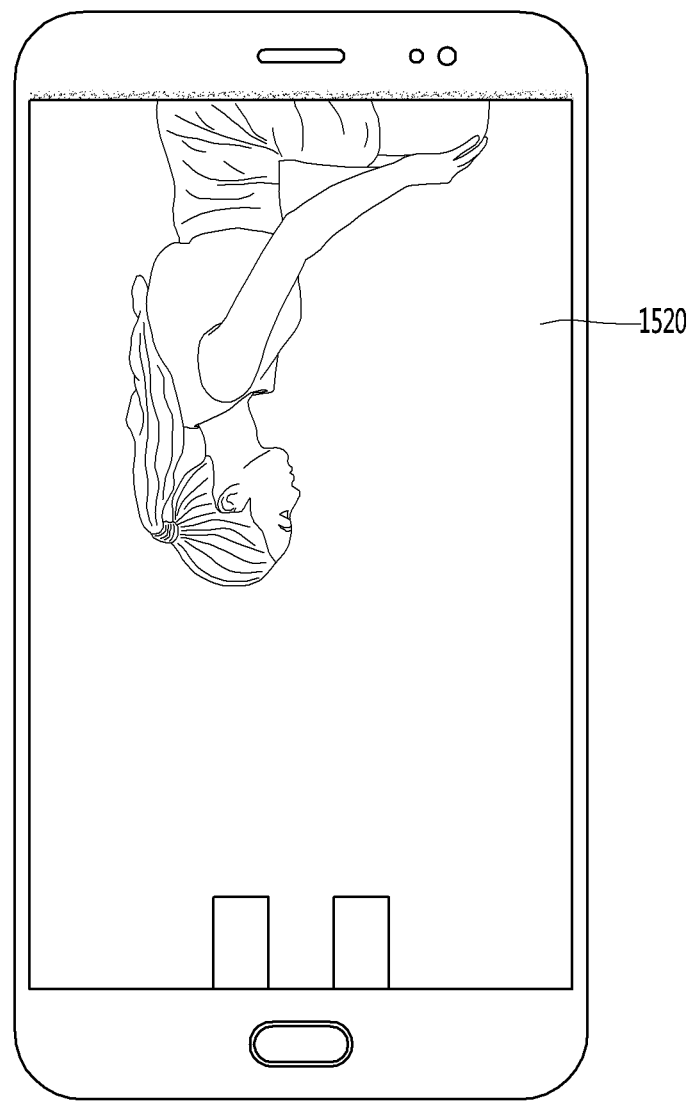

Also, after the image 1420 displayed on the screen passes through the uppermost portion 701 of the omnidirectionally captured image, the controller 180 may display a second image 1520 included in a second region 840 as shown in FIGS. 15A and 15B. A region 1510 corresponding to the second image 1520 in the entire region 700 of the omnidirectionally captured image is shown in FIG. 15A.

The second image 1520 may be an image whose upper and lower sides are maintained from the first image 1320. Specifically, the second image 1520 is merely an image rotated by passing through the uppermost portion 701 of the omnidirectionally captured image from the first image 1320 and may be an image whose upper and lower sides are maintained without reversing the upper and lower sides of the image from the first image 1320.

On the other hand, since the first image 1320 is displayed normally, the second image 1520 may be displayed as a reverse image, that is, an image whose upper and lower sides are reversed in terms of the user.

Figure 16A:
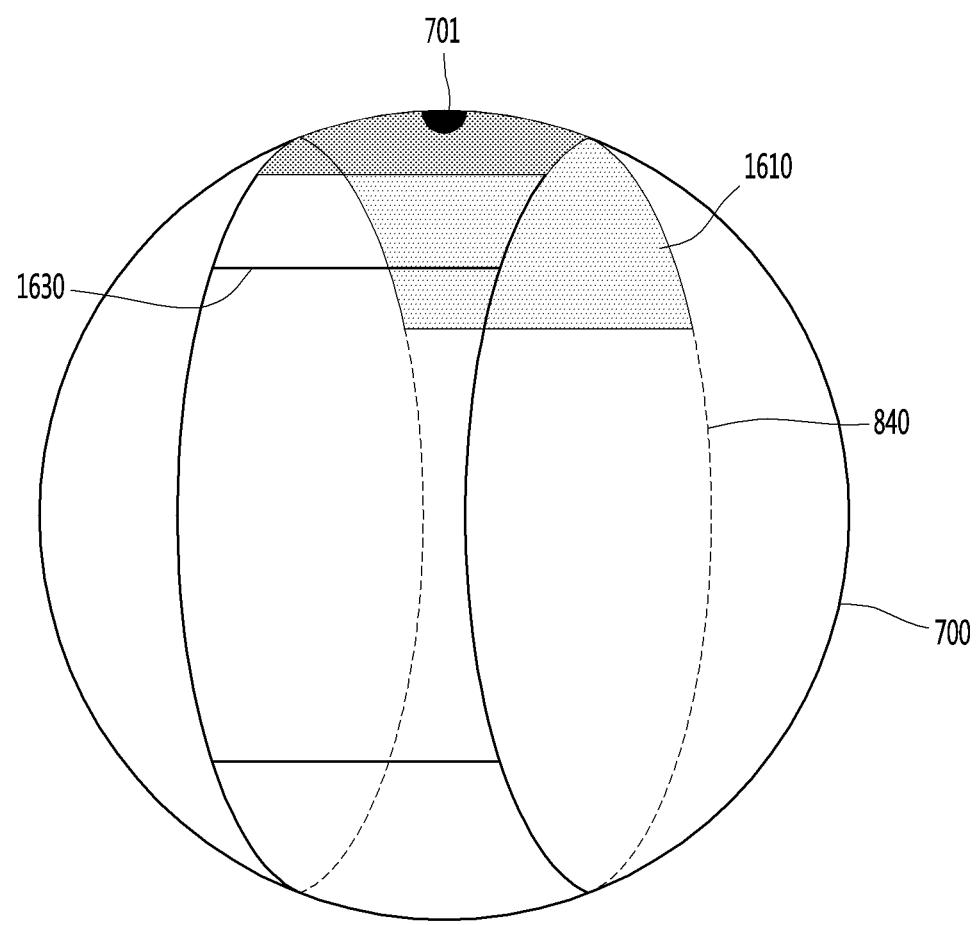
FIGS. 16A and 16B are views for describing a method of displaying an image reversely up to a preset range, in accordance with an embodiment of the present disclosure.
Figure 16B:
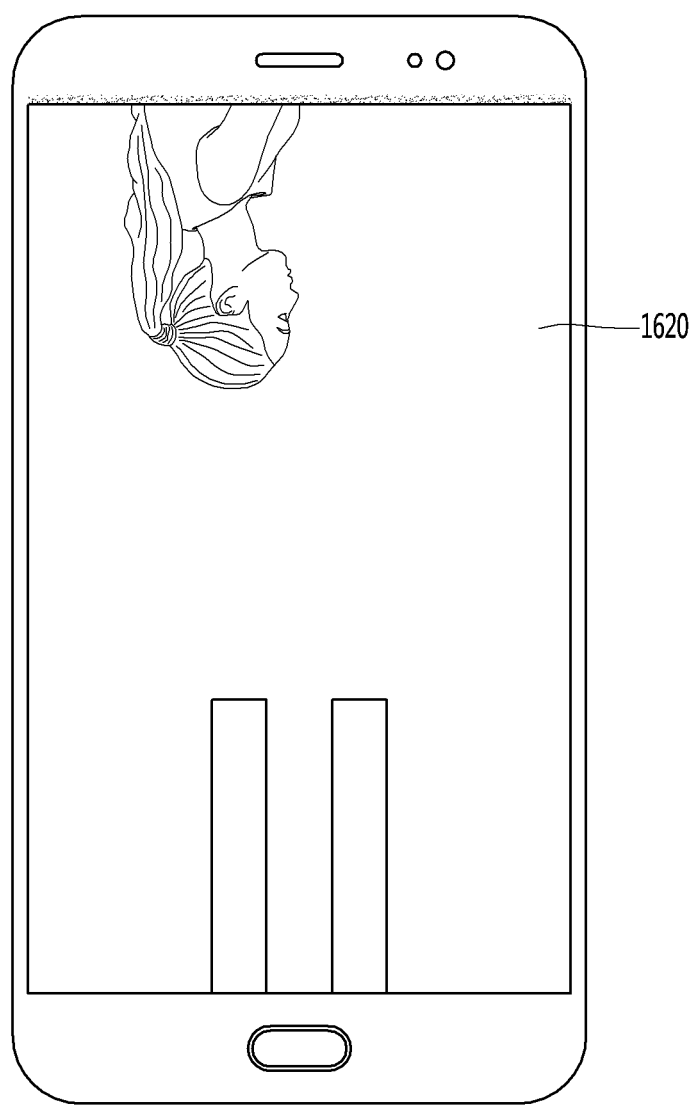

FIGS. 16A and 16B are views for describing a method of displaying an image reversely up to a preset range.

The controller 180 may display a second image 1620 included in a partial region 1610 of the second region 840. The partial region 1610 of the second region 840 may be an image including the uppermost portion 701 of the omnidirectionally captured image among regions obtained by dividing the second region 840 vertically.

In other words, the controller 180 may display a second image 1620 that is within a preset angle range from the uppermost portion 701 of the omnidirectionally captured image. Also, when the second image 1620 rotated up to the preset angle is displayed and an input for additionally rotating the second image 1620 in the same direction is received, the controller 180 may not perform a function corresponding to the input for additionally rotating the second image 1620.

Consequently, the second image displayed as a reverse image may be an image that is within a preset range from the upper portion of the omnidirectionally captured image.

Figure 17A:
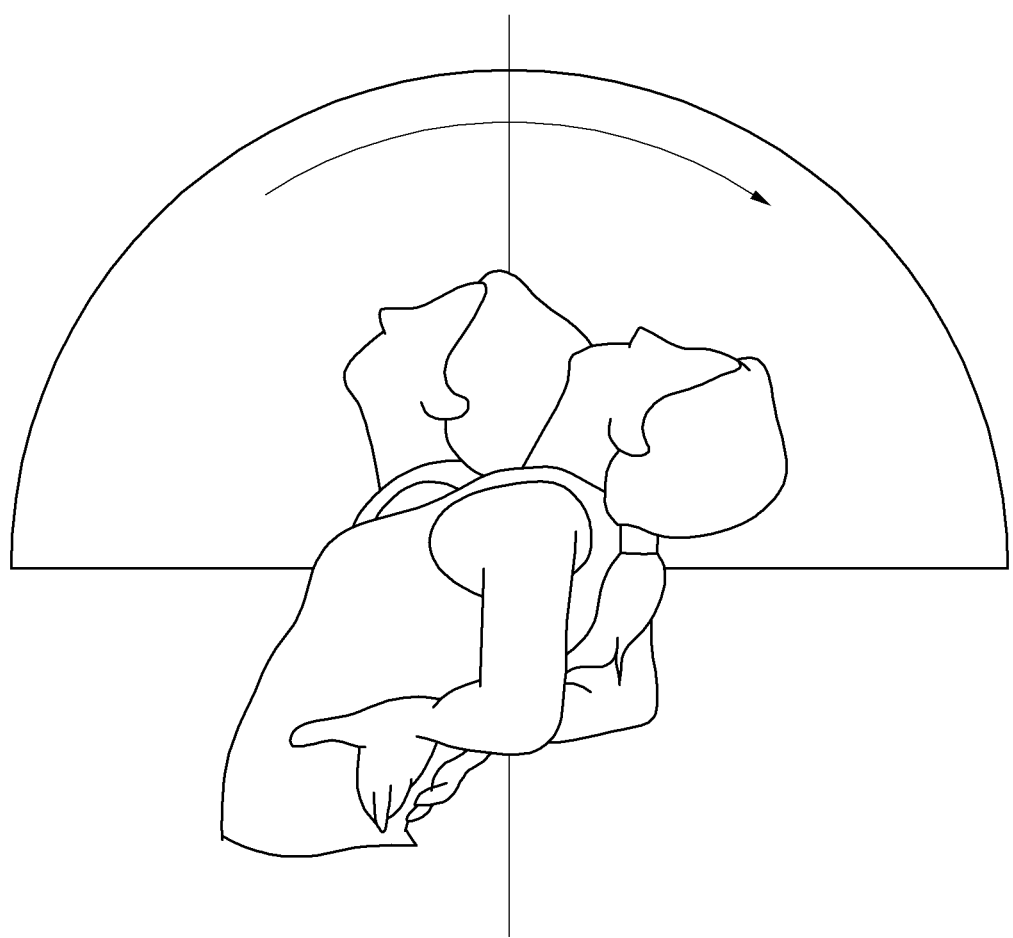
FIGS. 17A and 17B are views for describing the effects of the present disclosure.
Figure 17B:
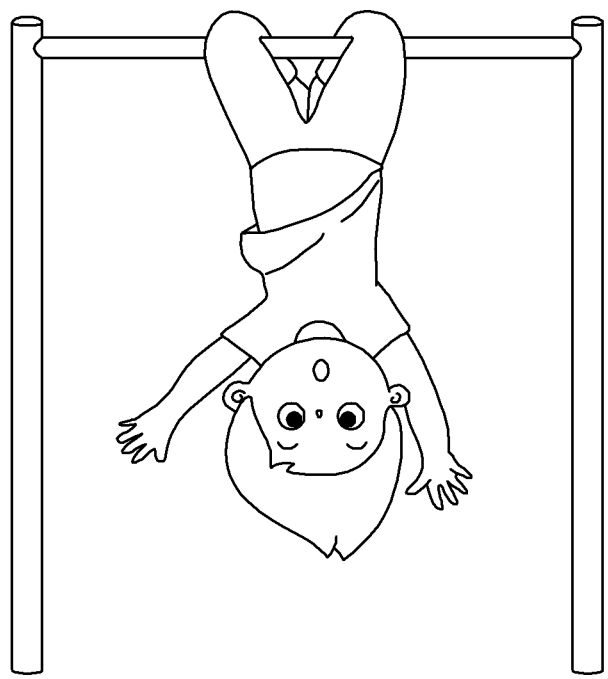

FIGS. 17A and 17B are views for describing the effects of the present disclosure.

The user may look back by tilting his or her head back as shown in FIG. 17A or by standing on his or her hands as shown in FIG. 17B. In this case, the user views an object that is upside down.

In the related art, in the displaying of the omnidirectionally captured image, it is impossible to allow the user to have an experience similar to reality, because the displayed region cannot be changed by passing through the uppermost portion or the lowermost portion of the omnidirectionally captured image.

However, in accordance with the present disclosure, the upper and lower sides of the image are maintained (the image is displayed reversely) while allowing the displayed region to be changed by passing through the uppermost portion or the lowermost portion, thereby providing an image that allows the user to have an experience similar to reality.

Also, the user has a limit in tilting his or her head back. Therefore, in accordance with the present disclosure, it is possible to provide the user with the experience similar to the reality by providing a reverse image with respect to only the image that is within the preset angle range from the uppermost portion 701 of the omnidirectionally captured image.

FIGS. 18A to 19D are views for describing a method of displaying a user interface (UI) indicating an image whose upper and lower sides are maintained, in accordance with an embodiment of the present disclosure.

When only a part of the omnidirectionally captured image is displayed, it is not easy for the user to determine which region of the image the user views. In particular, the user may be confused if the image is displayed reversely in a state in which the user cannot determine which region of the image the user views.

Therefore, the second image may be displayed together with a UI indicating that the second image is an image whose upper and lower sides are maintained. The UI indicating the image whose upper and lower sides are maintained may be displayed to overlap a region where the second image is displayed as a reverse image.

Figure 18A:
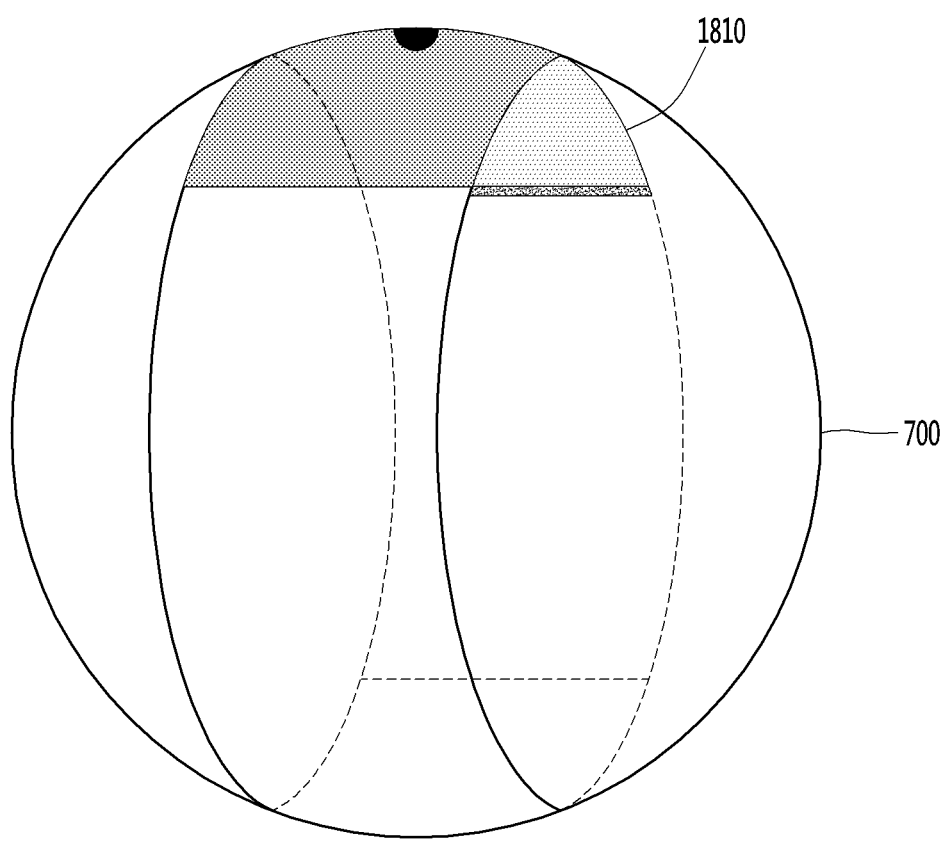
FIGS. 18A to 19D are views for describing a method of displaying a user interface (UI) indicating an image whose upper and lower sides are maintained, in accordance with an embodiment of the present disclosure.
Figure 18B:
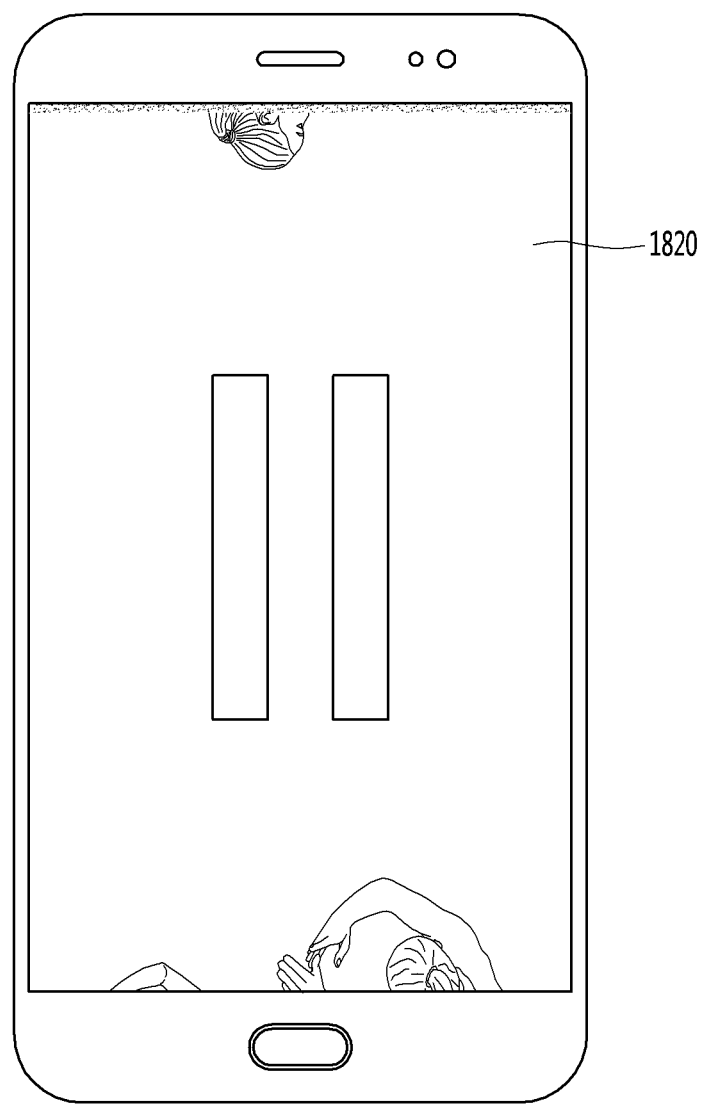

Specifically, when the first input is received, a region 1810 displayed on the screen may pass through the uppermost portion 701 of the omnidirectionally captured image as shown in FIGS. 18A and 18B. In this case, the image 1820 displayed on the screen may include the uppermost portion 701 of the omnidirectionally captured image. On the other hand, when the center of the region 1810 displayed on the screen matches the uppermost portion 701 of the omnidirectionally captured image, the region 1810 displayed on the screen may be a ceiling region.

Figure 19A:
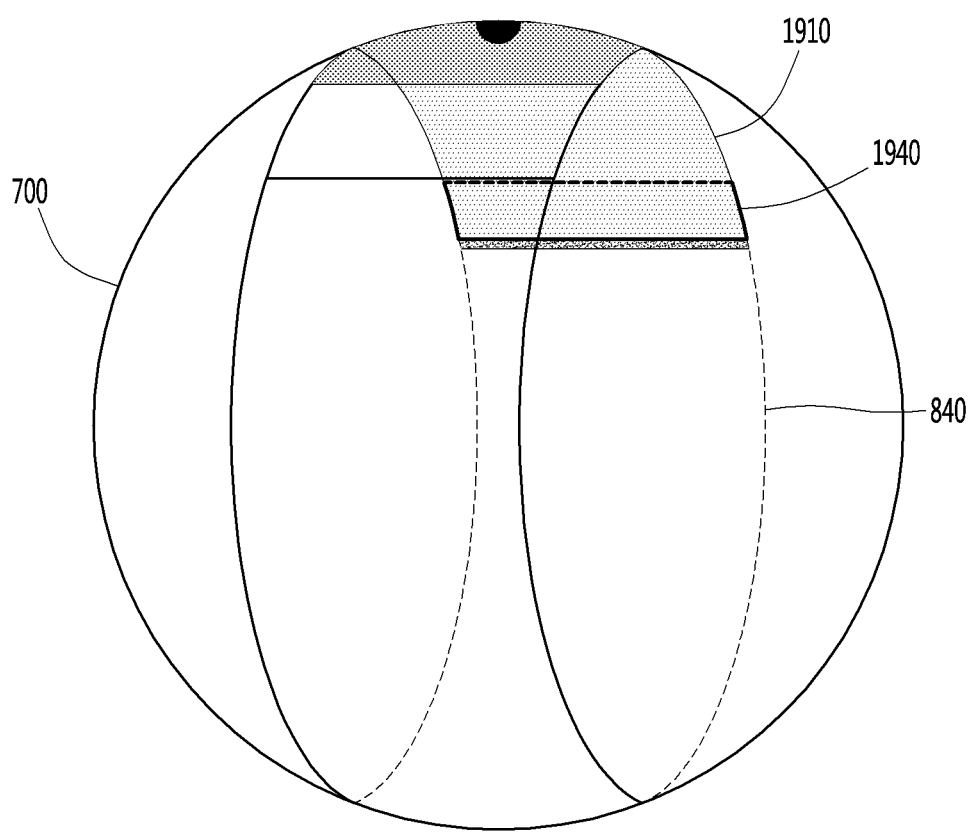
Figure 19B:
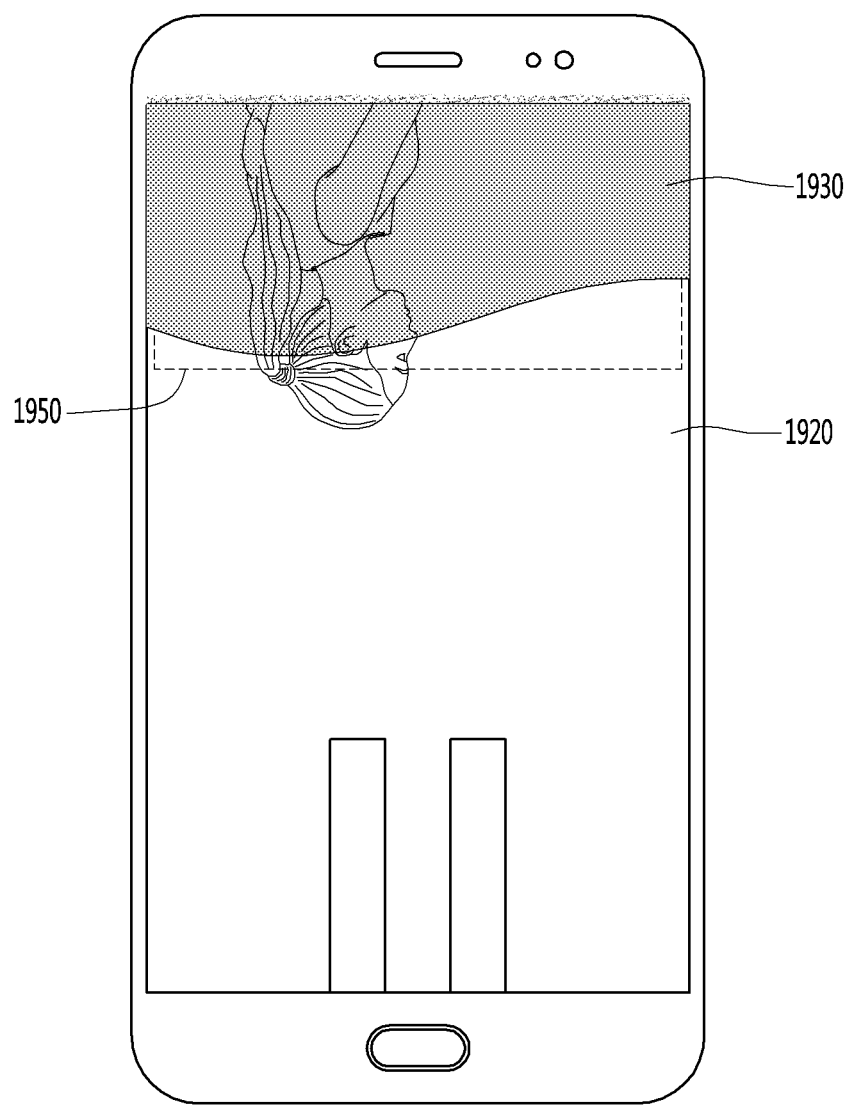

Also, after the image 1820 displayed on the screen passes through the uppermost portion 701 of the omnidirectionally captured image, the controller 180 may display a second image 1920 included in a second region 840 as shown in FIGS. 19A and 19B. A region 1910 corresponding to the second image 1920 in the entire region 700 of the omnidirectionally captured image is shown in FIG. 19A.

On the other hand, the controller 180 may display a UI 1930 indicating an image whose upper and lower sides are maintained, together with the second image 1920.

The UI 1930 indicating the image whose upper and lower sides are maintained may be displayed to overlap the second image 1920. Specifically, the controller 180 may display the UI 1930 indicating that the second image 1920 is an image whose upper and lower sides are maintained, while overlapping a region 1950 where the reverse image of the second image 1920 is displayed.

The region 1940 corresponding to the reversely displayed region 1950 may be an image except for the ceiling region 1810 in the region 1910 corresponding to the second image 1920.

Specifically, the region 1910 corresponding to the second image 1920 may be divided into a third region and a fourth region. The third region in the region 1910 corresponding to the second image 1920 may be an image overlapping the ceiling region 1810 shown in FIG. 18A. In this case, the third region may not be the reversely displayed region.

Also, as shown in FIG. 19A, the fourth region 1940 in the region 1910 corresponding to the second image 1920 may be an image that does not overlap the ceiling region 1810 shown in FIG. 18A. In this case, the fourth region 1940 may be the reversely displayed region.

In other words, when the second image is rotated and displayed by passing through the uppermost portion 701 of the omnidirectionally captured image from the first image, the controller 180 may display the UI 1930 indicating the image whose upper and lower sides are maintained, while overlapping the region newly displayed after passing through the uppermost portion 701.

On the other hand, as shown in FIG. 19B, the controller 180 may display the UI 1930, which indicates the image whose upper and lower sides are maintained, in the reversely displayed region 1950 of the second image. In this case, the reversely displayed region 1950 in the entire region of the second image is formed in an upper portion on the screen. That is, the UI indicating the image whose upper and lower sides are maintained from the first image may be displayed in an upper portion of the screen.

On the other hand, the controller 180 may display a UI 1930 having a first color and indicating the image whose upper and lower sides are maintained. The first color may be a color indicating the ground. For example, the controller 180 may display a brown UI 1930 indicating the image whose upper and lower sides are maintained.

On the other hand, the controller 180 may display the UI 1930 indicating the image whose upper and lower sides are maintained, such that the color of the UI 1930 becomes light.

Figure 19C:
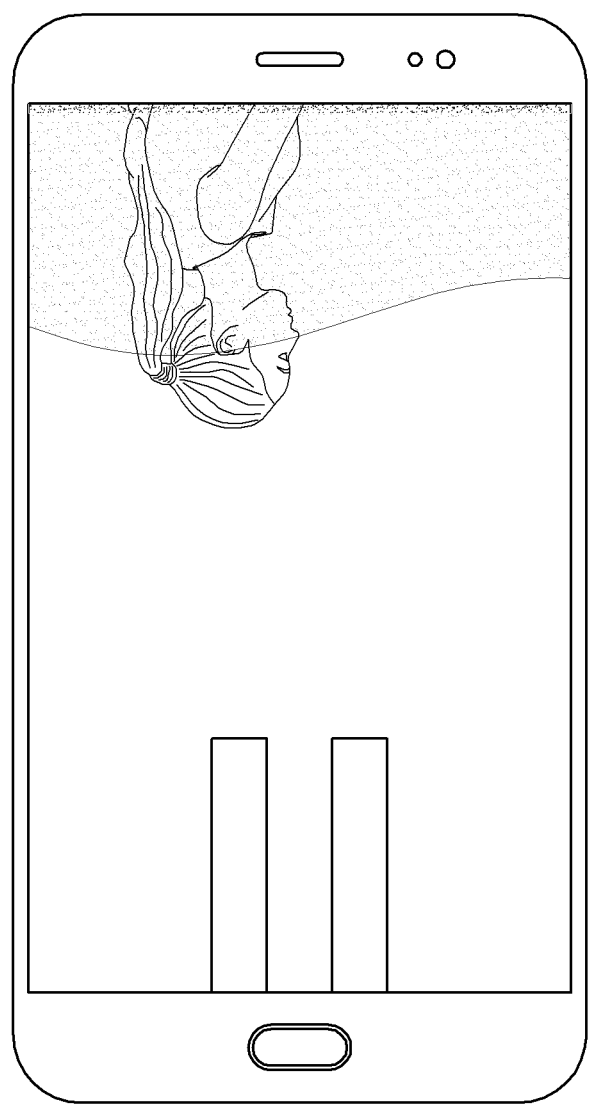
Figure 19D:
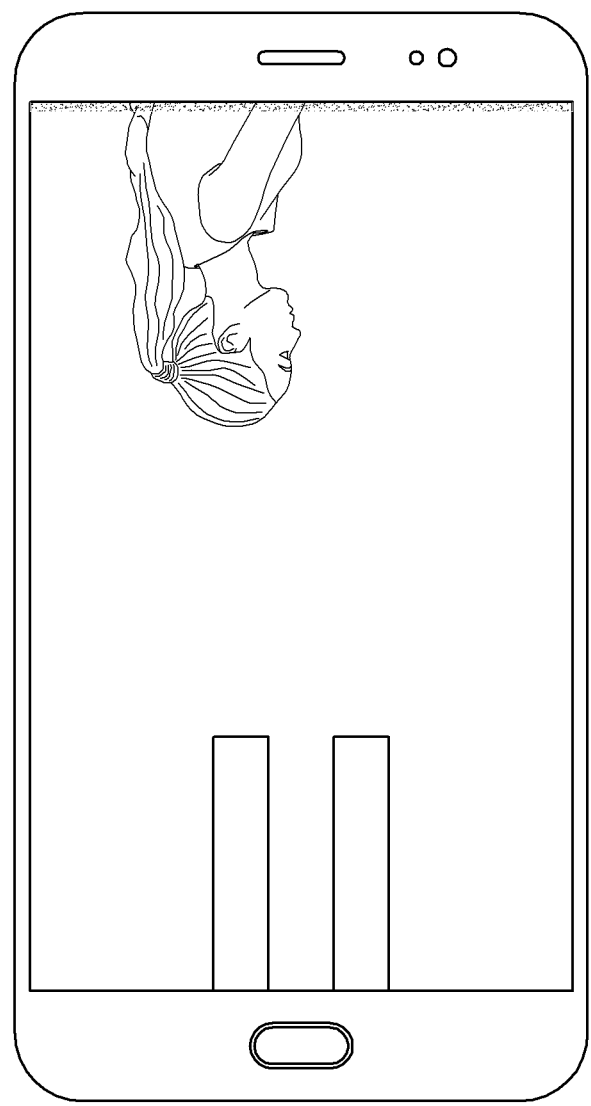

Specifically, as shown in FIG. 19C, the controller 180 may display the UI indicating the image whose upper and lower sides are maintained, while the color of the UI becomes light. Finally, as shown in FIG. 19D, the controller 180 may stop the displaying of the UI indicating the image whose upper and lower sides are maintained.

Figure 20:
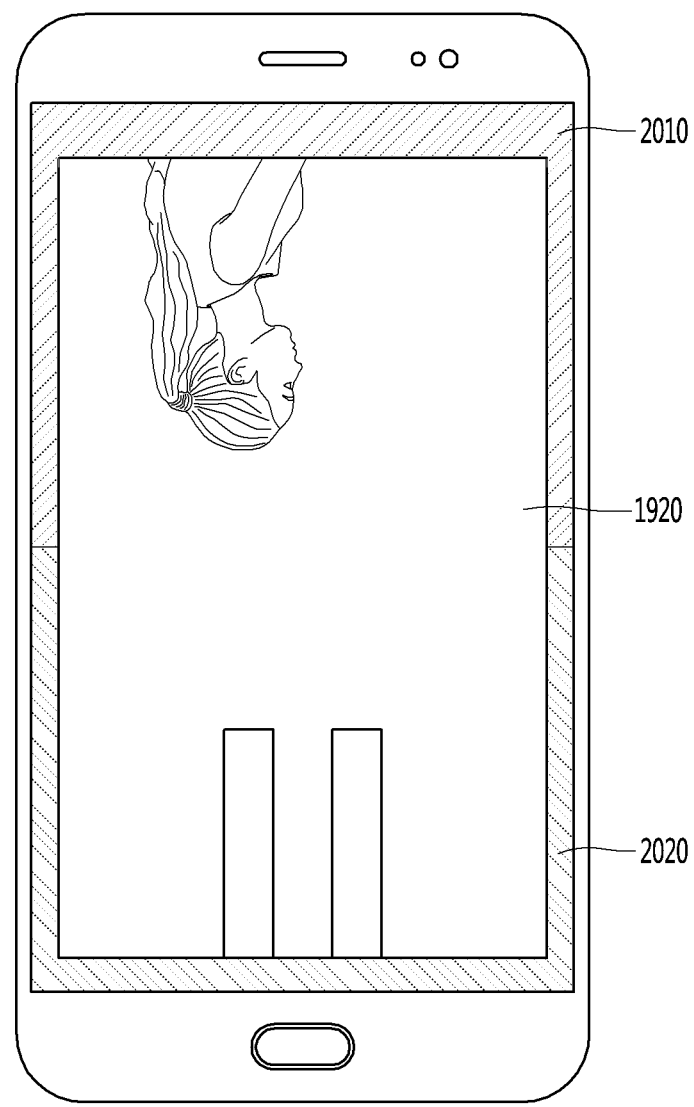
FIG. 20 is a view for describing a method of displaying a UI indicating that a second image is an image whose upper and lower sides are maintained, in accordance with another embodiment of the present disclosure.

FIG. 20 is a view for describing a method of displaying a UI indicating that a second image is an image whose upper and lower sides are maintained, in accordance with another embodiment of the present disclosure.

The controller 180 may display a first UI 2010 indicating an image whose upper and lower sides are maintained from the first image, together with the second image 1920.

Also, the controller 180 may display a second UI 2720 different from the first UI 2710.

On the other hand, the UI 2010 indicating the image whose upper and lower sides are maintained from the first image may be a UI having a first color. Also, the second UI 2720 may be a UI having a second color.

The first color may be a color indicating the ground For example, the first color of the UI 2010 may be brown.

Also, the second color may be a color indicating the sky. For example, the second color of the UI 2020 may be sky blue.

On the other hand, the UI 2010 indicating the image whose upper and lower sides are maintained from the first image may be displayed in an upper portion of the screen.

Specifically, the controller 180 may display the UI 2010, which indicates the image whose upper and lower sides are maintained from the first image, above the second UI 2020.

When the upper and lower sides of the image are maintained, the second image is reversely displayed. In this case, when the user drags the image downward, the region displayed on the screen is gradually closer to the bottom (or the ground).

In the present disclosure, the UI having the first color is displayed in an upper portion of the screen. Therefore, if the user continuously moves the image downward (drags the image downward), the user can intuitively recognize that the image will be closer to the bottom (ground).

Therefore, in accordance with the present disclosure, even though the image is reversely displayed, the user can clearly determine the region of the image the user views and the moving direction.

FIGS. 21A to 24B are views for describing an example in which an image displayed on a mobile terminal passes through a lowermost portion from a first region and is changed to a second region, in accordance with an embodiment of the present invention.

Figure 21A:
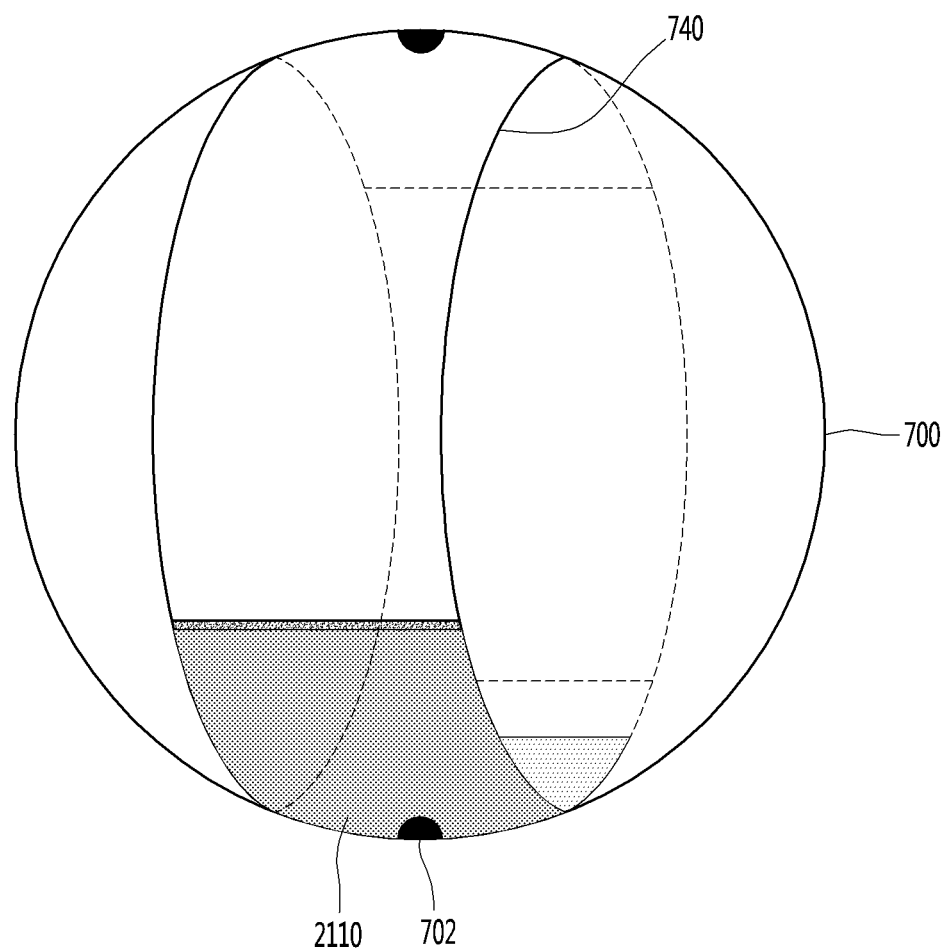
FIGS. 21A to 24B are views for describing an example in which an image displayed on a mobile terminal is changed by passing through a lowermost portion from a first region and is changed to a second region, in accordance with an embodiment of the present invention.
Figure 21B:
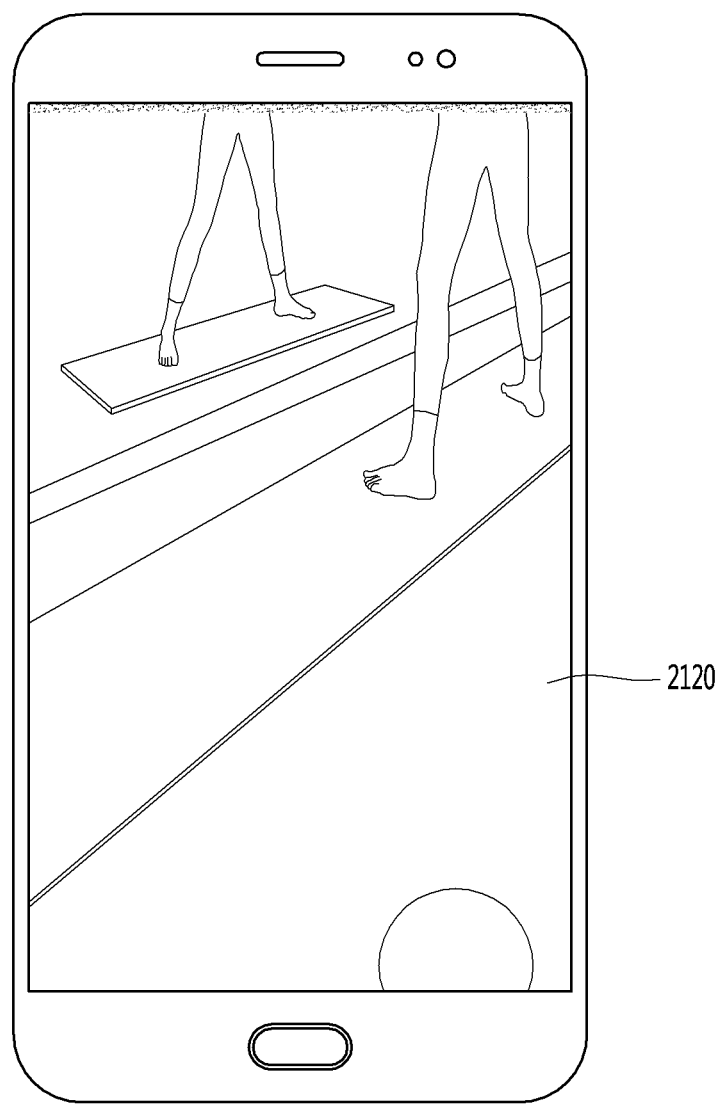

Referring to FIGS. 21A and 21B, the controller 180 may display a first image 2120 included in the first region 740 in the entire region 700 of the omnidirectionally captured image.

A region 2110 corresponding to the first image 2120 in the entire region 700 of the omnidirectionally captured image, that is, the region 2110 displayed on the screen in the entire region 700 of the omnidirectionally captured image, is shown in FIG. 21A.

On the other hand, the controller 180 may receive a second input of changing the region displayed on the display unit 151 in the entire region 700 of the omnidirectionally captured image. The second input may be an input for changing the region displayed on the display unit 151 from the first region 740 to the second region 840 by passing through the lowermost portion 702 of the omnidirectionally captured region.

Figure 22A:
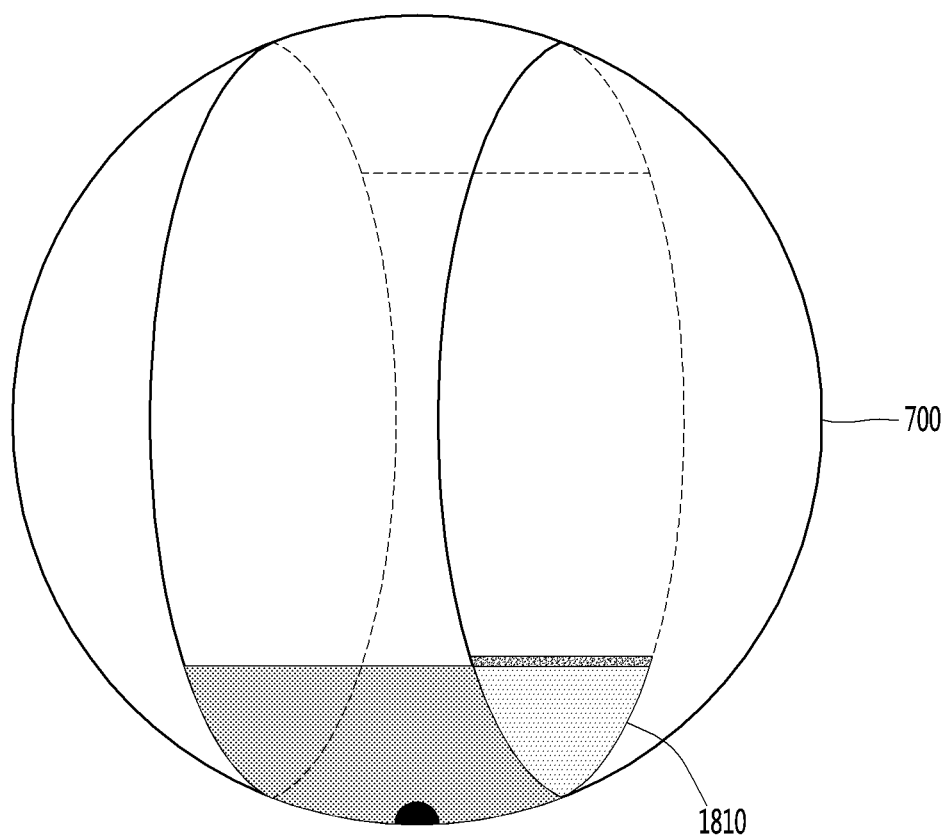
Figure 22B:
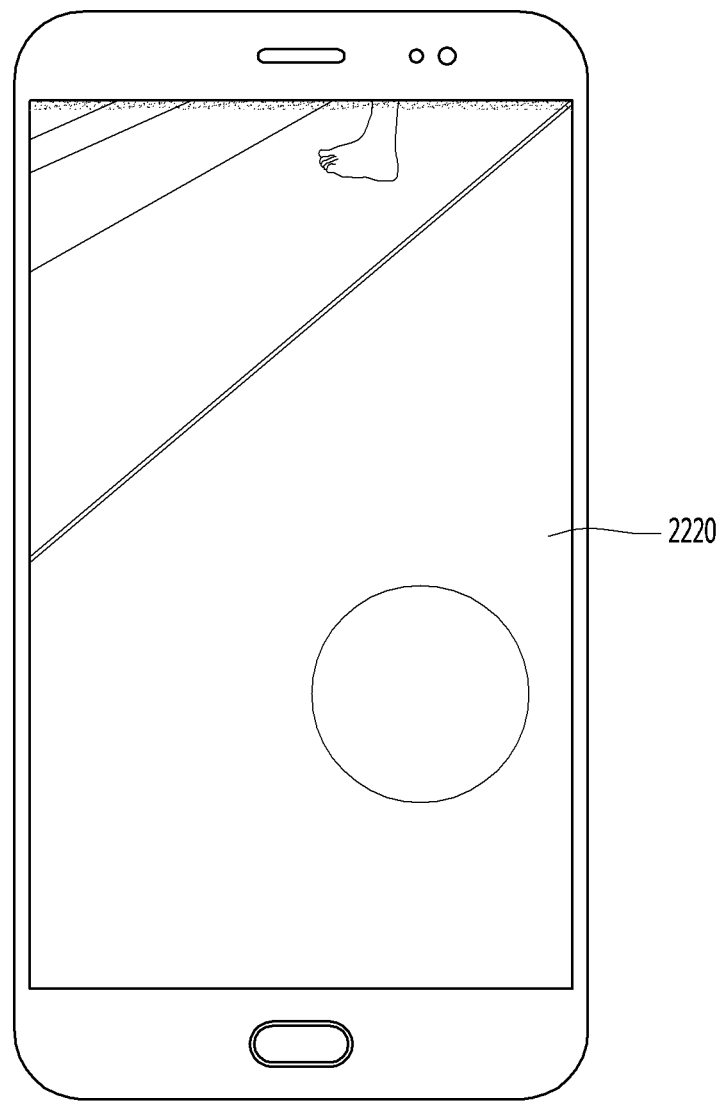

On the other hand, when the second input is received, a region displayed on the screen may pass through the lowermost portion 702 of the omnidirectionally captured image as shown in FIGS. 22A and 22B. In this case, the image 2220 displayed on the screen may include the lowermost portion 702 of the omnidirectionally captured image.

Figure 23A:
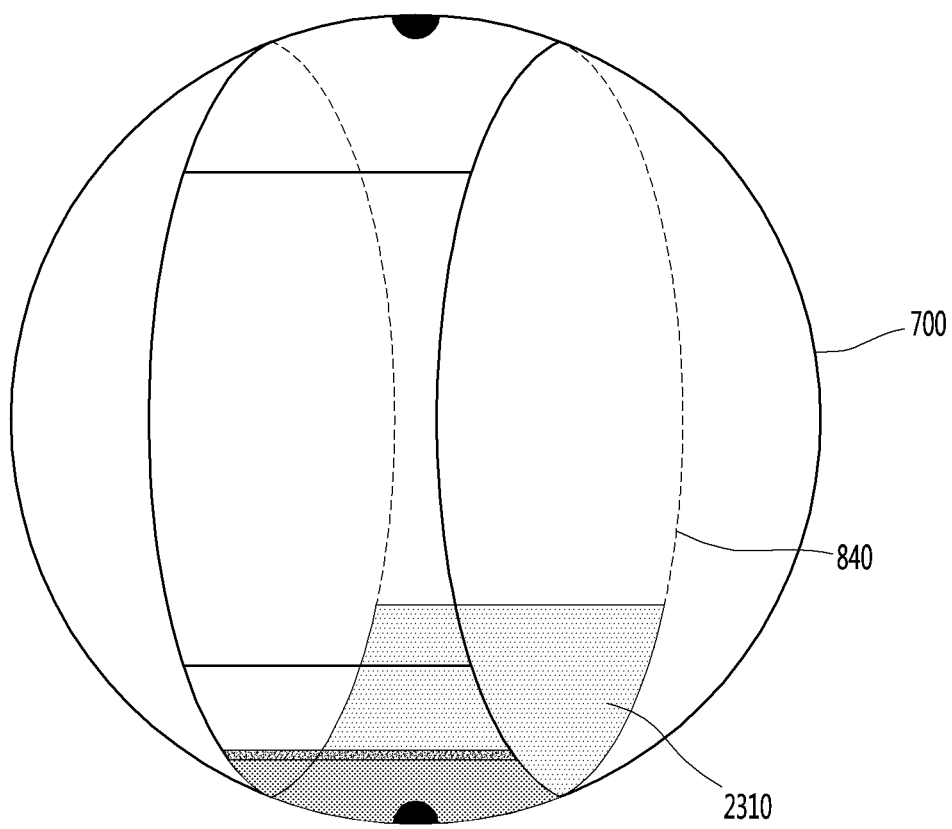
Figure 23B:
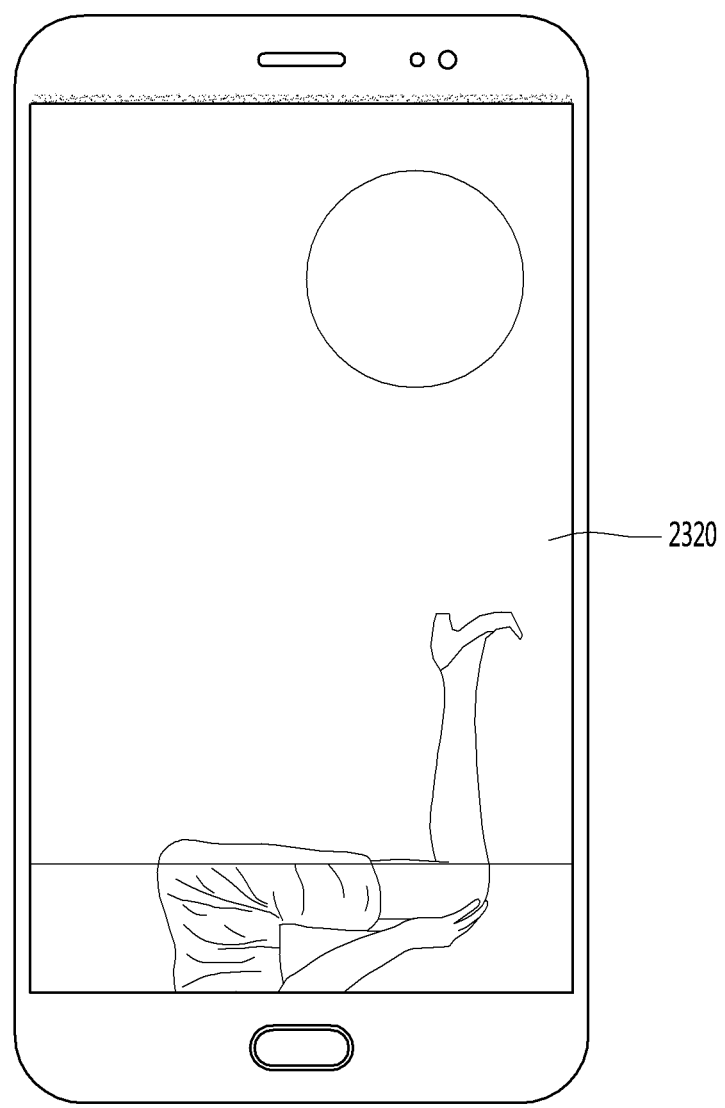

On the other hand, after the region displayed on the screen passes through the lowermost portion of the omnidirectionally captured image, the controller 180 may display a third image 2320 as shown in FIGS. 23A and 23B. The third region may be an image included in the second region 840 that is opposite to the first region 740 with respect to the lowermost portion of the omnidirectionally captured region. An image 2310 corresponding to the third image 2320 in the entire region 700 of the omnidirectionally captured image is shown in FIG. 23A.

Figure 24A:
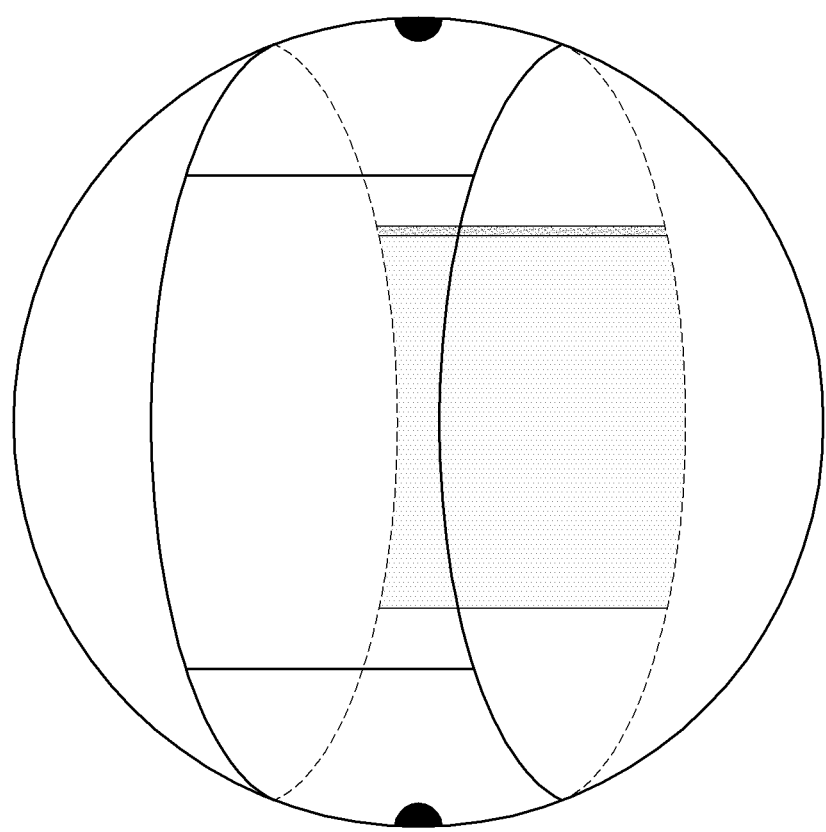
Figure 24B:
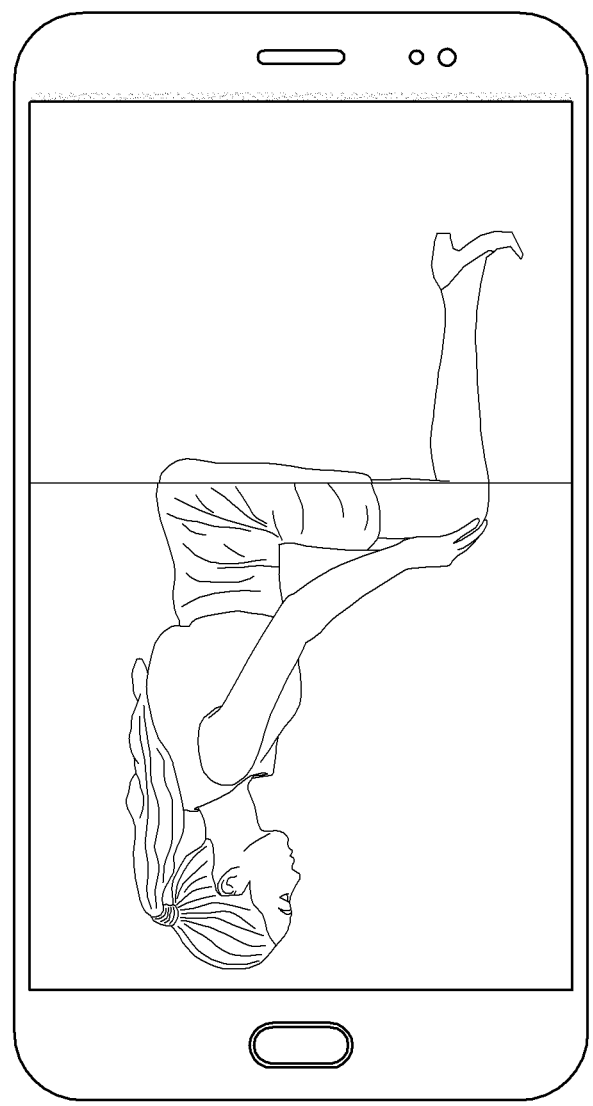

As shown in FIGS. 24A and 24B, the third image may be an image whose upper and lower sides are maintained from the first image. Specifically, the third image is merely an image rotated by passing through the lowermost portion 702 of the omnidirectionally captured image from the first image 1320 and may be an image whose upper and lower sides are maintained without reversing the upper and lower sides of the image from the first image.

On the other hand, since the first image is displayed normally, the second image may be displayed as a reverse image, that is, an image whose upper and lower sides are reversed in terms of the user.

FIGS. 25A to 26D are views for describing a method of displaying a UI indicating an image whose upper and lower sides are maintained, in accordance with an embodiment of the present disclosure.

The controller 180 may display a UI indicating an image whose upper and lower sides are maintained, together with the third image. The UI indicating the image whose upper and lower sides are maintained may be displayed to overlap a region where the third image is reversely displayed.

Figure 25A:
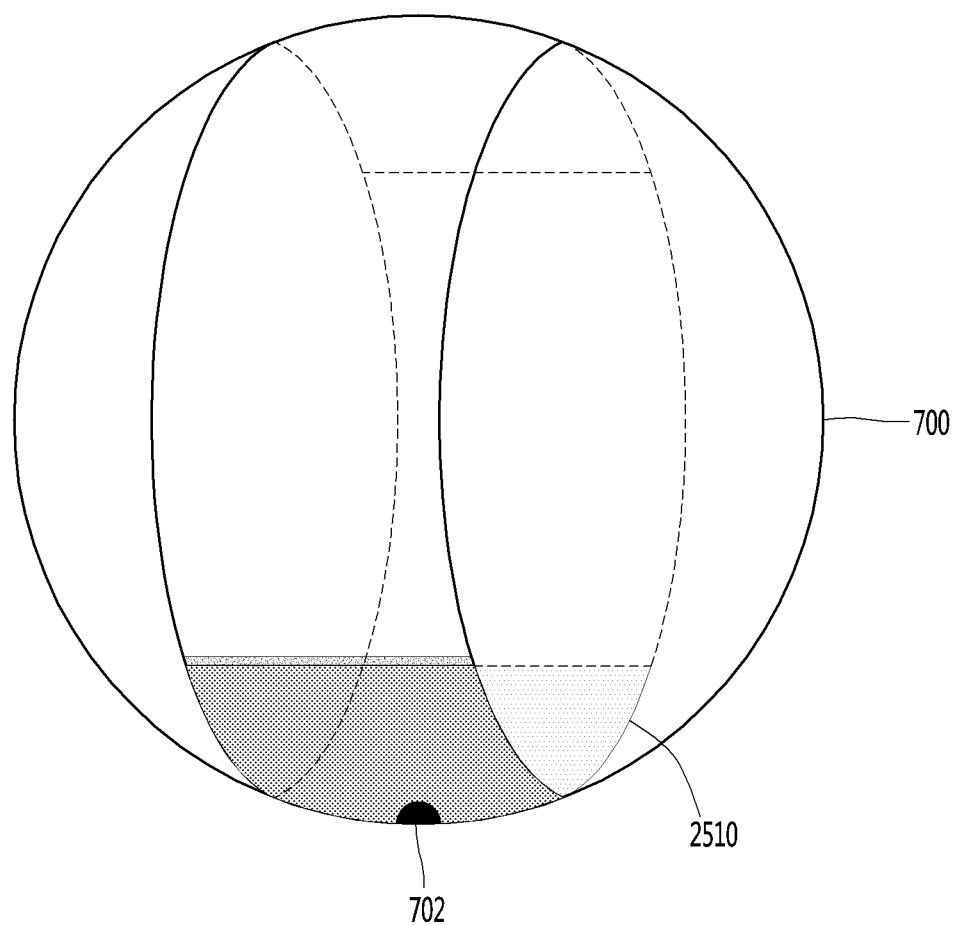
FIGS. 25A to 26D are views for describing a method of displaying a UI indicating an image whose upper and lower sides are maintained, in accordance with an embodiment of the present disclosure.
Figure 25B:
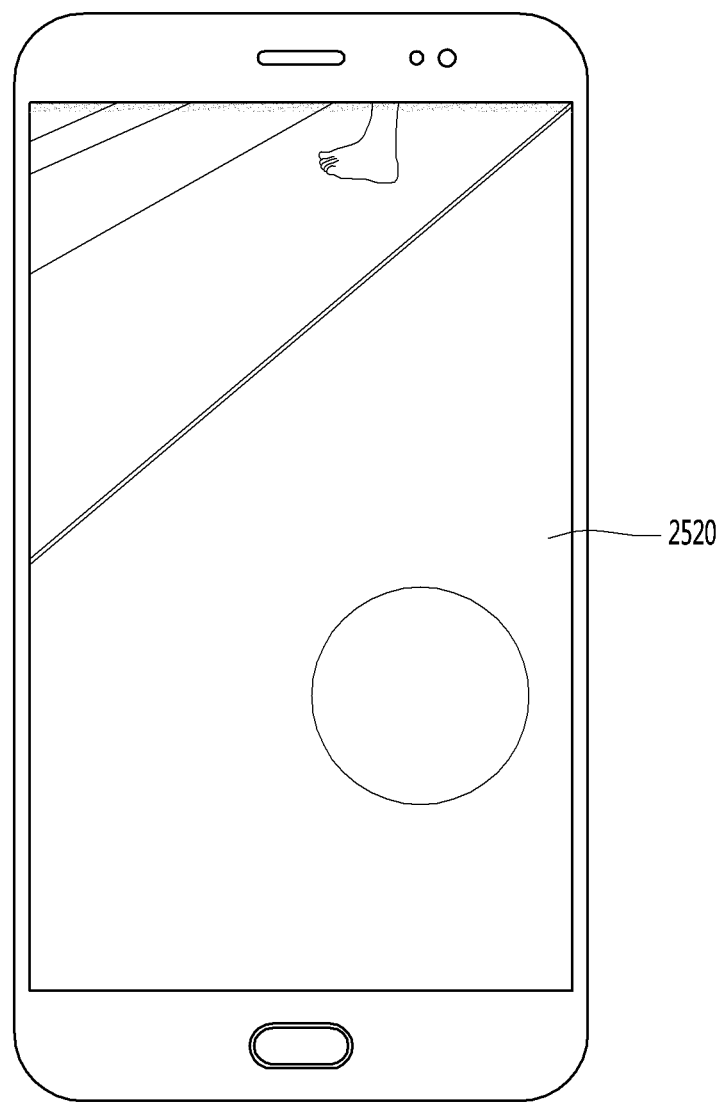

Specifically, when the second input is received, a region 2510 displayed on the screen may pass through the lowermost portion 702 of the omnidirectionally captured image as shown in FIGS. 25A and 25B. In this case, the image 2520 displayed on the screen may include the lowermost portion 702 of the omnidirectionally captured image. On the other hand, when the center of the region 2510 displayed on the screen matches the lowermost portion 702 of the omnidirectionally captured image, the region 2510 displayed on the screen may be a bottom region.

Figure 26A:
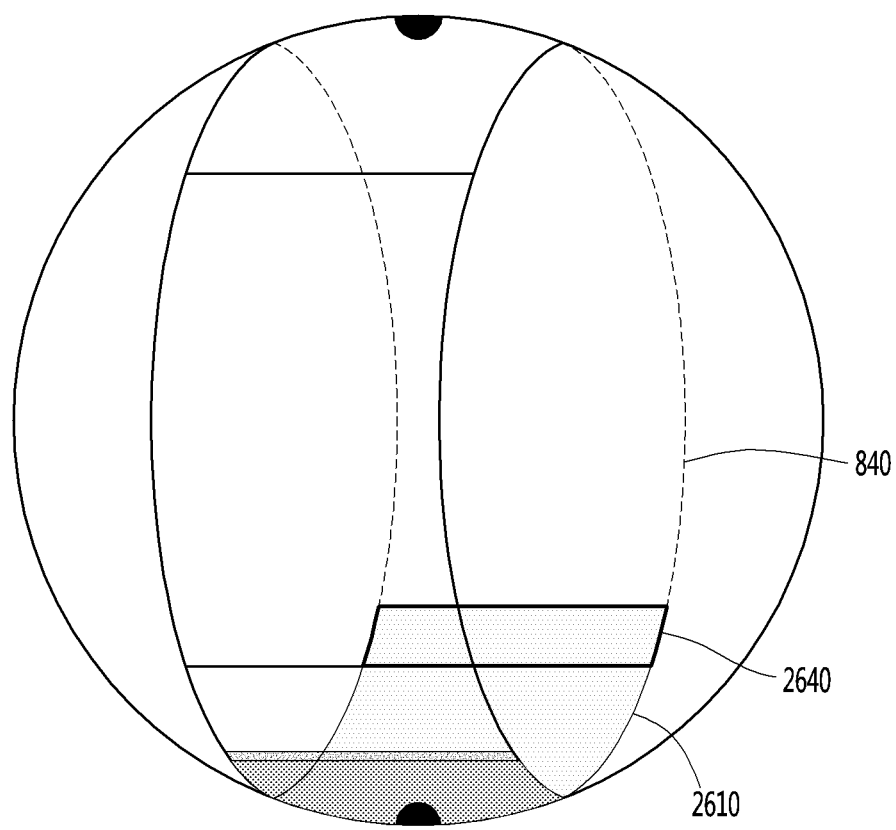
Figure 26B:
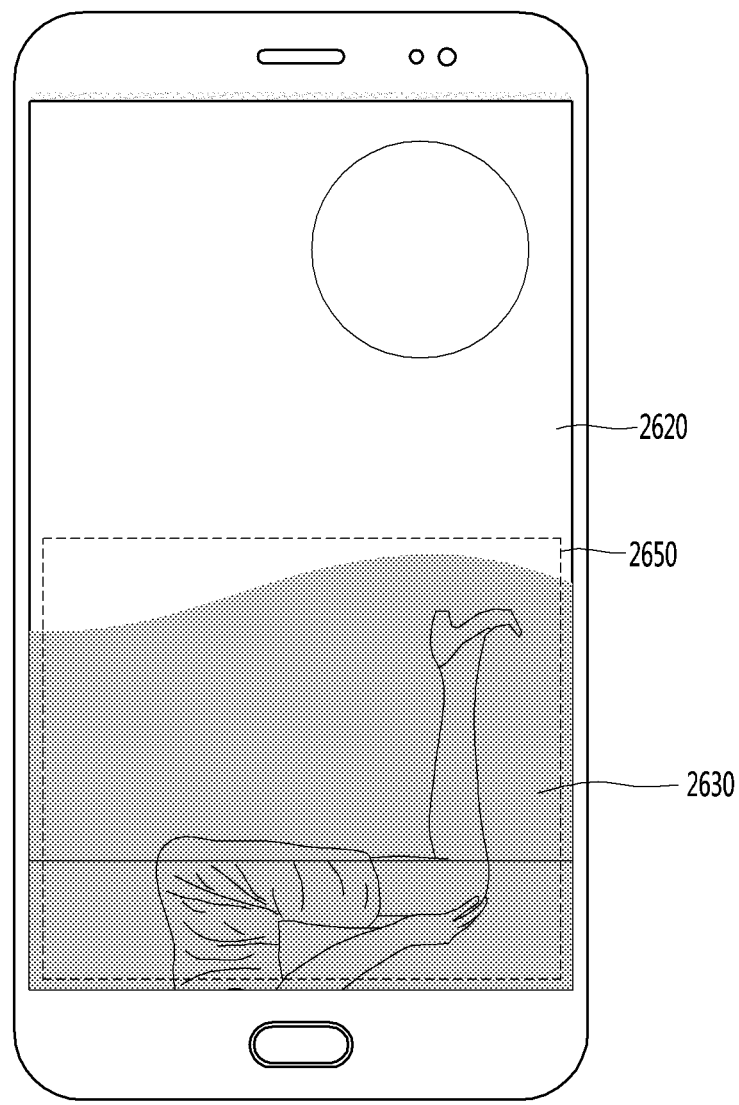

Also, after the region 2510 displayed on the screen passes through the lowermost portion 702 of the omnidirectionally captured image, the controller 180 may display a third image 2620 included in a second region 840 as shown in FIGS. 26A and 26B. A region 2610 corresponding to the third image 2620 in the entire region 700 of the omnidirectionally captured image is shown in FIG. 26A.

On the other hand, the controller 180 may display a UI 2630 indicating an image whose upper and lower sides are maintained, together with the third image 2620.

The UI 2630 indicating the image whose upper and lower sides are maintained may be displayed to overlap the third image 2620. Specifically, the controller 180 may display the UI 2630 indicating that the third image 2620 is an image whose upper and lower sides are maintained, while overlapping a region 2650 where the reverse image of the third image 2620 is displayed.

The region 2640 corresponding to the reversely displayed region 2650 may be an image except for the bottom region 2510 in the region 2610 corresponding to the third image 2620.

Specifically, the region 2610 corresponding to the third image 2620 may be divided into a third region and a fourth region. The third region in the region 2610 corresponding to the third image 2620 may be an image overlapping the bottom region 2510 shown in FIG. 25A. In this case, the third region may not be a reversely displayed region.

Also, as shown in FIG. 26A, the fourth region 2640 in the region 2610 corresponding to the third image 2620 may be an image that does not overlap the bottom region 2510 shown in FIG. 18A. In this case, the fourth region 2640 may be the reversely displayed region.

In other words, when the third image is rotated and displayed by passing through the lowermost portion 702 of the omnidirectionally captured image from the first image, the controller 180 may display the UI 2630 indicating the image whose upper and lower sides are maintained, while overlapping the region newly displayed after passing through the lowermost portion 702.

On the other hand, as shown in FIG. 26B, the controller 180 may display the UI 2630, which indicates the image whose upper and lower sides are maintained, in the reversely displayed region 2650 of the third image 2620. In this case, the reversely displayed region 2650 in the entire region of the third image is formed in a lower portion of the screen. That is, the UI indicating the image whose upper and lower sides are maintained from the first image may be displayed in a lower portion of the screen.

On the other hand, the controller 180 may display a UI 2630 having a second color and indicating the image whose upper and lower sides are maintained. The second color may be a color indicating the sky. For example, the controller 180 may display a sky-blue UI 2630 indicating the image whose upper and lower sides are maintained.

On the other hand, the controller 180 may display the UI 2630 indicating the image whose upper and lower sides are maintained, such that the color of the UI 1930 becomes light.

Figure 26C:
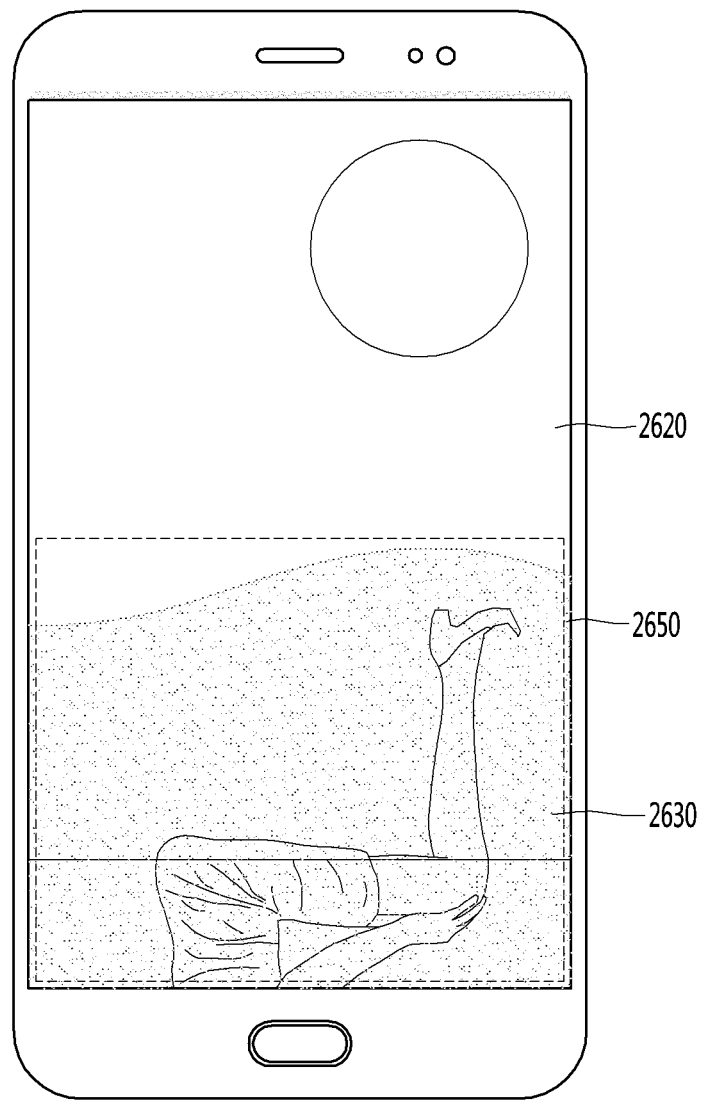
Figure 26D:
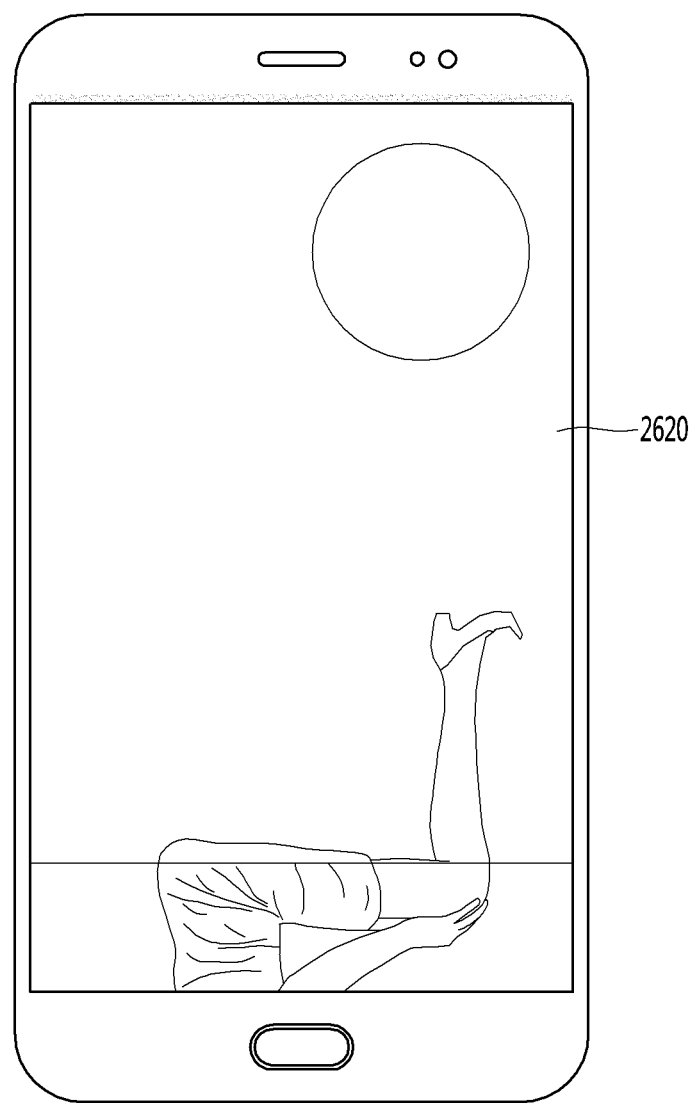

Specifically, as shown in FIG. 26C, the controller 180 may display the UI 2630 indicating the image whose upper and lower sides are maintained, while the color of the UI 2630 becomes light. Finally, as shown in FIG. 26D, the controller 180 may stop the displaying of the UI 2630 indicating the image whose upper and lower sides are maintained.

Figure 27:
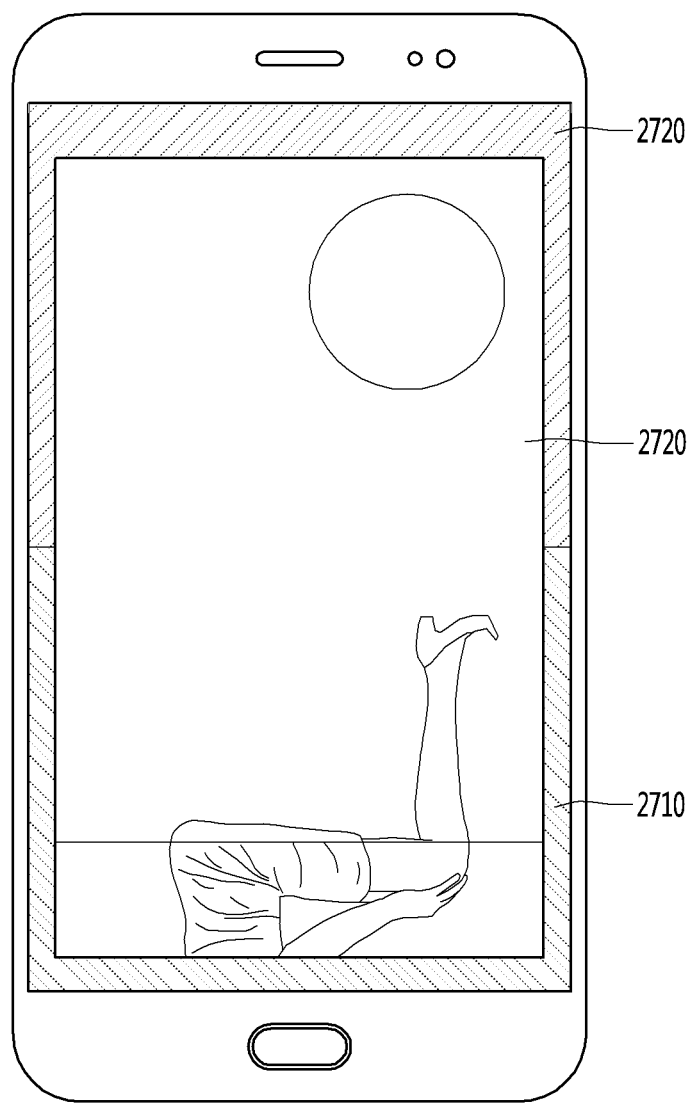
FIG. 27 is a view for describing a method of displaying a UI indicating that a third image is an image whose upper and lower sides are maintained, in accordance with another embodiment of the present disclosure.

FIG. 27 is a view for describing a method of displaying a UI indicating that a third image is an image whose upper and lower sides are maintained, in accordance with another embodiment of the present disclosure.

The controller 180 may display a first UI 2710 indicating an image whose upper and lower sides are maintained from the first image, together with the third image 2720.

Also, the controller 180 may display a second UI 2720 different from the first UI 2710.

On the other hand, the first UI 1 2710 indicating the image whose upper and lower sides are maintained from the first image may be a UI having a second color. Also, the second UI 2720 may be a UI having a first color.

The first color may be a color indicating the ground For example, the first color of the second UI 2720 may be brown.

Also, the second color may be a color indicating the sky. For example, the second color of the first UI 2710 may be sky blue.

On the other hand, the UI 2710 indicating the image whose upper and lower sides are maintained from the first image may be displayed in a lower portion of the screen. Specifically, the controller 180 may display the UI 2710, which indicates the image whose upper and lower sides are maintained from the first image, below the second UI 2720.

When the upper and lower sides of the image are maintained, the third image is reversely displayed. In this case, when the user drags the image upward, the region displayed on the screen is gradually closer to the ceiling (or the sky).

In the present disclosure, the UI having the second color is displayed in a lower portion of the screen. Therefore, if the user continuously moves the image upward (drags the image downward), the user can intuitively recognize that the image will be closer to the ceiling (sky).

Therefore, in accordance with the present disclosure, even though the image is reversely displayed, the user can clearly determine the region of the image the user views and the moving direction.

FIGS. 28A to 30B are views for describing a method of differently changing a speed of moving toward an upper end of an image and a speed of moving toward a lower end of the image, in accordance with an embodiment of the present disclosure.

Figure 28A:
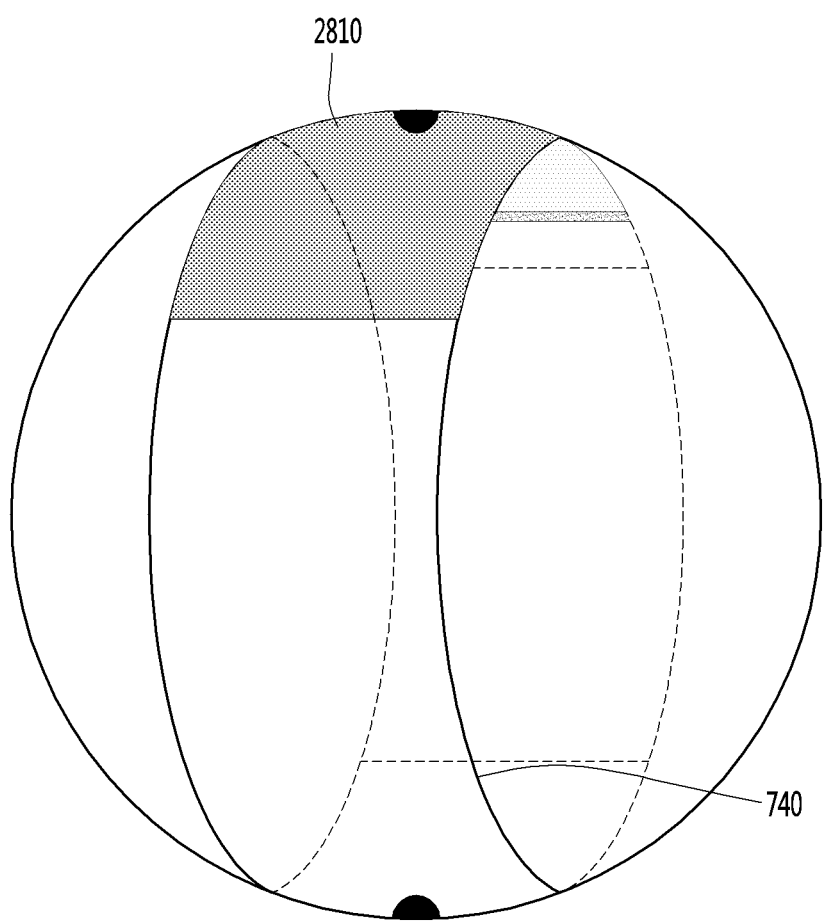
FIGS. 28A to 30B are views for describing a method of differently changing a speed of moving toward an upper end of an image and a speed of moving toward a lower end of the image, in accordance with an embodiment of the present disclosure.
Figure 28B:
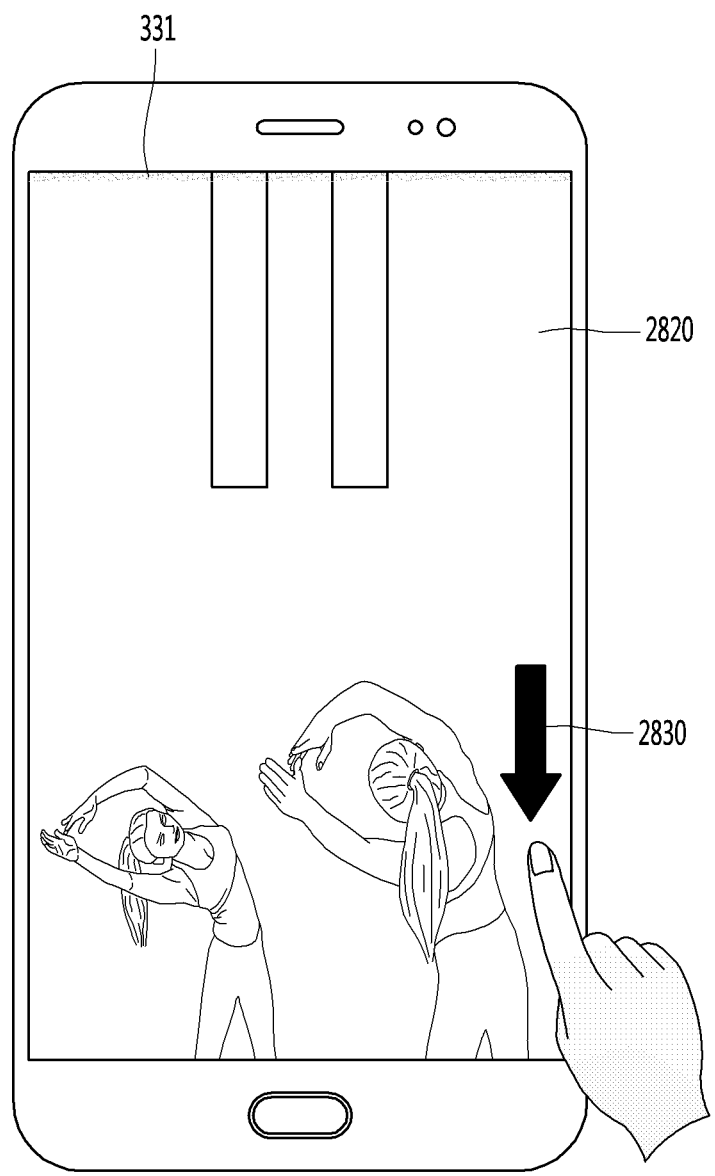

Referring to FIGS. 28A and 28B, a first image 2820 included in the first region 740 in the entire region 700 of the omnidirectionally captured image is currently displayed on the screen. A region 2810 corresponding to the first image 2820 in the entire region 700 of the omnidirectionally captured image, that is, the region 2810 displayed on the screen in the entire region 700 of the omnidirectionally captured image, is shown in FIG. 28A.

The controller 180 may receive an input for moving a region displayed on the screen toward an upper end of the first image 2820. For example, as shown in FIG. 28B, the controller 180 may receive an input of touching the screen and dragging downward.

When an input for moving the region displayed on the screen toward the upper end of the first image 2820 is received, the controller 180 may move the displayed region toward the upper end of the first image so as to correspond to a length of the input.

In this case, the controller 180 may move the region displayed on the screen toward the upper end of the first image at a first speed. In this case, the controller 180 may display an image corresponding to the finally moved region.

For example, the controller 180 may change the region displayed on the screen to the ceiling region by moving the region displayed on the screen toward the upper end of the first image at the first speed. In this case, the controller 180 may display an image corresponding to the ceiling region.

On the other hand, the ceiling region may be a region at a time point when the displayed region is changed from the first region to the second region. For example, the displayed region is included in the first region 740, is included in the ceiling region in the first region 740, and is then included in the second region 840 by the region movement.

Figure 29B:
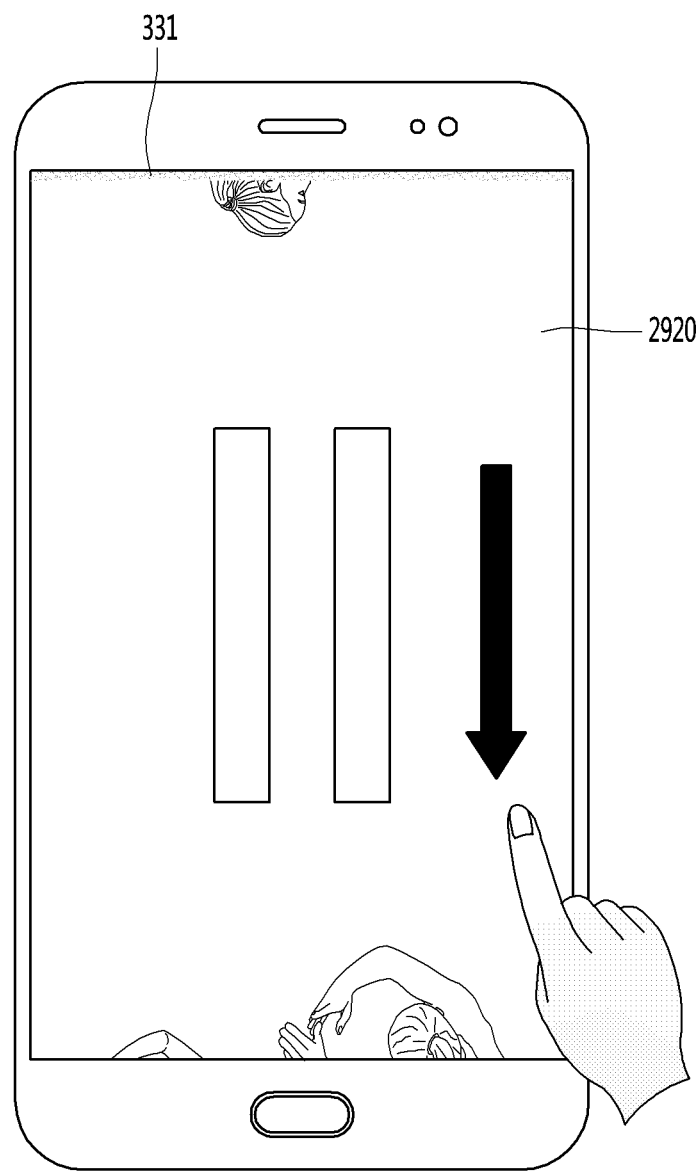

FIGS. 29A and 29B are views illustrating a situation immediately after the displayed region is changed from the first region 740 to the second region 840. In this case, the controller 180 may display a second image 2920 included in a second region 840. A region 2910 corresponding to the second image 2920 in the entire region 700 of the omnidirectionally captured image is shown in FIG. 29A.

The controller 180 may receive an input for moving a region displayed on the screen toward an upper end of the second image 2920. For example, as shown in FIG. 29B, the controller 180 may receive an input of touching the screen and dragging downward.

When an input for moving the region displayed on the screen toward the upper end of the second image 2920 is received, the controller 180 may move the region displayed on the screen toward the upper end of the second image so as to correspond to a length of the input.

In this case, the controller 180 may move the region displayed on the screen toward the upper end of the second image at a second speed. In this case, the controller 180 may display an image corresponding to the finally moved region.

Figure 30A:
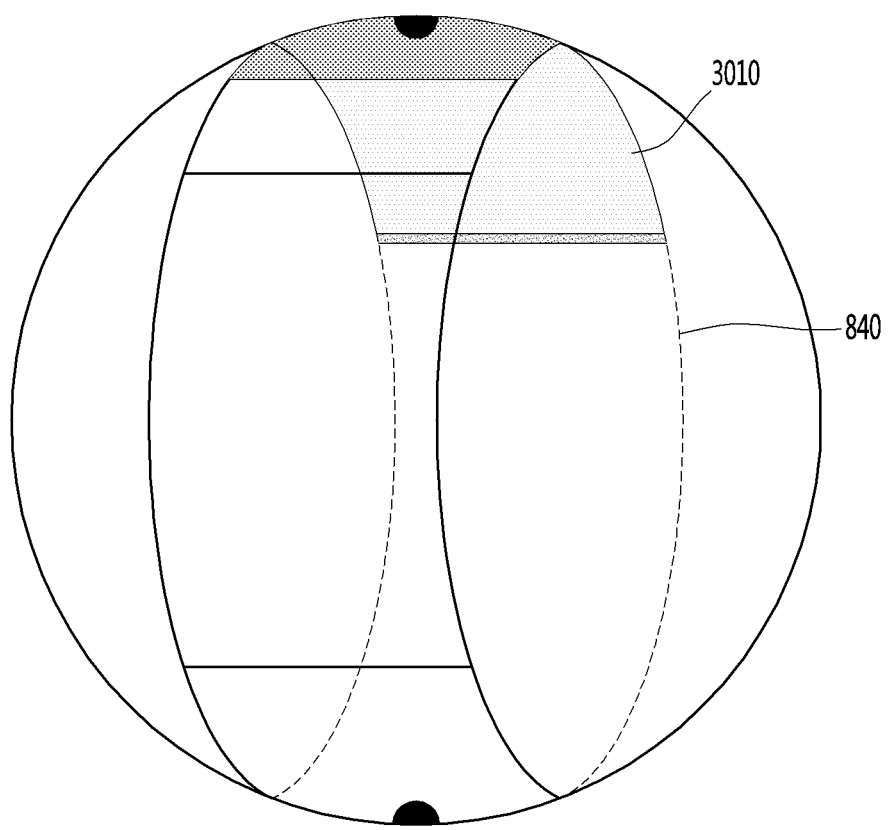
Figure 30B:
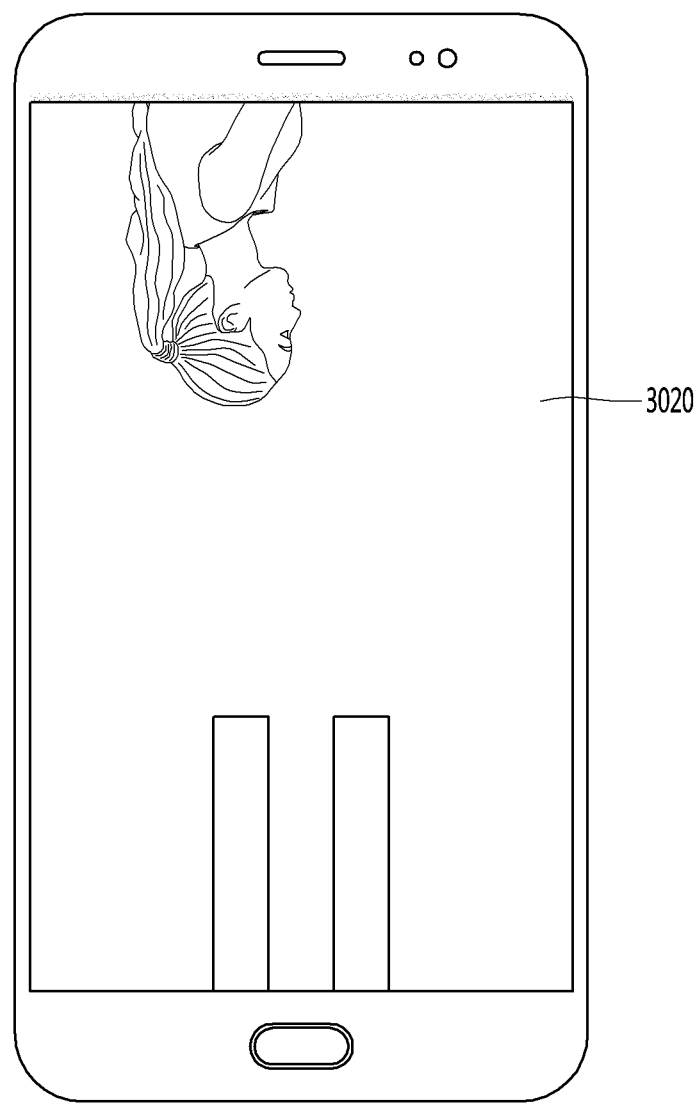

For example, as shown in FIG. 30A, the controller 180 may change the region displayed on the screen to a third region 3010 included in the second region 840 by moving the region displayed on the screen toward the upper end of the second image at the second speed. In this case, the controller 180 may display an image 3020 corresponding to the third region 3010.

On the other hand, the first speed may be faster than the second speed.

Specifically, when the first image included in the first region is displayed, the controller 180 may change the region displayed on the screen at the first speed faster than the second speed. On the other hand, when the second image included in the second region is displayed, the controller 180 may change the region displayed on the screen at the second speed slower than the first speed.

When the first speed is faster than the second speed, the length of the input for moving the same distance may be changed.

For example, when it is assumed that the first image 2820 is displayed as shown in FIG. 28B and a drag input of a first length is required for moving the displayed region by a first distance, the second image 2920 is displayed as shown in FIG. 29B and a drag input of a second length longer than the first length is required for moving the displayed region by the first distance.

When only a part of the omnidirectionally captured image is displayed, it is not easy for the user to determine which region of the image the user views. In particular, when an image is reversely displayed, the user may become more confused.

However, in accordance with the present disclosure, when the image is reversely displayed, moving toward the upper end of the image is made to be more difficult as compared to the case of normally displaying the image, whereby the user can clearly determine the region of the image the user views and the moving direction.

Also, it is more difficult for the user to look back by tilting his or her head back while viewing the sky, as compared to an action of viewing the sky in a state in which the front is ahead. Therefore, in accordance with the present disclosure, the speed of changing the displayed region is made to be slower when the image is reversely displayed, whereby the user can intuitively recognize that the current image is reversely displayed.

On the other hand, the present embodiment may be implemented in such a manner that, in a state in which the image is reversely displayed, the speed of moving toward the upper end of the image is made to be different from the speed of moving toward the lower end of the image.

Specifically, when an input for moving the displayed region toward the upper end of the second image 3020 is received in a state in which the second image 3020 is displayed, the controller 180 may move the displayed region toward the upper end of the second image 3020 at the second speed. Also, when an input for moving the displayed region toward the lower end of the second image 3020 is received in a state in which the second image 3020 is displayed, the controller 180 may move the displayed region toward the lower end of the second image 3020 at a third speed. In this case, the third speed may be faster than the second speed.

In a state in which the user look back while tilting his or her head back, it is more difficult for the user to tilt his or her head back as compared to an action of leaning forward.

Therefore, in accordance with the present disclosure, when the image is reversely displayed, the speed of moving the displayed region toward the lower end of the second image is made to be slower than the speed of moving the displayed region toward the upper end of the second image, whereby the user can intuitively recognize that the image is reversely displayed.

FIGS. 31A to 34B are views for describing a method of expressing a reversely displayed image as flowing down, in accordance with an embodiment of the present disclosure.

Figure 31A:
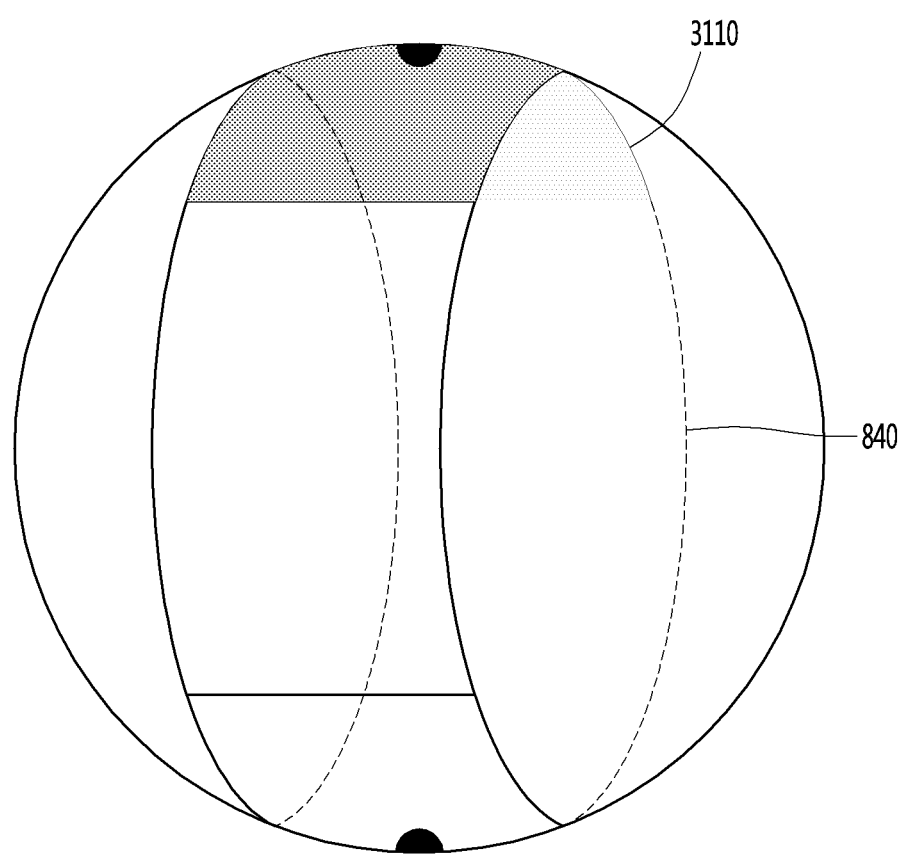
FIGS. 31A to 34B are views for describing a method of expressing a reversely displayed image as flowing down, in accordance with an embodiment of the present disclosure.
Figure 31B:
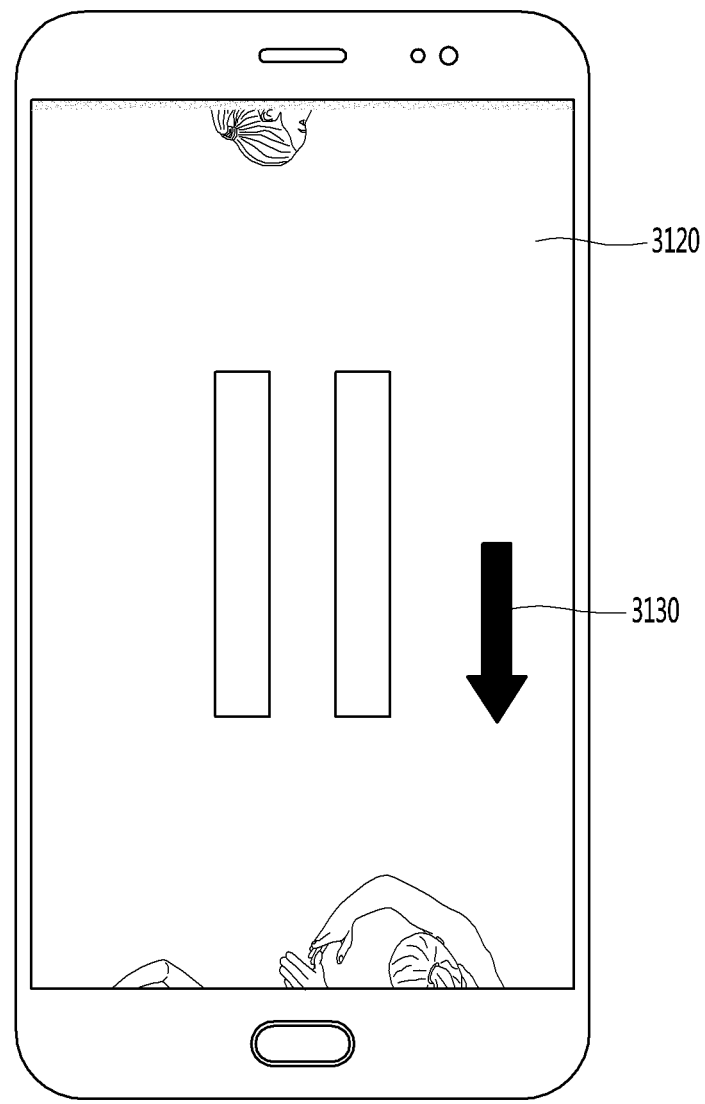

FIGS. 31A and 31B are views illustrating a situation immediately after the displayed region is changed from the first region 740 to the second region 840. In this case, the controller 180 may display a second image 3120 included in a second region 840. An image 3110 corresponding to the second image 3120 in the entire region 700 of the omnidirectionally captured image is shown in FIG. 31A.

The controller 180 may receive an input 3130 for moving a region displayed on the screen toward an upper end of the second image 3120. For example, as shown in FIG. 31B, the controller 180 may receive an input of touching the screen and dragging downward.

When an input for moving the region displayed on the screen toward the upper end of the second image 3120 is received, the controller 180 may move the region displayed on the screen toward the upper end of the second image.

While receiving the input for moving the region displayed on the screen toward the upper end of the second image 3120 (while receiving the input of touching the screen and dragging downward), the controller 180 may move the region displayed on the screen toward the upper end of the second image.

Figure 32A:
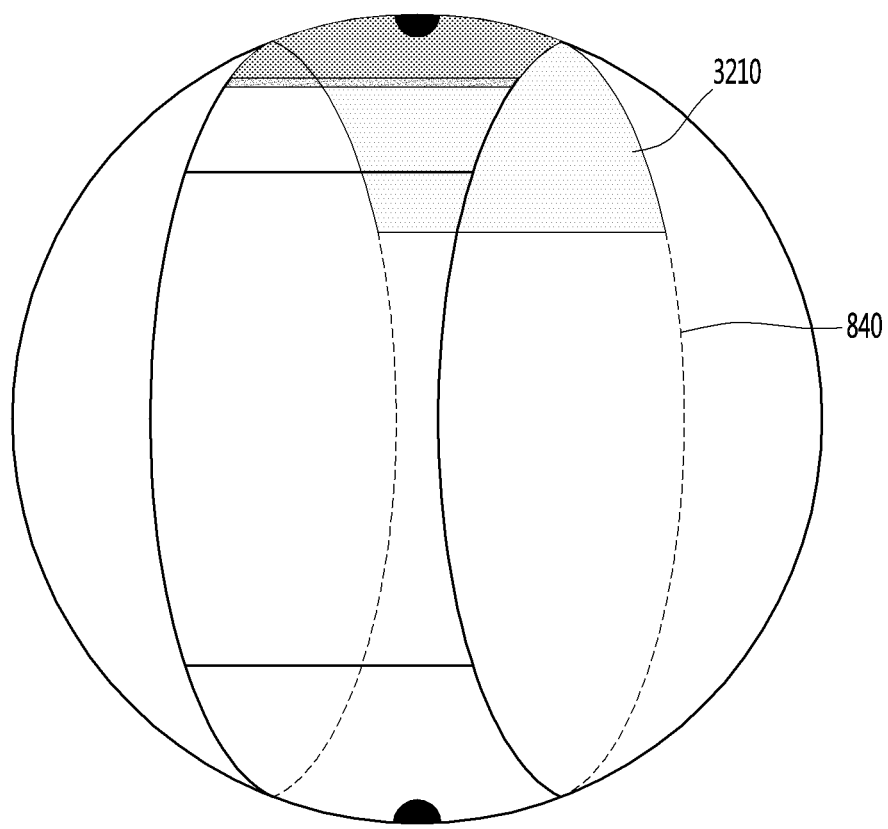
Figure 32B:
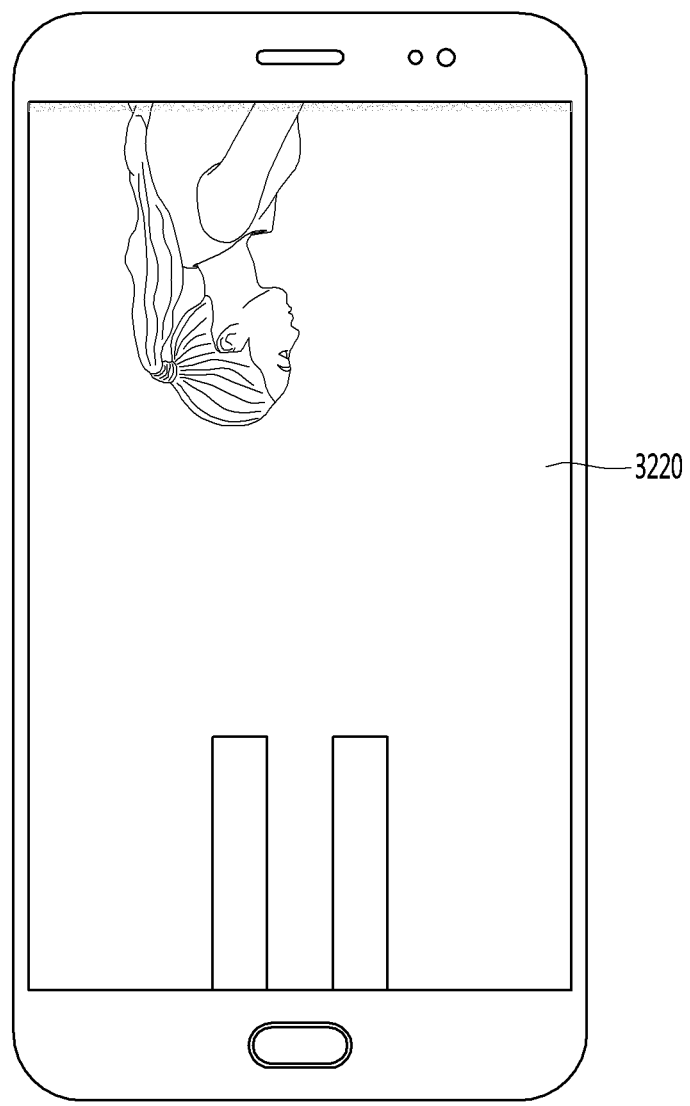

Also, when the reception of the input for moving the region displayed on the screen toward the upper end of the second image 3120 is ended, the controller 180 may display a third image 3220, to which the display region is moved toward the upper end of the second image 3120, as shown in FIG. 32B. A region 3210 corresponding to the third image 3220 is shown in FIG. 32A.

When the reception of the input for moving the region displayed on the screen toward the upper end of the second image 3120 is ended, the controller 180 may move the region displayed on the screen toward the lower end of the third image 3220. Specifically, when the reception of the input for moving the region displayed on the screen toward the upper end of the second image 3120 is ended, the controller 180 may move the region displayed on the screen toward the lower end of the third image 3220 even when the input is not received from the user.

Figure 33A:
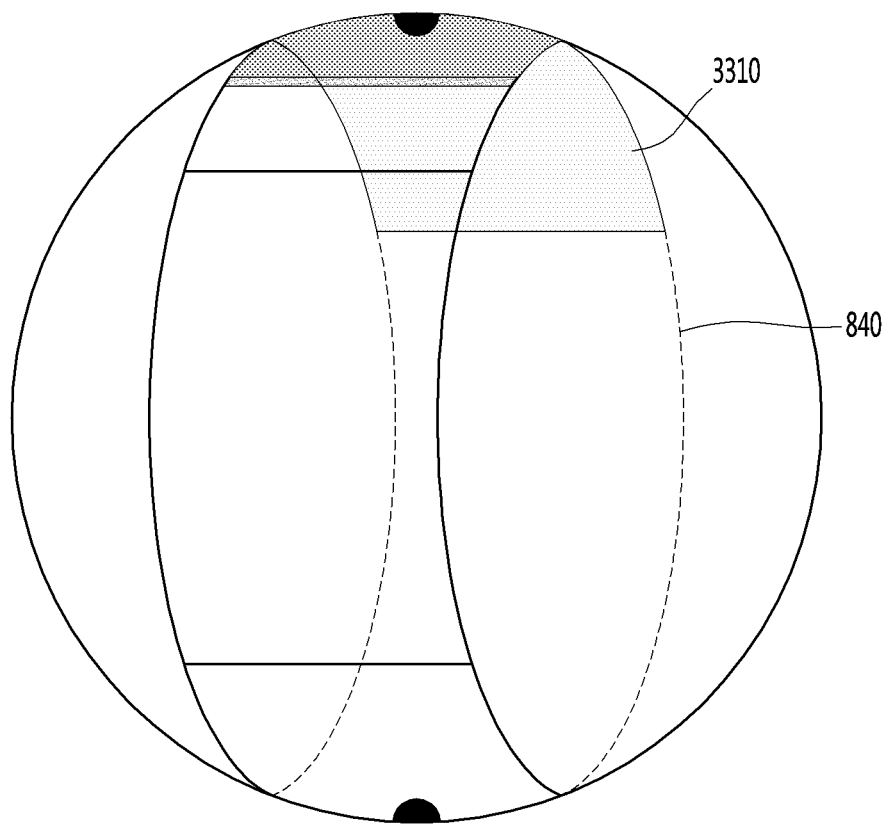
Figure 33B:
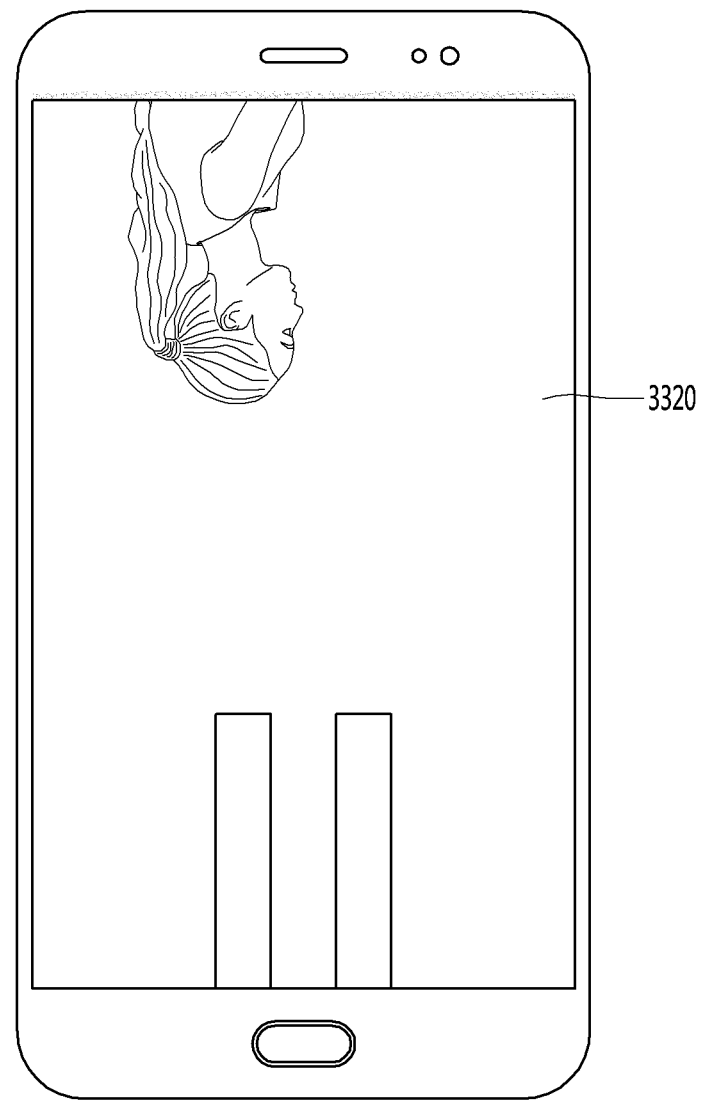

For example, when the reception of the input for moving the region displayed on the screen toward the upper end of the second image 3120 is ended, the controller 180 may display a fourth image 3320, to which the display region is moved toward the lower end of the third image 3220, as shown in FIG. 33B. A region 3310 corresponding to the fourth image 3320 is shown in FIG. 33A.

Figure 34A:
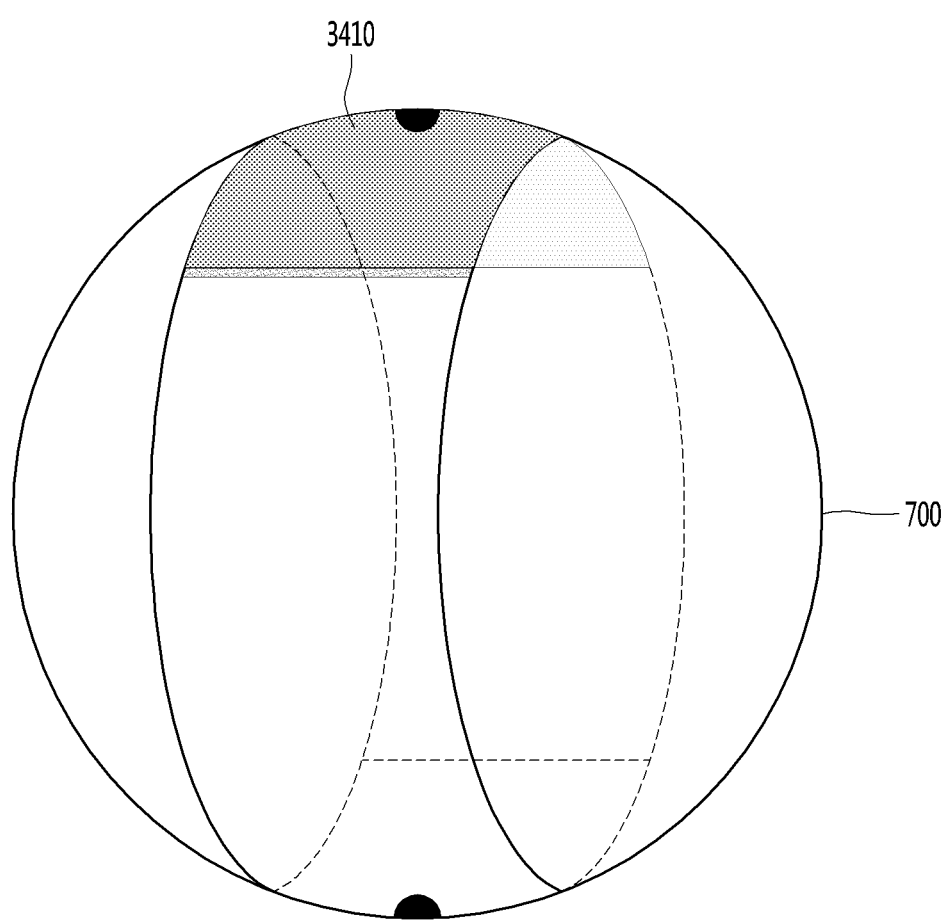
Figure 34B:
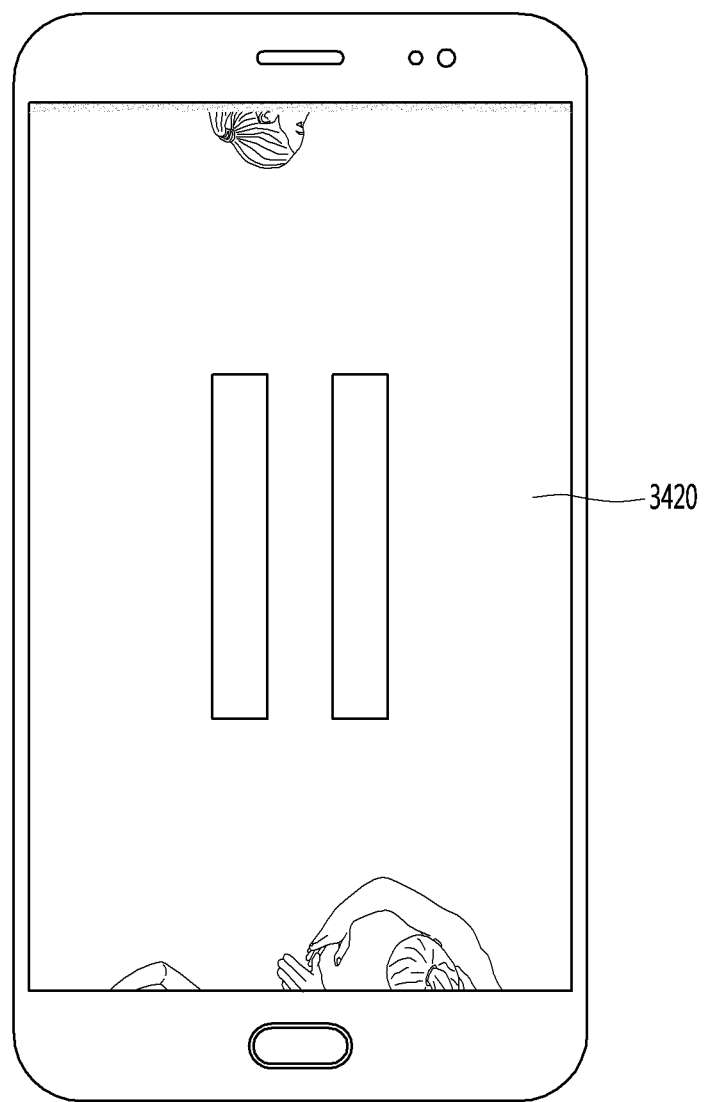

On the other hand, when the displayed region is moved toward the lower end of the third image 3220 and reaches a ceiling region 3410 as shown in FIG. 34a, the controller 180 may display an image 3420 corresponding to the ceiling region 3410.

Also, when the ceiling region 3410 is displayed, the controller 180 may stop moving the region displayed on the screen toward the lower end of the third image 3220.

An action of looking back while tilting his or her head back may be difficult for the user. Thus, it is general that the user cannot maintain the action of tilting his or her head back for a long time.

Therefore, in accordance with the present disclosure, when the image is reversely displayed, the displayed region is gradually changed, whereby the user can intuitively recognize that the current image is reversely displayed.

FIGS. 35A to 37B are views for describing a method of displaying a second image normally.

The second image may be an image whose upper and lower sides are reversed from the first image. Specifically, the second image may be an image whose upper and lower sides are not maintained from the first image.

In terms of the user, when the first image is normal, the second image may be displayed normally when the displayed region is changed from the first region to the second region by passing through the uppermost portion or the lowermost portion of the omnidirectionally captured image. That is, when the first image is a normal image, the second image may be an image that is displayed normally. On the contrary, when the first image is a reverse image, the second image may also be an image that is displayed reversely.

This will be described in detail with reference to FIGS. 35A to 37B.

Figure 35A:
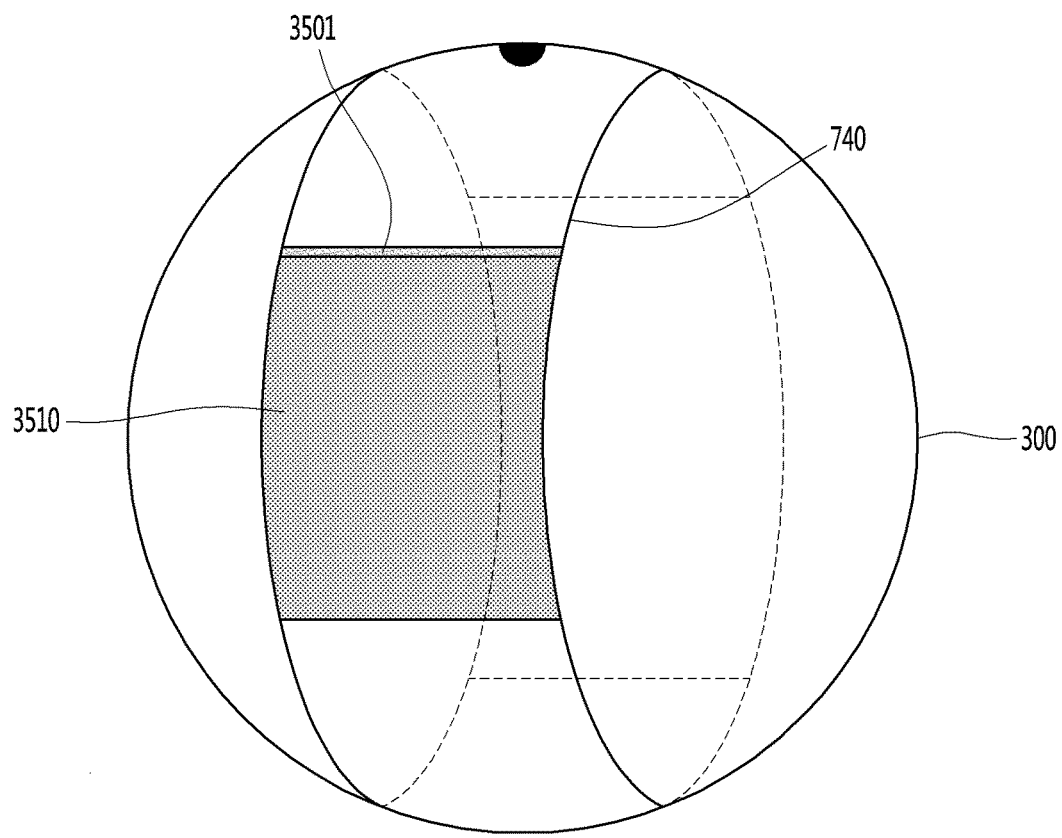
FIGS. 35A to 37B are views for describing a method of displaying a second image normally.
Figure 35B:
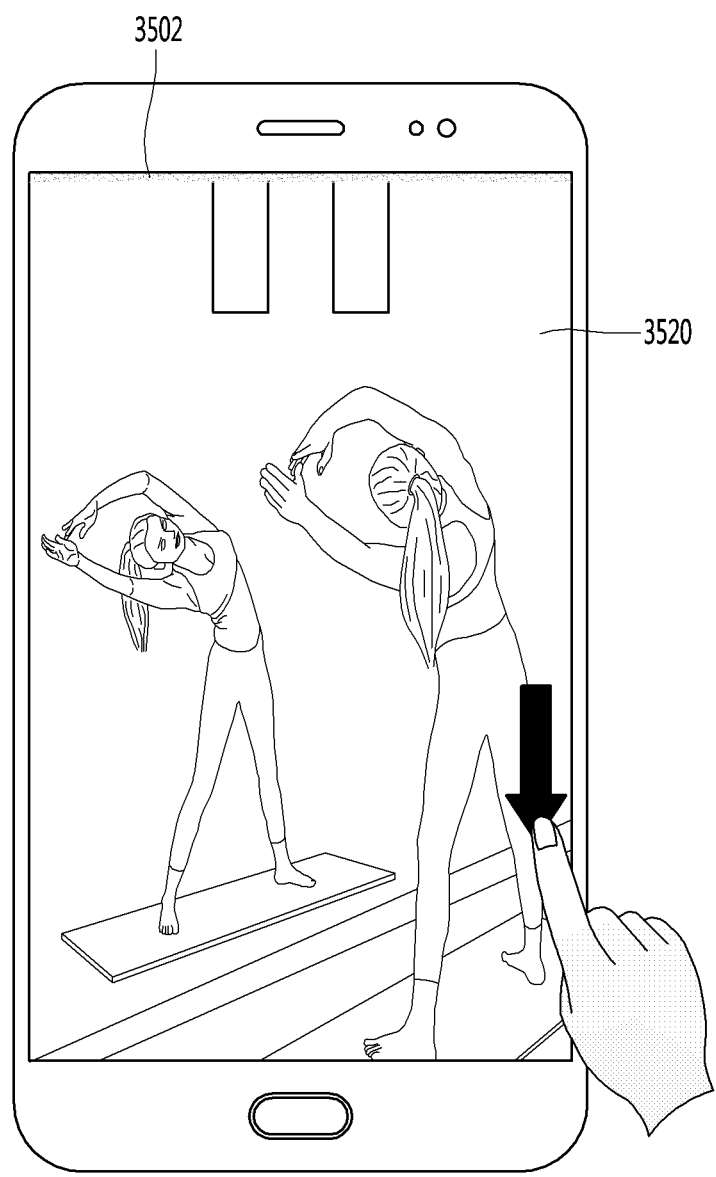

FIGS. 35A and 35B are views for describing a method of displaying a second image whose upper and lower sides are reversed from the first image.

As shown in FIGS. 35A and 35B, the controller 180 may display a first image 3520 included in a first region 740. A region 3510 corresponding to the first image 3520 in an entire region 700 of an omnidirectionally captured image is shown in FIG. 35A.

The first image 3520 is displayed so that a direction of a bar 3501 of the region 3510 corresponding to the first image 3520 is directed toward an upper portion 3502 of a screen. The first image 3520 may be displayed as a normal image, that is, an image whose upper and lower sides are not reversed in terms of the user.

Figure 36A:
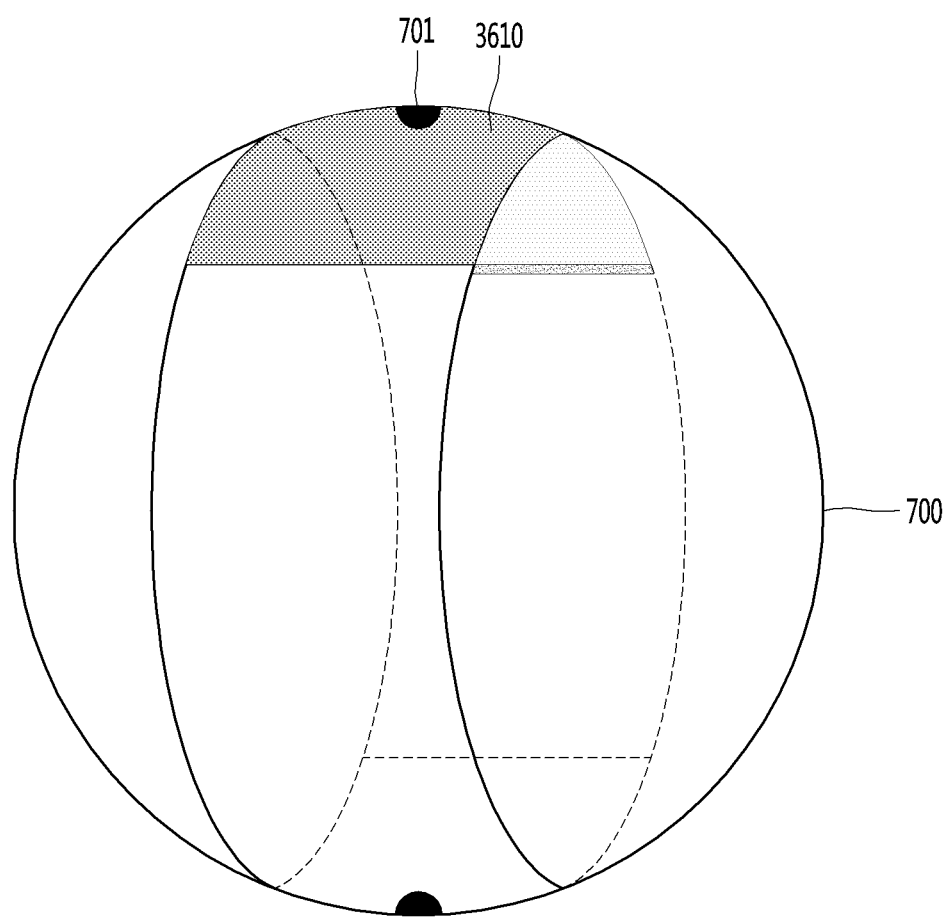
Figure 36B:
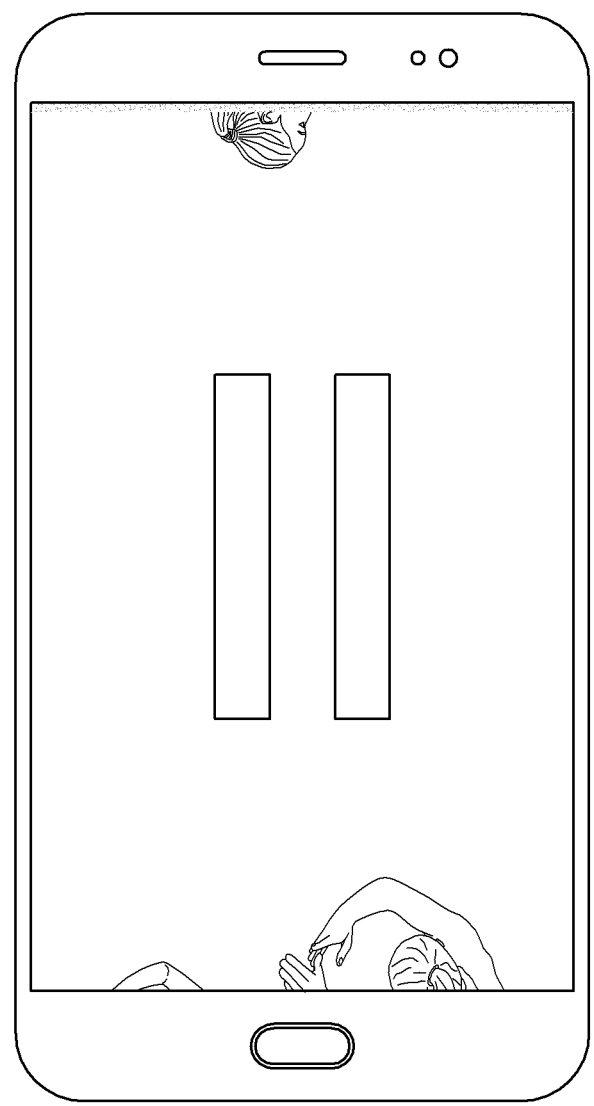

On the other hand, the controller 180 may receive a first input. Also, when the first input is received, a region 3610 displayed on the screen may pass through the uppermost portion 701 of the omnidirectionally captured image as shown in FIG. 36A. In this case, the image displayed on the screen may include the uppermost portion 701 of the omnidirectionally captured image.

Figure 37A:
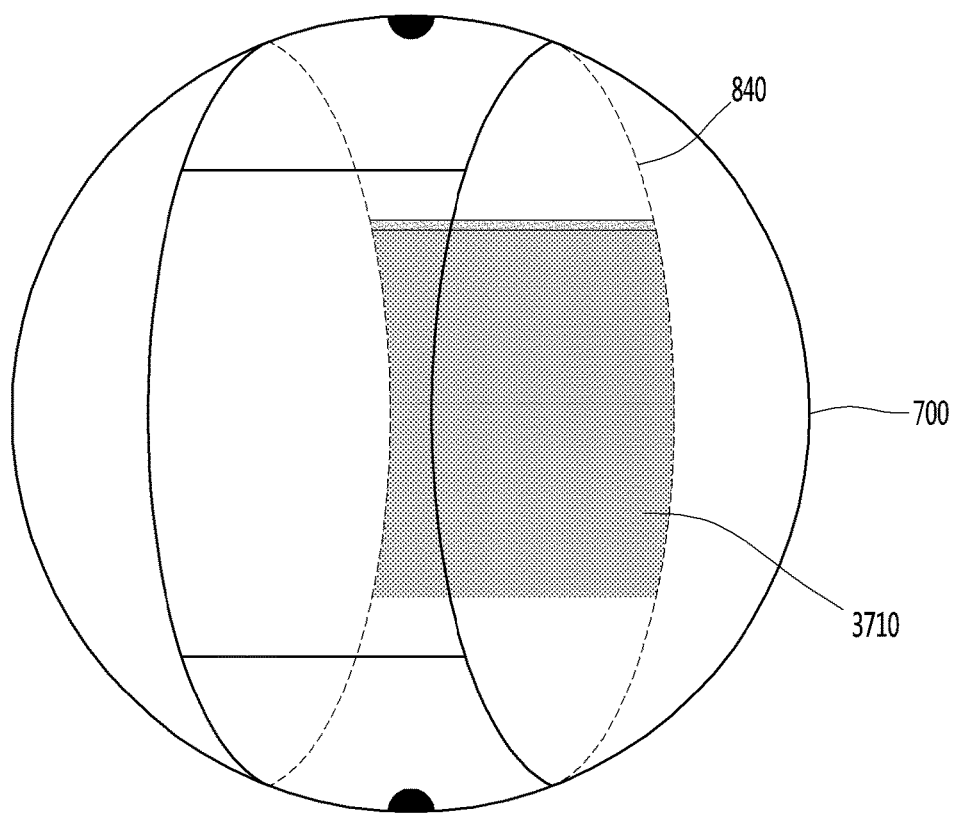
Figure 37B:
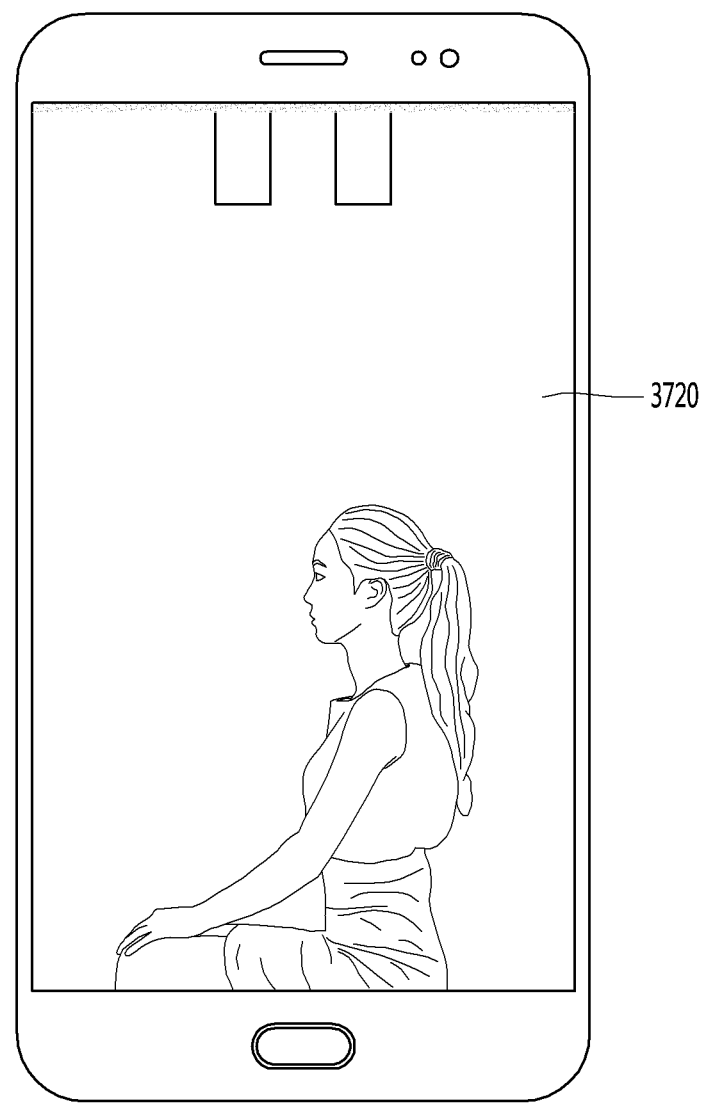

After the region displayed on the screen passes through the uppermost portion 701 of the omnidirectionally captured image, the controller 180 may display a second image 3720 included in a second region 840 as shown in FIGS. 37A and 37B. A region 3710 corresponding to the second image 3720 in the entire region 700 of the omnidirectionally captured image is shown in FIG. 37A.

The second image 3720 may be an image whose upper and lower sides are reversed from the first image 3520. Specifically, the second image 3720 may be an image which is rotated by passing through the uppermost portion 701 of the omnidirectionally captured image from the first image 3520 and whose upper and lower sides are reversed from the first image 3520.

On the other hand, since the first image 3520 is displayed normally, the second image 3720 may be displayed as a normal image, that is, an image whose upper and lower sides are not reversed in terms of the user.

As such, in accordance with the present disclosure, the displayed region is changed by passing through the uppermost portion or the lowermost portion of the omnidirectionally captured image, whereby the displayed region can be changed toward the opposite side through a simple input (for example, one drag input).

Also, the first image is included in the first region and the second image is included in the second region that is symmetrical to the first region with respect to the uppermost portion or the lowermost portion. Therefore, in accordance with the present disclosure, it is possible to provide an environment that allows the user to easily rotate the image 180 degrees.

Also, in accordance with the present disclosure, since the rotated image is normally provided, it is possible to provide a non-reversed image to the user.

FIGS. 38A to 40B are views for describing a method displaying an image around an uppermost portion of an omnidirectionally captured image when a first input is received and then displaying a second image when an additional input is received, in accordance with an embodiment of the present disclosure.

Figure 38A:
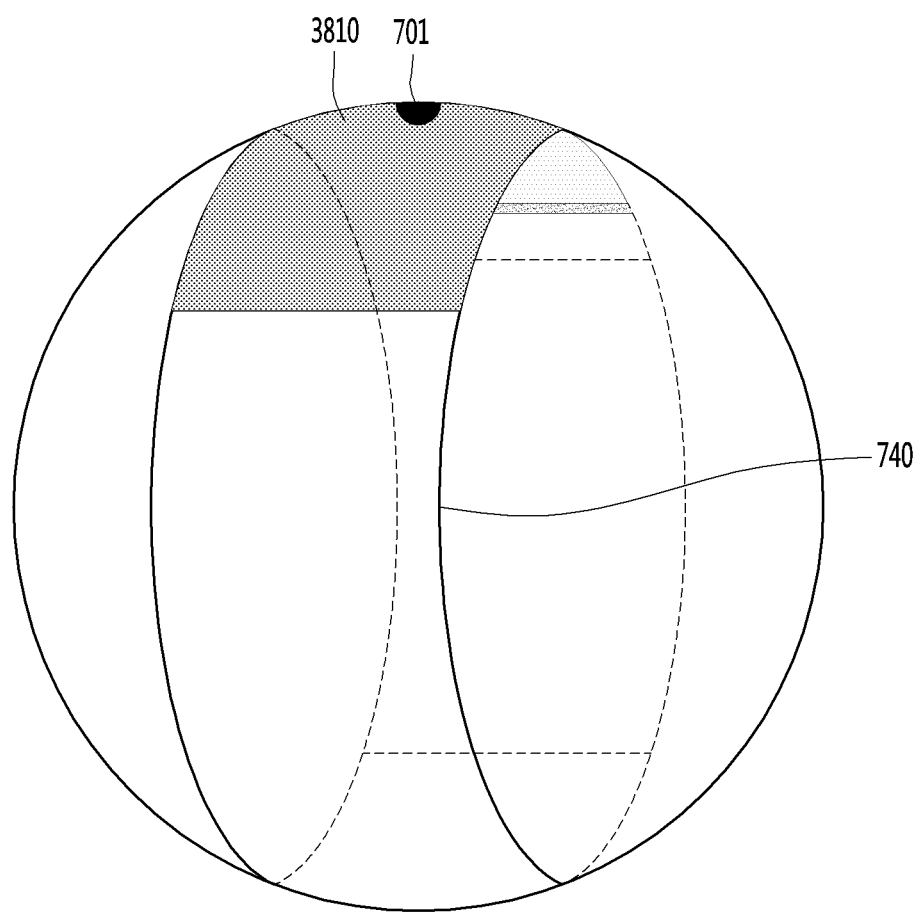
FIGS. 38A to 40B are views for describing a method displaying an image around an uppermost portion of an omnidirectionally captured image when a first input is received and then displaying a second image when an additional input is received, in accordance with an embodiment of the present disclosure.
Figure 38B:
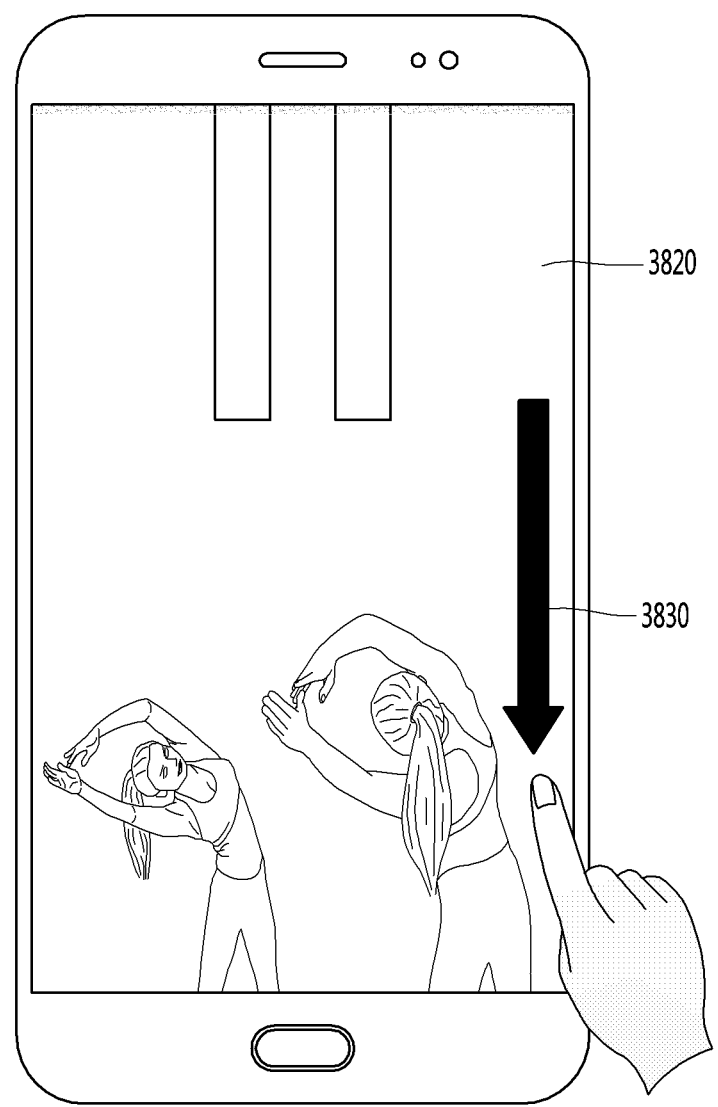

As shown in FIGS. 38A and 38B, the controller 180 may display a first image 3820 included in a first region 740. An image 3810 corresponding to the first image 3820 in an entire region 700 of an omnidirectionally captured image is shown in FIG. 38A.

On the other hand, the controller 180 may receive a first input in a state in which the first image 3820 is displayed. The first input may be an input for changing the region displayed on a screen from the first region 740 to a second region 840 by passing through an uppermost portion 701 of an omnidirectionally captured region. For example, the controller 180 can differently change a moving distance of a region displayed on the screen according to a length of a drag. The first input may be an input of a distance that allows the region displayed on the screen to be changed from the first region 740 to the second region 840 by passing through the uppermost portion 701 of the omnidirectionally captured region.

On the other hand, if the displayed region is directly changed from the first region to the second region according to the reception of the first input, the upper and lower sides of the displayed image is abruptly reversed, thus causing the user to be confused.

Figure 39A:
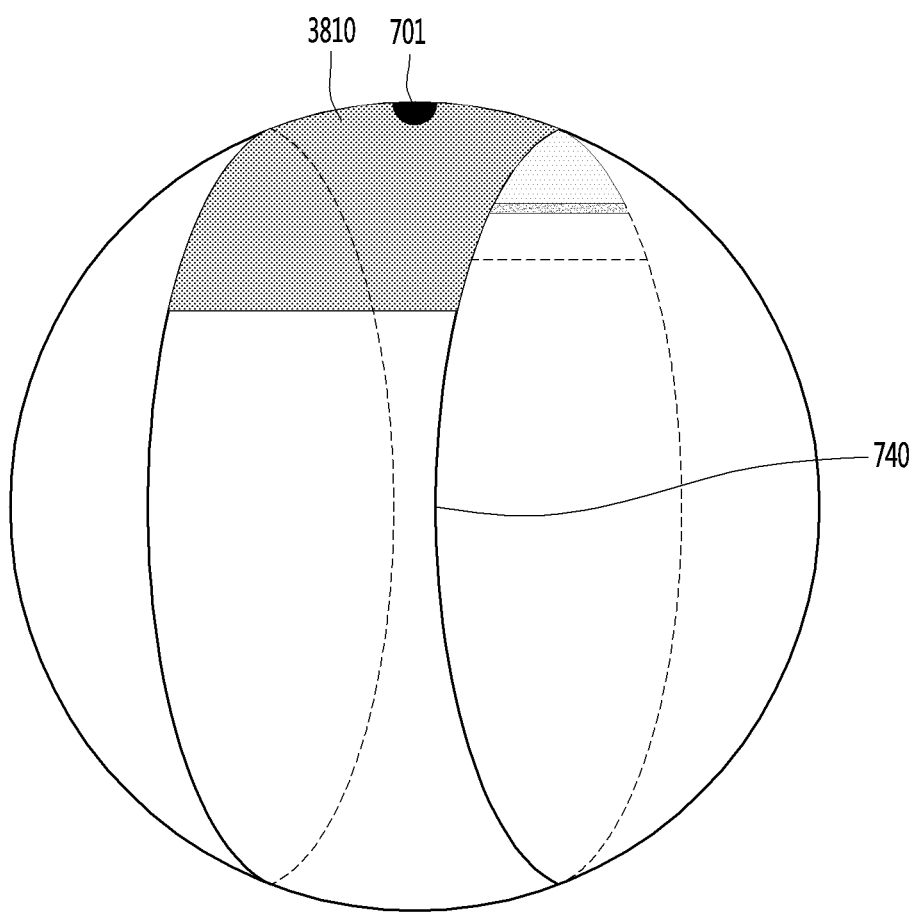
Figure 39B:
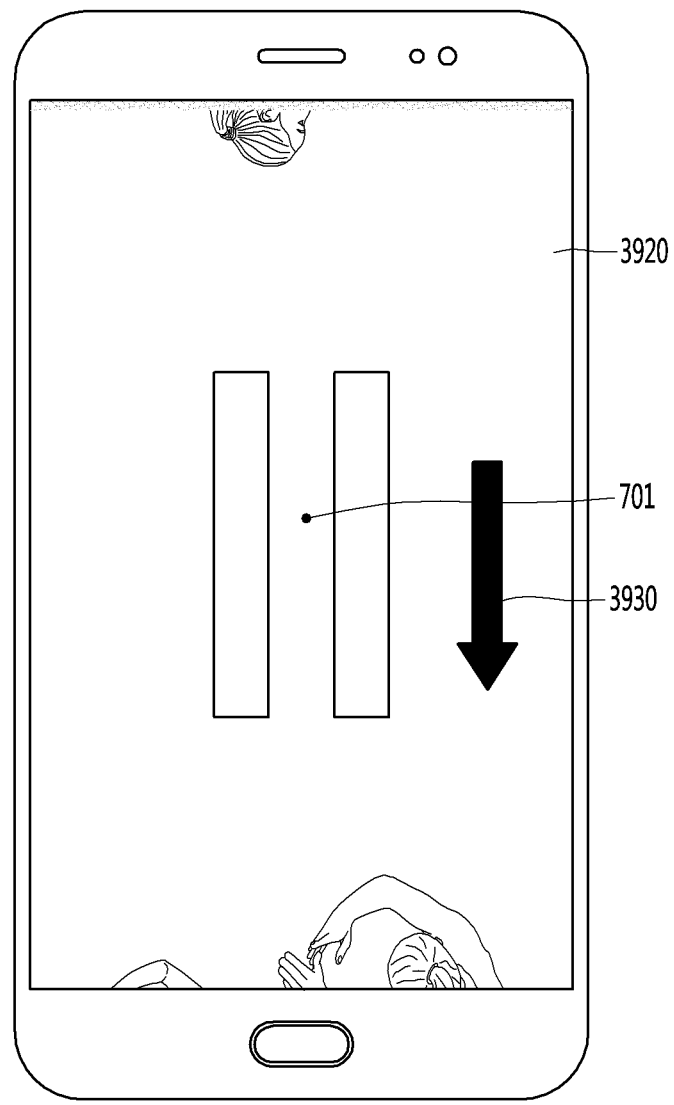

Therefore, as shown in FIG. 39B, when the first input is received, the controller 180 may display a fourth image 3920 including the uppermost portion 701 of the omnidirectionally captured image. In this case, the center of the fourth image 3920 may be the uppermost portion 701 of the omnidirectionally captured image. A region 3910 corresponding to the fourth image 3920 is shown in FIG. 39A, and the region 3910 corresponding to the fourth image 3920 in the entire region of the omnidirectionally captured image may be a ceiling region included in the first region 740.

Figure 40A:
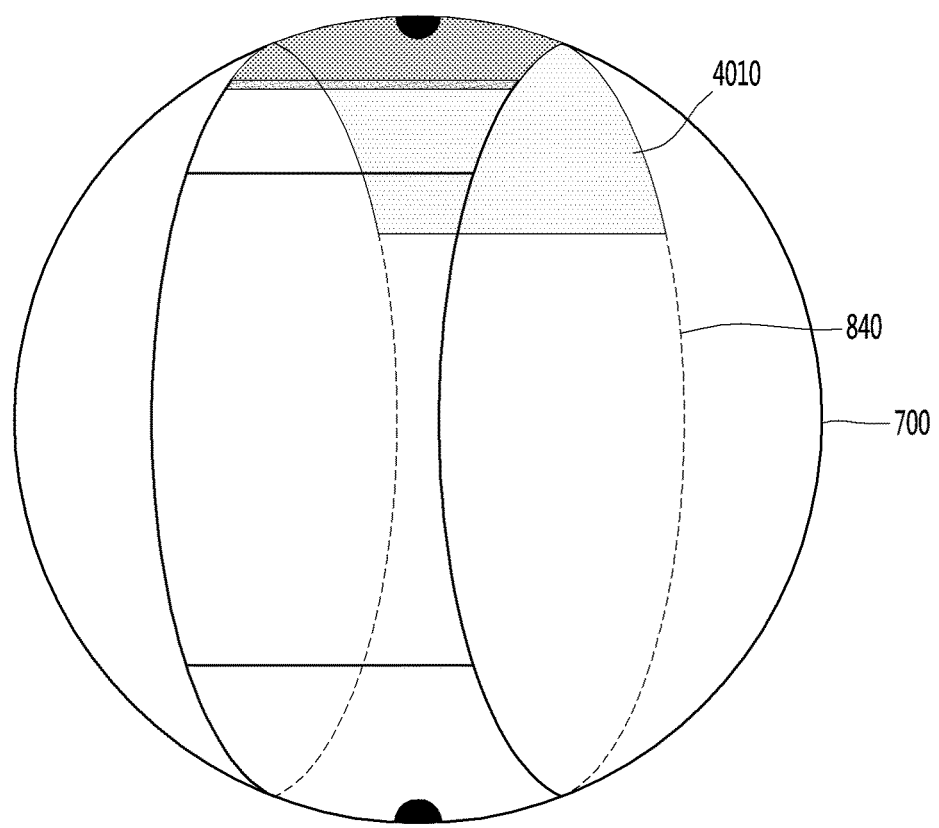
Figure 40B:
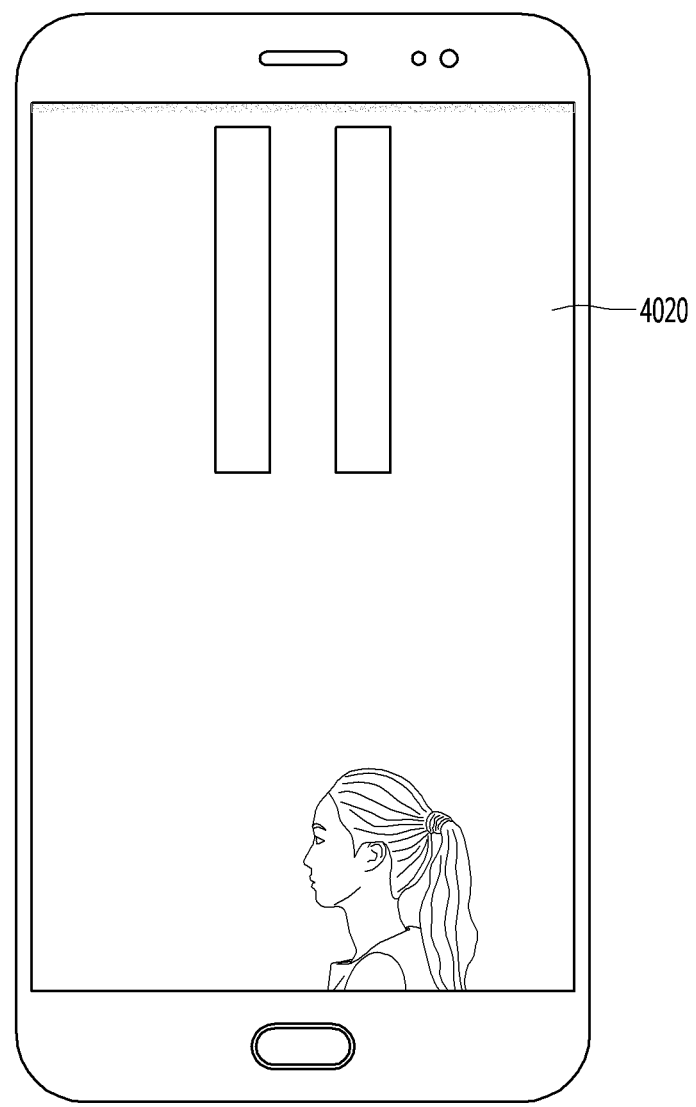

When a third input 3930 for changing the region displayed on the screen from the first region to the second region is received in a state in which the fourth image 3920 including the uppermost portion 701 of the omnidirectionally captured image is displayed, the controller 180 may display a second image 4020 included in the second region 840, as shown in FIG. 40B. The second image 4020 included in the second region 840 may be an image whose upper and lower sides are reversed from the first image. That is, when the first image is normally displayed, the second image 4020 also may be normally displayed.

A region 4010 corresponding to the second image 4020 in the entire region 700 of the omnidirectionally captured image is shown in FIG. 40A.

Figure 39C:
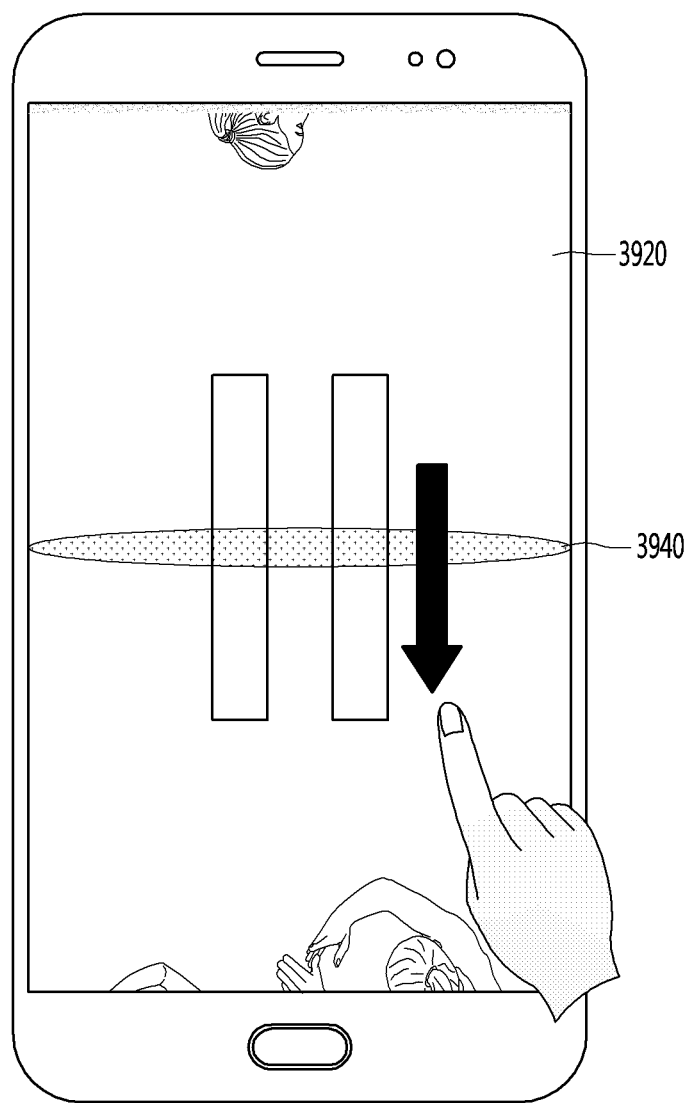

On the other hand, in a state in which the fourth image 3920 having the uppermost portion 701 of the omnidirectionally captured image as a center is displayed, the controller 180 may display a UI indicating that the image is reversed. Specifically, as shown in FIG. 39C, the controller 180 may display a UI 3940 indicating that the image is reversed, together with the fourth image 3920 including the uppermost portion 701 of the omnidirectionally captured image.

On the other hand, when a third input 3930 for changing the region displayed on the screen from the first region to the second region is received in a state in which the UI 3940 indicating that the image is reversed is displayed, the controller 180 may display the second image 4020 included in the second region 840, as shown in FIG. 40B. The second image 4020 included in the second region 840 may be an image whose upper and lower sides are reversed from the first image. That is, when the first image is normally displayed, the second image 4020 also may be normally displayed.

As such, in accordance with the present disclosure, it is possible to prevent the displayed image from being abruptly reversed, thereby preventing the user from being confused.

FIGS. 41A to 42B are views for describing a method of reversing only upper and lower sides of an image in a state in which an image including an uppermost portion is displayed, in accordance with an embodiment of the present disclosure.

Figure 41A:
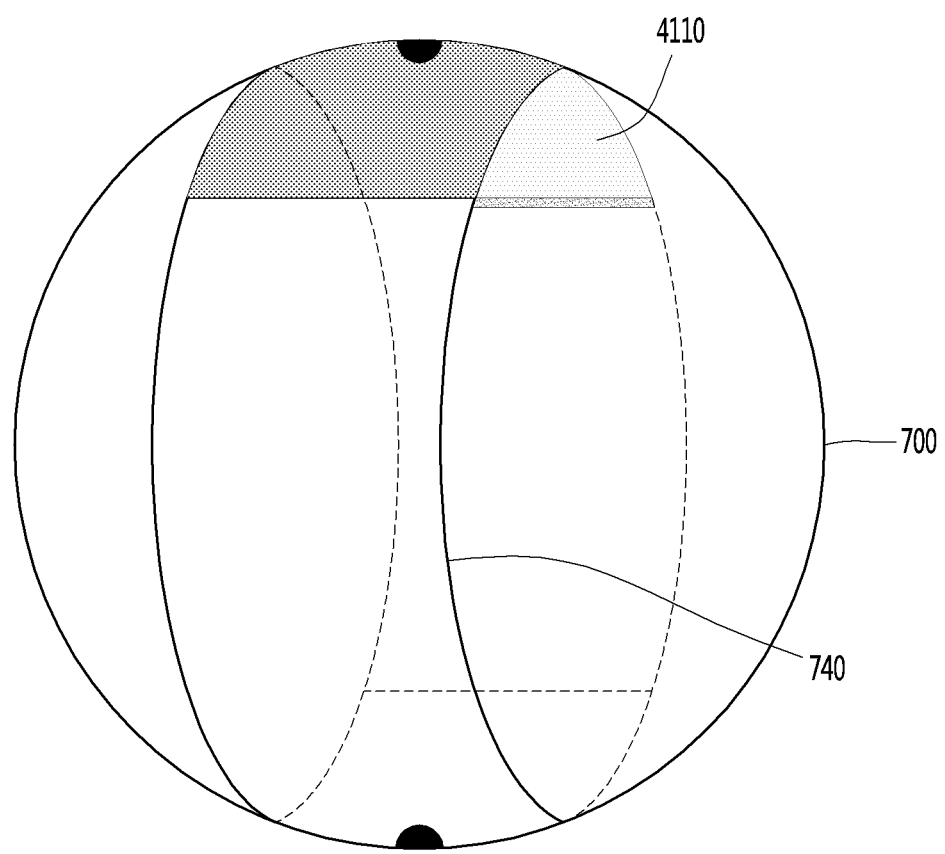
FIGS. 41A to 42B are views for describing a method of reversing only upper and lower sides of an image in a state in which an image including the uppermost portion is displayed, in accordance with an embodiment of the present disclosure.
Figure 41B:
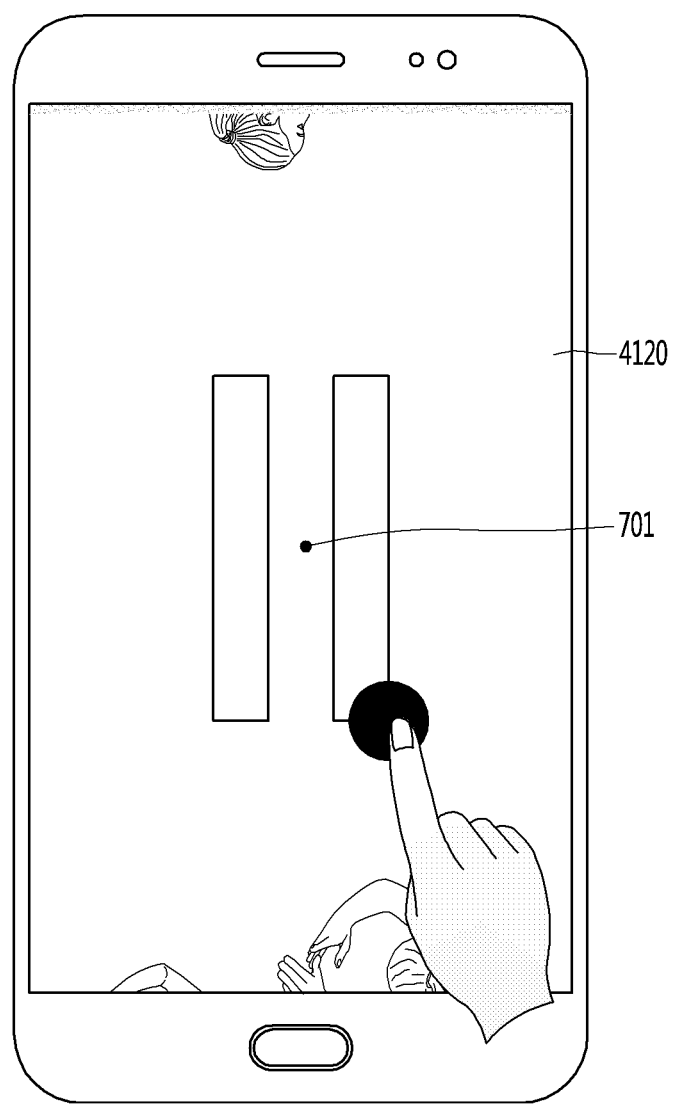

As shown in FIG. 41B, a fourth image 4120 including an uppermost portion 701 of an omnidirectionally captured image is displayed according to the reception of the first input. The fourth image 4120 including the uppermost portion 701 of the omnidirectionally captured image may be an image having the uppermost portion 701 of the omnidirectionally captured image as a center. A region 4110 corresponding to the fourth image 4120 in the entire region 700 of the omnidirectionally captured image is shown in FIG. 41A. The region 4110 corresponding to the fourth image 4120 in the entire region 700 of the omnidirectionally captured image may be a ceiling region included in the first region 740.

Figure 41C:
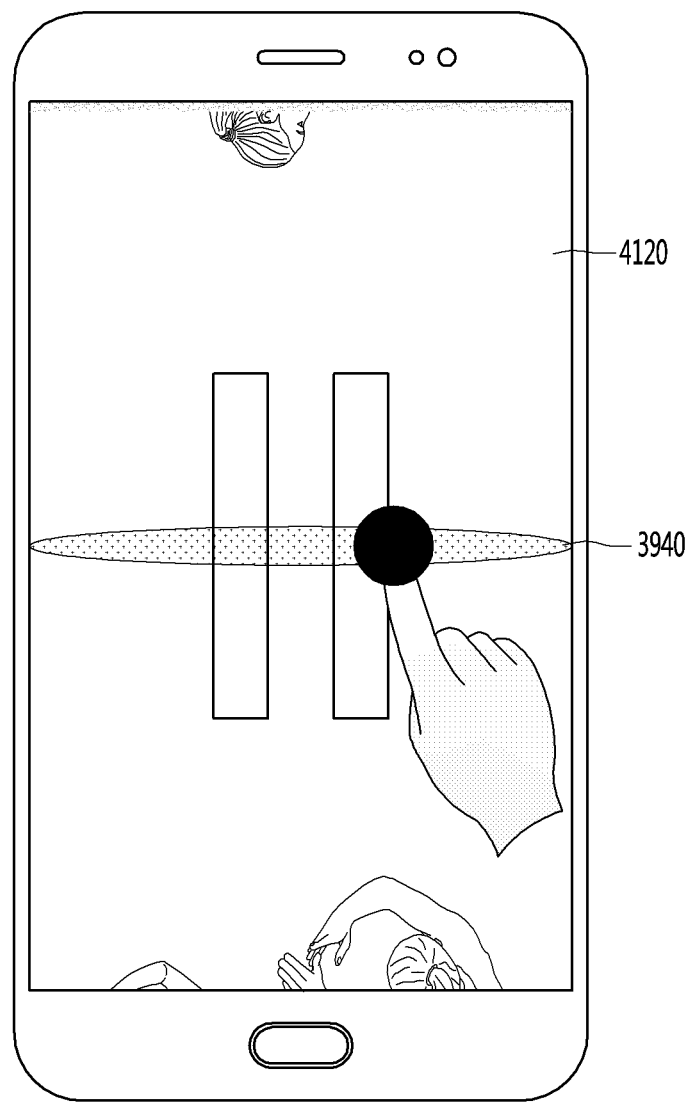

On the other hand, the controller 180 may receive a fourth input for reversing upper and lower sides of an image. Specifically, the controller 180 may receive an input of touching a certain region of the fourth image 4120, as shown in FIG. 41B, or may receive an input of touching a UI 3940 indicating that an image is reversed, as shown in FIG. 41C.

Figure 42A:
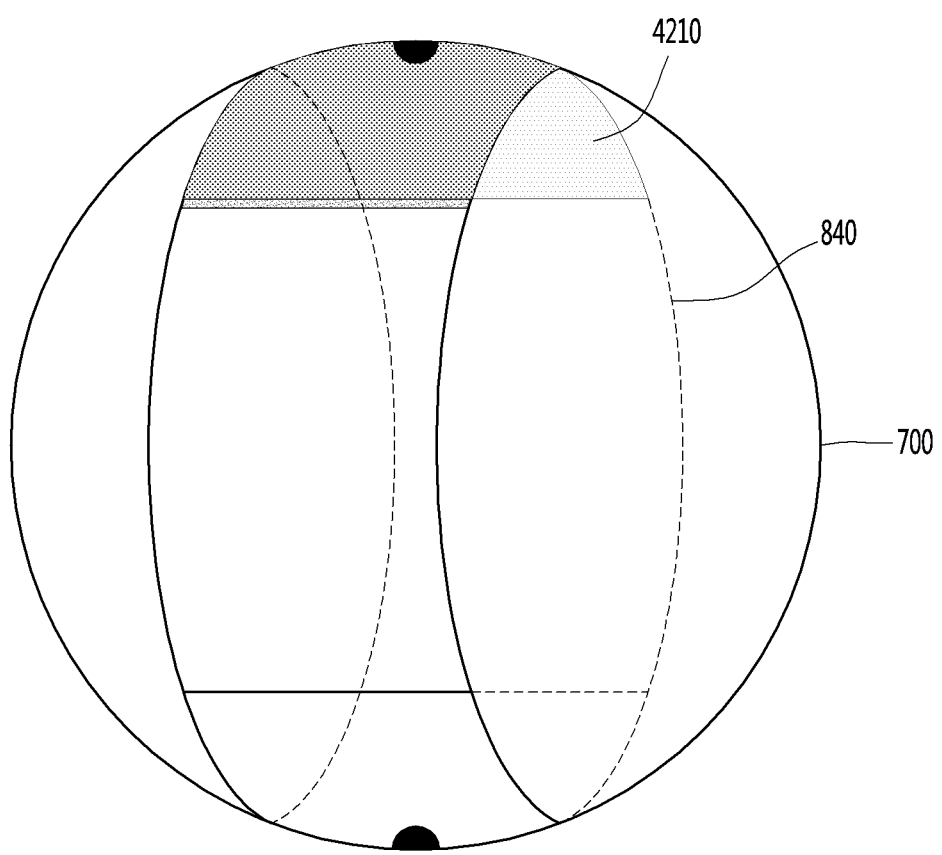
Figure 42B:
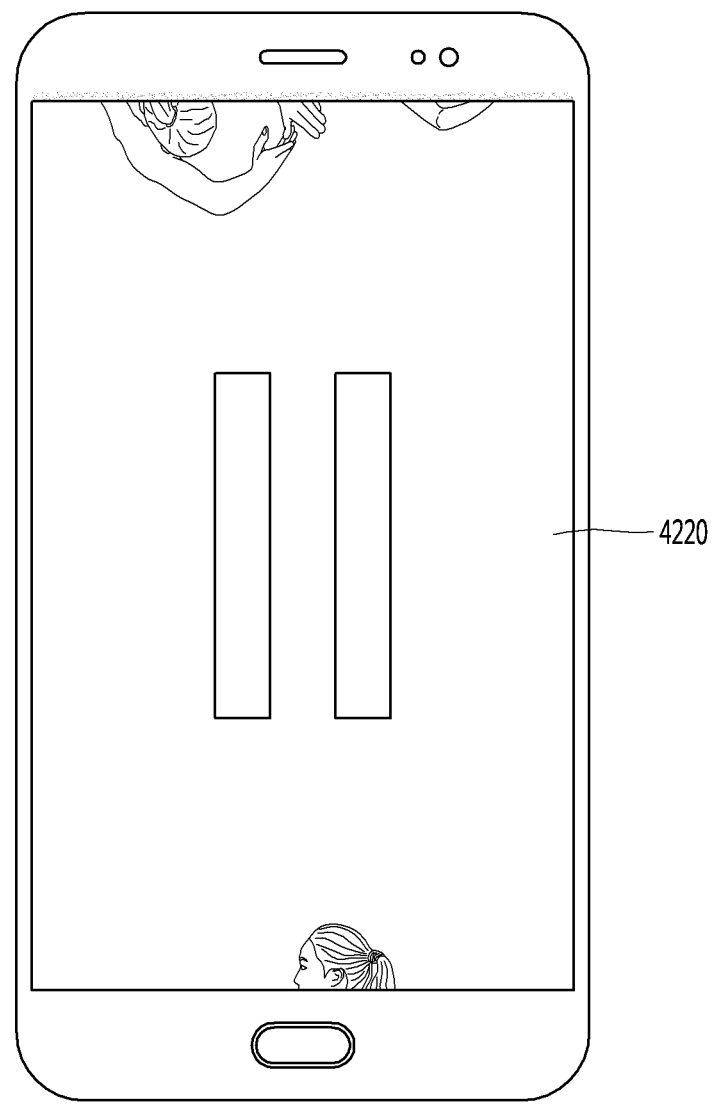

On the other hand, as shown in FIG. 42B, when the fourth input is received, the controller 180 may display a second image 4220 included in a second region 840. The second image 4220 may be an image in which the same region as the fourth image 4120 is displayed and whose upper and lower sides are reversed from the fourth image 4120. That is, the second image 4220 may be an image which includes the same region as a region included in the fourth image 4120 and whose upper and lower sides are reversed from the fourth image 4120.

On the other hand, a region 4210 corresponding to the second image 4220 in the entire region 700 of the omnidirectionally captured image is shown in FIG. 42A. That is, the region 4210 corresponding to the second image 4220 included in the second region 840 may have the same region as the region 4110 corresponding to the fourth image 4120 included in the first region 740.

In the related art, when an image having an uppermost portion of an omnidirectionally captured image as a center is displayed, an input of rotating the image is required so as to reverse the upper and lower sides of the image. In this case, a rotation manipulation needs to be performed several times, and it is difficult to exactly reverse the upper and lower sides of the image.

However, in accordance with the present disclosure, it is possible to provide an environment that can reverse the upper and lower sides of the image simply and exactly.

FIGS. 43A to 45B are views for describing a problem that may occur when upper and lower sides of a second image are reversely displayed, in accordance with an embodiment of the present disclosure.

Figure 43A:
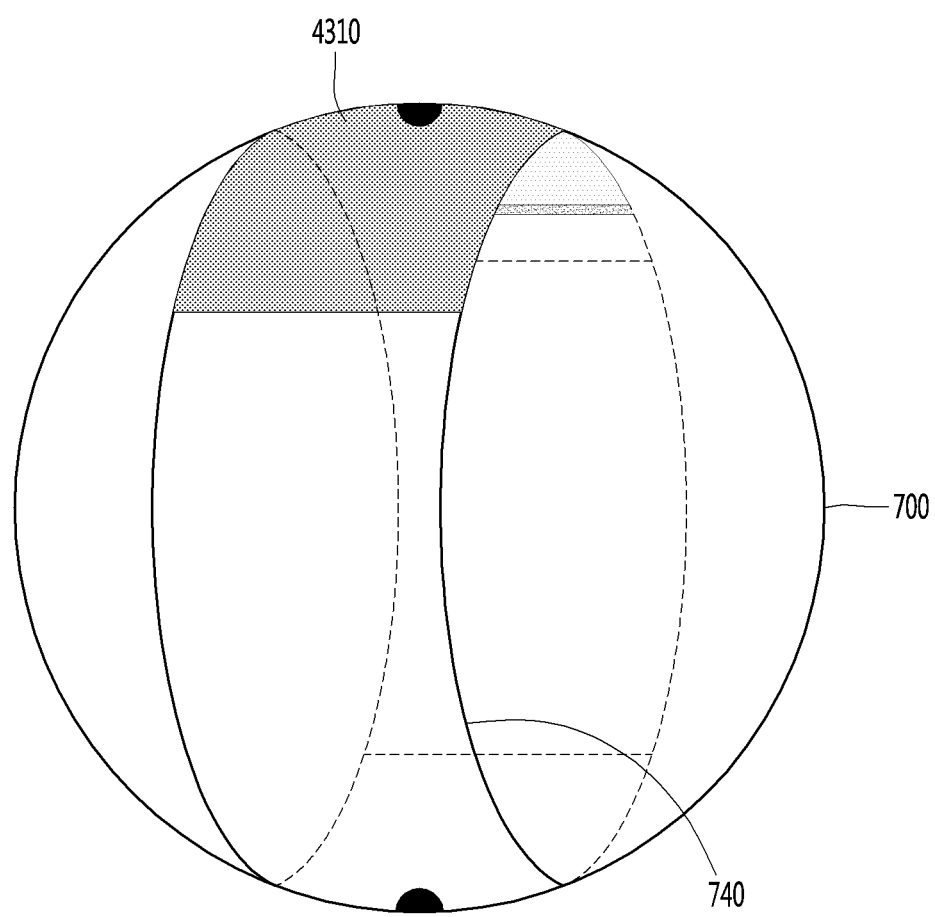
FIGS. 43A to 45B are views for describing a problem that may occur when upper and lower sides of a second image are reversely displayed, in accordance with an embodiment of the present disclosure.
Figure 43B:
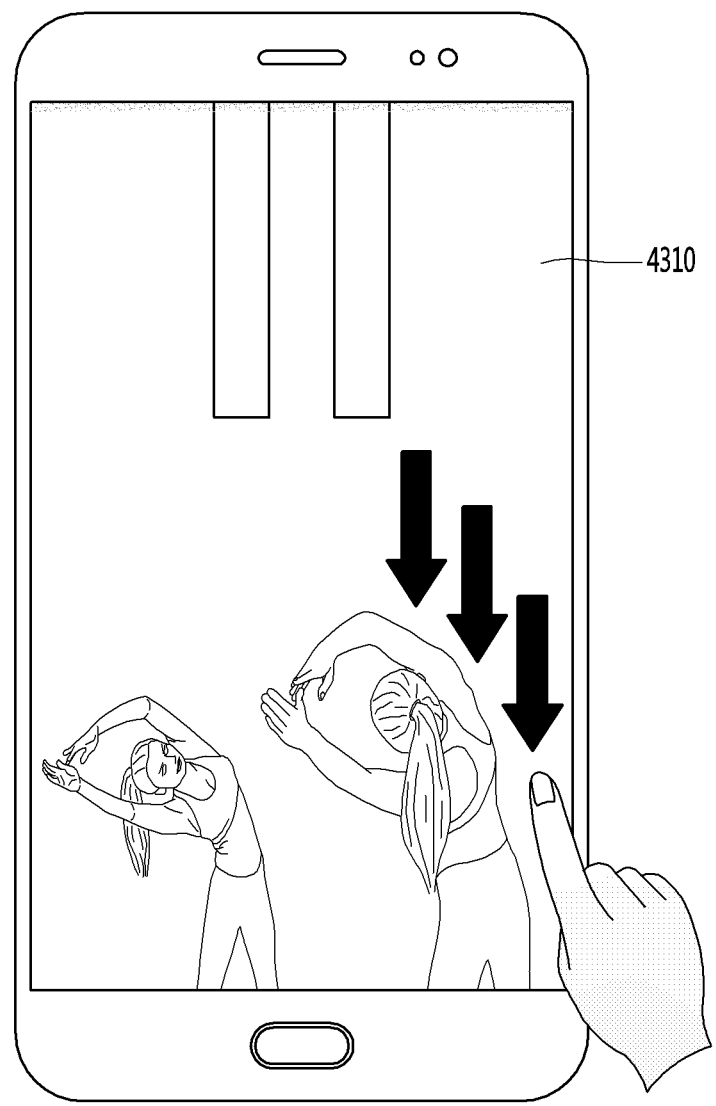

Referring to FIG. 43B, a first image 4320 included in a first region 740 in an entire region 700 of a current omnidirectionally captured image is displayed. A region 4310 corresponding to the first image 4320 in the entire region 700 of the omnidirectionally captured image is shown in FIG. 43A.

A distance that is movable by one input is limited. Thus, when the user wants to move to a region far from the currently displayed region, the user usually drags in the same direction twice or more.

Figure 44A:
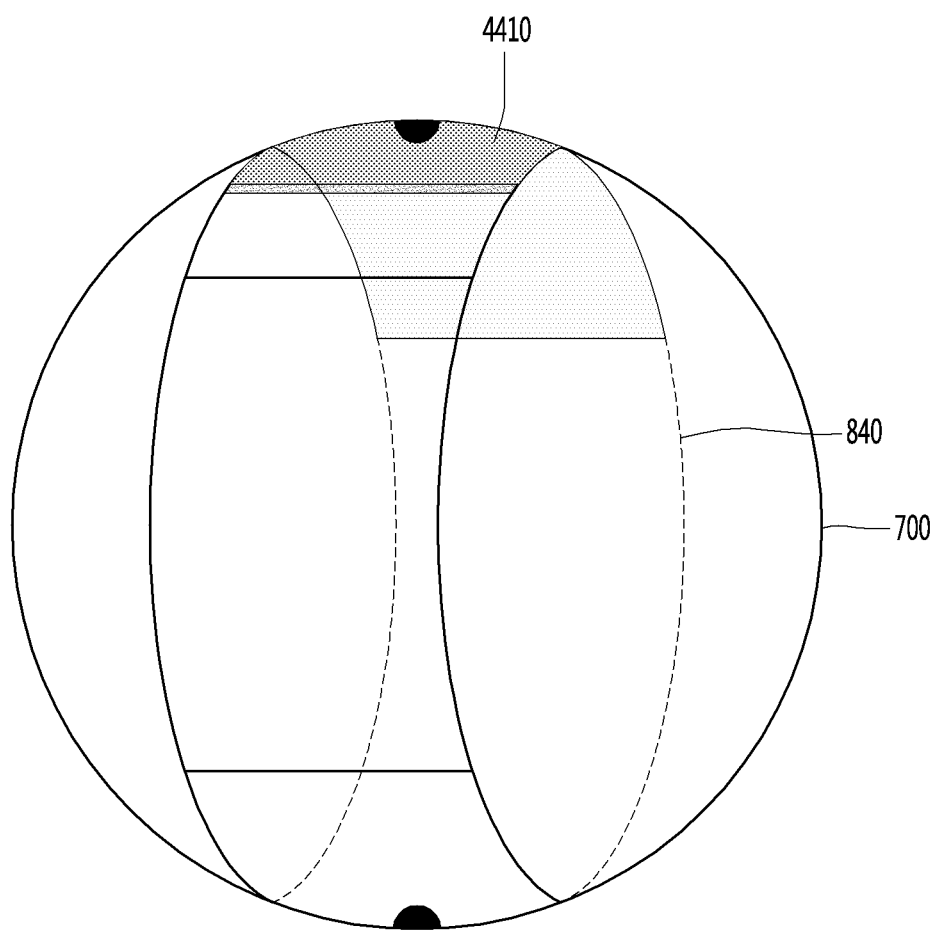
Figure 44B:
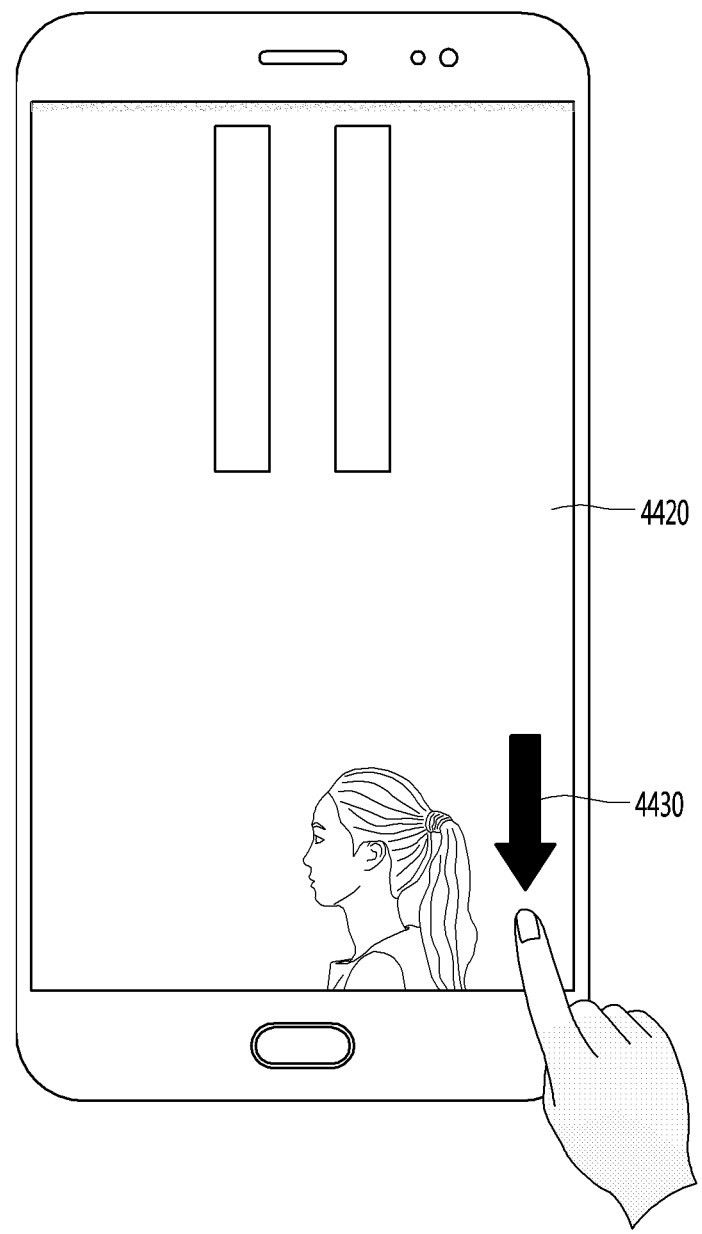

On the other hand, while a plurality of drag inputs are received, a second image 4420 included in a second region 840 may be displayed as shown in FIG. 44B. A region 4410 corresponding to the second image 4420 in the entire region 700 of the omnidirectionally captured image is shown in FIG. 44A.

The user, who drags in the same direction twice or more in a state in which the first image 4320 is displayed, may continue to drag in the same direction in a state in which the second image 4420 is displayed.

Figure 45A:
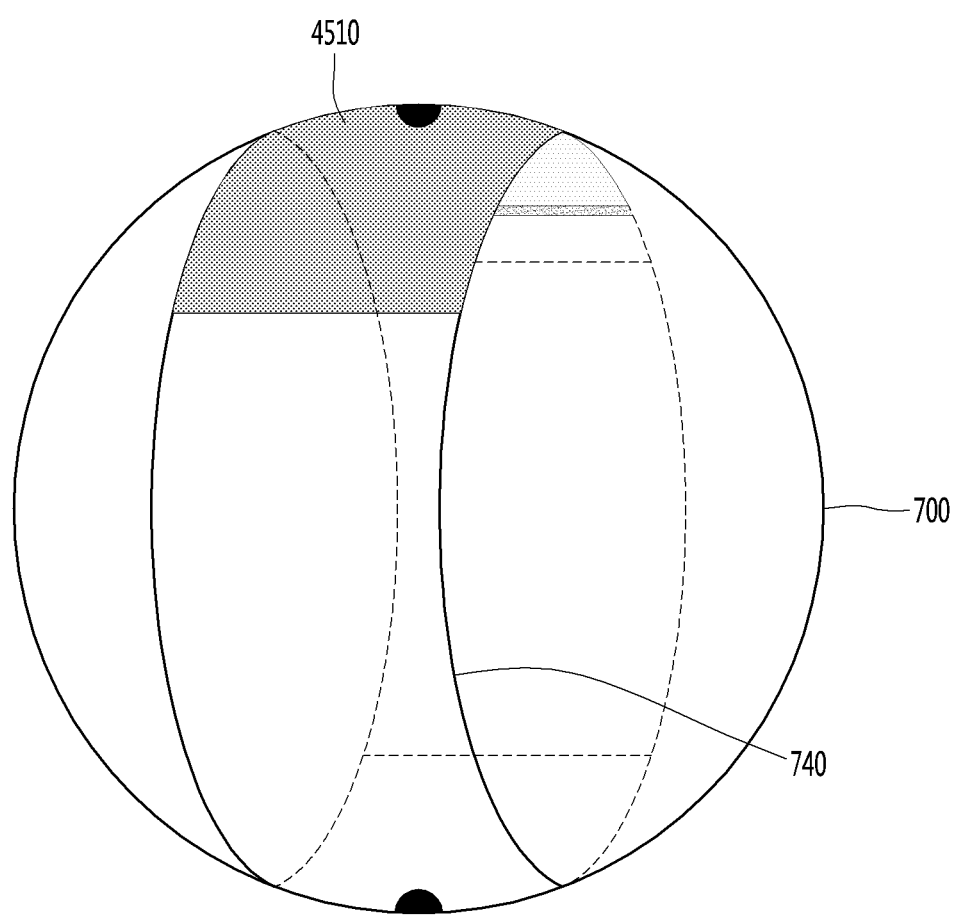
Figure 45B:
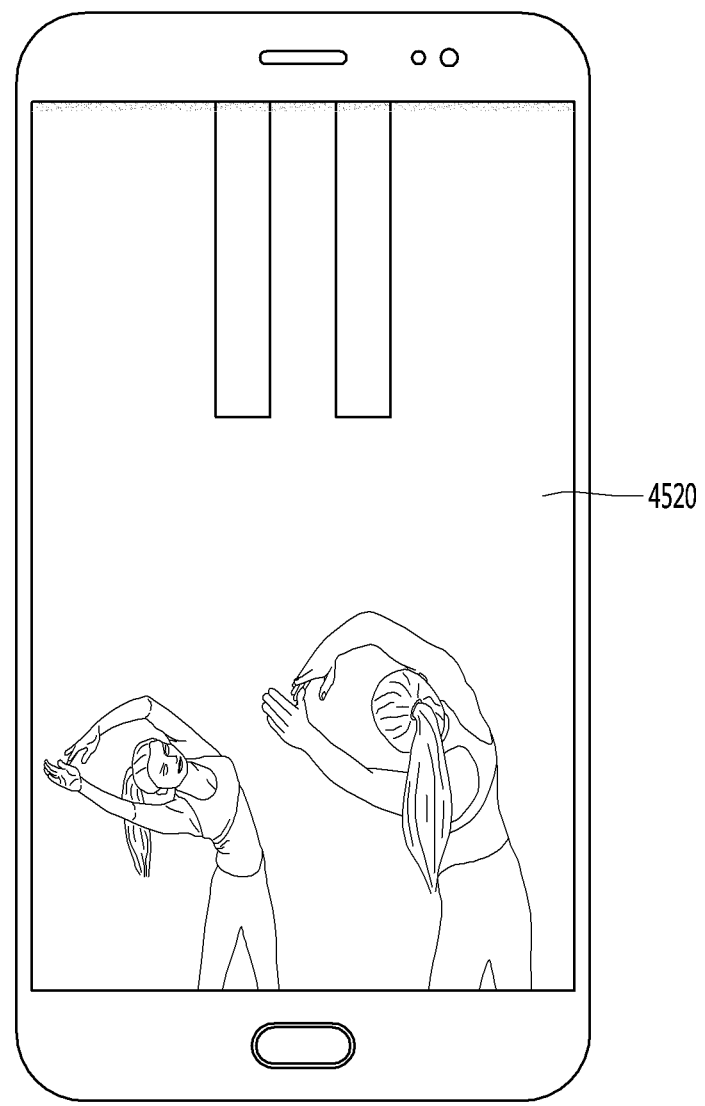

On the other hand, the second image 4420 is an image whose upper and lower sides are reversed from the first image 4320. Therefore, when the drag input of the same direction is received in a state in which the second image 4420 is displayed, the controller 180 may display a third image 4520 corresponding to the first region 740 in the entire region 700 of the omnidirectionally captured image, as shown in FIG. 45B. A region 4510 corresponding to the third image 4520 in the entire region 700 of the omnidirectionally captured image is shown in FIG. 45A.

In this case, the displayed image may be back and forth between the first region and the second region, thus bringing inconvenience to the user.

FIGS. 46A to 49 are views for describing a method of not performing a function corresponding to an input received for a preset time, in accordance with an embodiment of the present disclosure.

Figure 46A:
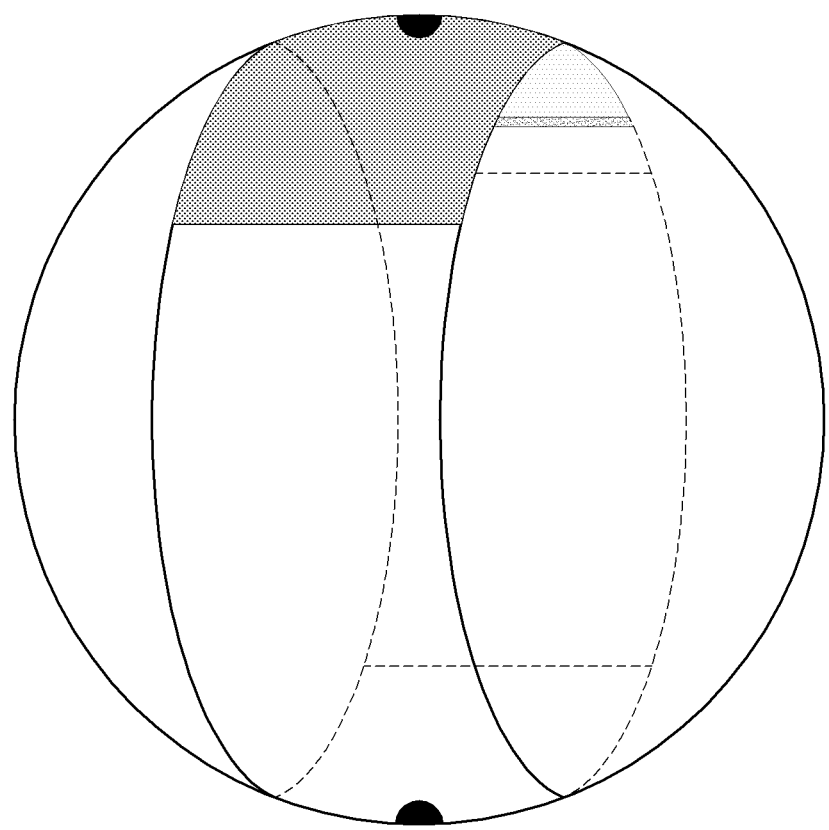
FIGS. 46A to 49 are views for describing a method of not performing a function corresponding to an input received for a preset time, in accordance with an embodiment of the present disclosure.
Figure 46B:
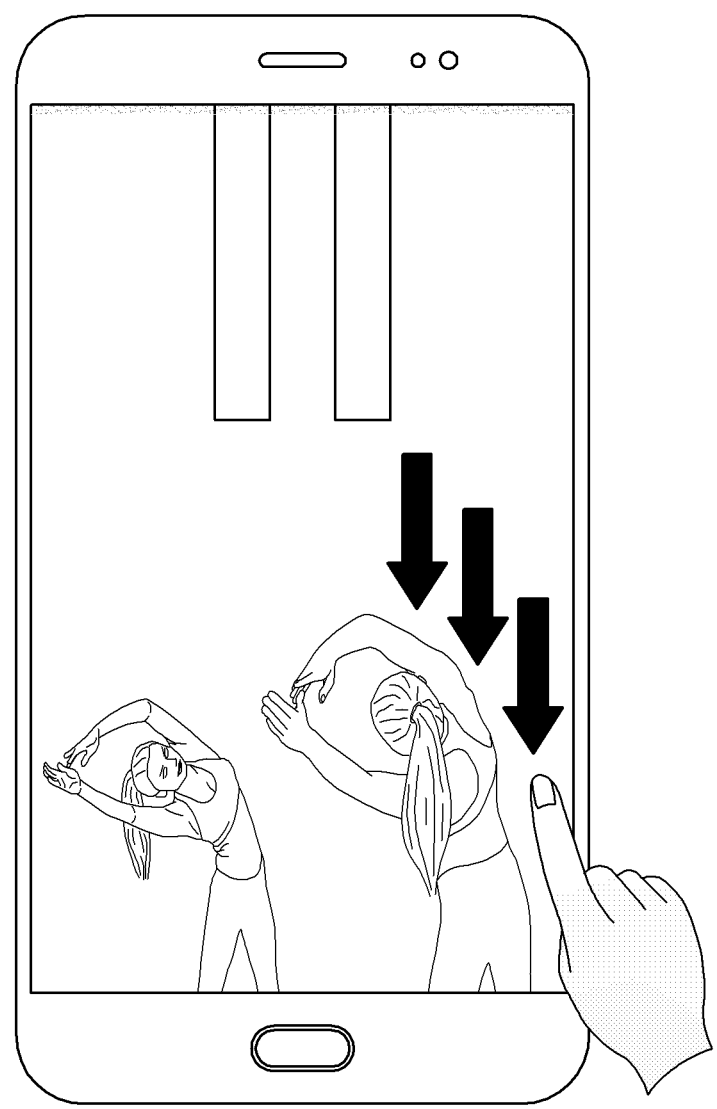

Referring to FIGS. 46A and 46B, the controller 180 may receive a first input in a state in which a first image 4620 included in the first region 740 in the entire region 700 of the current omnidirectionally captured image is displayed.

Figure 47A:
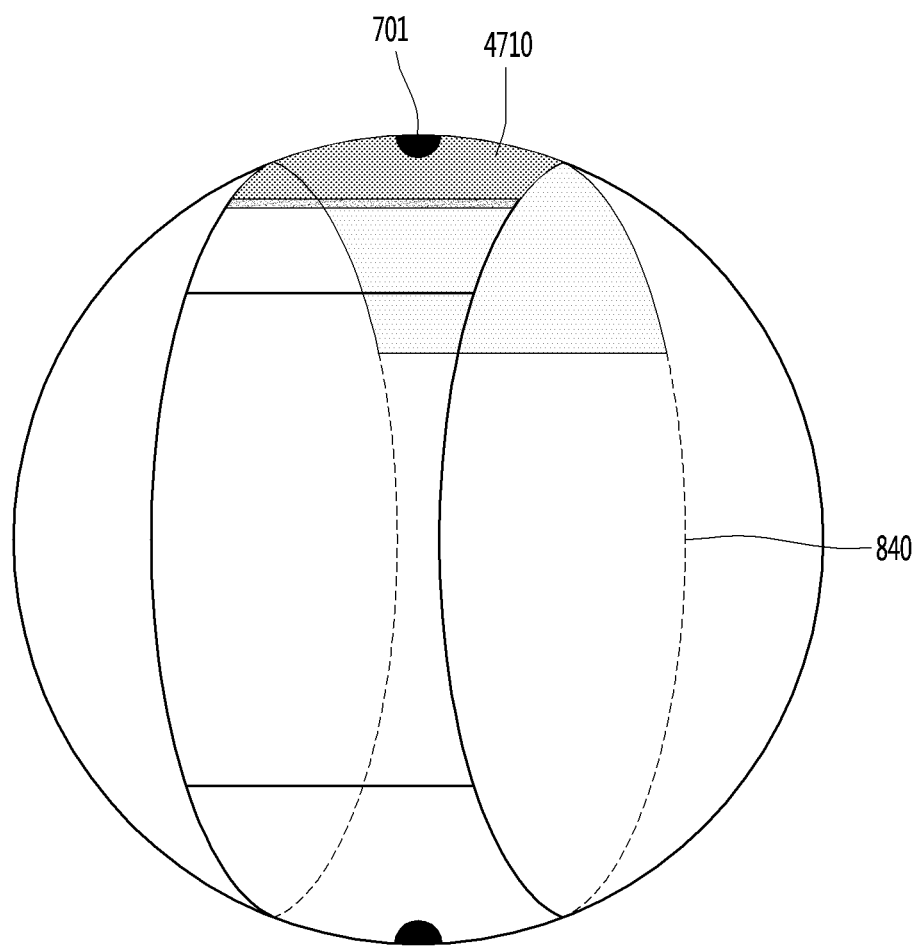
Figure 47B:
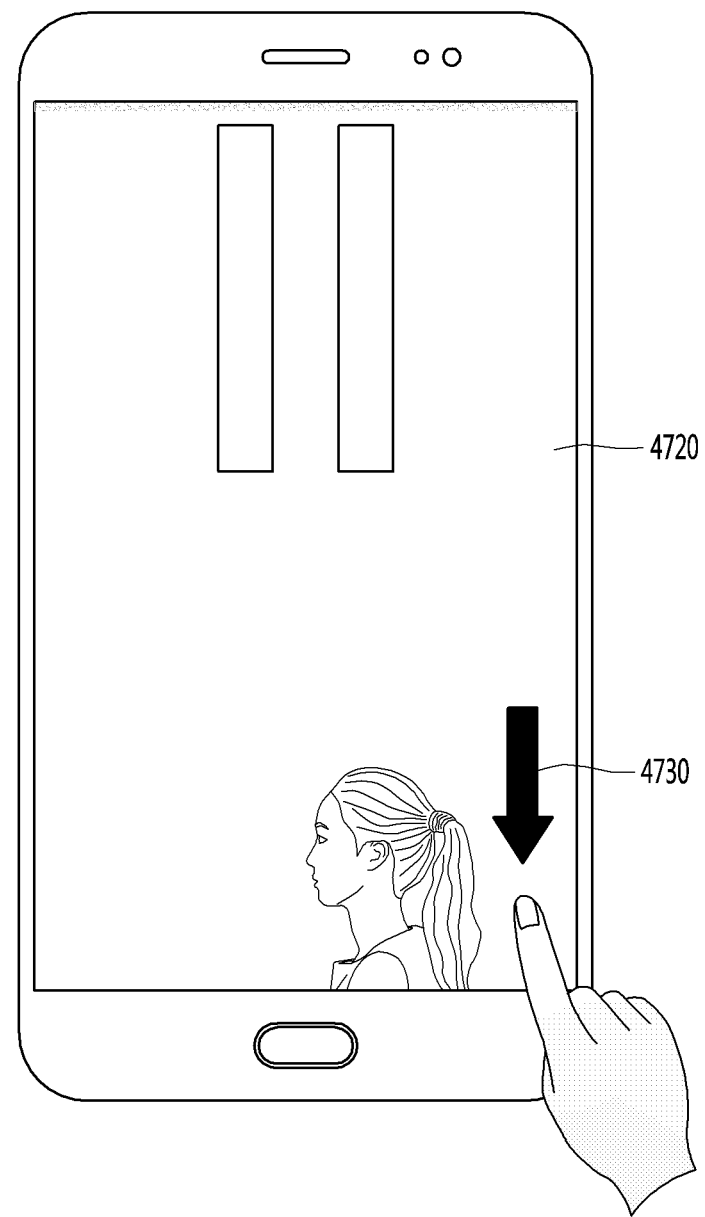

On the other hand, when the first input is received, the controller 180 may display a second image 4720 included in a second region 840, as shown in FIG. 47B. A region 4710 corresponding to the second image 4720 in the entire region 700 of the omnidirectionally captured image is shown in FIG. 47A.

On the other hand, the controller 180 may receive a second input 4730 for changing the displayed region to the first region 740 by passing through the uppermost portion 701 of the omnidirectionally captured image, within a preset time after the reception of the first input.

The second input 4730 may be an input having the same direction as the first input. For example, when the first input is an input of dragging downward, the second input 4730 also may be an input of dragging downward.

When the second input 4730 is received within the preset time after the reception of the first input, the controller 180 may not perform a function corresponding to the second input 4730.

Specifically, although the second input 4730 is an input for changing the displayed region from the second region 840 to the first region 740 by passing through the uppermost portion 701 of the omnidirectionally captured region, the controller 180 may display the second image 4720 as it is.

For example, when the second input 4730 is received within 3 seconds after the reception of the first input, the controller 180 may display the second image 4720 as it is.

On the other hand, during the preset time after the reception of the first input, the controller 180 may display a UI indicating that the function corresponding to the second input 4730 is not performed.

The UI indicating that the function corresponding to the second input 4730 is not performed may be an animation.

Figure 48A:
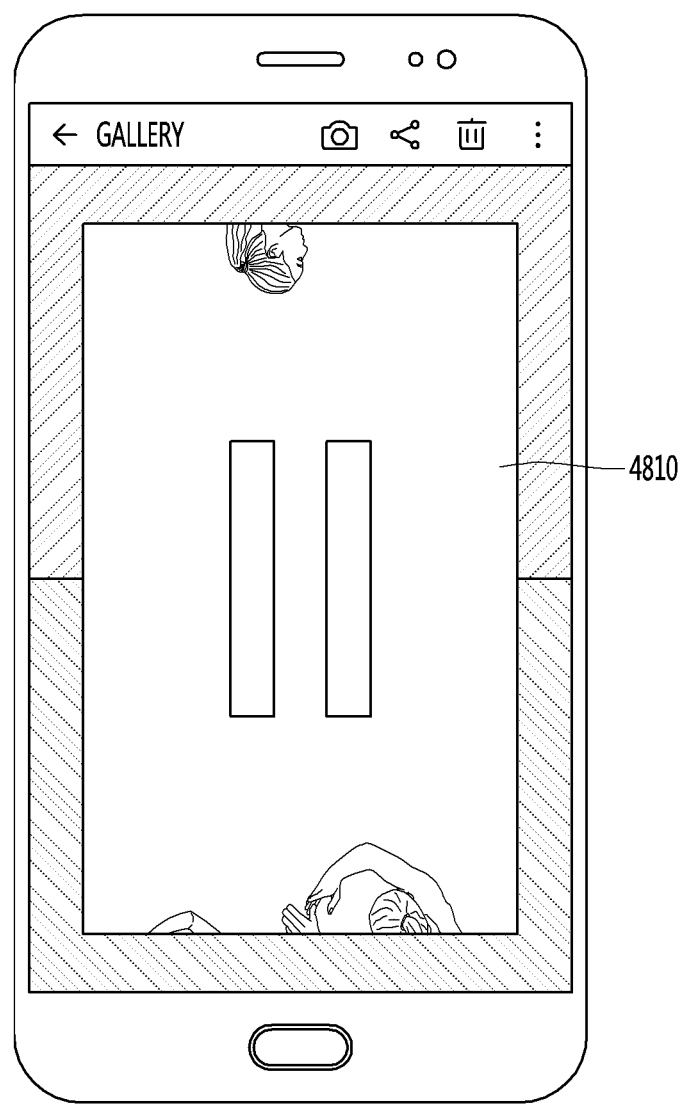
Figure 48B:
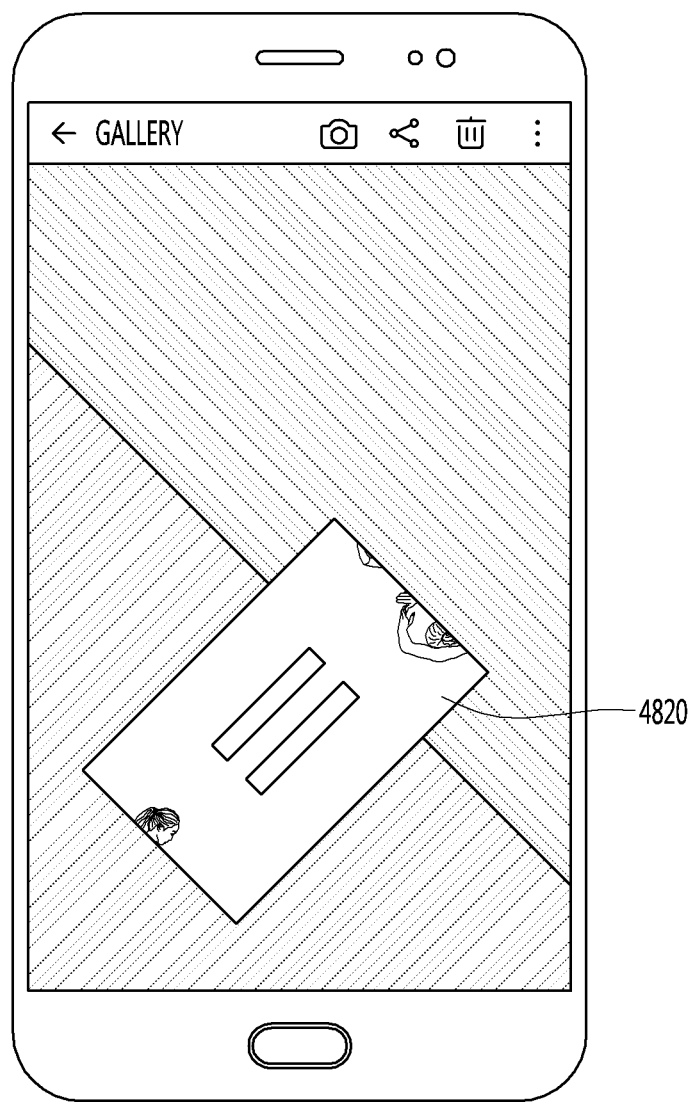
Figure 48C:
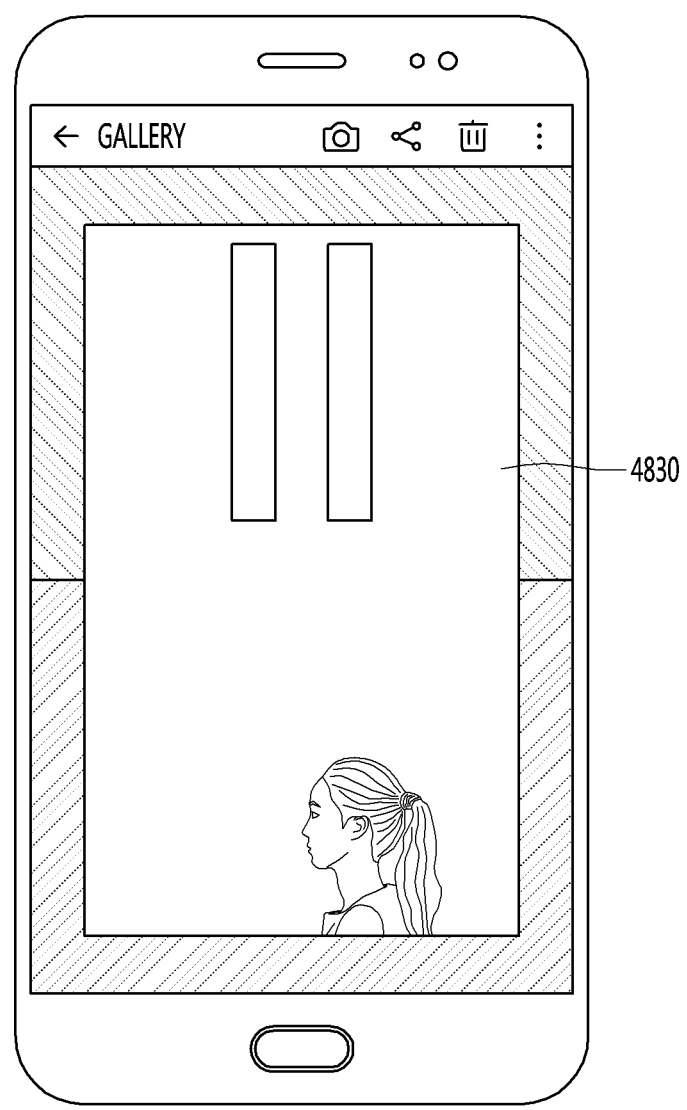

Specifically, as shown in FIGS. 48A to 48C, when the first input is received, the controller 180 may display an animation indicating that the function corresponding to the second input 4730 is not performed.

Specifically, during the preset time after the reception of the first input, the controller 180 may sequentially display an image 4810 whose upper and lower sides are maintained from the first image as shown in FIG. 48A, an image 4820 obtained by rotating the image 4810 whose upper and lower sides are maintained as shown in FIG. 48B, and an image 4830 whose upper and lower sides are reversed from the first image as shown in FIG. 48C.

Figure 49:
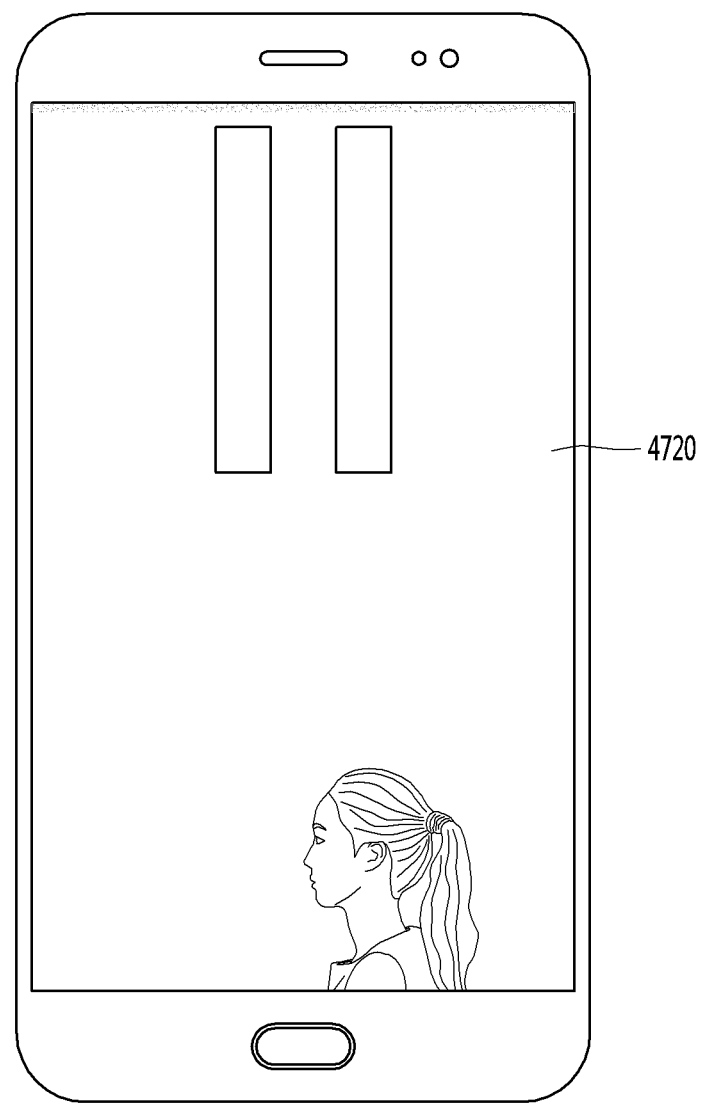

On the other hand, when the animation is ended, the controller 180 may display the second image 4720 included in the second region 840, as shown in FIG. 49.

When the preset time is ended, the animation also may be ended together. Also, when the second image 4720 included in the second region 840 is displayed after the end of the animation and the second input 4730 for changing the displayed region to the first region 740 by passing through the uppermost portion 701 of the omnidirectionally captured image is received, the controller 118 may display an image included in the first region 740.

FIGS. 50A to 52B are views for describing a method of changing a display region to a third region, in accordance with an embodiment of the present disclosure.

Figure 50A:
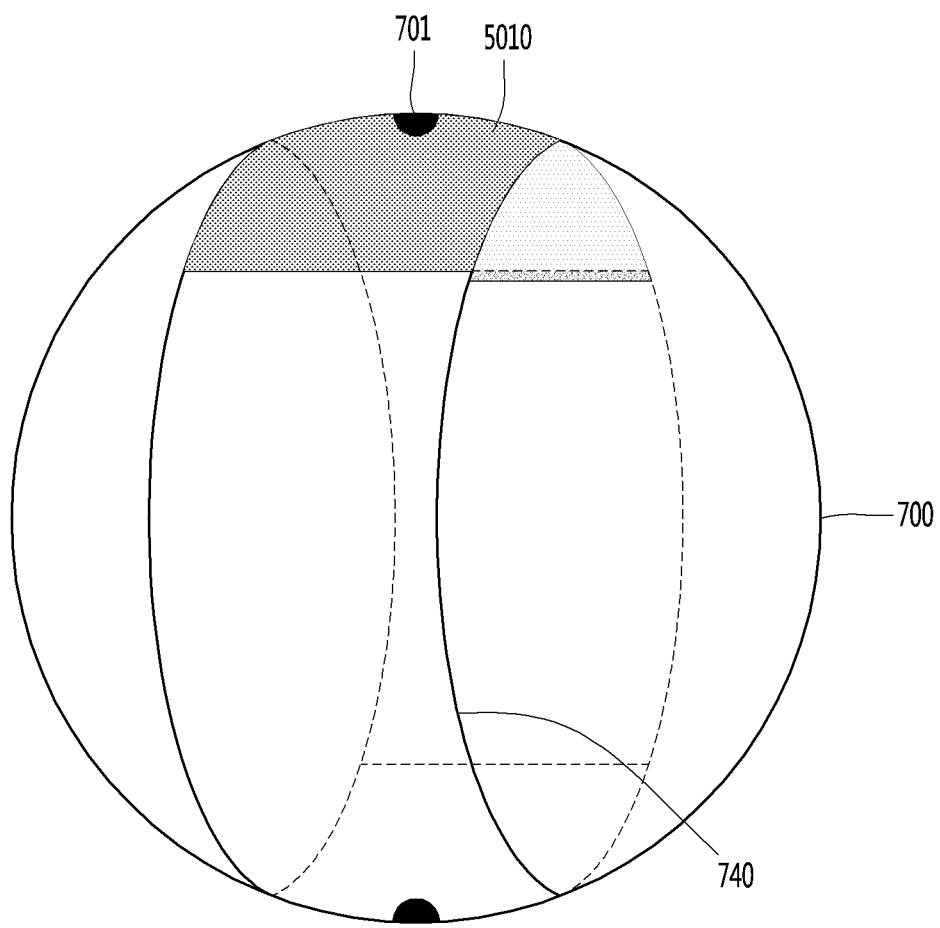
FIGS. 50A to 52B are views for describing a method of changing a display region to a third region, in accordance with an embodiment of the present disclosure.
Figure 50B:
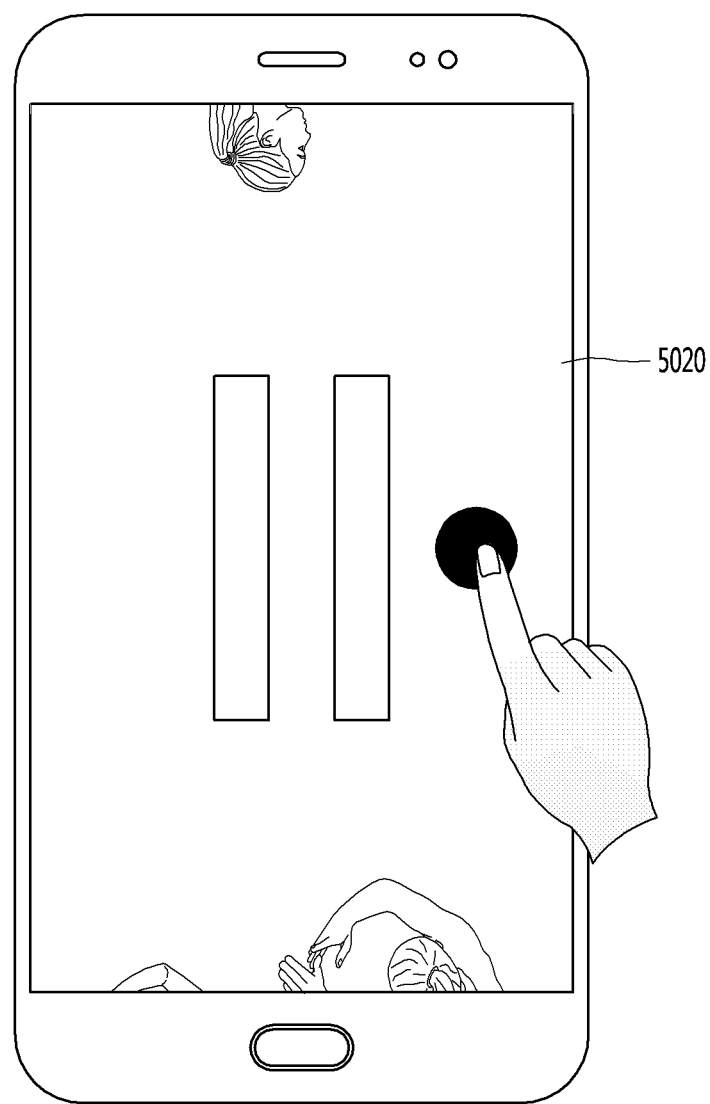

In FIGS. 50A and 50B, an image corresponding to a certain region in a first region 740 is displayed, and then, a sixth image 5020 including an uppermost portion 701 of an omnidirectionally captured image is displayed by an input of changing the displayed region. A region 5010 corresponding to the sixth image 5020 is shown in FIG. 50A.

On the other hand, the controller 180 may receive a sixth input from a user. The sixth input may be an input of indicating a specific direction. For example, as shown in FIG. 50B, the sixth input of touching a right region of a screen may be an input of indicating a right direction.

Figure 52A:
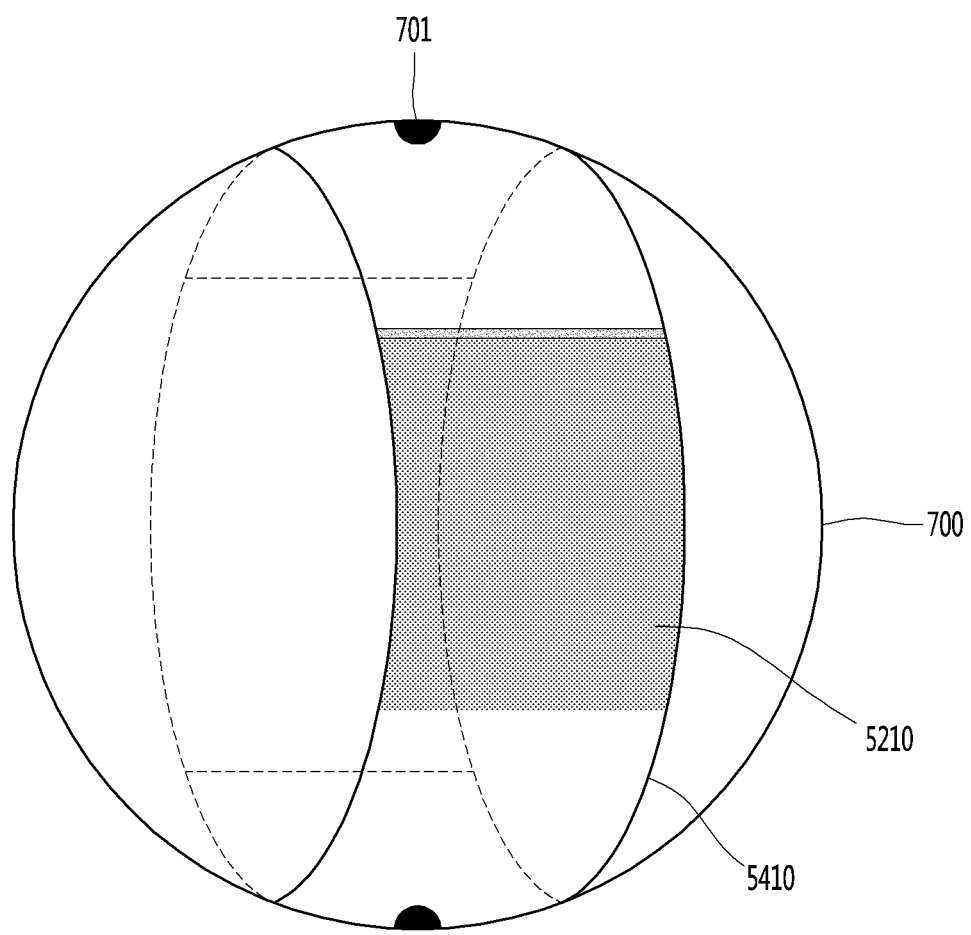
Figure 52B:
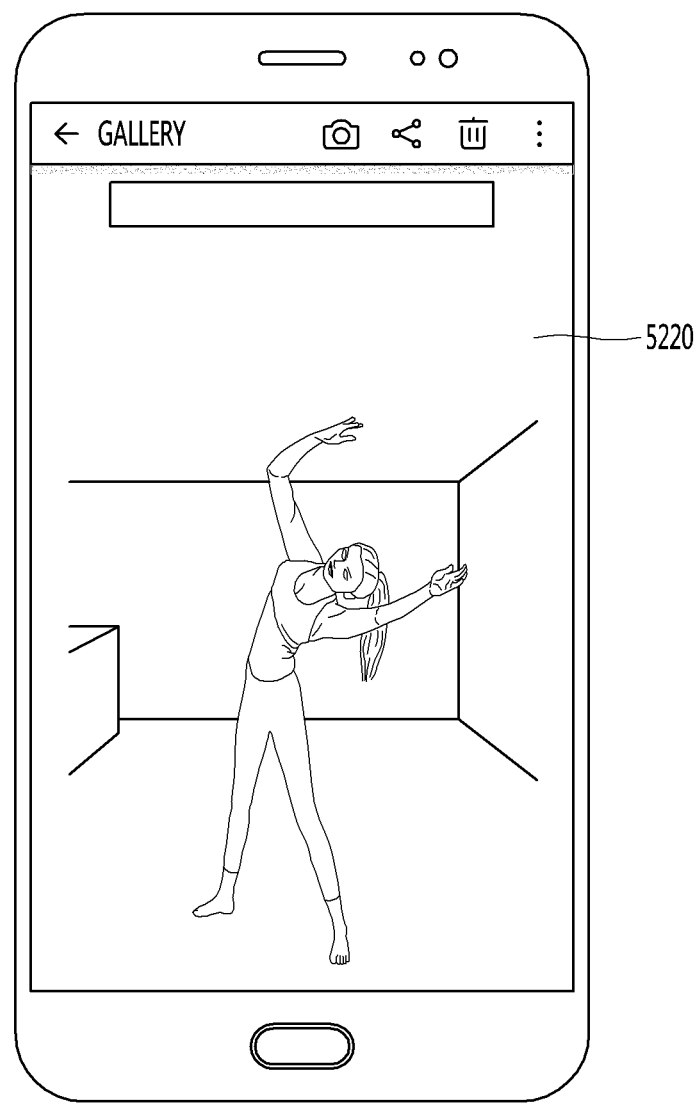

On the other hand, as shown in FIGS. 52A and 52B, when the sixth input of indicating the specific direction is received, the controller 180 may display a seventh image 5220 included in a third region 5140 corresponding to the specific direction. A region 5210 corresponding to the seventh image 5220 is shown in FIG. 52A.

That is, when the lower side of the screen in FIG. 50B corresponds to the first region 740 and the right side of the screen where the sixth input is received corresponds to the third region 5140 located 90 degrees to the right from the first region 740, the controller 180 may display the seventh image 5220 included in the third region 5140 located 90 degrees to the right from the first region 740.

For example, when the first region 740 is an image that is within −25 degrees to 25 degrees horizontally and −35 degrees to 215 degrees vertically with respect to the center of the entire region 700 of the omnidirectionally captured image, the third region 5140 may be a region that is within 65 degrees to 115 degrees horizontally and −35 degrees to 215 degrees vertically with respect to the center of the entire region 700 of the omnidirectionally captured image.

In this case, the direction of the upper end of the seventh image 5220 may be the direction in which the uppermost portion of the omnidirectionally captured image is located. That is, the seventh image 5220 may be displayed normally.

On the other hand, after the sixth image 5020 including the uppermost portion 701 of the omnidirectionally captured image is rotated, the seventh image 5220 included in the third region 5140 may be displayed.

Figure 51A:
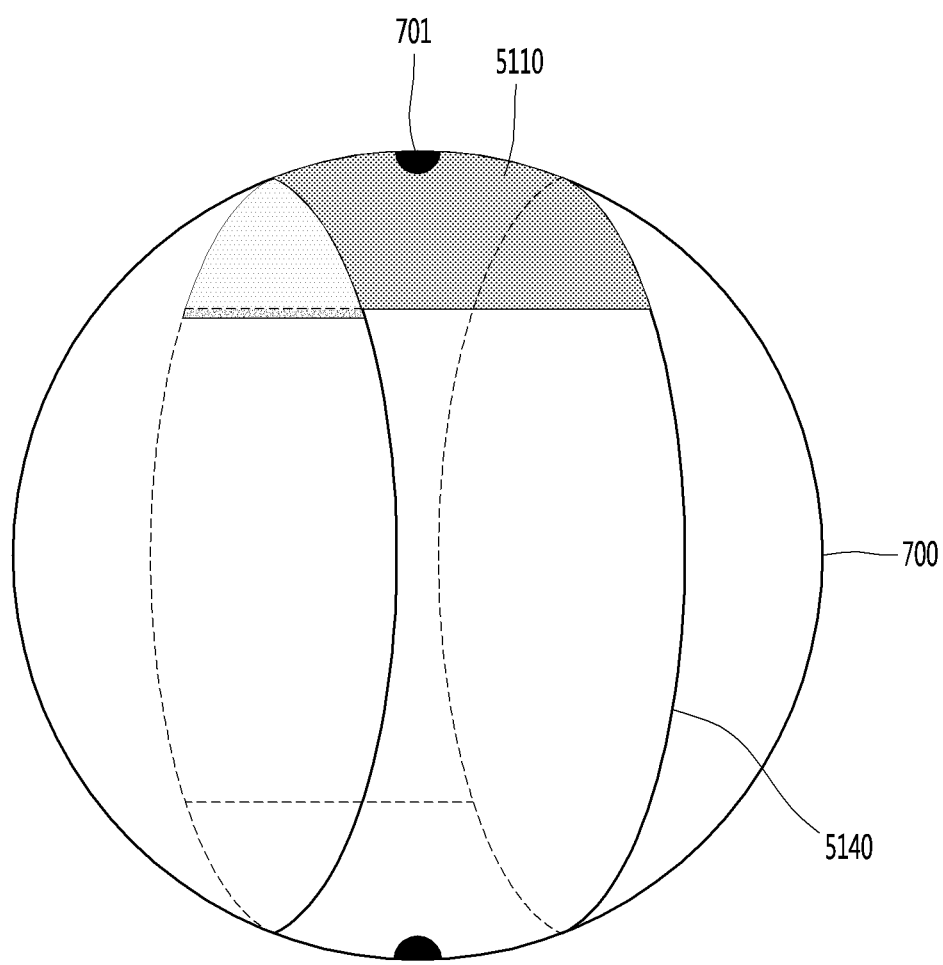
Figure 51B:
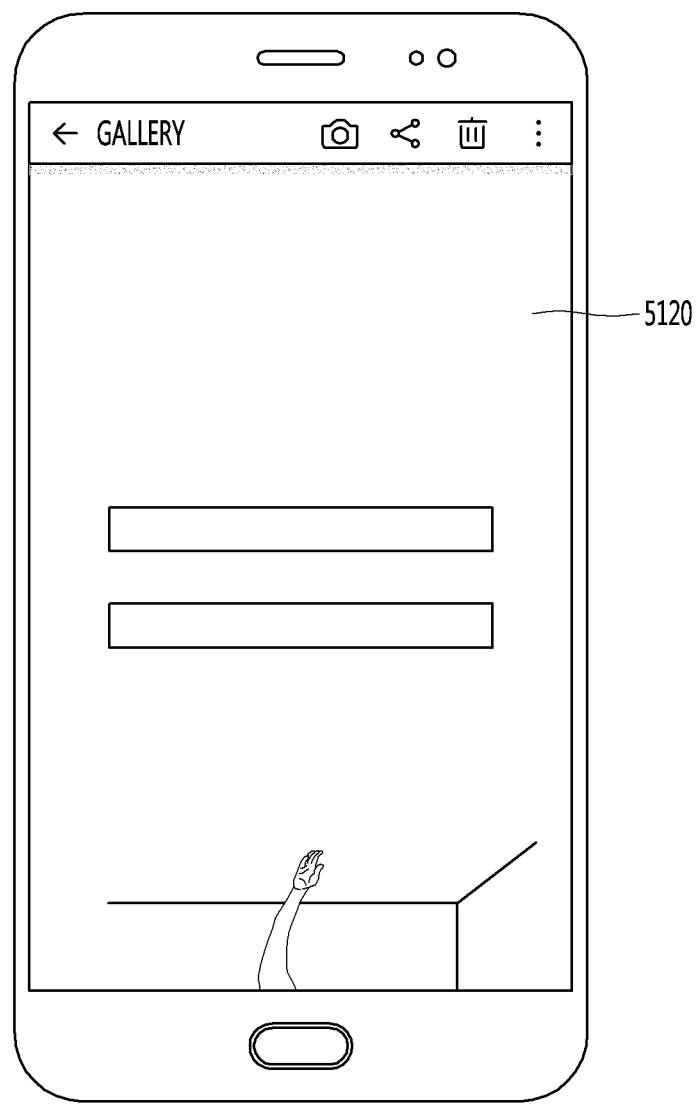

For example, when the sixth input of indicating the specific direction as shown in FIG. 50B is received, the controller 180 may display an eighth image 5120 included in the third region 5140, as shown in FIG. 51B. A region 5110 corresponding to the eighth image 5120 is shown in FIG. 51A.

The eighth image 5120 included in the third region 5140 may be an image of the region 5110 that includes the uppermost portion 701 of the omnidirectionally captured image and is rotated from the region 5010 corresponding to the sixth image 5020.

On the other hand, when an input of moving the displayed region downward is received in a state in which the eighth image 5120 is displayed, the controller 180 may display the seventh image 5220 included in the third region 5140 corresponding to the specific direction, as shown in FIGS. 52A and 52B.

As such, in accordance with the present disclosure, it is possible to provide an environment that easily displays a third region as well as a region opposite to a currently displayed region.

FIGS. 53A to 57B are views for describing a method of displaying an image included in a second region normally or reversely, based on different inputs, in accordance with an embodiment of the present disclosure.

Figure 53A:
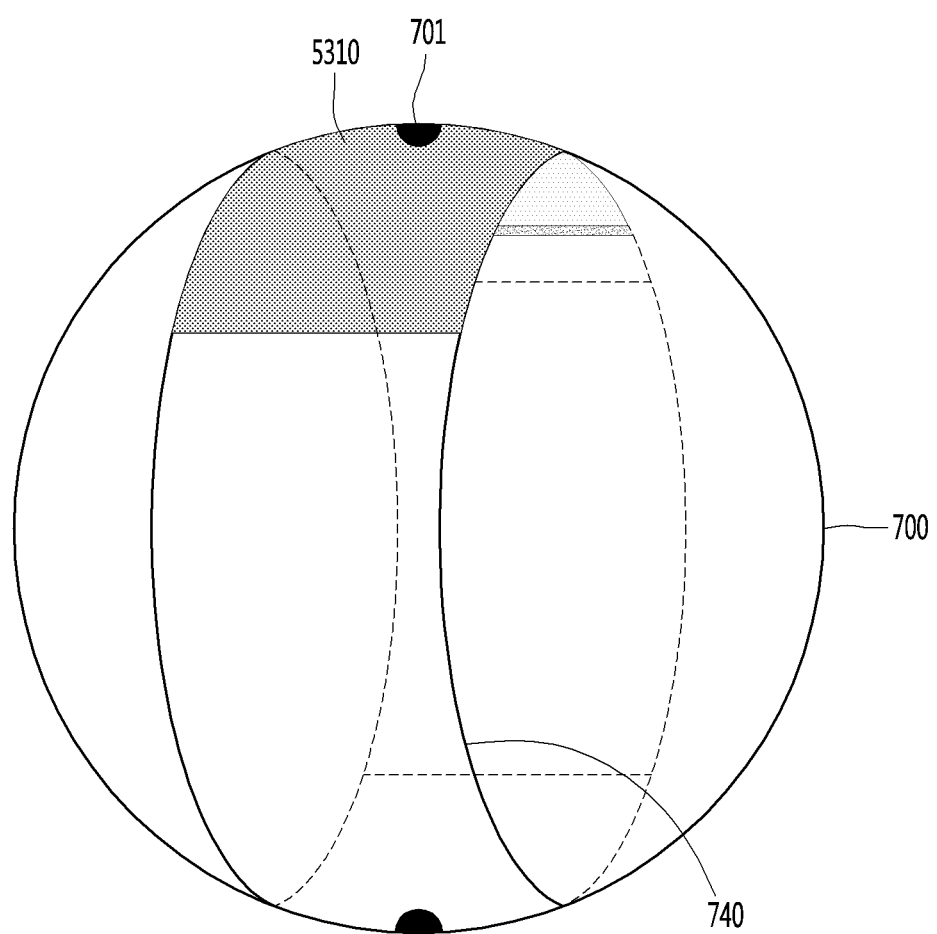
FIGS. 53A to 57B are views for describing a method of displaying an image included in a second region normally or reversely, based on different inputs, in accordance with an embodiment of the present disclosure.
Figure 53B:
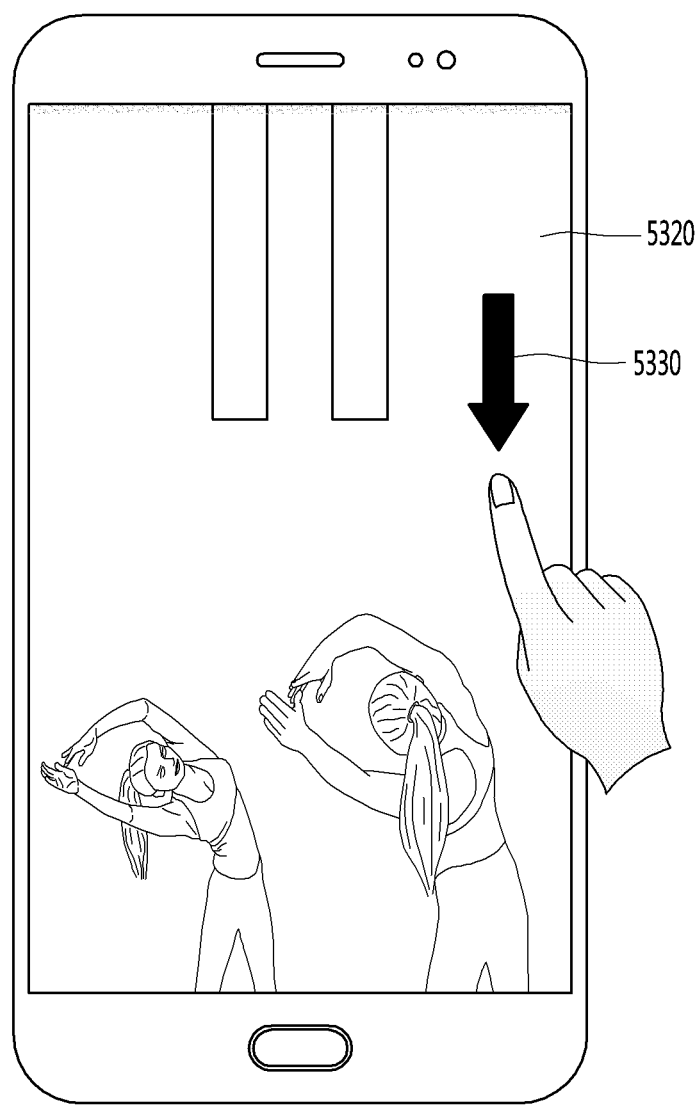

As shown in FIGS. 53A and 53B, the controller 180 may display a first image 5320 included in a first region 740. A region 5310 corresponding to the first image 5320 in an entire region 700 of an omnidirectionally captured image is shown in FIG. 53A.

The first image 5320 is displayed so that a direction of a bar of a region 5310 corresponding to the first image 5320 is directed toward an upper portion of a screen. The first image 5320 may be displayed as a normal image, that is, an image whose upper and lower sides are not reversed in terms of the user.

The controller 180 may receive a first input for changing the displayed image from the first region 740 to the second region 840 by passing through the uppermost portion 701 of the omnidirectionally captured region. The first input may be an input of dragging the screen so as to change the displayed region from the first region 740 to the second region 840 by passing through the uppermost portion 701 of the omnidirectionally captured region. For example, as shown in FIG. 53B, the first input may be an input of dragging the screen downward.

On the other hand, when the first input is received, the region displayed on the screen may pass through the uppermost portion of the omnidirectionally captured image.

Figure 54A:
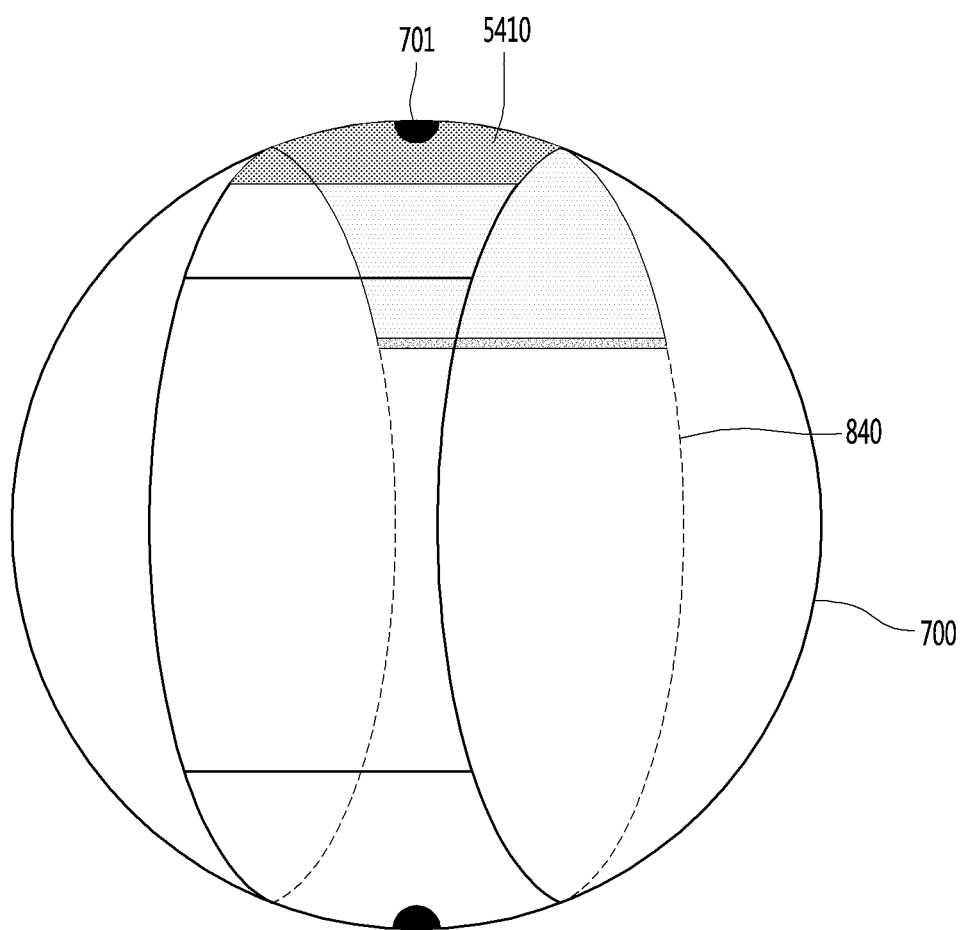

Also, after the region displayed on the screen passes through the uppermost portion of the omnidirectionally captured image, the controller 180 may display the second image 5420 included in the second region 840 as shown in FIG. 54A. A region 5410 corresponding to the second image 5420 in the entire region 700 of the omnidirectionally captured image is shown in FIG. 54A.

The second image 5420 may be an image whose upper and lower sides are maintained from the first image 5320. Specifically, the second image 5420 may be an image which is rotated by passing through the uppermost portion 701 of the omnidirectionally captured image from the first image 5320 and whose upper and lower sides are not reversed from the first image 5320.

On the other hand, since the first image 5320 is displayed normally, the second image 5420 may be displayed as a reverse image, that is, an image whose upper and lower sides are reversed in terms of the user.

On the other hand, when a fourth input is received, the controller 180 may display a fourth image which is included in the second region 840 and whose upper and lower sides are maintained from the first image 5320. The fourth input may be an input of ending the touch after the screen is dragged.

Figure 54B:
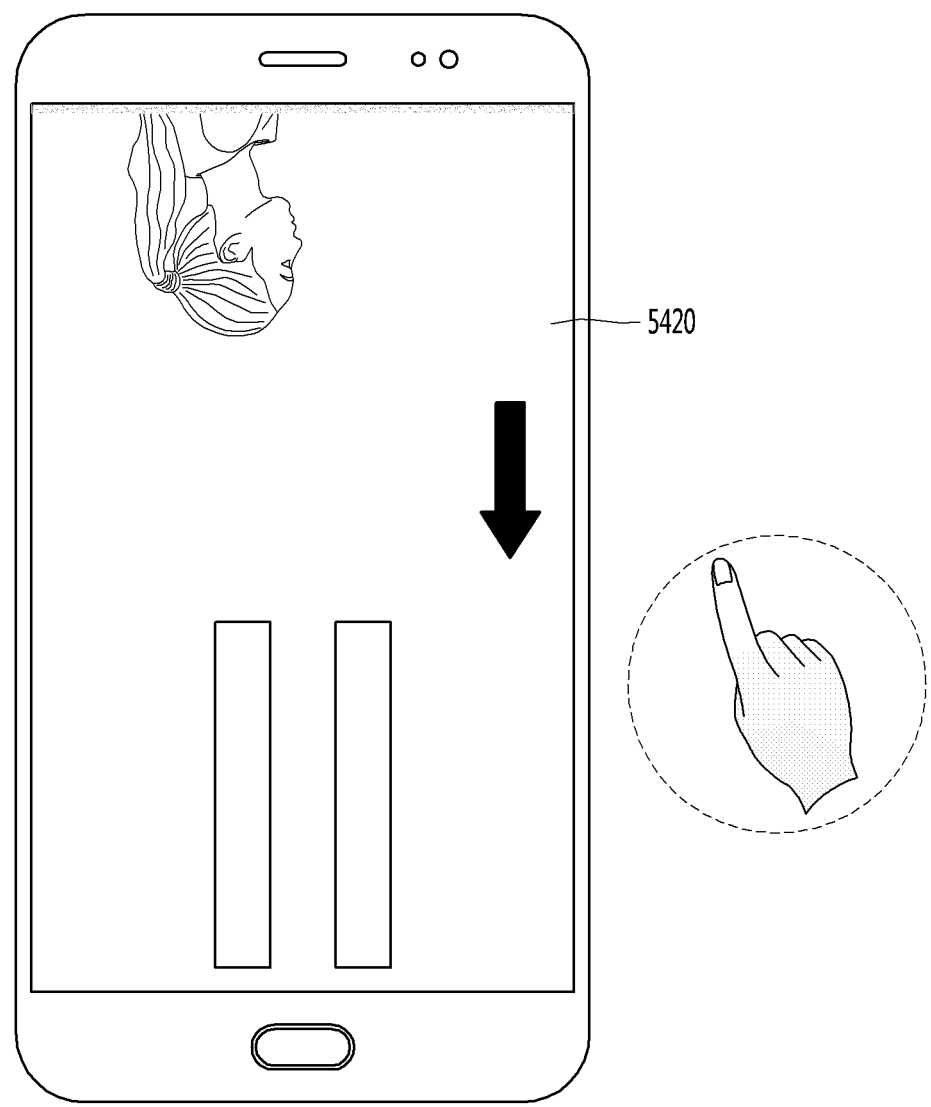

Specifically, the fourth input may be an input of, after receiving the first input of dragging the screen as shown in FIG. 53B, ending the first input as shown in FIG. 54B.

Figure 55A:
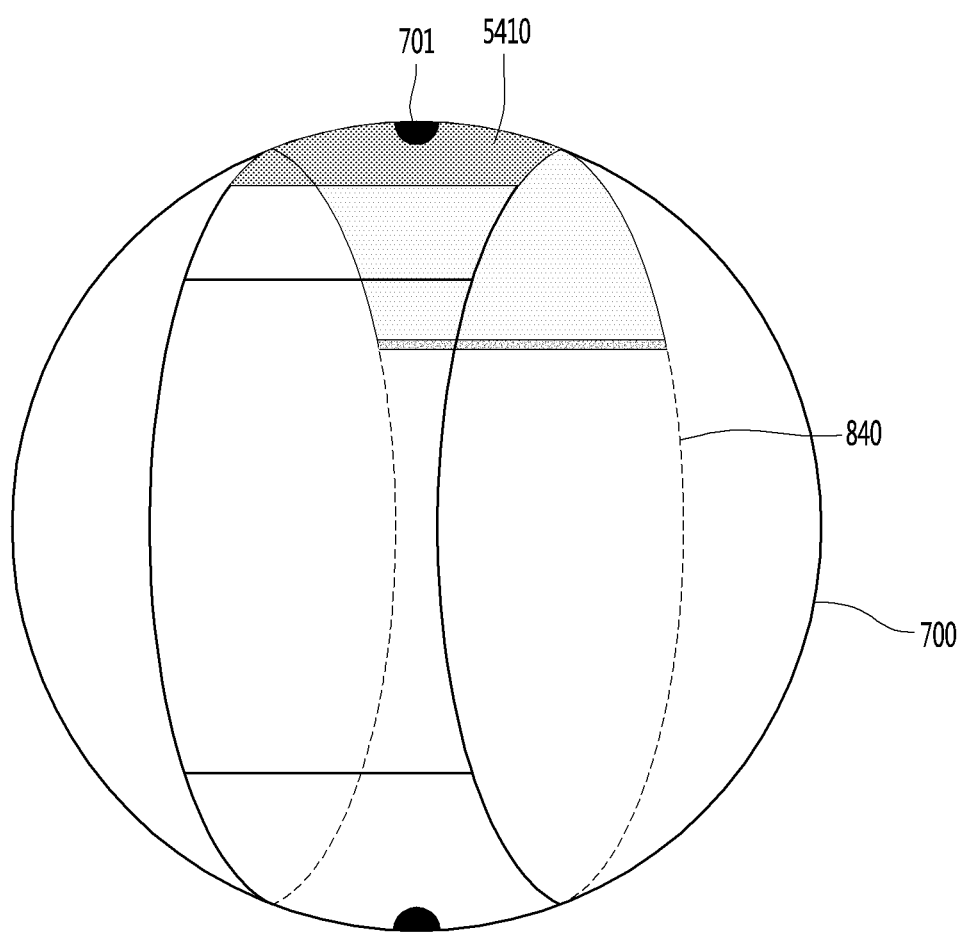
Figure 55B:
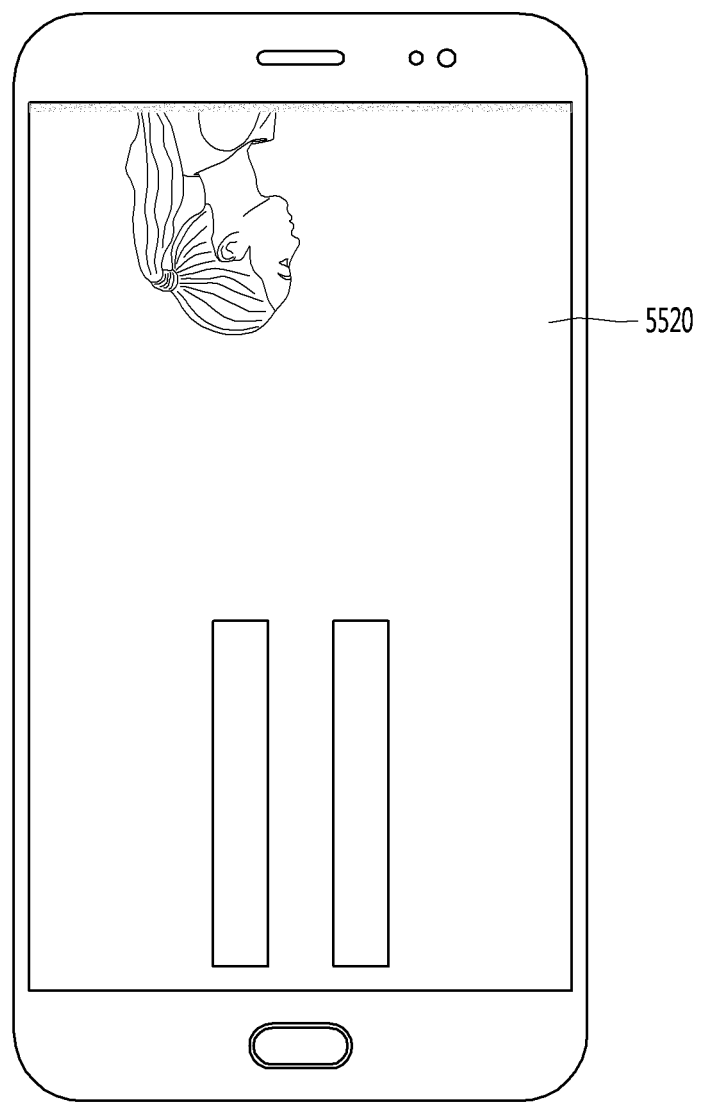

When the fourth input is received, the controller 180 may display a fourth image 5520 which is included in the second region 840 and whose upper and lower sides are maintained from the first image 5320, as shown in FIG. 55B.

Since the first image 5320 is displayed normally, the fourth image 5520 may be displayed as a reverse image, that is, an image whose upper and lower sides are reversed in terms of the user.

On the other hand, the fourth image 5520 may be an image displayed when the touch is ended after the screen is dragged. For example, if the second image 5420 is displayed when the touch is ended, the controller 180 may display the fourth image 5520 that is the same as the second image 5420.

On the other hand, when a fifth input is received, the controller 180 may display a fifth image which is included in the second region 840 and whose upper and lower sides are reversed from the first image 5320.

The fifth input may be an input of maintaining the touch during a preset time after the screen is dragged.

Figure 56:
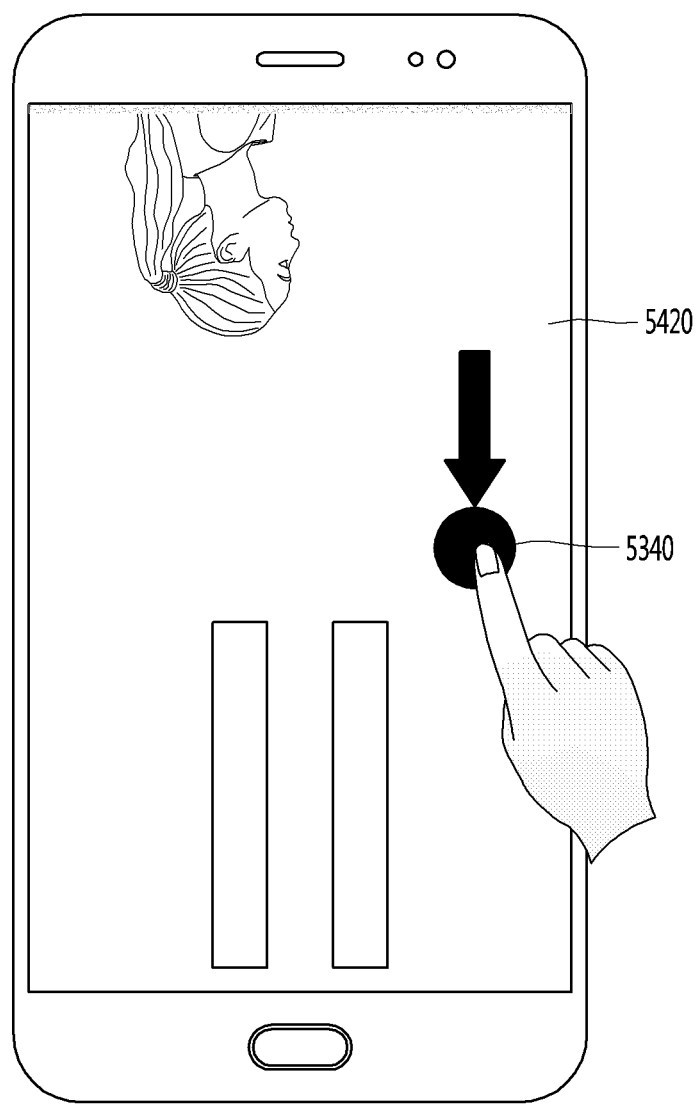

Specifically, the fifth input may be an input of, after receiving the first input of touching and dragging the screen as shown in FIG. 53B, maintaining the touch during a preset time as shown in FIG. 56.

Figure 57A:
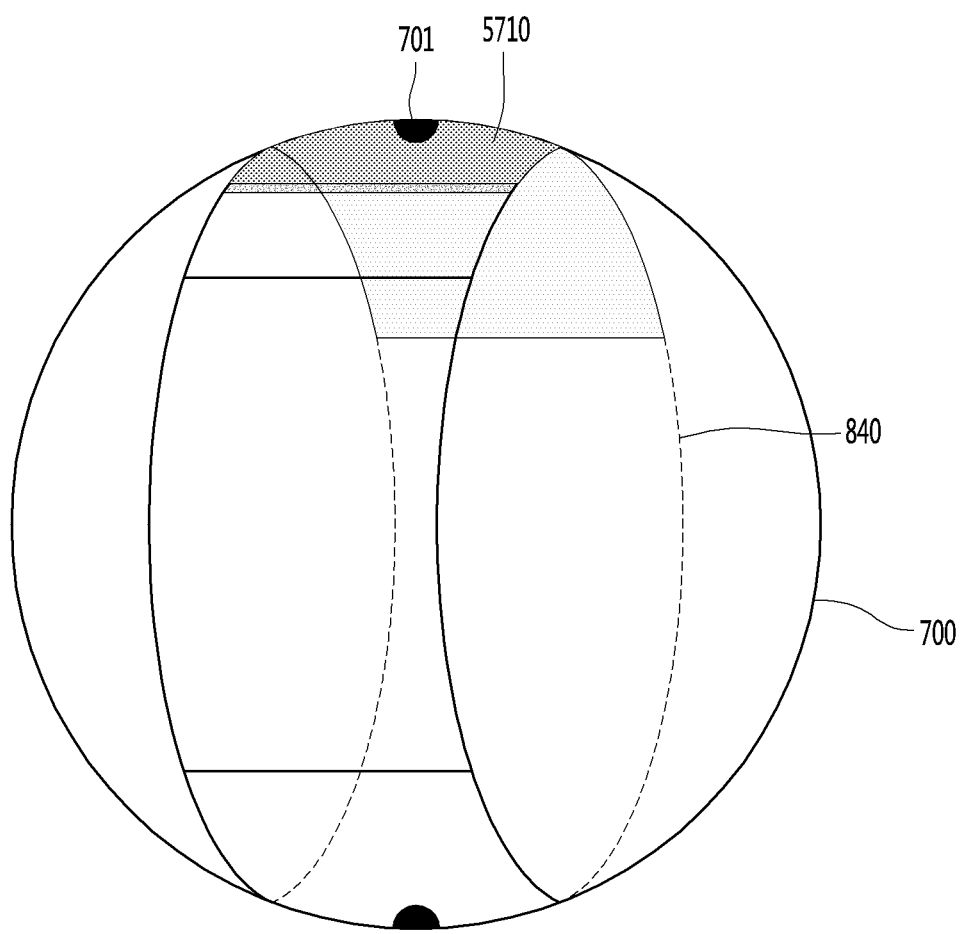
Figure 57B:
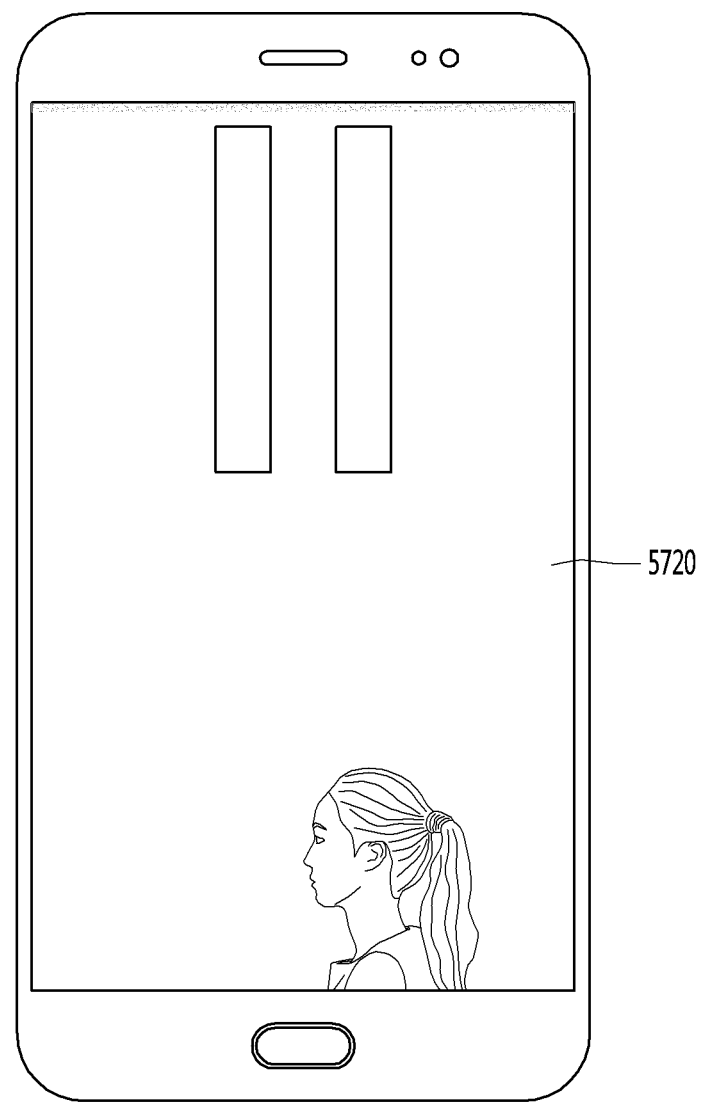

On the other hand, when the fifth input is received, the controller 180 may display a fifth image 5720 which is included in the second region 840 and whose upper and lower sides are reversed from the first image 5320, as shown in FIG. 57B.

On the other hand, since the first image 5320 is displayed normally, the fifth image 5720 may be displayed as a normal image, that is, an image whose upper and lower sides are not reversed in terms of the user.

On the other hand, the fifth image 5720 may be an image whose upper and lower sides are reversed from the image displayed when the first input is ended. For example, if the second image 5420 is displayed when the drag is ended and the touch is maintained during a preset time after the end of the drag, the controller 180 may display the fifth image 5720 whose upper and lower sides are reversed from the second image 5420.

As such, in accordance with the present disclosure, it is possible to provide the image of the opposite side normally or reversely according to a user's selection by maintaining or reversing the upper and lower sides of the image according to the type of the input.

Figure 58:
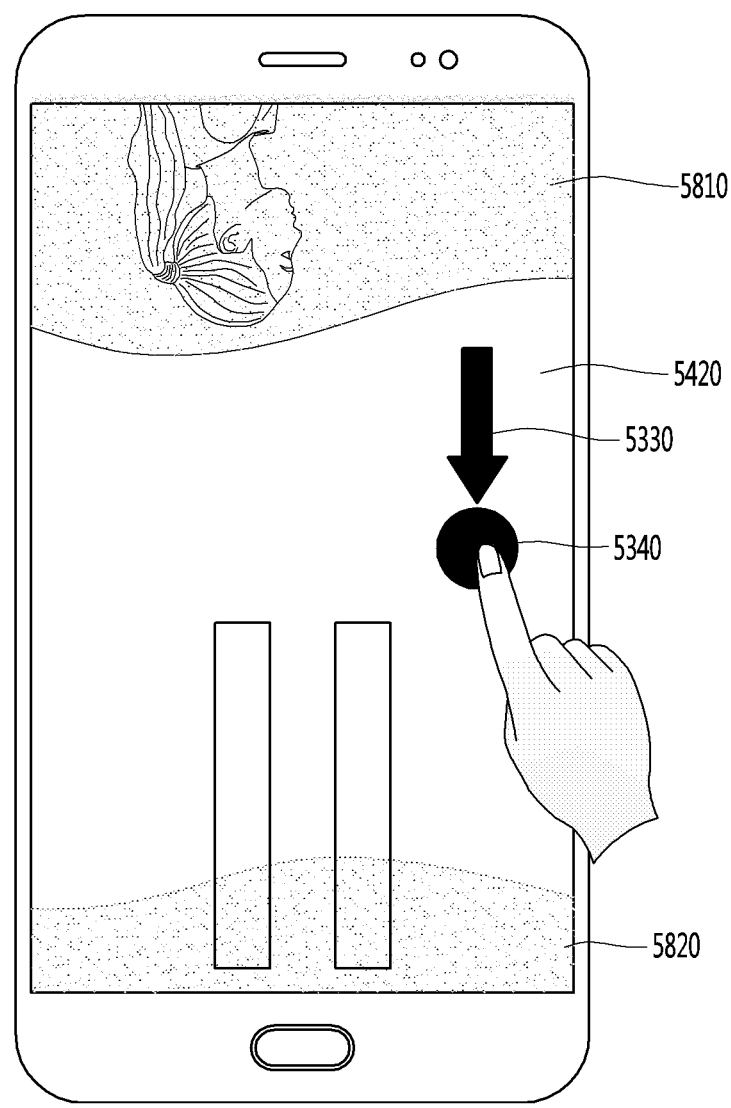
FIGS. 58 and 59 are views for describing a UI indicating that upper and lower sides of an image are reversed, in accordance with an embodiment of the present disclosure.
Figure 59:
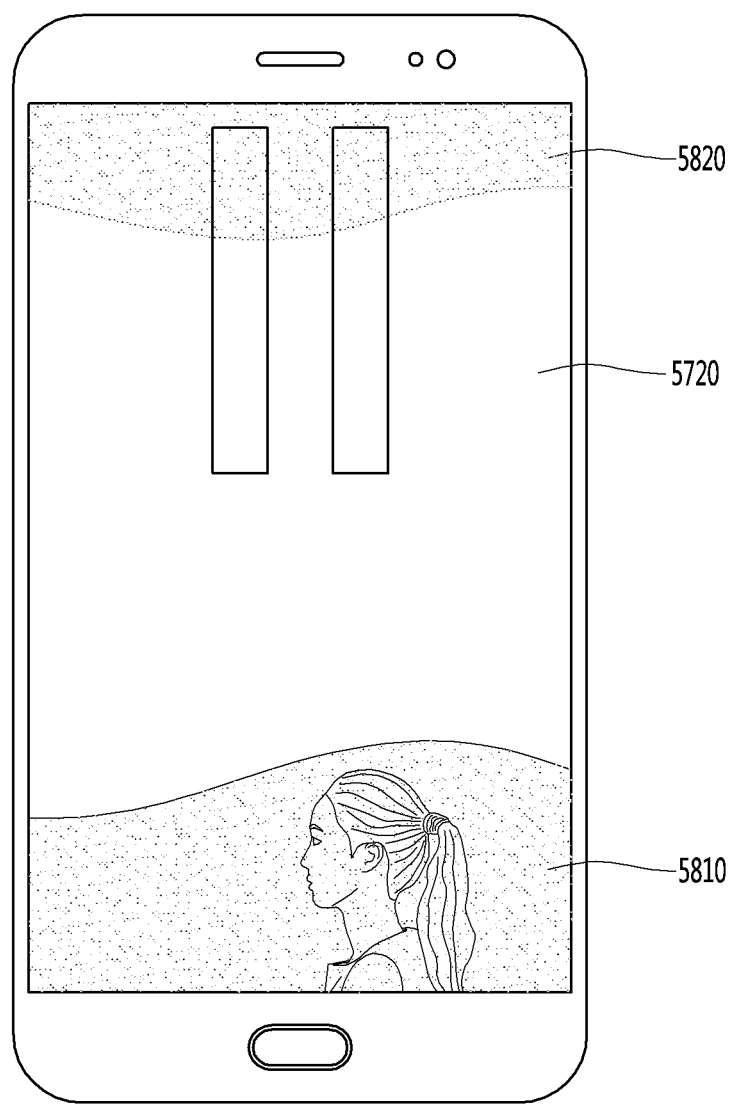

FIGS. 58 and 59 are views for describing a UI indicating that upper and lower sides of an image are reversed, in accordance with an embodiment of the present disclosure.

As shown in FIG. 58, when a first input 5330 is received, the controller 180 may display UIs 5810 and 5820 respectively indicating upper and lower sides of the image together with a second image 5420.

The UIs 5810 and 5820 respectively indicating the upper and lower sides of the image may include a first UI 5810 having a first color and a second UI 5820 having a second color.

On the other hand, the first color may be a color indicating the ground, and the first UI 5810 may be displayed in an upper portion of a screen.

Also, the second color may be a color indicating the sky, and the second UI 5820 may be displayed in a lower portion of the screen.

When the upper and lower sides of the image are maintained, the second image 5420 is displayed reversely. In this case, if the user drags the image downward (if the user moves the displayed region upward), the region displayed on the screen is gradually closer to the bottom (or the ground). If the user drags the image upward (if the user moves the displayed region downward), the region displayed on the screen is gradually closer to the ceiling (or the sky) Therefore, the user can intuitively recognize that the second image 5420 is a reversely displayed image.

As shown in FIG. 59, when a fifth input 5340 is received, the controller 180 may display UIs 5810 and 5820 indicating upper and lower sides of the image are reversed, together with a fifth image 5820.

The first UI 5810 may be displayed in a lower portion of the screen, and the second UI 5820 may be displayed in an upper portion of the screen.

The fifth image 5820 is an image whose upper and lower sides are reversed and is a normally displayed image.

In this case, if the user drags the image downward (if the user moves the displayed region upward), the region displayed on the screen is gradually closer to the ceiling (or the sky). If the user drags the image upward (if the user moves the displayed region downward), the region displayed on the screen is gradually closer to the bottom (or the ground) Therefore, the user can intuitively recognize that the fifth image 5820 is a normally displayed image.

Figure 60:
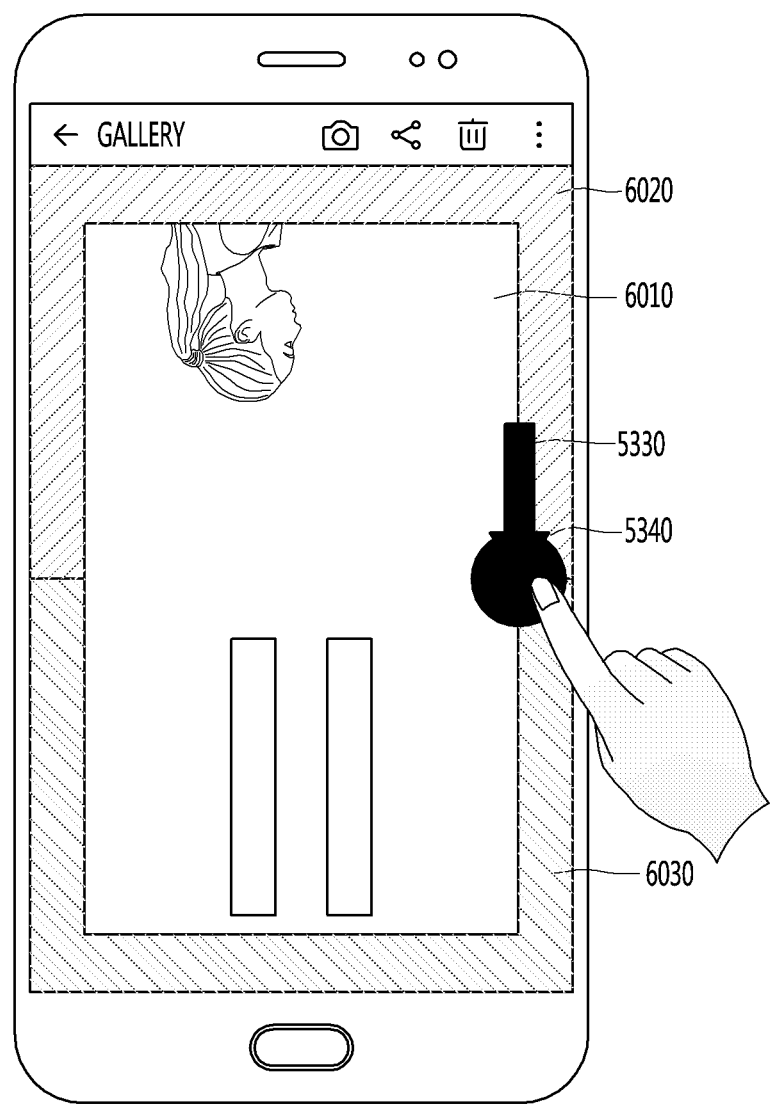
FIGS. 60 to 62 are views for describing an animation displayed while a fifth input is received, in accordance with an embodiment of the present disclosure.
Figure 61:
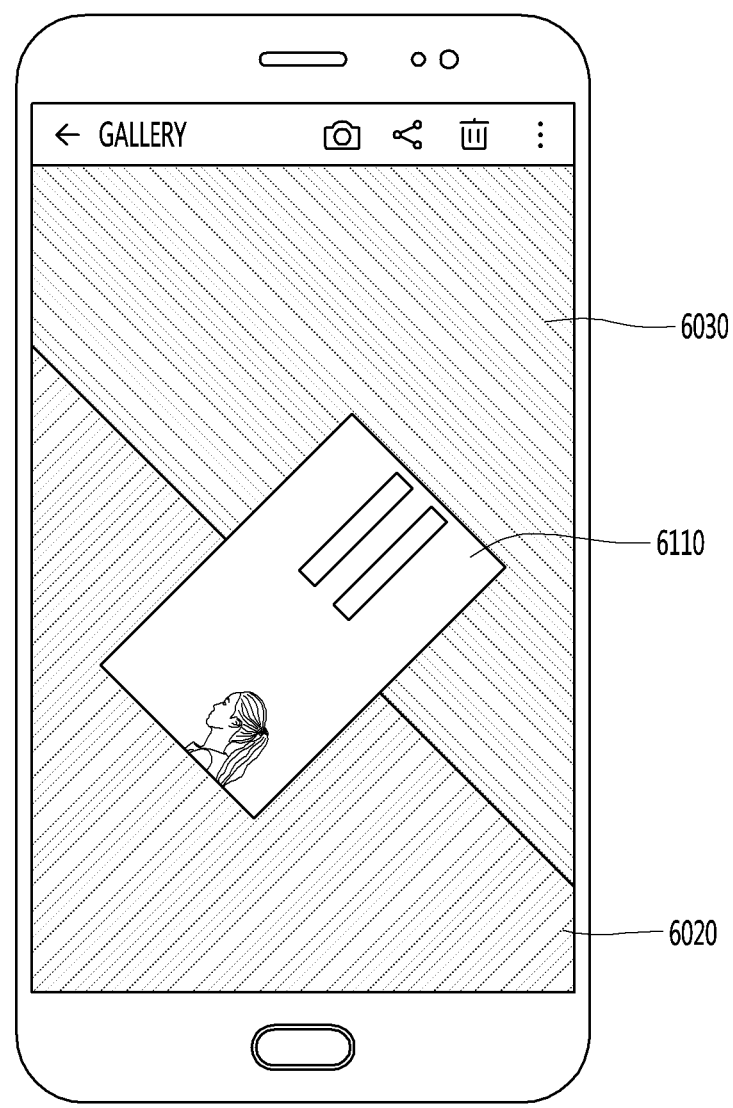
Figure 62:
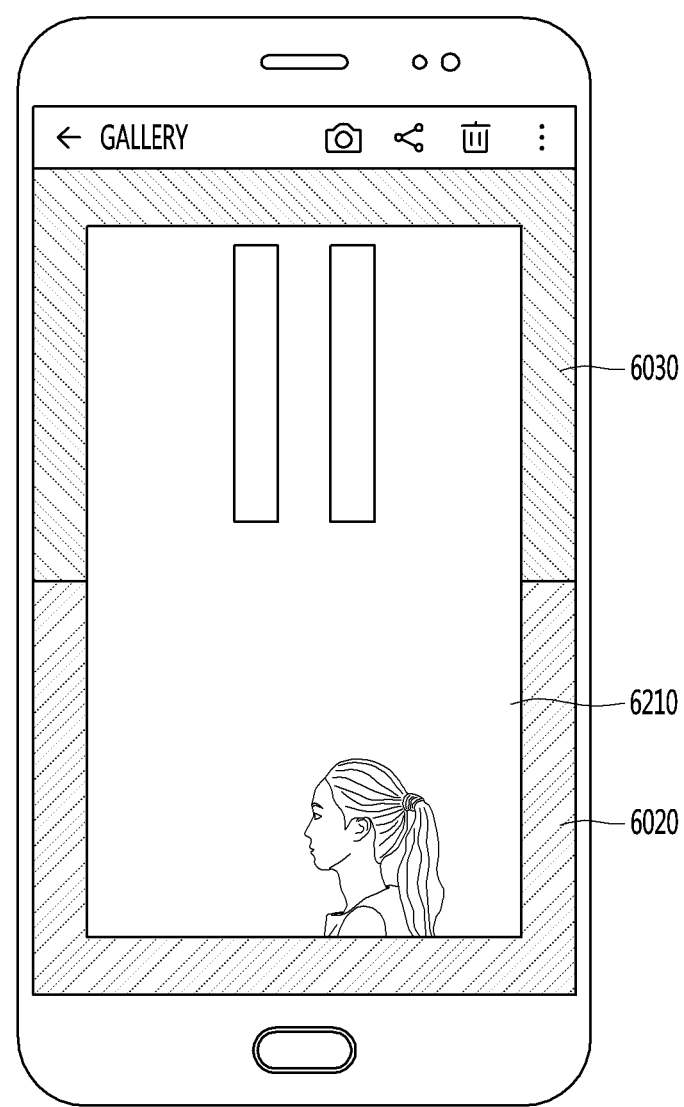

FIGS. 60 to 62 are views for describing an animation displayed while a fifth input is received, in accordance with an embodiment of the present disclosure.

The controller 180 may receive a fifth input 5340 in a state in which the second image is displayed according to the reception of the first input 5330. The fifth input may be an input of maintaining the touch during a preset time after the screen is dragged.

During the preset time, the controller 180 may display an animation indicating that the upper and lower sides of the image are reversed.

Specifically, during the reception of the fifth input, the controller 180 may sequentially display an image 6010 whose upper and lower sides are maintained from the second image as shown in FIG. 60, an image 6611 obtained by rotating the image 6010 whose upper and lower sides are maintained as shown in FIG. 61, and an image 6210 whose upper and lower sides are reversed from the second image as shown in FIG. 62.

The UI indicating that the upper and lower sides of the image are reversed may be displayed during the displaying of the animation.

Specifically, during the reception of the fifth input, the controller 180 may display the first UI 6020 in an upper portion of the screen and display the second UI 6030 in a lower portion of the screen as shown in FIG. 60. Also, the controller 180 may rotate the first UI 6020 and the second UI 6030 as shown in FIG. 61, and may display the first UI 6020 in a lower portion of the screen and display the second UI 6030 in an upper portion of the screen as shown in FIG. 61.

On the other hand, when the displaying of the animation is ended, the controller 180 may display a fifth image whose upper and lower sides are reversed from the second image.

As such, in accordance with the present disclosure, it is possible to exactly provide the user with whether the image is reversed and a time point when the reversing of the image is ended and thus the end of the touch is allowable.

FIGS. 63A to 65B are views for describing a method of displaying an image included in a second region normally or reversely, based on different inputs, in accordance with another embodiment of the present disclosure.

Figure 63A:
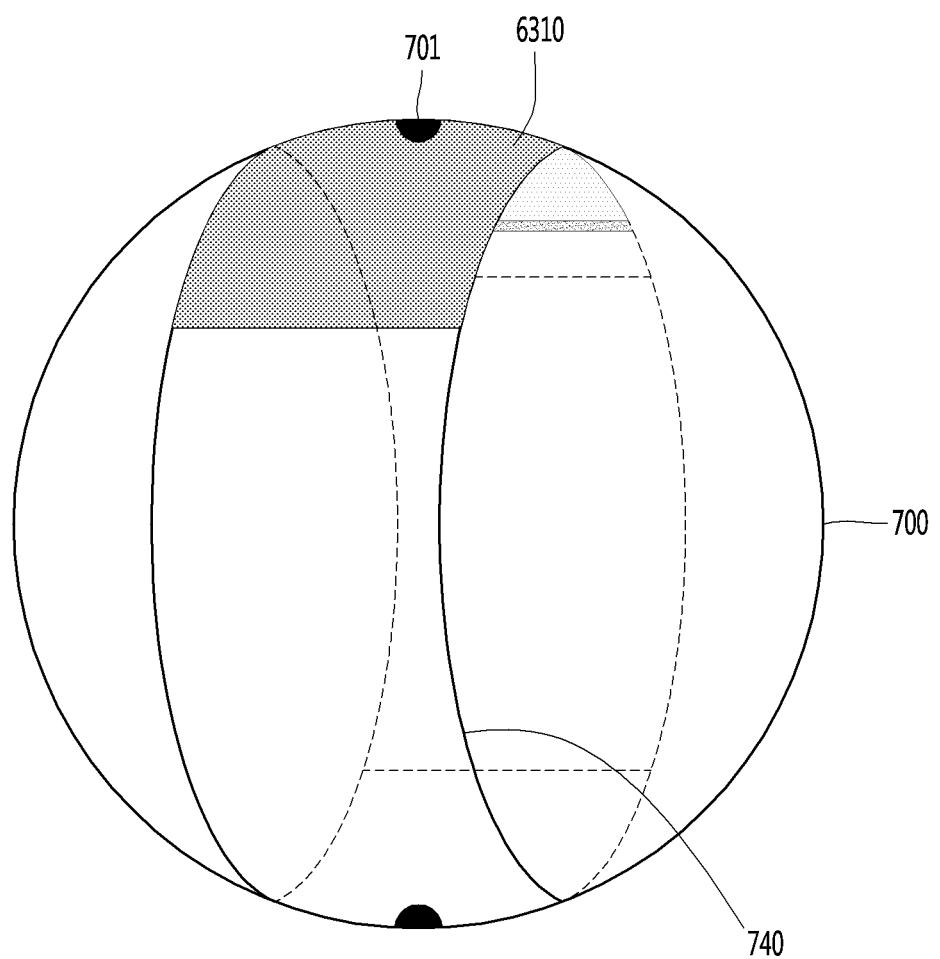
FIGS. 63A to 65B are views for describing a method of displaying an image included in a second region normally or reversely, based on different inputs, in accordance with another embodiment of the present disclosure.
Figure 63B:
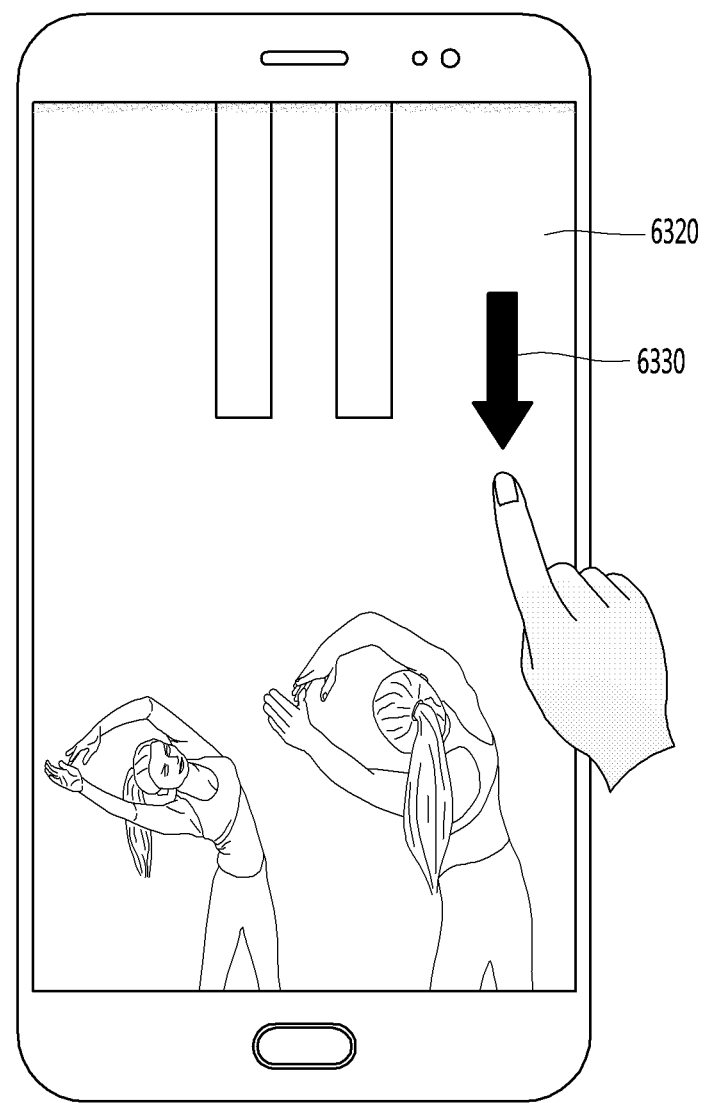

As shown in FIGS. 63A and 63B, the controller 180 may display a first image 6320 included in a first region 740. A region 6310 corresponding to the first image 6320 in an entire region 700 of an omnidirectionally captured image is shown in FIG. 63A.

The first image 6320 may be displayed as a normal image, that is, an image whose upper and lower sides are not reversed in terms of the user.

The controller 180 may receive a first input 6330 for changing the displayed image from the first region 740 to the second region 840 by passing through the uppermost portion 701 of the omnidirectionally captured region. For example, as shown in FIG. 63B, the first input may be an input of dragging the screen downward.

Figure 64A:
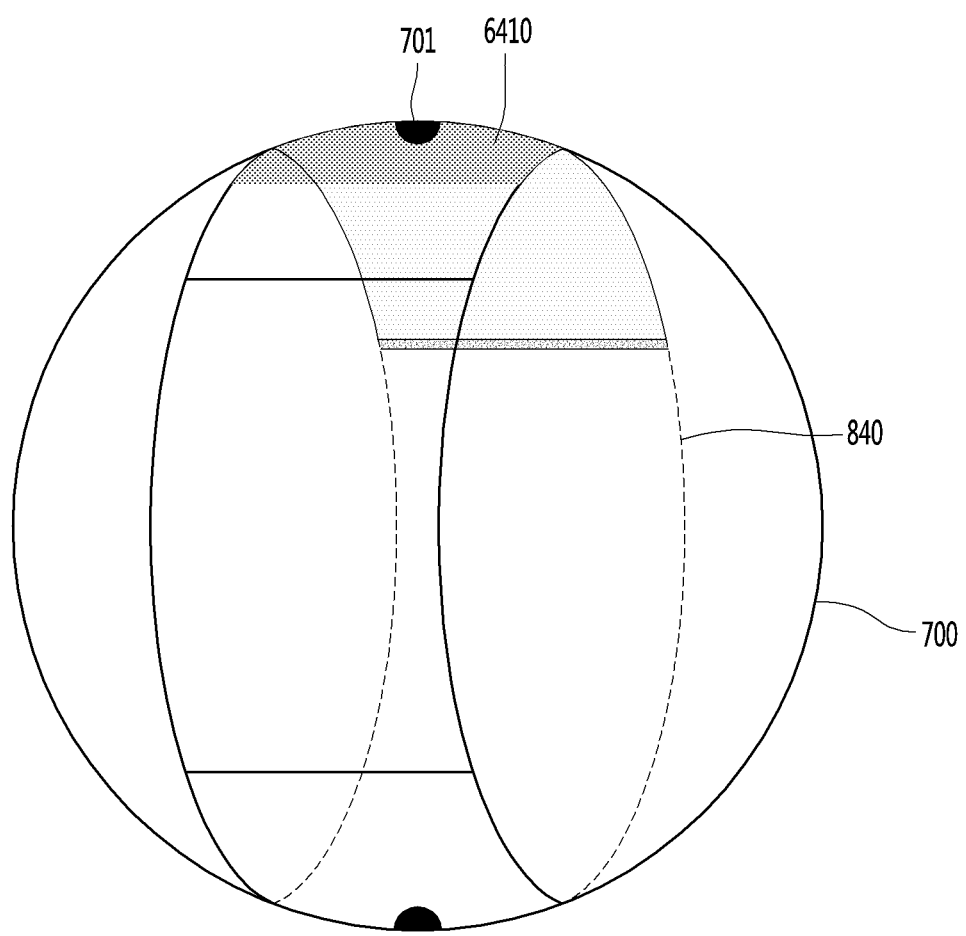
Figure 64B:
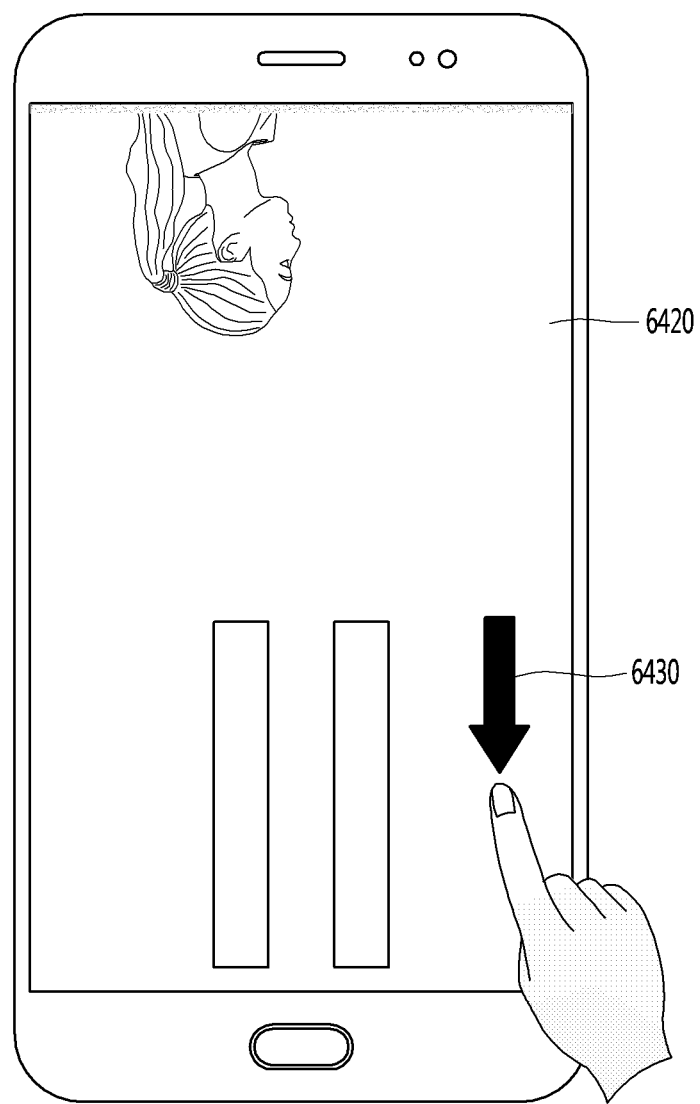

On the other hand, when the first input is received, the region displayed on the screen may pass through the uppermost portion 701 of the omnidirectionally captured image. Also, after the region displayed on the screen passes through the uppermost portion 701 of the omnidirectionally captured image, the controller 180 may display a second image 6420 included in a second region 840 as shown in FIG. 64A. A region 6410 corresponding to the second image 6420 in the entire region 700 of the omnidirectionally captured image is shown in FIG. 64A.

The second image 6420 may be an image whose upper and lower sides are maintained from the first image 6320.

On the other hand, since the first image 6320 is displayed normally, the second image 6420 may be displayed as a reverse image, that is, an image whose upper and lower sides are reversed in terms of the user.

On the other hand, when a fourth input is received, the controller 180 may display a fourth image which is included in the second region 840 and whose upper and lower portions are maintained from the first image 6320. The fourth input may be an input of ending the touch after the screen is dragged.

Specifically, the fourth input may be an input of, after receiving the first input of dragging the screen, ending the first input as shown in FIG. 63B.

On the other hand, when a fourth input is received, the controller 180 may display a fourth image which is included in the second region 840 and whose upper and lower sides are maintained from the first image 5320.

Since the first image 5320 is displayed normally, the fourth image may be displayed as a reverse image, that is, an image whose upper and lower sides are reversed in terms of the user.

On the other hand, the fourth image may be an image displayed when the touch is ended after the screen is dragged. For example, if the second image 6420 is displayed when the touch is ended, the controller 180 may display the fourth image that is the same as the second image 6420.

On the other hand, when a fifth input 6430 is received, the controller 180 may display a fifth image which is included in the second region 840 and whose upper and lower sides are reversed from the first image 6320.

The fifth input may be an input of, after dragging the screen, additionally dragging the screen in the same direction as the dragged direction.

For example, the fifth input may be an input 6430 of, after receiving the first input 6330 of touching and dragging the screen as shown in FIG. 63B, additionally dragging the screen in the same direction as the first input 6330.

Also, the fifth input may be an input of making the displayed region spaced apart from the uppermost portion 701 of the omnidirectionally captured image by a preset distance or more.

In other words, when the image rotated by passing through the uppermost portion 701 of the omnidirectionally captured image is displayed, the controller 180 may display the image within a preset angle from the uppermost portion 701 of the omnidirectionally captured image such that the upper and lower sides of the image are maintained from the first image 6320. However, the controller 180 may display the image rotated by the preset angle or more from the uppermost portion 701 of the omnidirectionally captured image such that the upper or lower sides of the image are reversed from the first image 6320, and the fifth input may be an input of rotating the second image 6420 by the preset angle or more from the uppermost portion 701 of the omnidirectionally captured image.

Figure 65A:
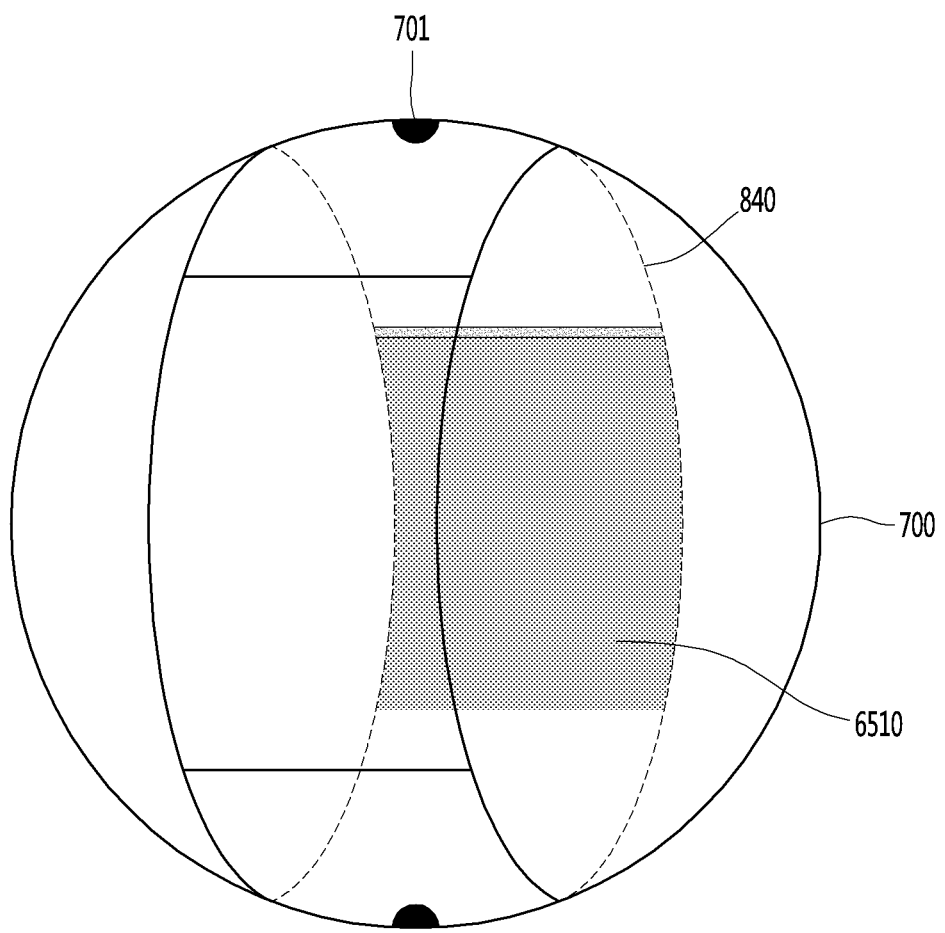
Figure 65B:
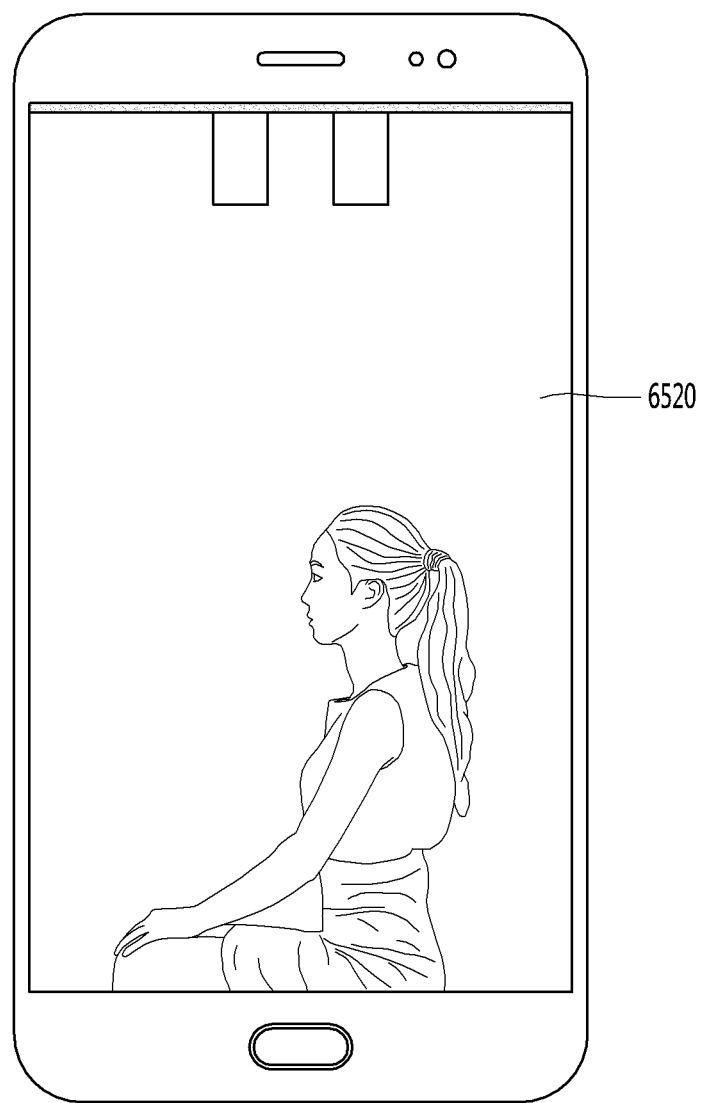

On the other hand, when the fifth input is received, the controller 180 may display a fifth image 6520 which is included in the second region 840 and whose upper and lower sides are reversed from the first image 6320, as shown in FIG. 65B.

On the other hand, since the first image 6320 is displayed normally, the fifth image 6520 may be displayed as a normal image, that is, an image whose upper and lower sides are not reversed in terms of the user.

On the other hand, the fifth image 5720 may be an image whose upper and lower portions are reversed from the image displayed when the first input is ended and which is moved such that the displayed image corresponds to a length of a drag from the image displayed when the first input is ended.

For example, if the second image 6420 is displayed when the drag is ended and the fifth input 6430 of additionally dragging in the same direction as the first input 6330 is received, the controller 180 may display the fifth image 6520 whose upper and lower sides are reversed from the second image 6420 and which is such that the displayed region 6510 corresponds to the length of the fifth input 6430.

A case where a user looking straight ahead tilts his or her head back and looks at the sky or a region near to the sky may frequently occur, but a case where a user looking straight ahead tilts his or her head back and looks in an opposite direction may not frequently occur.

Therefore, in accordance with the present disclosure, it is possible to allow the user to have an experience similar to reality by providing a reverse image when the rotation angle is small and a normal image when the rotation angle is large.

Figure 67A:
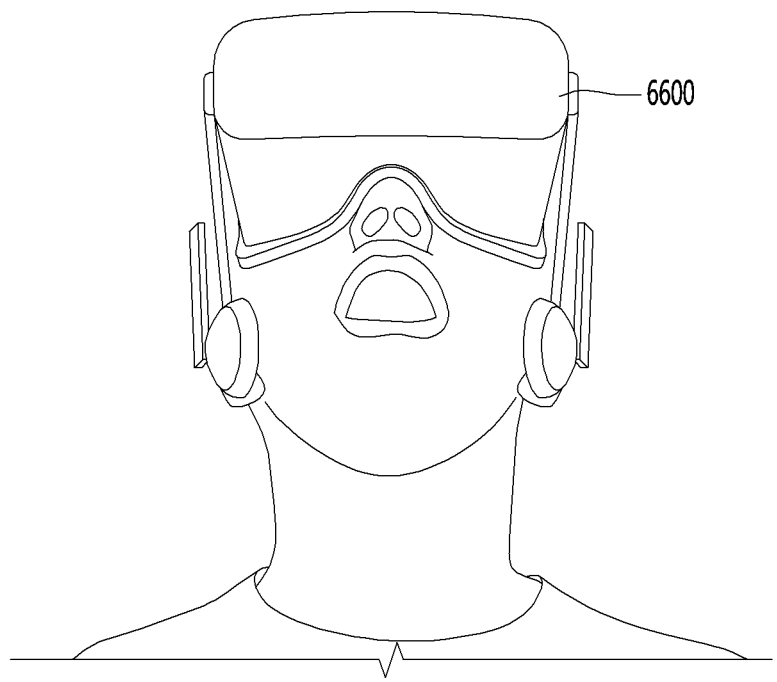
FIGS. 67A to 67C are views for describing an image displayed when an HMD device is rotated toward the sky.
Figure 67B:
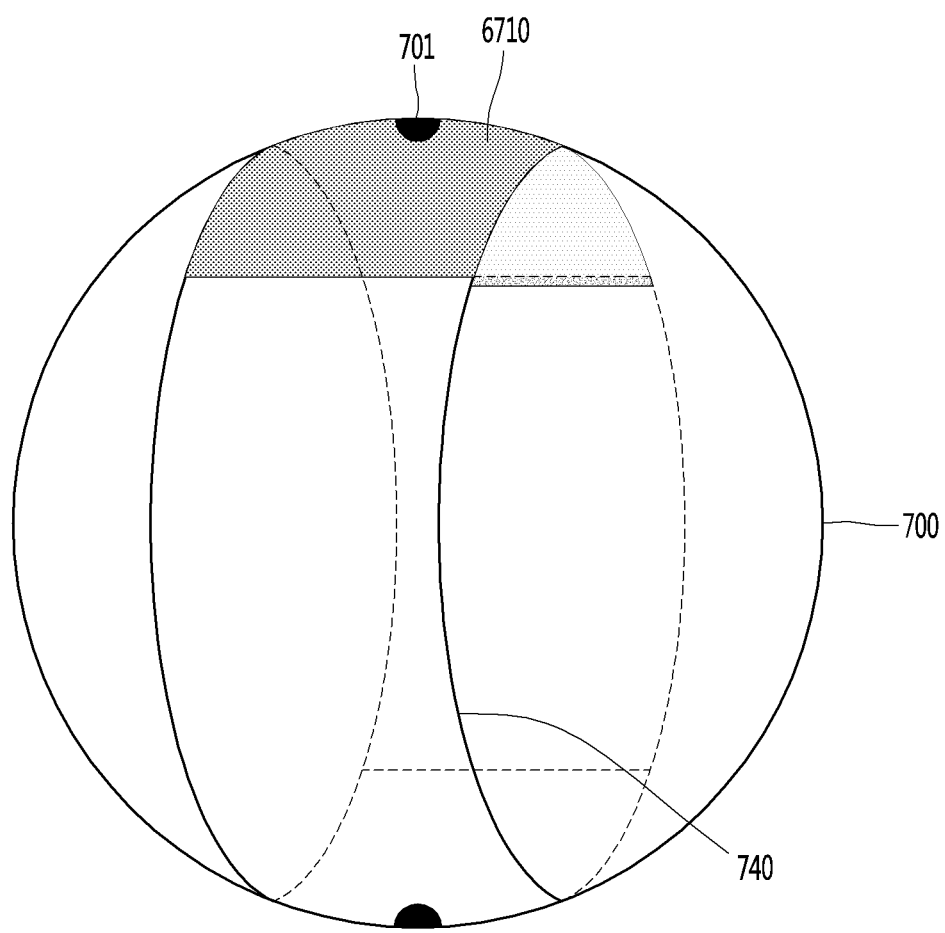
Figure 67C:
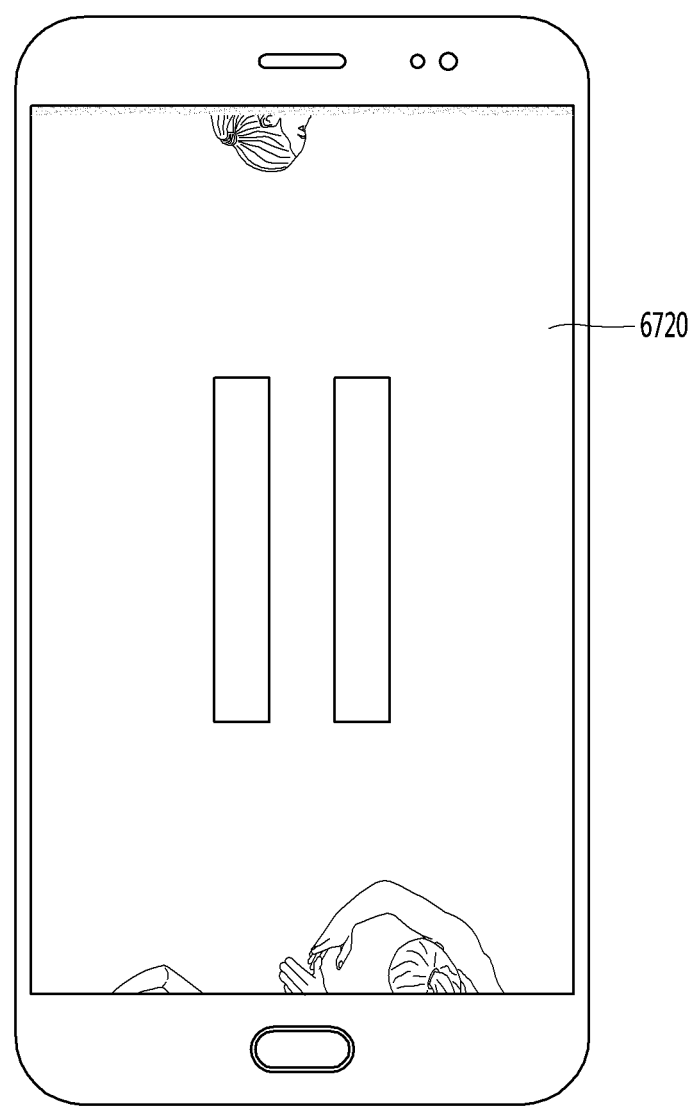

FIGS. 67A to 67C are views for describing an operating method when an omnidirectionally captured image is displayed on a head mounted display (HMD) device.

The display apparatus in accordance with the embodiment of the present disclosure may be an HMD device 6500.

The display apparatus in accordance with the embodiment of the present disclosure may further include a sensing unit (not illustrated) that senses a movement of the HMD device 6600. The controller 180 may acquire information on a direction of the HMD device 6600 based on the sensing result of the sensing unit (not illustrated).

Also, the controller 180 may display an image corresponding to the direction of the HMD device 6600 in the omnidirectionally captured image.

Figure 66A:
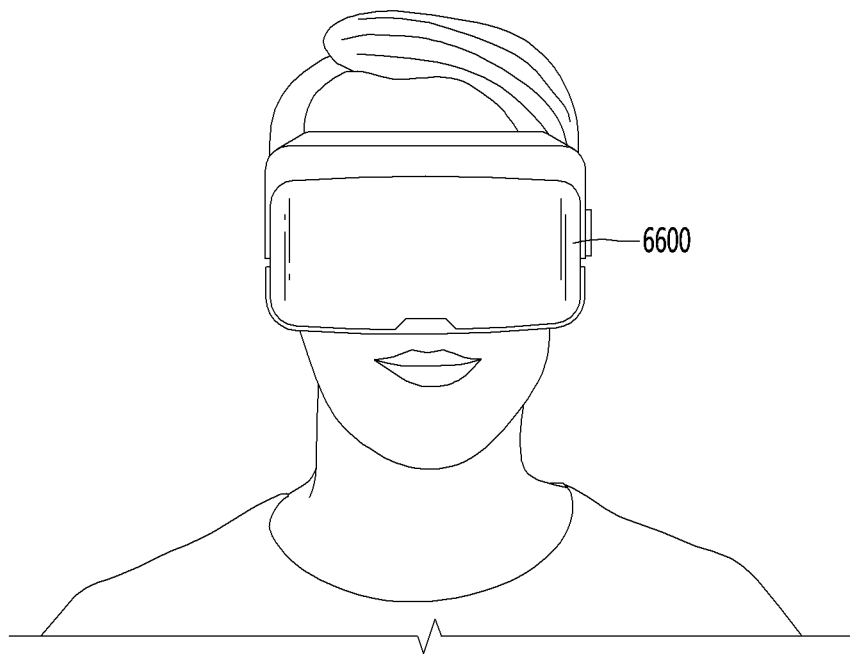
FIGS. 66A to 66C are views for describing an image displayed when a head mounted display (HMD) device is directed frontward.
Figure 66B:
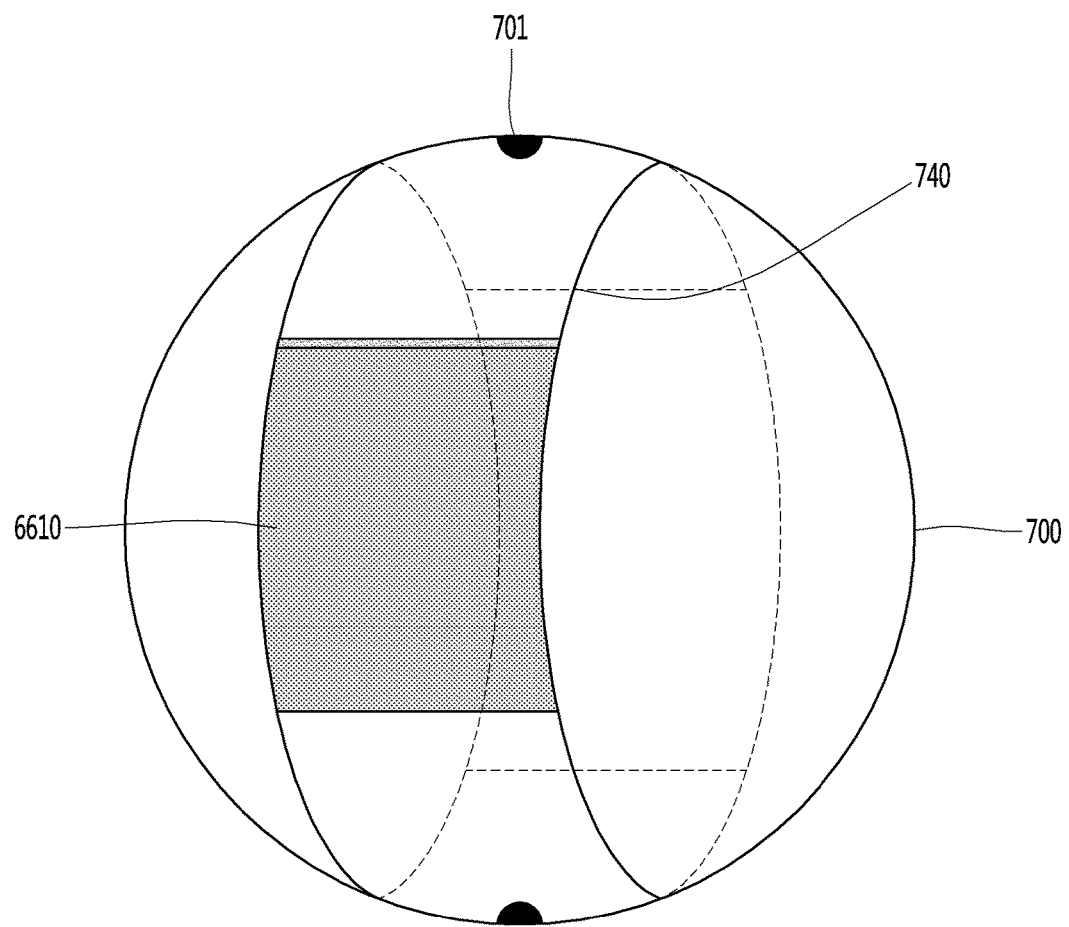
Figure 66C:
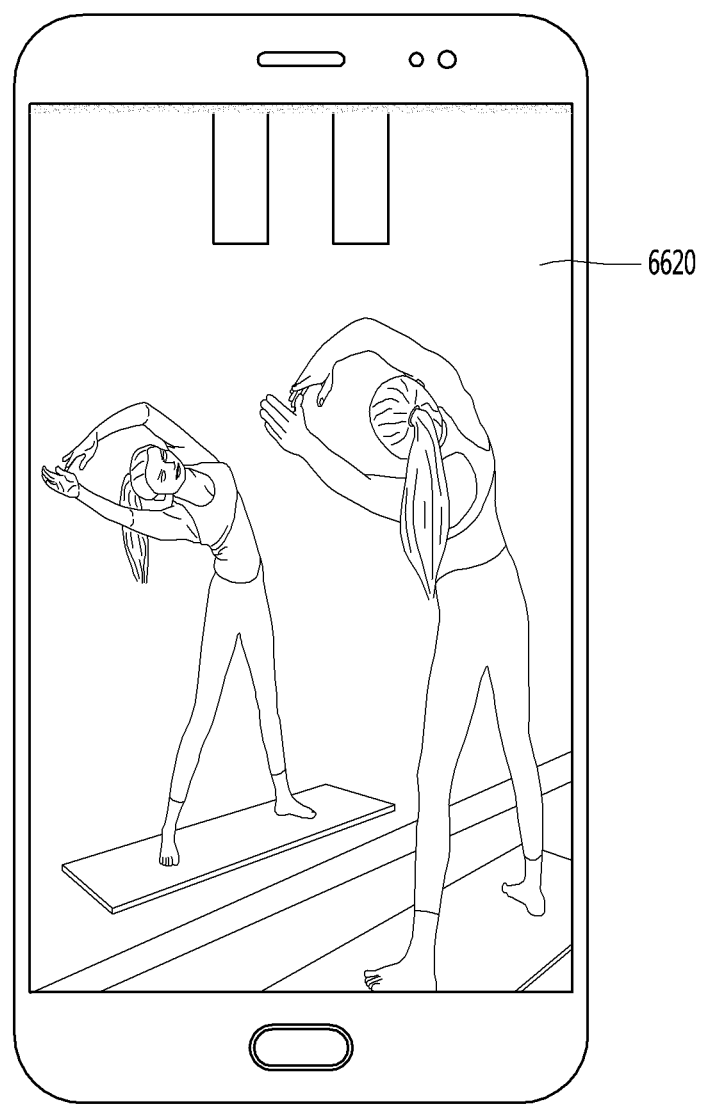

FIGS. 66A to 66C are views for describing an image displayed when the HMD device 6600 is directed frontward.

When the HMD device 6600 is directed frontward, the controller 180 may display a first image 6620 included in a first region 740. A region 6610 corresponding to the first image 6620 in the entire region 700 of the omnidirectionally captured image is shown in FIG. 66A.

FIGS. 67A to 67C are views for describing an image displayed when the HMD device 6600 is rotated toward the sky.

As shown in FIG. 67A, when the HMD device 6600 is rotated toward the sky, the controller 180 may display a seventh image 6720 including the uppermost portion 701 of the omnidirectionally captured image. A region 6710 corresponding to the seventh image 6720 in the entire region 700 of an omnidirectionally captured image is located in a ceiling region in the first region 740 and is shown in FIG. 67B.

FIGS. 68A to 69C are views for describing an image displayed reversely when the motion is stopped in a state in which the HMD device 6600 is rotated toward the sky.

When the motion of the HMD device 6600 is stopped for a preset time in a state in which a seventh image 6720 including the uppermost portion 701 of the omnidirectionally captured image is displayed, the controller 180 may determine that the first input is received. The first input may be an input for changing the displayed region from the first region 740 to the second region 840 by passing through the uppermost portion 701 of the omnidirectionally captured region.

Figure 68A:
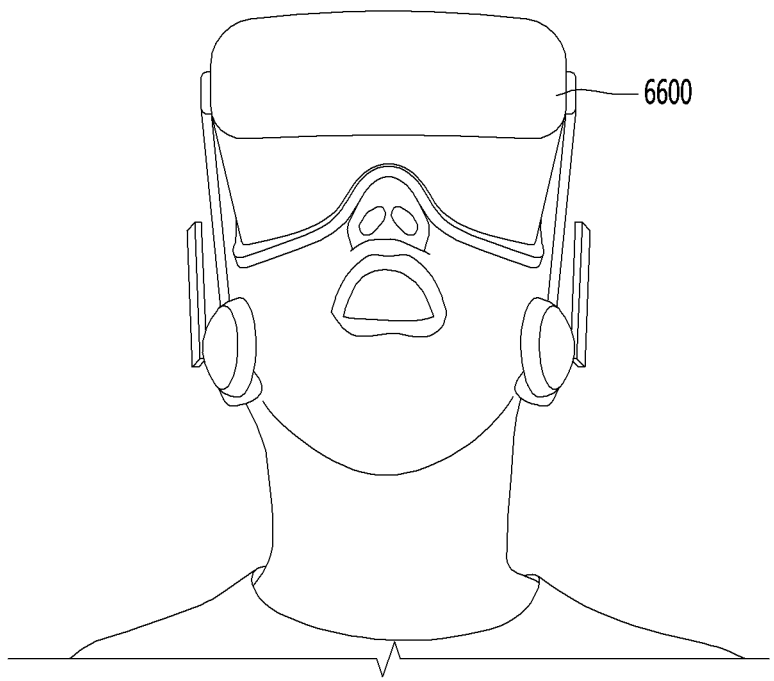
FIGS. 68A to 69C are views for describing an image displayed reversely when a motion of an HMD device is stopped in a state in which the HMD device is rotated toward the sky.
Figure 68B:
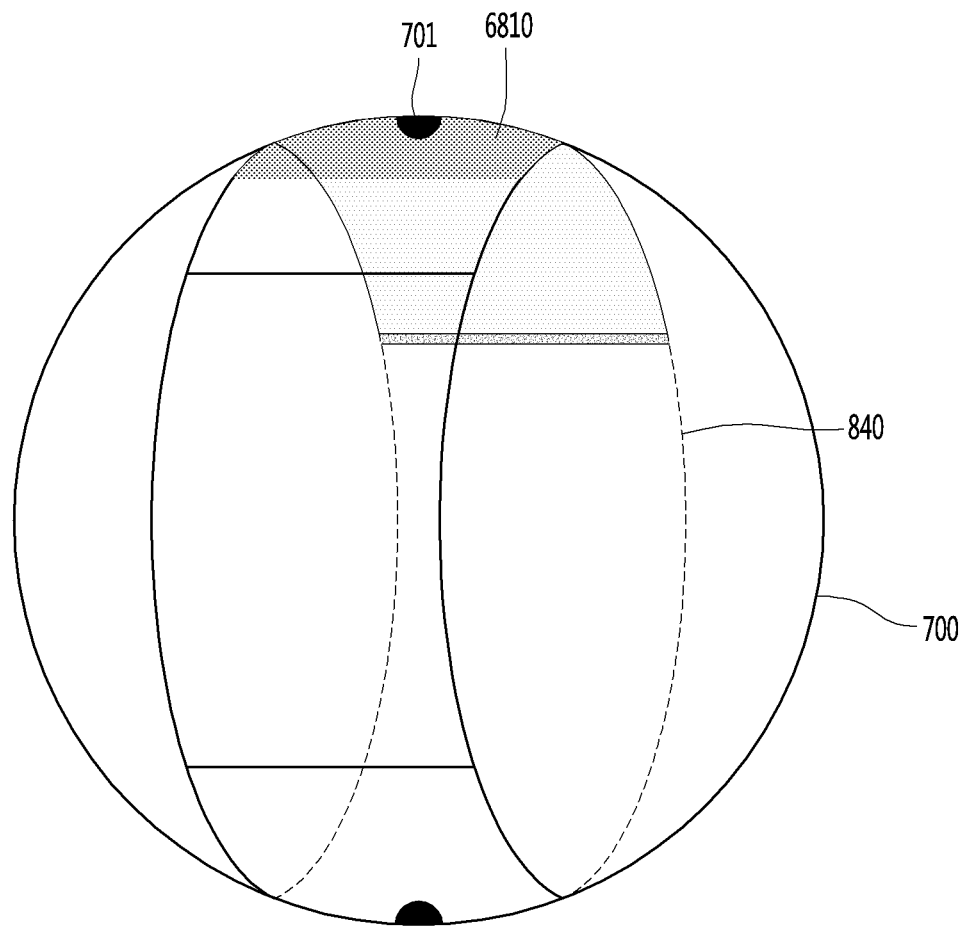
Figure 68C:
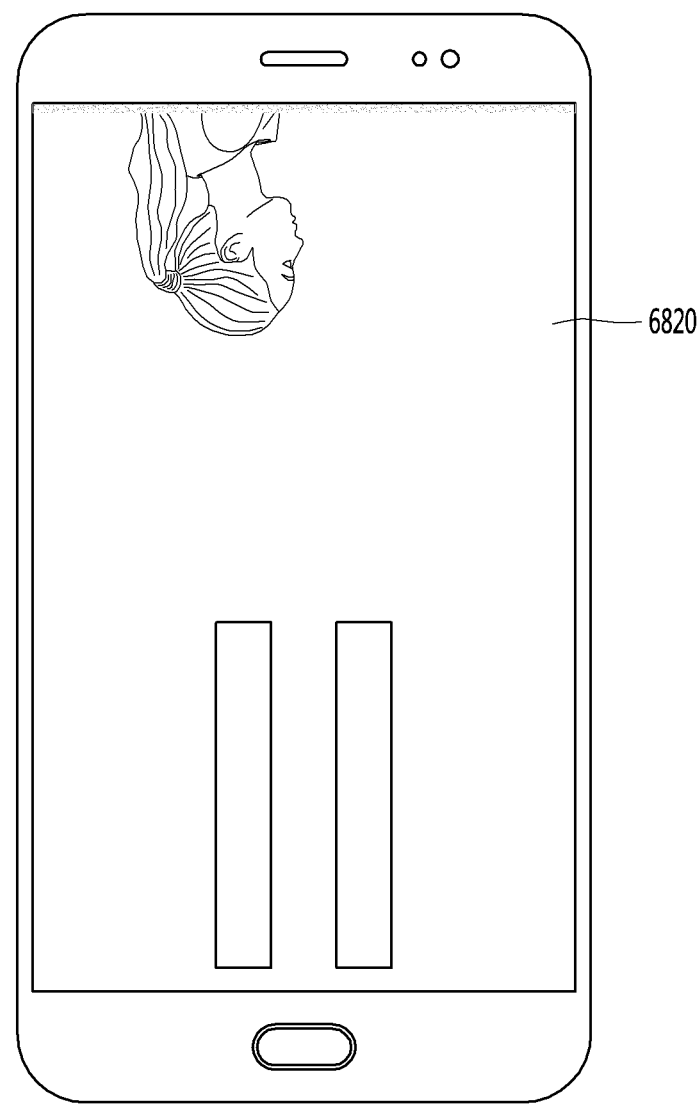

When the first input is received, the controller 180 may display an eighth image 6820 included in a second region 840. A region 6810 corresponding to the eighth image 6820 in the entire region 700 of the omnidirectionally captured image is shown in FIG. 68A.

The eighth image 6820 may be an image whose upper and lower sides are maintained from the seventh image 6720. That is, the eighth image 6820 may be a reversely displayed image.

Figure 69A:
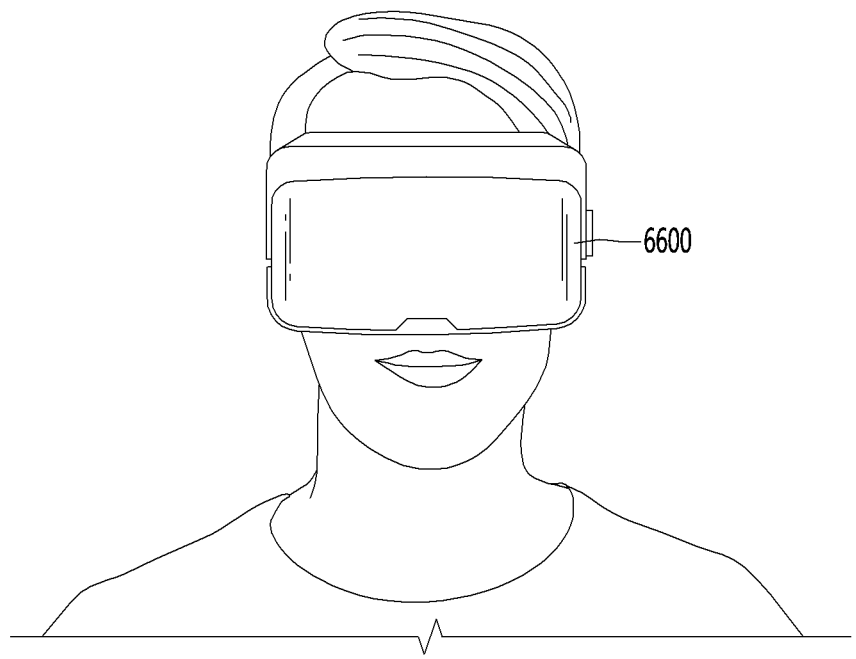
Figure 69B:
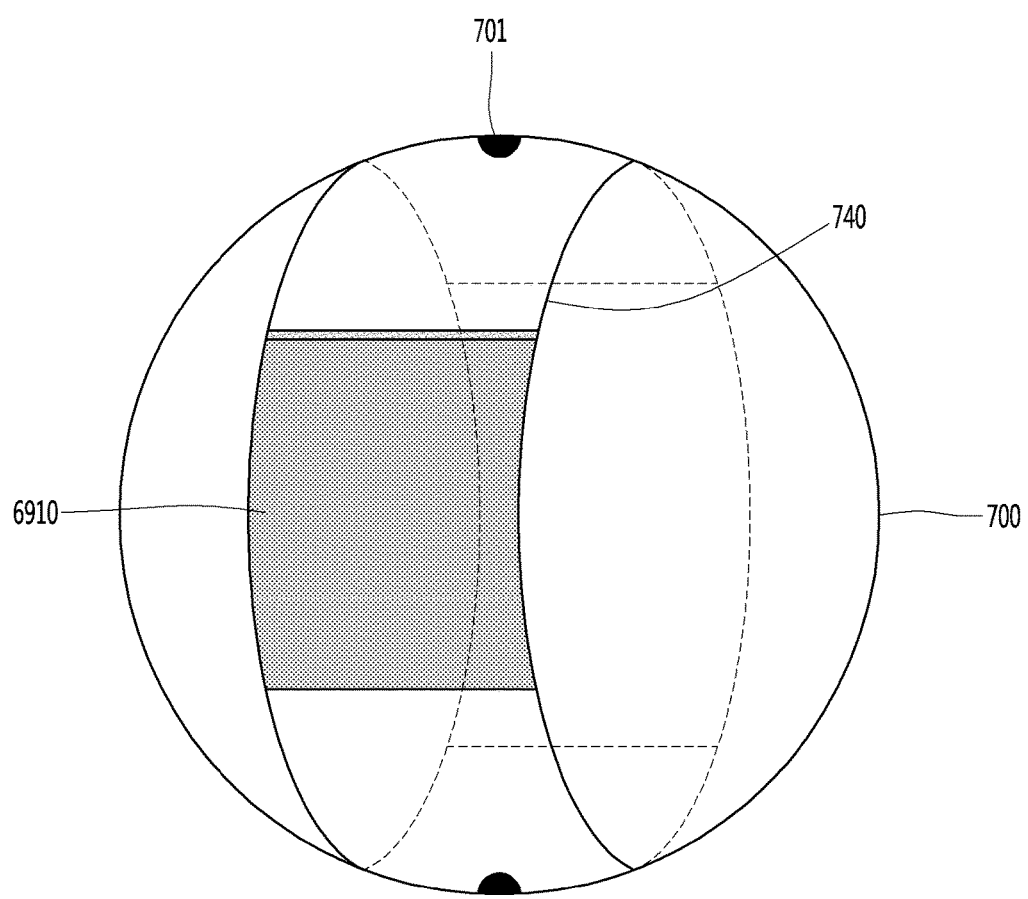
Figure 69C:
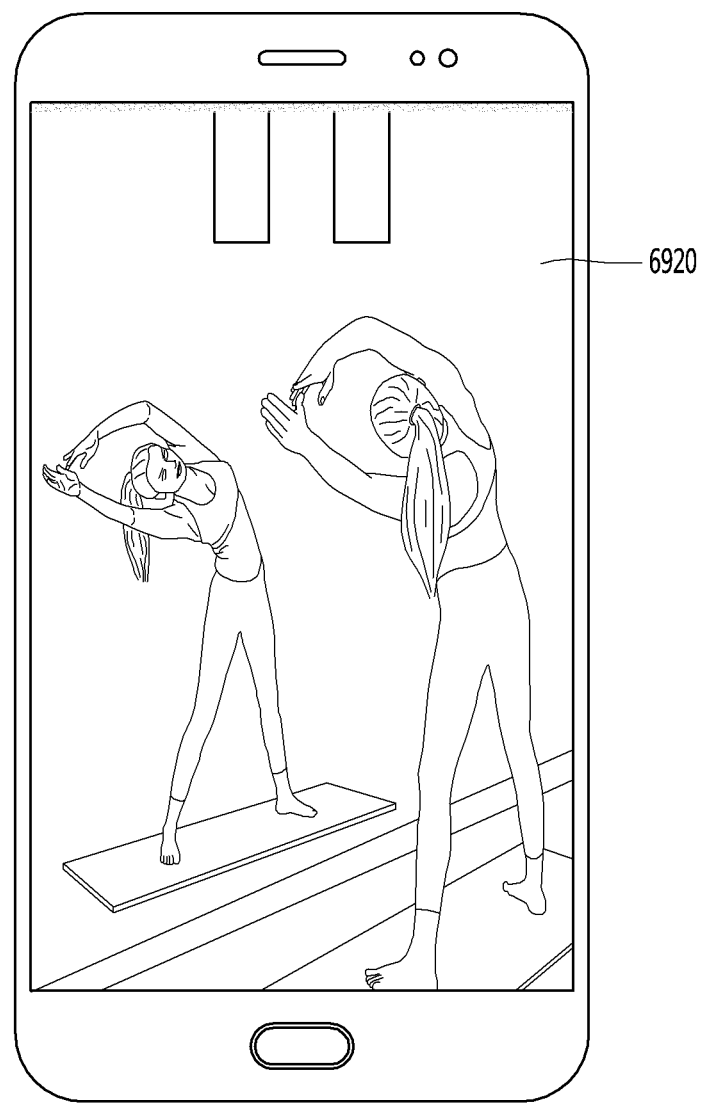

On the other hand, as shown in FIG. 69A, when the HMD device 6600 is rotated and directed frontward again, the controller 180 may display a ninth image 6920 including the first region 740. A region 6910 corresponding to the ninth image 6920 in the entire region 700 of the omnidirectionally captured image is shown in FIG. 69B.

When the omnidirectionally captured image is displayed on the display apparatus such as a mobile terminal, a manipulation for a direction change is performed by a drag or the like. Thus, it is easy to perform a manipulation for displaying an opposite region.

However, in the HMD device 6600, since the user has to physically tilt his or her head back, it may be difficult to perform a manipulation for viewing a reverse image of the opposite region.

Therefore, in accordance with the present disclosure, when the HMD device 6600 is stopped for a preset time in a state in which the image including the uppermost portion is displayed, it is determined that the first input is received, and the user can easily view the reverse image of the opposite region.

The image displayed reversely when the motion is stopped in a state in which the HMD device 6600 is rotated toward the sky has been described above, but the present disclosure is not limited thereto. This will be described in detail with reference to FIGS. 70A to 71C.

FIGS. 70A to 71C are views for describing an image displayed normally when the motion of the HMD device 6600 is stopped in a state in which the HMD device 6600 is rotated toward the sky.

When the motion of the HMD device 6600 is stopped for a preset time in a state in which a seventh image 6720 including the uppermost portion 701 of the omnidirectionally captured image is displayed, the controller 180 may determine that the first input is received.

Figure 70A:
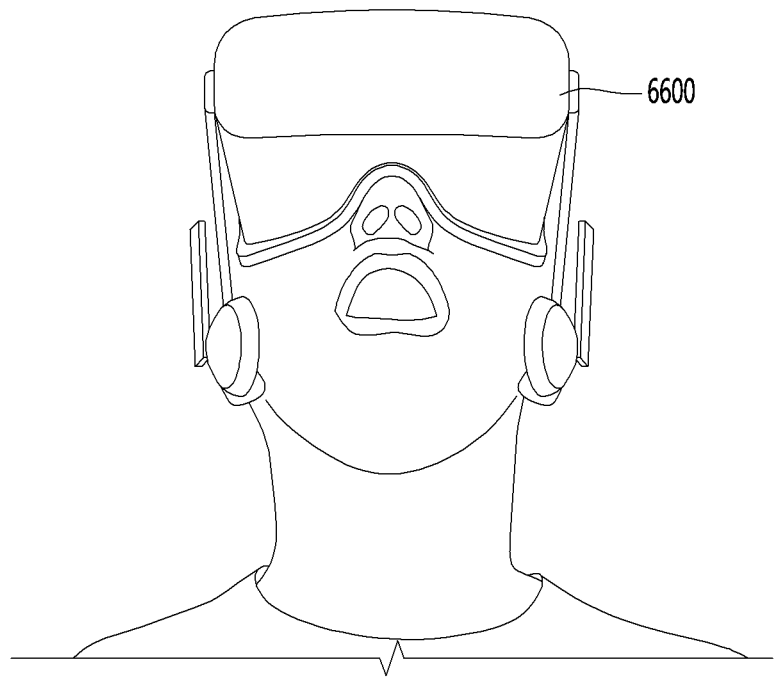
FIGS. 70A to 71C are views for describing an image displayed normally when a motion of an HMD is stopped in a state in which the HMD device is rotated toward the sky.
Figure 70B:
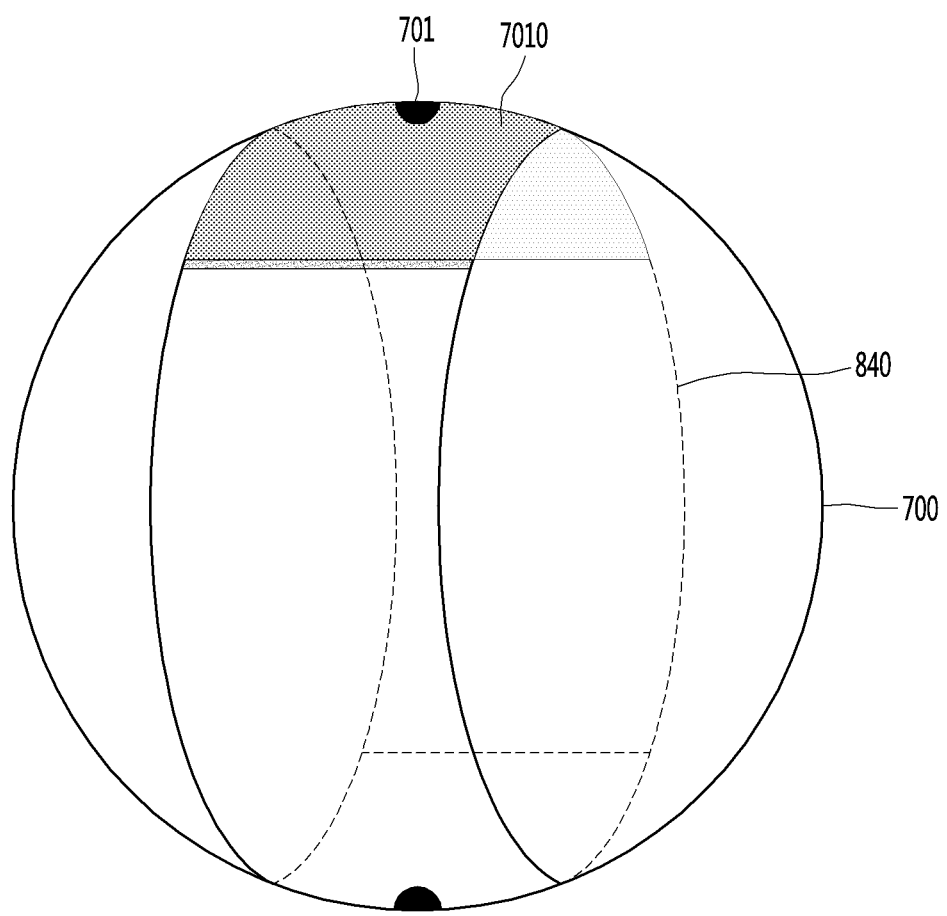
Figure 70C:
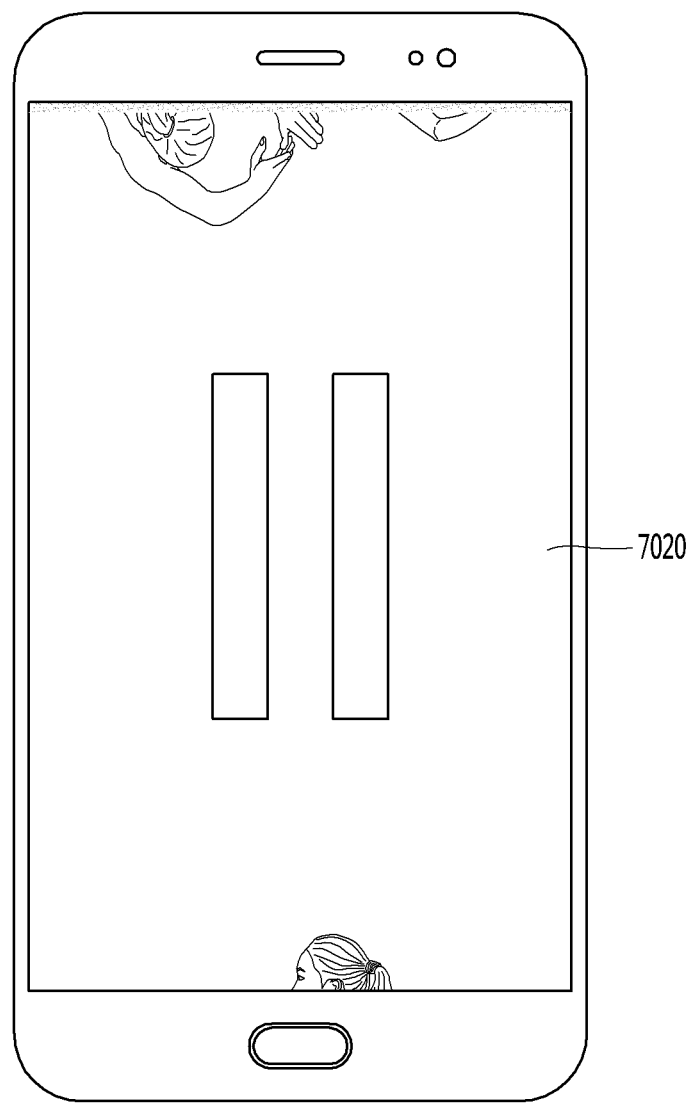

When the first input is received, the controller 180 may display a tenth image 7020 included in a second region 840. A region 7010 corresponding to the tenth image 7020 in the entire region 700 of the omnidirectionally captured image is shown in FIG. 70A.

The tenth image 7020 may be an image that is the same region as the seventh image 6720 and may be an image whose upper and lower sides are reversed from the seventh image 6720. That is, the tenth image 7020 may be a normally displayed image.

Figure 71A:
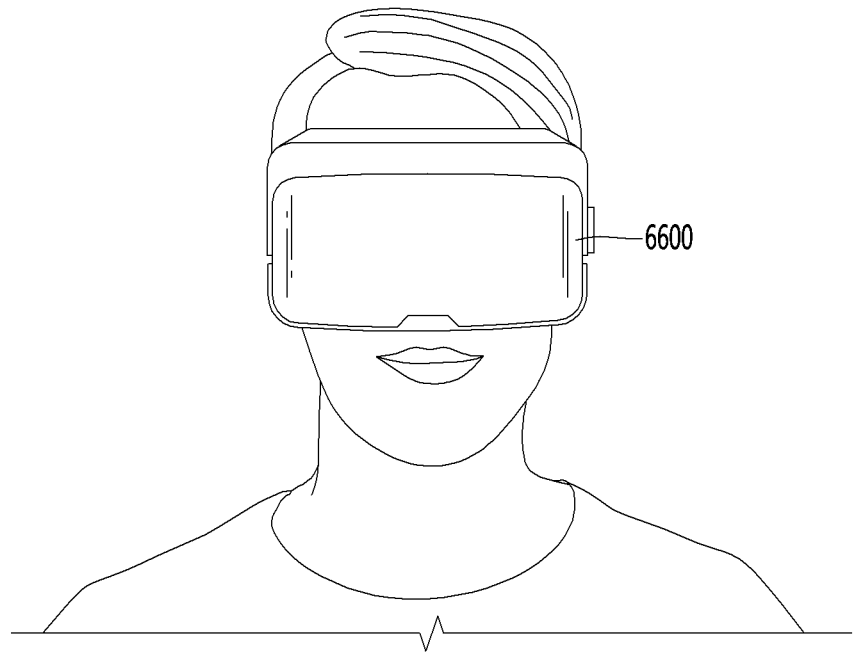

On the other hand, as shown in FIG. 71A, when the HMD device 6600 is rotated and directed frontward again, the controller 180 may display an eleventh image 7120 included in the second region 840. Specifically, when the rotated HMD device 6600 is rotated again and returned to a state prior to the rotation, the controller 180 may display the eleventh image 7120 included in the second region 840.

Figure 71B:
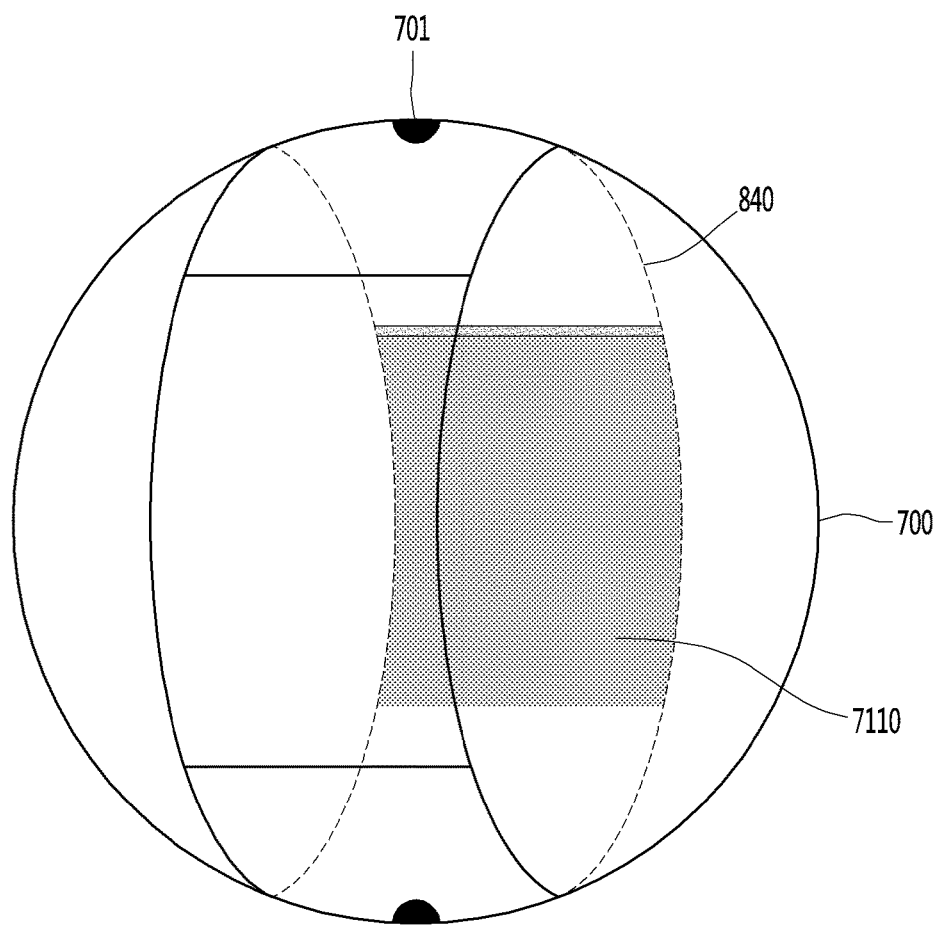
Figure 71C:
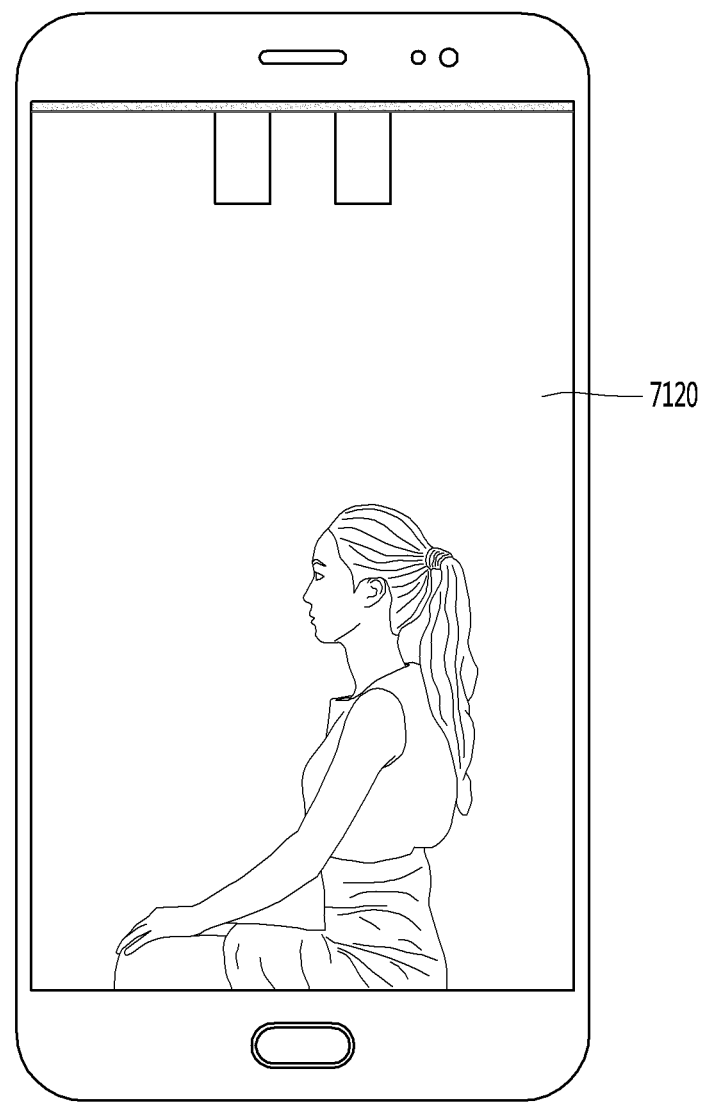

A region 7110 corresponding to the eleventh image 7120 in the entire region 700 of the omnidirectionally captured image is shown in FIG. 71B.

The user wearing the HMD device 6600 has to turn his or her body and look back so as to view the reverse image of the opposite region.

However, in accordance with the present disclosure, when the HMD device 6600 is stopped for a preset time in a state in which the image including the uppermost portion is displayed, it is determined that the first input is received, and the user can easily view the normal image of the opposite region.

Figure 72:
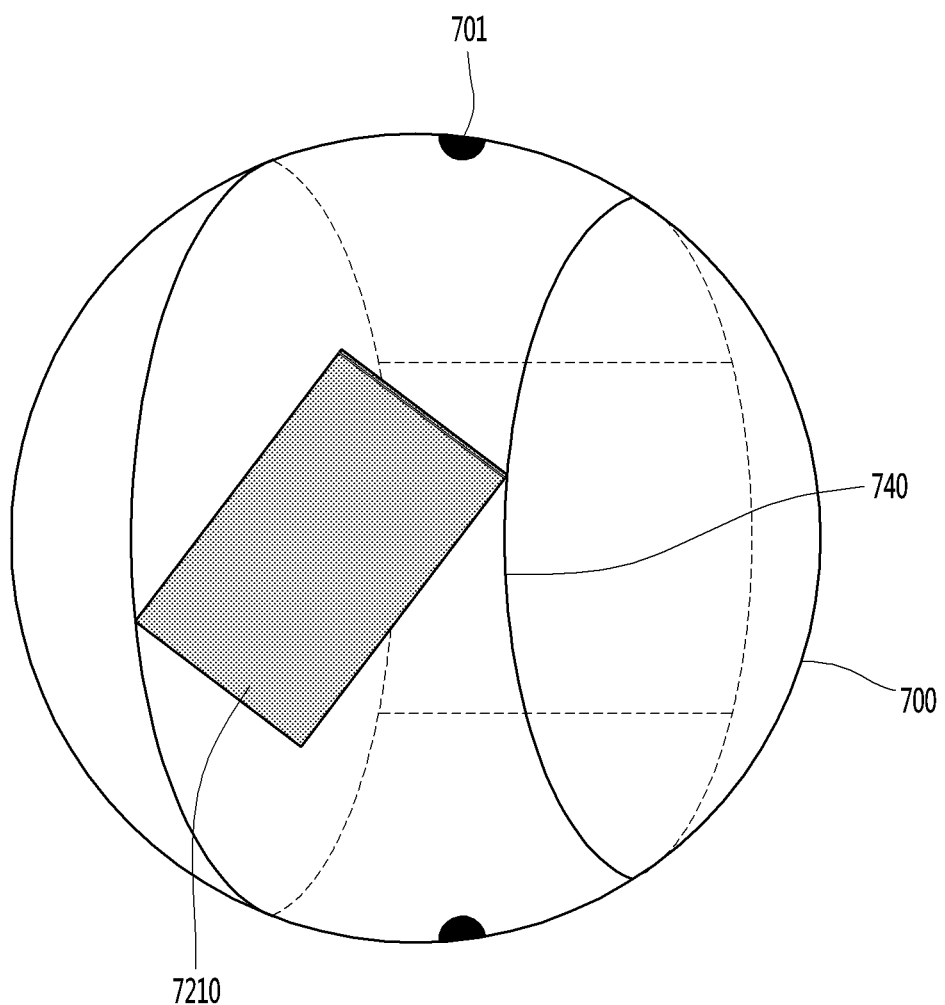
FIGS. 72 to 74 are views for describing a first region and a second region, in accordance with another embodiment of the present invention.
Figure 73:
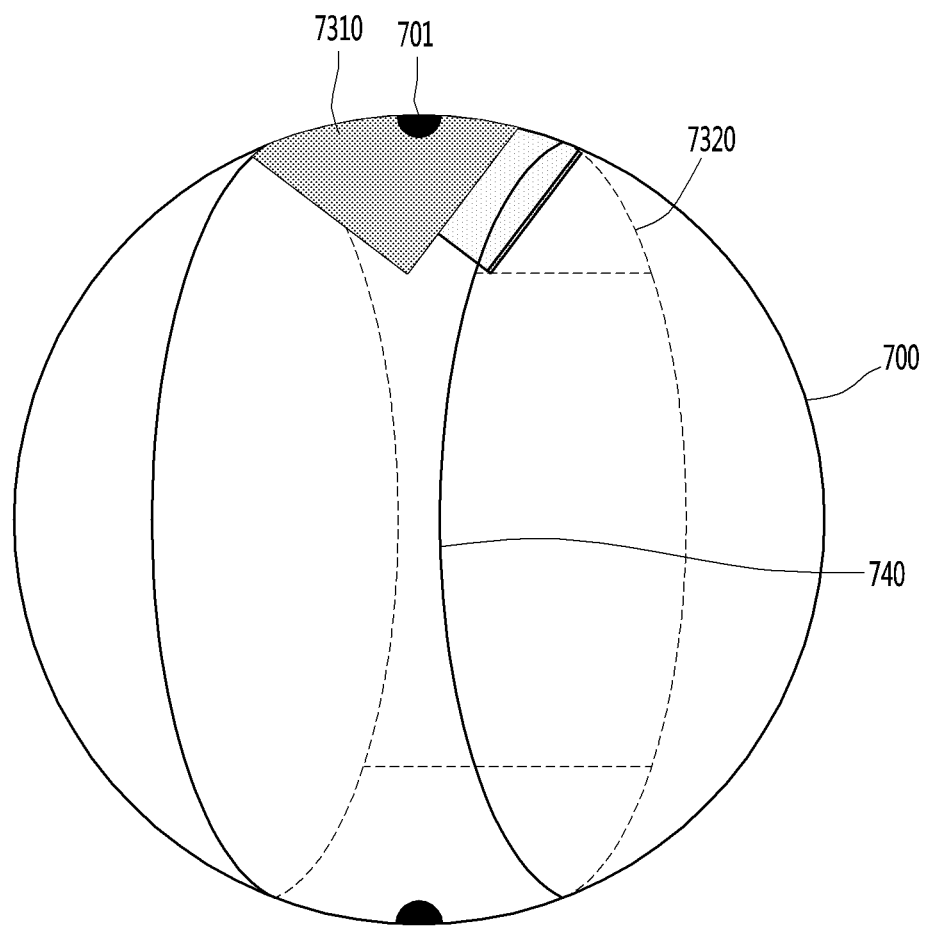
Figure 74:
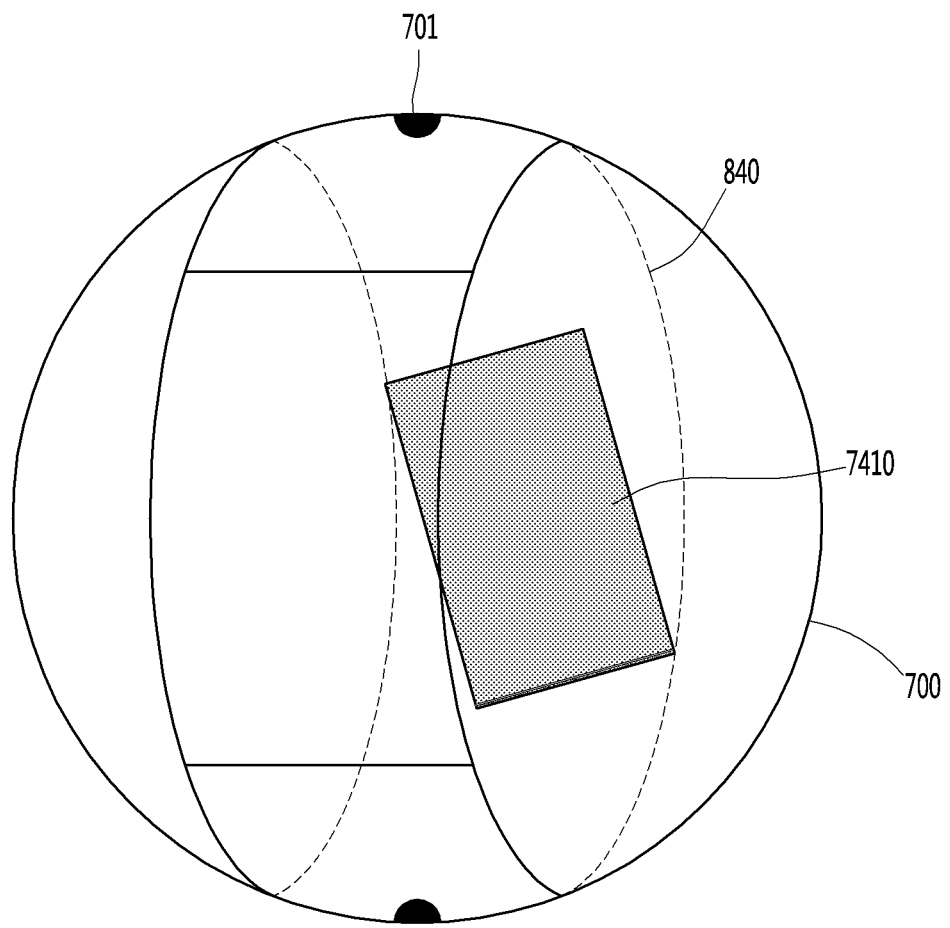

FIGS. 72 to 74 are views for describing a first region 740 and a second region 840, in accordance with another embodiment of the present invention.

It has been described above that the first region has the same horizontal (left/right) angle as the image currently displayed on the mobile terminal 100. Also, it has been described above that the upper portion of the region corresponding to the displayed image is directed toward the uppermost portion 701 of the omnidirectionally captured image.

However, the present disclosure is not limited thereto. As shown in FIG. 72, a region 7210 corresponding to the image displayed on the mobile terminal 100 may be inclined. Even in this case, the first region may have the same horizontal (left/right) angle as the displayed image. Also, the second region 840 may be a region that is symmetrical to the first region 740 with respect to at least one of the uppermost portion 701 and the lowermost portion 702.

Also, when the first input is received, a region 7310 displayed on the mobile terminal 100 may pass through the uppermost portion 701 of the omnidirectionally captured image, as shown in FIG. 73.

Also, after the region 7310 displayed on the mobile terminal 100 passes through the uppermost portion 701 of the omnidirectionally captured image, the controller 180 may display a second image included in a second region 840. A region 7410 corresponding to the second image in the entire region 700 of the omnidirectionally captured image is shown in FIG. 74.

That is, even when the region 7210 corresponding to the image displayed on the mobile terminal 100 is inclined, all the embodiments described above with reference to FIGS. 1 to 71 can be applied.

On the other hand, the controller 180 is generally a component that manages the control of the apparatus and may also be referred to as a central processing unit, a microprocessor, a processor, and the like.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A display apparatus comprising:
a display unit configured to display an image;
an input unit configured to receive an input from a user; and
a controller configured to display a first image included in a first region being part of an entire region of an omnidirectionally captured image, and to display a second image included in a second region being part of the entire region of the omnidirectionally captured image if a first input for changing a region displayed on the display unit in the entire region of the omnidirectionally captured image is received,
wherein the second region is a region that is symmetrical to the first region with respect to an uppermost portion of the omnidirectionally captured image,
wherein the first input is an input of dragging a screen so as to change the displayed region from the first region to the second region by passing through the uppermost portion of the omnidirectionally captured image,
wherein the controller is configured to change, in response to the first input, the displayed region from the first region to the second region by passing through the uppermost portion of the omnidirectionally captured image, and
wherein, as the displayed region passes through the uppermost portion, the controller is configured to display an image including the uppermost portion.

2. The display apparatus of claim 1, wherein the second image is an image whose upper and lower sides are maintained from the first image, and
wherein the second image is an image which is displayed reversely with regard to the first image.

3. The display apparatus of claim 2, wherein the controller is configured to display the second image together with a user interface, UI, indicating that the second image is an image whose upper and lower sides are maintained, and
the UI indicating that the second image is an image whose upper and lower sides are maintained is displayed to overlap a reversely displayed region in an entire region of the second image.

4. The display apparatus of claim 2, wherein the second image is an image that is within a preset range from the uppermost portion of the omnidirectionally captured image.

5. The display apparatus of claim 1, wherein, if an input for moving the displayed region toward an upper end of the first image is received in a state in which the first image is displayed, the controller is configured to move the displayed region toward the upper end of the first image at a first speed,
if an input for moving the displayed region toward an upper end of the second image is received in a state in which the second image is displayed, the controller is configured to move the displayed region toward the upper end of the second image at a second speed, and
the first speed is faster than the second speed.

6. The display apparatus of claim 1, wherein, if an input for moving the displayed region toward an upper end of the second image is received in a state in which the second image is displayed, the controller is configured to move the displayed region toward the upper end of the second image at a second speed,
if an input for moving the displayed region toward a lower end of the second image is received in a state in which the second image is displayed, the controller is configured to move the displayed region toward the lower end of the second image at a third speed, and
the third speed is faster than the second speed.

7. The display apparatus of claim 1, wherein, if an input for moving the displayed region toward an upper end of the second image is received, the controller is configured to display a third image, to which the display region is moved toward the upper end of the second image, and
if the reception of the input for moving the displayed region toward the upper end of the second image is ended, the controller is configured to move the displayed region toward a lower end of the third image.

8. The display apparatus of claim 1, wherein, if a second input for changing the displayed region from the first region to the second region by passing through a lowermost portion of the omnidirectionally captured image is received, the controller is configured to display a third image included in the second region,
the second region is a region that is symmetrical to the first region with respect to the lowermost portion of the omnidirectionally captured image,
the third image is an image whose upper and lower sides are maintained from the first image, in particular, wherein the third image is an image which is displayed reversely with regard to the first image, and the third image is displayed together with a UI indicating that the third image is an image whose upper and lower sides are maintained, and
the UI indicating that the third image is an image whose upper and lower sides are maintained is displayed to overlap a reversely displayed region in an entire region of the third image.

9. The display apparatus of claim 1, wherein the second image is an image whose upper and lower sides are reversed from the first image, and wherein the second image is an image which is not displayed reversely with regard to the first image.

10. The display apparatus of claim 9, wherein, if the first input is received, the controller is configured to display a fourth image including the uppermost portion of the omnidirectionally captured image and a UI indicating that an image is reversed, and if a third input is received, the controller is configured to display the second image.

11. The display apparatus of claim 9, wherein, if a second input for changing the displayed region from the second region to the first region by passing through the uppermost portion of the omnidirectionally captured image is received within a preset time after the reception of the first input, the controller is configured to not perform a function according to the second input.

12. The display apparatus of claim 1, wherein, if a fourth input is received, the controller is configured to display a fourth image whose upper and lower sides are maintained from the first image, wherein the fourth image is included in the second region, and if a fifth input is received, the controller is configured to display a fifth image whose upper and lower sides are reversed from the first image, wherein the fifth image is included in the second region.

13. The display apparatus of claim 12, wherein the fourth input is an input of ending a touch after the screen is dragged, and wherein the fifth input is an input of maintaining the touch during a preset time after the screen is dragged.

14. The display apparatus of claim 12, wherein the fourth input is an input of ending a touch after the screen is dragged, and wherein the fifth input is an input of, after the screen is dragged, additionally dragging the screen in the same direction as the dragged direction.

15. The display apparatus of claim 1, wherein the controller is configured to display a sixth image including the uppermost portion of the omnidirectionally captured image, and if a sixth input of indicating a specific direction is received from a user, the controller is configured to display a seventh image included in a region corresponding to the specific direction.

16. The display apparatus of claim 1, wherein the display apparatus is a head mounted display, HMD, device, the display apparatus further comprises a sensing unit configured to sense a motion of the HMD device, wherein the controller is configured to display a seventh image including the uppermost portion of the omnidirectionally captured image if the HMD device is rotated in a state in which the first image is displayed, and to determine that the first input is received if the motion of the HMD device is stopped for a preset time in a state in which the seventh image is displayed.

17. The display apparatus of claim 16, wherein the second image is an image whose upper and lower sides are maintained from the first image.

18. The display apparatus of claim 16, wherein the second image is an image whose upper and lower sides are reversed from the first image.

19. The display apparatus of claim 18, wherein, if the rotated HMD device is rotated and returned to a state prior to the rotation in a state in which the second image is displayed, the controller displays an image included in the second region.

20. The display apparatus of claim 1, wherein, if a seventh input is received, the controller displays an eighth image including the uppermost portion of the omnidirectionally captured image, if an input for reversing the upper and lower sides of an image is received, the controller displays the second image included in the second region, and the second image is an image which includes the same region as a region included in the eighth image and whose upper and lower sides are reversed from the eighth image.

\* \* \* \* \*